US007224539B2

(12) United States Patent
Schaack

(10) Patent No.: US 7,224,539 B2
(45) Date of Patent: May 29, 2007

(54) PROVIDING OPTICAL SYSTEMS HAVING IMPROVED PROPERTIES TO USERS OF CATALOG (STOCK) LENSES

(76) Inventor: David F. Schaack, 11719 Menaul Blvd. NE., Suite C, Albuquerque, NM (US) 87112

( * ) Notice: Subject to any disclaimer, the term of this patent is extended or adjusted under 35 U.S.C. 154(b) by 0 days.

(21) Appl. No.: 11/432,944

(22) Filed: May 12, 2006

(65) Prior Publication Data
US 2006/0256451 A1 Nov. 16, 2006

Related U.S. Application Data

(60) Provisional application No. 60/729,609, filed on Oct. 24, 2005, provisional application No. 60/680,608, filed on May 13, 2005.

(51) Int. Cl.
*G02B 3/08* (2006.01)
(52) U.S. Cl. .................................... 359/741; 359/743
(58) Field of Classification Search ............. 359/741, 359/743, 740, 738, 739, 733, 793, 691
See application file for complete search history.

(56) References Cited

U.S. PATENT DOCUMENTS 3,014,407 A 12/1961 Altman

OTHER PUBLICATIONS

Conrady, A. E., Applied Optics and Optical Design—Part One, book, p. 360, Dover, New York, 1985.

Kingslake, R., A History of the Photographic Lens, book, pp. 35-41, Academic Press, New York, 1989.
Smith, W. J., Modern Optical Engineering, book, pp. 448-449, McGraw-Hill, New York, 2000.
H. Rutten & M. vanVenrooij, Telescope Optics, book, pp. 157-160, Willmann-Bell, Richmond, Va., 2002.
Jamieson, T.H., Thick Meniscus Field Correctors, journal, Applied Optics, vol. 21, No. 15, pp. 2799-2803, 1982.
Product data sheet, "2.5 X CCD Compressor", Lumicon, Inc., available at www.lumicon.com/25x.htm, last accessed Jul. 27, 2006.
Walker, B. H., Lens data file, "Petzval EdSci.len", Lambda Research Corporation, available at www.lambdares.com/walker/fundamentals.phtml, last accessed Jul. 27, 2006.
Jaci, M., Jaci's Lenses, article, available at www.astronomia-carj.com.br/htdocs/english/jaci2.htm, last accessed Jul. 27, 2006.

*Primary Examiner*—Timothy Thompson

(57) ABSTRACT

Optical systems providing any or all of better images, brighter images, better optical usability, and better mechanical flexibility are made available to users of catalog lenses. These systems are enabled by apparatus including field compressor/corrector lenses and coordinated groups of field compressor/corrector lenses, and methods which include teaching the user how to make effective use of the apparatus. In preferred embodiments, the field compressor/corrector lenses are newly designed and are adapted to correct a field aberration of standard achromatic doublets. The apparatus may also be extracted from prior art lens combinations by separating these combinations into discrete components. These discrete components are then provided to the user and the user is taught how to combine these components to meet the user's specific requirements.

55 Claims, 51 Drawing Sheets

PRIOR ART

Maximum field over which a 50 mm. FL catalog achromat can produce an Average RMS Spot <= 10 microns Fig. 20
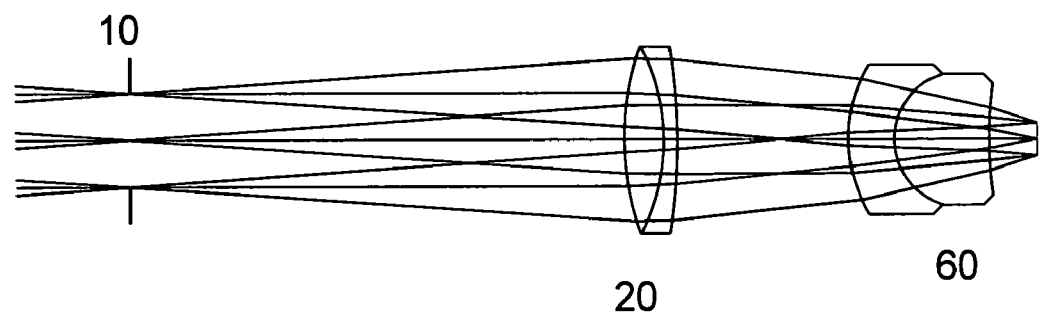
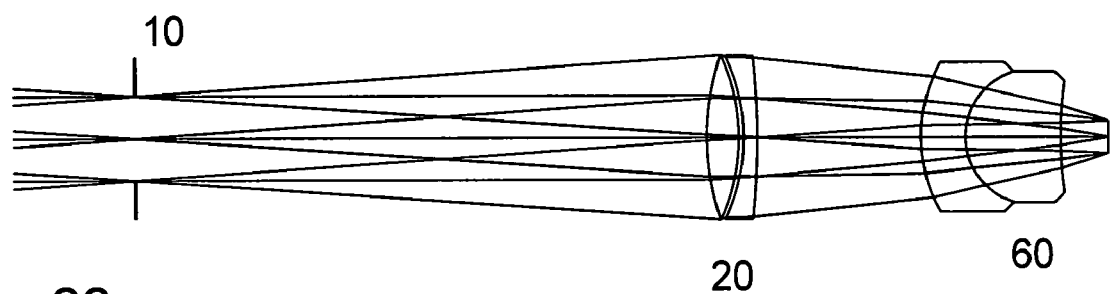
Fig. 22

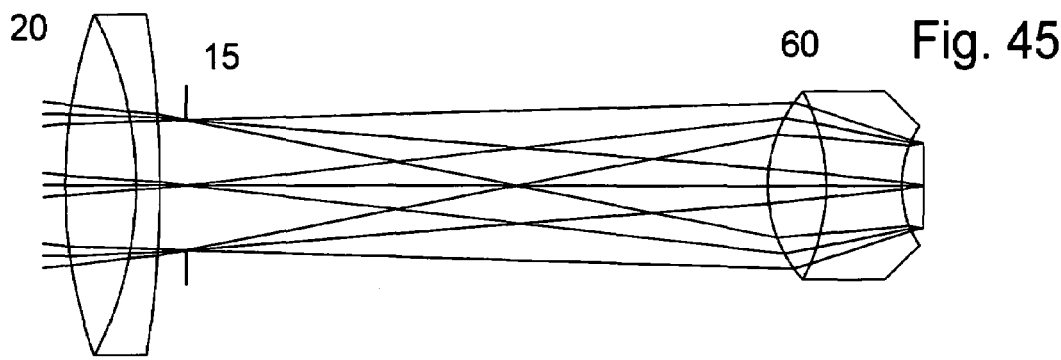
Fig. 45
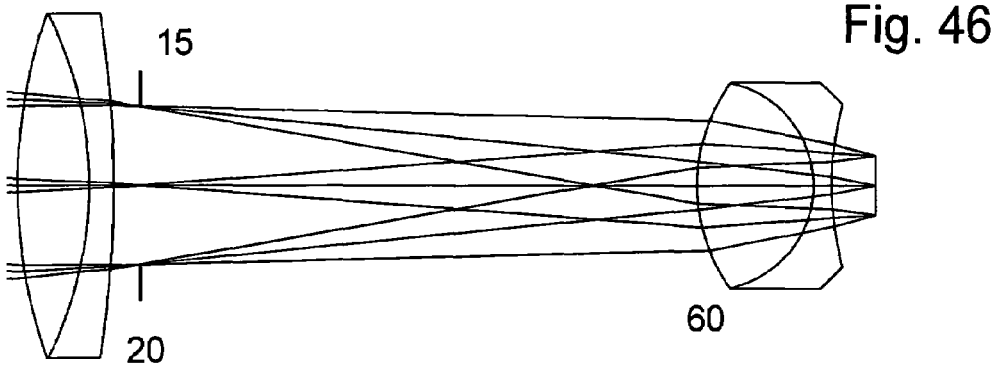
Fig. 46
Fig. 47
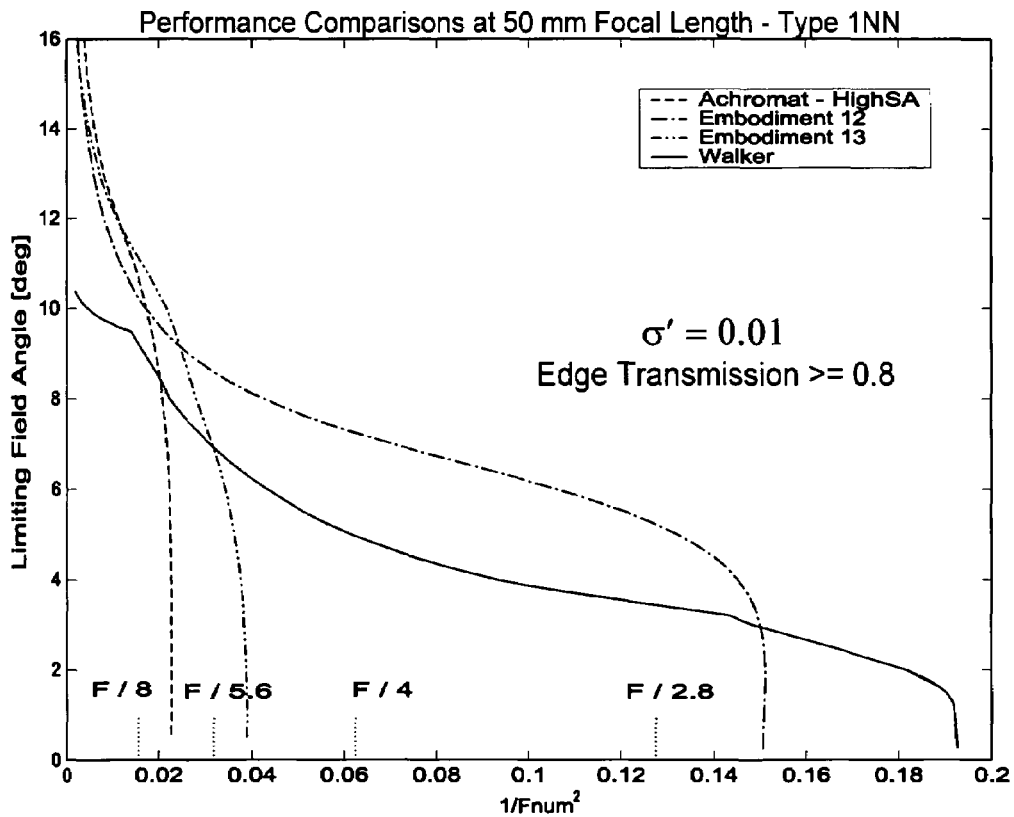

107 mm. FL, 38.1 mm. Dia.
60.0 mm. FL, 30.0 mm. Dia

Companion; B25-T20A
Primary #2; 50 mm FL, F/2.0
Stop
Primary #1; 100 mm FL, F/3.2
Companion; B50-T20A

PROVIDING OPTICAL SYSTEMS HAVING IMPROVED PROPERTIES TO USERS OF CATALOG (STOCK) LENSES

CROSS REFERENCE TO RELATED APPLICATIONS

This application claims the benefits of the following U.S. Provisional applications; No. 60/680,608 filed May 13, 2005, and No. 60/729,609 filed Oct. 24, 2005.

STATEMENT REGARDING FEDERALLY SPONSORED RESEARCH AND DEVELOPMENT (Not Applicable)

THE NAMES OF THE PARTIES TO A JOINT RESEARCH AGREEMENT (Not Applicable)

INCORPORATION-BY-REFERENCE OF MATERIAL SUBMITTED ON A COMPACT DISC (Not applicable)

BACKGROUND OF THE INVENTION

1. Field of the Invention

This invention relates to image forming optical systems, and more particularly, to systems that employ catalog (stock) lenses and that can employ field correcting lenses.

2. Description of Related Art

A. Use of Catalog Achromatic Doublet Lenses

It has long been known that chromatic aberration in lenses can be corrected by combining two lens elements of different glass types, one of positive power and one of negative power, into a single lens assembly. If the combination is to have a positive focal length, the positive element is made of a low dispersion glass commonly referred to as "crown" while the negative element is made of a high dispersion glass commonly referred to as "flint". When the glass types and relative powers of the two elements are correctly chosen, the resulting lens has a focal length that is largely independent of wavelength over a substantial working wavelength range. These lenses are known as achromatic doublets.

The most commonly used form of achromatic doublet is also substantially corrected for spherical aberration for an object at infinity, and is then often referred to as a "telescope objective". In addition, an telescope objective can also be substantially corrected for coma with the aperture stop at the lens; these variants are called "aplanats". (Hereinafter, I always use the term "aplanat" to refer to a lens which is corrected for both spherical aberration and for coma with the stop at the lens. I will use the term "aplanatic" in a more general way, as will be discussed below.)

Today such lenses have a much wider range of applications than telescopes, and achromatic doublets are widely available from a large number of manufacturers who publish catalogs of them. The two elements of these catalog achromatic doublets almost always have a common radius of curvature on their adjacent surfaces and are cemented together at these surfaces to lower the cost. Cemented doublets sacrifice some ability to correct higher order aberrations, but with modern glass types, their correction for axial color, (third order) spherical aberration and (third order) coma can be quite good.

The resulting lenses, which I will refer to hereinafter as standard achromats, are very useful since the correction of the monochromatic aberrations allow them to perform much more like ideal lenses than do the simple singlet lenses that are also commonly available. As a result, standard achromats are widely used in laboratory, prototype, and small production run optical instrument applications where the cost and/or delivery time of custom designed and/or manufactured lenses cannot be justified.

It is known to those skilled in the art that although standard achromats are usually corrected for coma, the size of the field of view over which they provide good performance is limited by the additional aberrations field curvature and astigmatism. The useful field of view of these lenses is usually taken to be 2 degrees radius or less. In fact, it is known from optical aberration theory that if both spherical aberration and coma are corrected in a thin lens, that the astigmatism will not affected by the position of the aperture stop, so that an aplanat will always have an uncorrected astigmatism when the lens is used in its normal orientation.

Note that hereinafter I will sometimes refer to "field aberrations" or "a field aberration". In this document I use the term "field aberration" as a generic term that may include any or all of coma, field curvature, astigmatism, or lateral chromatic aberration.

It is also known to those skilled in the art that if one reverses the orientation of a standard achromat (so that the lens is no longer corrected for spherical aberration), then one can find a position of the stop that minimizes the astigmatism of the lens. With the stop in this position, the lens can be used over a much larger field of view; a field angle in excess of 20 degrees is not unreasonable. The problem is that in this case the aperture of the lens must be kept small, since the large spherical aberration produced by the reversed lens will dominate the quality of the image otherwise.

There are many practical applications in which lenses are used in combination to relay and otherwise manipulate images in which the field of view of standard achromats, when used at large aperture, is not adequate. In addition, the focal ratio of achromats is often larger than needed to obtain the necessary amount of light in the image.

B. Use of Stock Multi-element Lenses

While there are a number of existing multi-element photographic and video lenses immediately available from stock that have low focal ratios and good performance over wide fields of view, these lenses cannot often be employed in relay and finite conjugate applications that arise in optical instrument design. One of the recurring frustrations that optical system designers face these days is that the manufacturers of these lenses generally refuse to release their detailed designs to ease their use within optical systems. In fact, the problem is more than lack of access to their detailed designs; additional problems with making use of existing multi-element, lenses in these applications are:
  (a) Accurate paraxial properties are not made available by their manufacturers, so that it is not possible to accurately determine the layout of an optical system that will perform a desired function without first laboriously characterizing the lenses.
  (b) Locations of the entrance and exit pupils are not made available by their manufacturers, so that one cannot determine the vignetting that will occur when using such lenses in combination with other lenses, once again without performing a laborious characterization.

(c) The internal stops inherent in these lenses often lead to unacceptably large vignetting when these lenses are combined into relays.

(d) These lenses are often physically too large to fit into the available space. They lack the flexibility to address the wide variety of system mechanical constraints that appear in practice.

(e) These lenses are often too expensive for the application to bear.

As a result, individuals relaying or manipulating images within optical instruments often make use of standard achromats for applications requiring a wider field of view than achromats can handle and accept the resulting poor performance because there is simply no better alternative short of custom made lenses.

C. Use of Correcting Lenses

It is a well established principle in lens design to use multiple lenses in cooperation so that one lens or lens group can correct for aberrations caused by another lens or lens group. There are several known approaches to correcting field aberrations of a lens, some of which have previously been applied to achromats. However, none of the high quality approaches have, to my knowledge, been conceived of as optical components of general utility. As I will demonstrate, none of the prior art approaches addresses all aspects of the current problem, and in fact, the prior art strongly teaches away from the solution that I have devised.

C1. Field Flattening Lenses

In the 1870's, Scottish astronomer C. Piazzi-Smyth suggested placing a lens element having a strong negative power close to the image plane for correcting the field curvature in an image. In concept, the aberrations of the field flattening lens have little effect on the image, and the size and location of the image are also little changed by its presence. Unfortunately, in practice, only a small amount of field curvature can be corrected in this manner before the aberrations of a single-element field flattener do affect the quality of the image. While sometimes useful, in no way can single-element field flatteners be considered a general purpose solution to improving the performance of achromat-based systems.

Two-element field flatteners are also known, for example Friedman, U.S. Pat. No. 4,772,107, and Sugawara, U.S. Pat. No. 6,563,642. Just as with the Smyth field flattener, these act to increase the focal length of the primary optical system. In the examples disclosed by Friedman the magnifications (that is, the ratio of the focal length of the lens combination to the focal length of the primary lens) are 1.08 and 1.09, while in the case of Sugawara, the magnifications of the field flatteners shown are about 1.4. While almost everyone would agree that Friedman's lenses are field flatteners, I believe that there would be disagreement among those skilled in the art as to whether Sugawara's lenses should be considered to be field flatteners, as he refers to them, or whether these are really the diverging element in what amounts to a telephoto system. While telephoto systems have their uses, they do not address the problem I am concerned with because the focal ratio of the combination is actually larger than the focal ratio of the primary lens. What is needed is that the focal ratio of the system of achromat plus corrector should be smaller than the focal ratio of the achromat used alone, thereby providing, at least potentially, a higher irradiance ("more light") in the image.

C2. Field Correcting Lenses

Reflecting telescopes often exhibit coma. It is common to use multi-element coma correcting lenses with large professional telescopes to increase their useable fields of view, as discussed, for instance, by C. G. Wynne, in the journal article "Field correctors for large telescopes", *Applied Optics*, vol. 4, No. 9, September 1965, pp. 1185–1192, and by R. N. Wilson in "Corrector systems for Cassegrain telescopes", *Applied Optics*, vol. 7, No. 2, February 1968, pp. 253–263. Depending on the design of the telescope, such correctors may be intended to correct for coma only or for astigmatism and field curvature or for all three aberrations simultaneously. However, the fields of view over which such corrections are offered are small; in fact the widened fields for these telescopes are often smaller than the unaided field capability of an achromat. In addition, the color correction required in such correctors is such that it can often be satisfied by making all elements of the corrector from the same glass; the same is not true for the optical instrument applications I am addressing. Finally, these correctors have essentially no effect on the speed of the cone illuminating the image, which is an advantage for their intended applications, but is not what is needed here.

C3. Field Compressor/Corrector Lenses

In amateur astronomy, it is now common to use a multi-purpose lens near the focal plane of a Schmidt-Cassegrain telescope when photographing the heavens using a solid-state imager. This lens can correct for coma and for field curvature of the telescope, and it also reduces the focal ratio of the cone illuminating the image. An example is provided by H. Rutten and M. vanVenrooij in the book *Telescope Optics*, Willman-Bell, © 1988–2002, pp. 157–159. Similar lenses have also been provided for use with Newtonian telescopes, an example being U.S. Pat. No. 4,881,801 by R. J. Gebelein. I call these multi-purpose lenses "field compressor/corrector" lenses. Other terms that are sometimes used are "focal reducers" and "telecompressors", but I prefer to reserve these terms for lenses that do not combine field correction with focal ratio compression.

Field compressor/corrector lenses could conceivably address the problem I am trying to solve. However, field compressor/corrector lenses designed for use with reflecting telescopes are not directly applicable to use with achromats because the field aberrations of an achromat are not the same as are the field aberrations of a reflecting telescope. There have been provided focal reducers for achromatic (indeed for apochromatic, that is, having a color correction superior to that of an achromat) refractive telescopes which reduce the focal ratio of the telescope at the image without destroying the already excellent image quality provided by the primary lens. These focal reducing lenses are superb for their purpose, but they are multi-element, expensive, and are designed to work only over small field of view. They also are not designed to correct for field aberrations. Note that the designs of multi-element field compressor/corrector and focal reducer lenses offered commercially for use in amateur astronomy are, for the most part, proprietary and have not been published.

There have been suggested, and even provided, focal reducing lenses for use with refracting telescopes in amateur astronomy. However, these lenses are not expected to produce high quality images. This is clear when one considers that according to their manufacture's literature they are considered to be equally applicable to use with either reflecting telescopes or refracting telescopes, and that no construction or performance data is ever provided. An example, I believe, is the "2.5×CCD Compressor" sold by Lumicon International of Simi Valley, Calif. It is important that the user be enabled to provide the best possible performance in his or her application and this certainly is not the case with these lenses. In fact, recently the use of a standard achromat has also been suggested for use as telescope focal reducer, but it is clear to anyone skilled in the art that such a lens can only provide modest performance at best. In summary, in the prior art a doublet field reducer is used on a refractive telescope either by those who are not skilled in the art, or by those who are not making a serious attempt to correct aberrations of the telescope objective.

C4. Meniscus Correctors

Thick meniscus lenses have also been used as correctors in otherwise reflective telescope systems, to form what are referred to as "catadioptric" telescopes. However, it was pointed out by T. H. Jamieson in the journal article "Thick meniscus field correctors", *Applied Optics*, vol. 21, No. 15, 1 Aug. 1982, pp. 2799–2803, that a thick meniscus lens can also act as a field corrector for an achromatic doublet. He also points out that a thick meniscus can have considerable positive power while offering field correction, that is, that it can act as a field compressor/corrector. Jamieson depicts examples and discusses the use of these lenses in a general way, but what this reference lacks is any consideration of a corrector as a standard optical component of general utility; it is instead considered as a component to be used inside a more complex lens. It also lacks any consideration of color correction, which makes sense, since when the meniscus is used inside a more complex lens, the color correction can be accomplished elsewhere. In fact, it is clear that the meniscus correctors discussed by Jamieson, even though he refers to them as "thick", are much too thin to be color corrected. On the contrary, I have found color correction to be extremely important in addressing the current problem.

Much thicker examples of meniscus lenses used near an image were disclosed by F. E. Altman in U.S. Pat. No. 3,014,407. The lenses disclosed by Altman are used in pairs as pupil relay lenses. On analysis, one finds that Altman's lenses make very poor field correctors, and also that they are not reducers but instead act to increase the focal ratio at the image. Thus, Altman's lenses are not a solution either; these lenses are useful only in relay pairs where one of them can correct for the aberrations of another. Altman does disclose the use of a thick meniscus formed from two different glasses, i.e., a doublet. However, it becomes clear on analysis that this doublet does not result from any thought of color correction; Altman used it, as he discusses, because an aspherical surface is used on one surface of the lens. Making the lens as two components then allows use of a thinner piece of glass that is more easily slumped or molded to have the aspheric surface shape; this piece is then cemented to a second piece of glass to make up the complete meniscus element at the desired large thickness. In fact, the performance of Altman's lenses as field correctors are so poor that color correcting them would be irrelevant. Altman heavily relied on the fact that when these lenses are used in pairs for a 1:1 pupil relay the lateral chromatic aberration of one cancels the other.

D. Lens Combinations

In the prior art there are known combinations of two component lenses and in many of these combinations one component could be considered to be correcting a field aberration of the other component. However these combinations have, for the most part, been considered useful only as combinations, that is, their components have not been considered to be useful individually. Lens combinations per se, therefore, cannot be considered as prior art to a field correction lens of general utility, as there is no guidance as to how or when the "corrector" lens of the pair could be used to correct aberrations any lens other than the one with which it was originally combined.

That being said, it is important to examine prior art lens combinations because of the teachings about what is possible in the way of correction of field aberrations contained in the prior art. In the few cases where a first component of the combination could be considered useful when used by itself, the second component has generally been considered unable to correct field aberrations of the first component. There are strong statements to this effect in the prior art, and most of the known lens combinations have designs that are consistent with these statements. In those few examples I have found where the designs are not consistent with these teachings, the resulting low performance of the combinations is exactly what one would expect according to these teachings. The issues here are complex, and a more detailed discussion is deferred until Section 12 of the Detailed Description of the Invention.

E. Summary

Standard achromats are high quality lenses, immediately available from stock, that are widely used in laboratory and short production run applications where the cost and/or delivery time of custom made lenses is unacceptable. Their optical performance is adequate where the application requires imaging only over narrow fields of view, or where the application requires only a large focal ratio. However, there are many applications where the performance of standard achromats is not adequate, yet they are used simply because there is currently no better available option.

Existing stock multi-element lenses are often not helpful in these applications, either because necessary data are unavailable or because they lack the mechanical and/or optical flexibility required.

Field compressor/corrector lenses might be considered suitable for combining with achromats to improve the performance of achromats in these applications, however those previously known are not suitable for one reason or another. High quality correctors have been implemented as multi-element lenses, and doublet field compressor/correctors have been used only when optical quality was not a serious goal. In fact, the prior art in two-component lens combinations teaches strongly against trying to combine an achromat with a doublet compressor/corrector lens if a high quality image over an extended field of view is required. The use of thick meniscus correctors has also been suggested, but the correction of color aberrations in the corrector was not then considered necessary.

Fundamentally, what is needed is an optical system which can produce an improved performance in optical systems that must operate at larger fields of view and/or smaller focal ratios than can be handled by standard achromats. The new optical system should be as easy to apply and as flexible as existing standard achromats, both optically and mechanically. In addition, the new system should have a cost in line with the cost of standard achromats. Ideally, this solution would be suitable in all respects for selling in catalogs just as are standard achromats. The solution should be as universal as possible in that it should have a range of applicability approaching that of achromats themselves. Last, but not least, the new optical system should be supplied with all of the information needed for it to be effectively applied to a user's requirements, no matter what those requirements happen to be.

BRIEF SUMMARY OF THE INVENTION

My new system resolves the problems identified with the prior art and offers additional advantages as well. The fundamental goals of my system are to increase the range of imaging optical systems that can be constructed using catalog (stock) lenses and to make the design of such systems, for challenging applications, easier and quicker. In order to meet these goals, my new system has five major aspects:

(a) A new optical component of general utility, that I call the companion.

(b) Combination of the companion with a primary lens to form a combination optical system of unprecedented imaging performance, providing the user with the advantages of better quality images, brighter images, or both. In many embodiments, the primary lens is a standard achromatic doublet.

(c) Provision of adequate technical information'to the user so that each individual user can be taught how to select a companion and a suitable matching primary lens to obtain the best feasible results consistent with the requirements of his or her own application.

(d) Provision of the companion and the primary lens to the user as discrete components, giving the user advantages in optical and mechanical flexibility, to better match the requirements of his or her own application.

(e) Provision of suitable coordinated groups of companions, so that users with requirements that vary over a wide range of focal lengths, focal ratios, fields of view, overall length requirements, and back focal length requirements can obtain these advantages.

In many embodiments, the new optical component, the companion, is a doublet field compressor/corrector lens which corrects a field aberration of a standard achromatic doublet. I have found that companions with suitable designs can be combined with matching standard achromats in various ways to produce optical systems that not only have higher performance than any previously known two-doublet lens combination, but which also have a much wider range of applicability than is contemplated by the prior art.

I have found that the preferred location of the stop in such combinations is often in front of the combination. This characteristic is just what is needed for use in optical instrument applications. As a result, these companion combinations are especially helpful in just those applications for which achromats are the only practical non-custom option currently available.

I have found that the matching between suitable companions and primaries is not critical, in that many different primaries having approximately the same focal lengths can be combined with a given companion to produce optical systems having similar performances over a wide range of system focal ratios and fields of view. I have also found that the optical performance of the combination system can be substantially insensitive to the focal length of the combination system over a useful range of system focal lengths. This means that the number of companions that it is necessary to provide to cover a particular range of applications is minimized. It also means that when these combination systems are in turn combined into optical relays, that the performance of the optical relays are substantially independent of the magnification of the relay over a substantial working range. This is an entirely new, valuable, and surprising result.

I have also found that companion combination relays can have optical performance which is substantially independent of the position of the entrance pupil, while at the same time maintaining a low level of vignetting, making them valuable for relaying images within optical instruments.

In order to meet these goals it was necessary to gain a full understanding of the problem. To gain this understanding I developed a new perspective on the performance of imaging optical systems. This new perspective allows one to display the performance of any number of optical systems having different focal ratios and fields of view, but which use the same optical components, on a single chart. Using this new perspective I have uncovered a number of unanticipated and surprising results.

In contradistinction to the teachings of the prior art, I have found that a companion, when combined with an aplanatic primary, can correct a field aberration of that primary to produce a combination optical system of high performance over a significant field of view.

Further objects, advantages, and features of my system will become apparent from a consideration of the drawing and ensuing description.

BRIEF DESCRIPTION OF THE SEVERAL
VIEWS OF THE DRAWING

Figure 14:
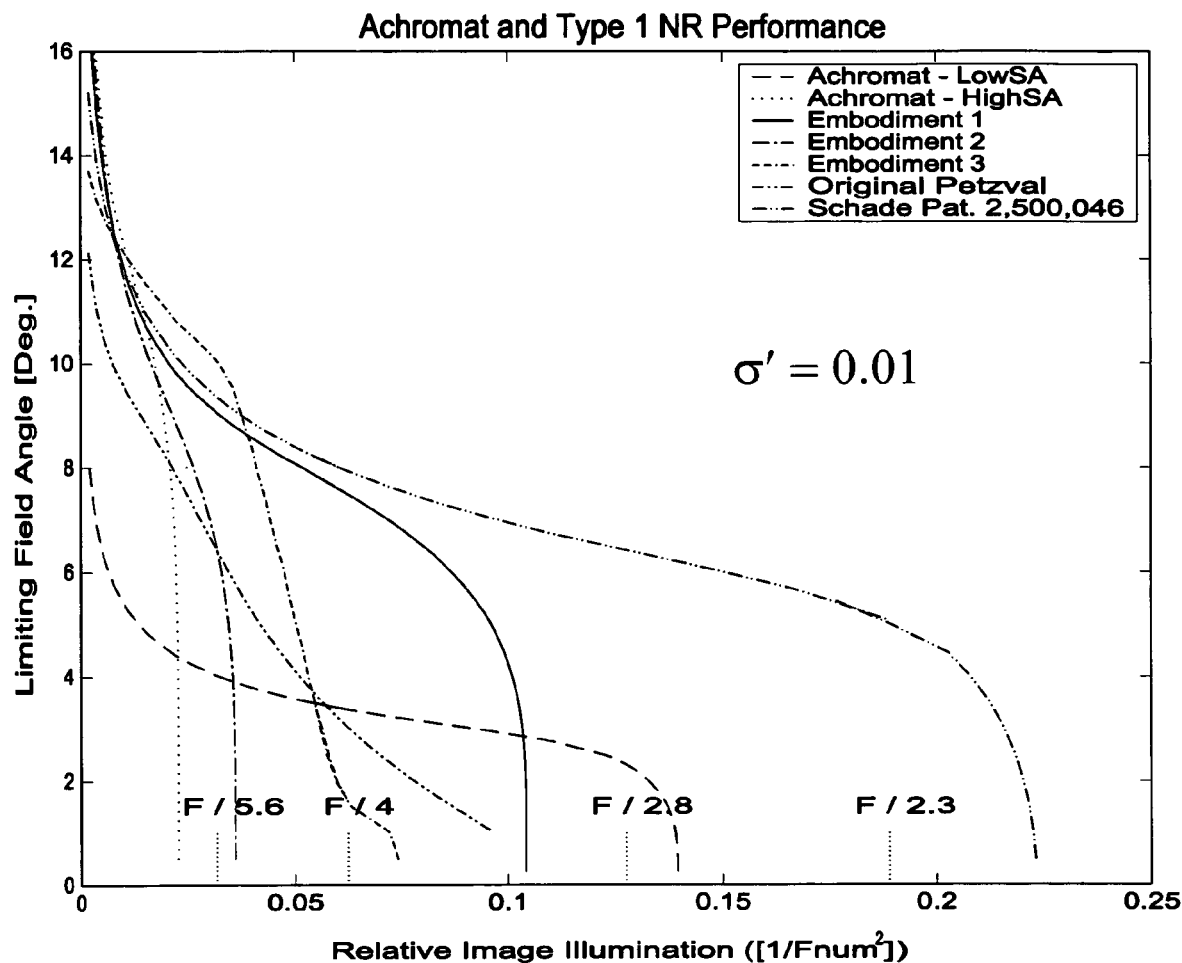

FIG. 14 compares the performances of several of my Type 1NR combinations to that of the achromat and the two Petzval lenses.

Figure 15:
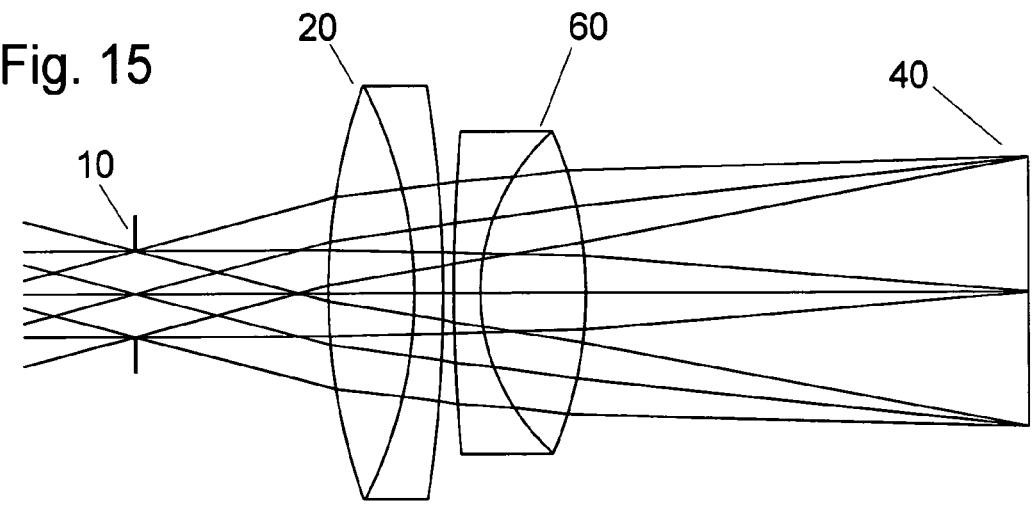

FIG. 15 depicts the second companion in combination with a primary achromat, as the second combination embodiment.

Figure 16:
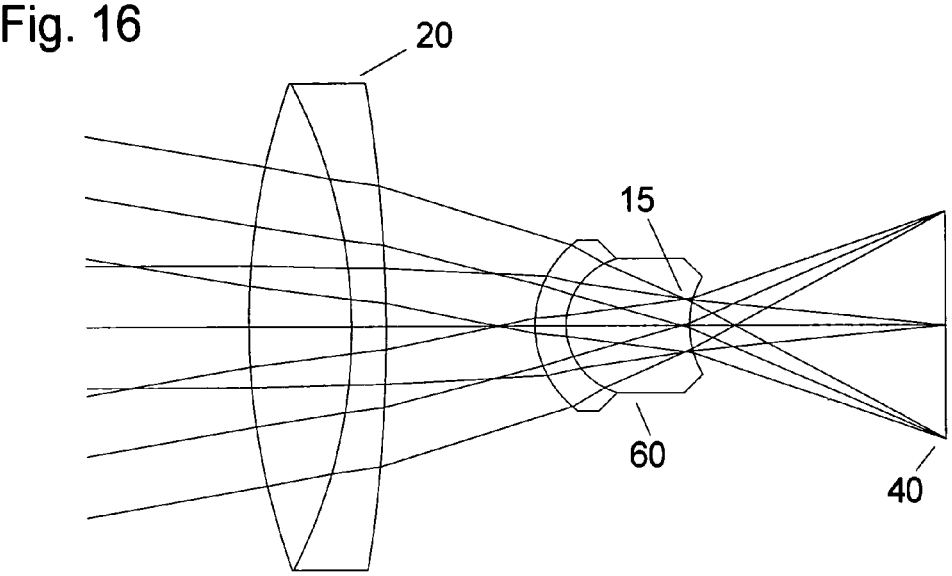

FIG. 16 depicts the third combination embodiment.

Figure 17:
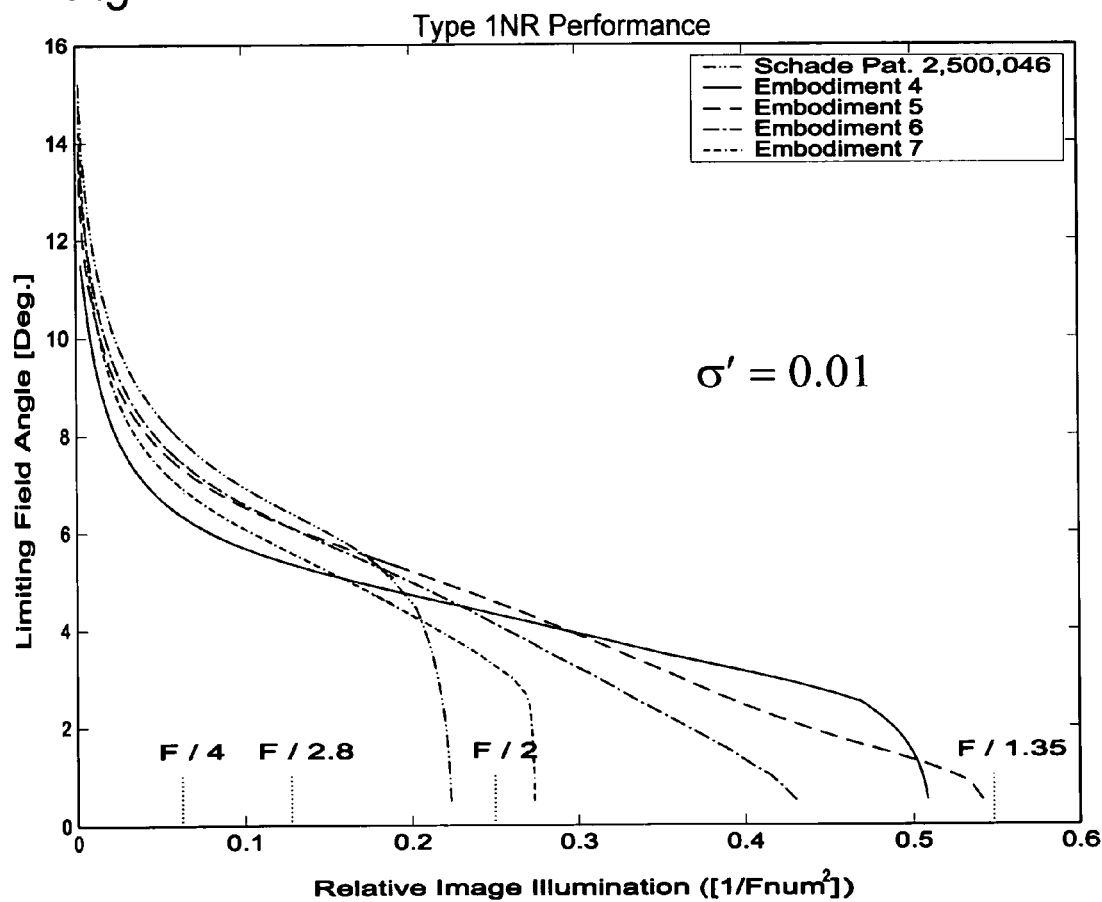

FIG. 17 depicts the performances of certain Type 1NR combination embodiments as compared to Schade's Petzval lens.

Figure 18:
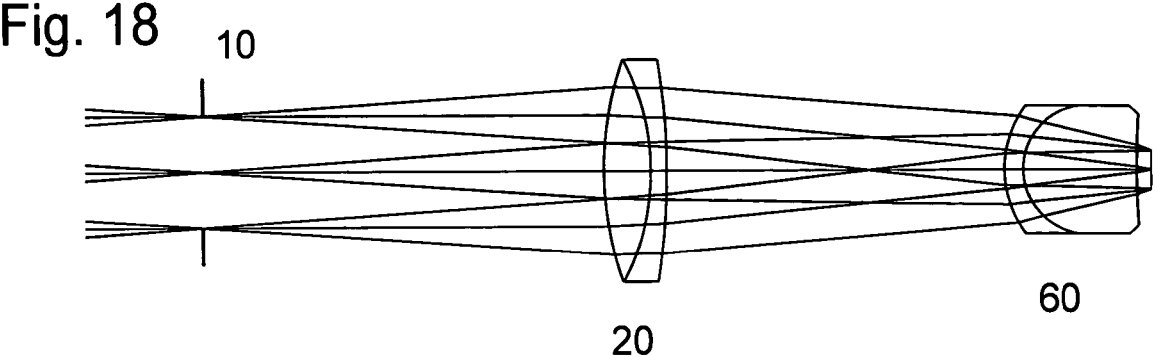

FIG. 18 depicts the fourth combination embodiment.

Figure 19:
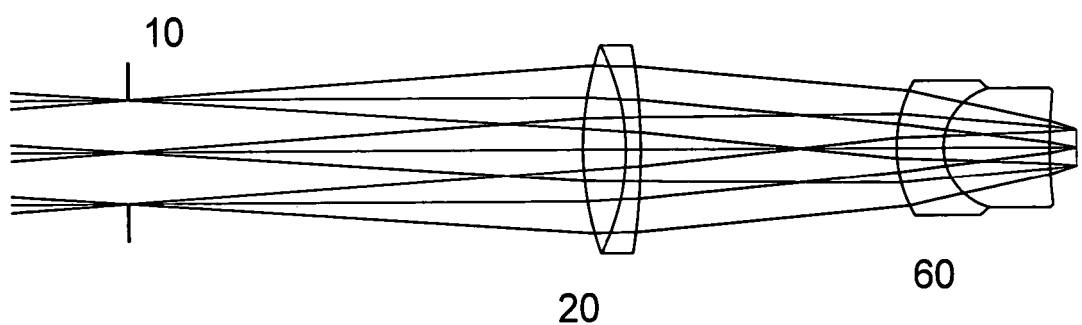

FIG. 19 depicts the fifth combination embodiment.

FIG. 20 depicts the sixth combination embodiment.

Figure 21:
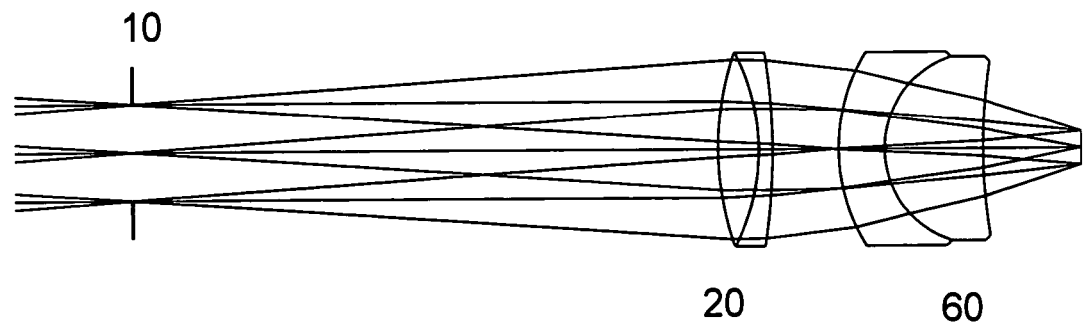

FIG. 21 depicts the seventh combination embodiment.

FIG. 22 depicts combination embodiment 6A, in which an air spaced primary is used.

Figure 23:
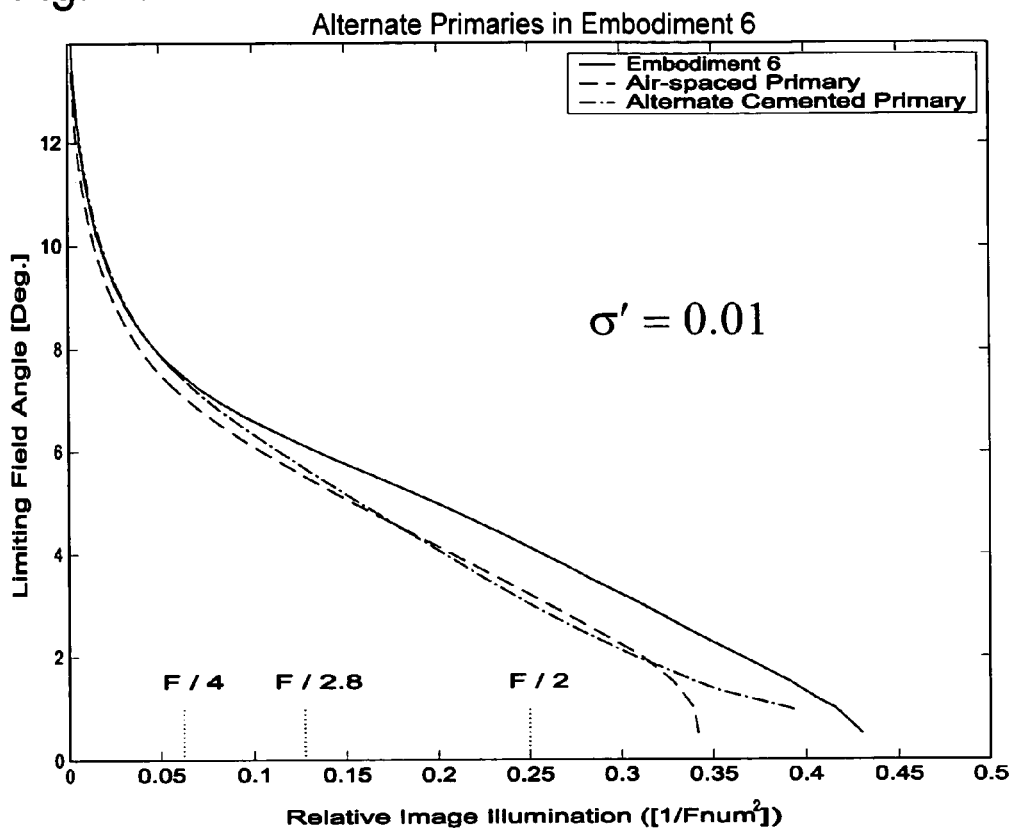

FIG. 23 compares the performance of combination embodiment 6 to versions using two alternate primaries, at a performance criterion of σ'=10 microns.

Figure 24:
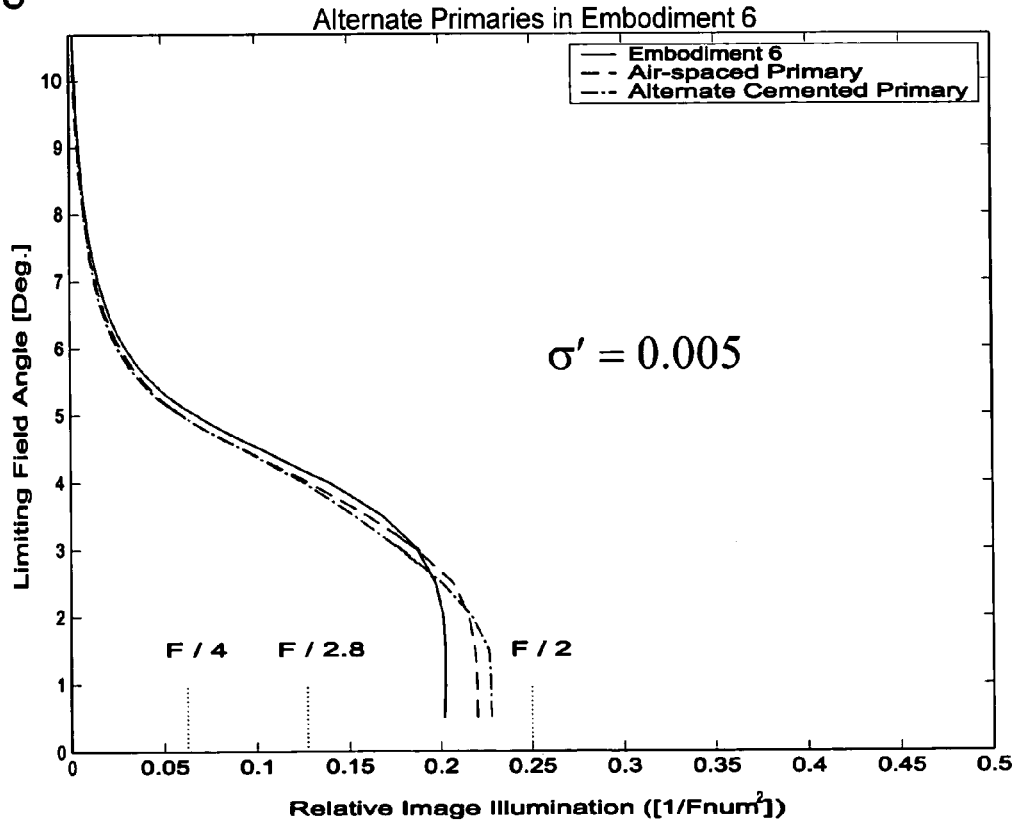

FIG. 24 compares the performance of combination embodiment 6 to versions using two alternate primaries, at a performance criterion of σ'=5 microns.

Figure 25:
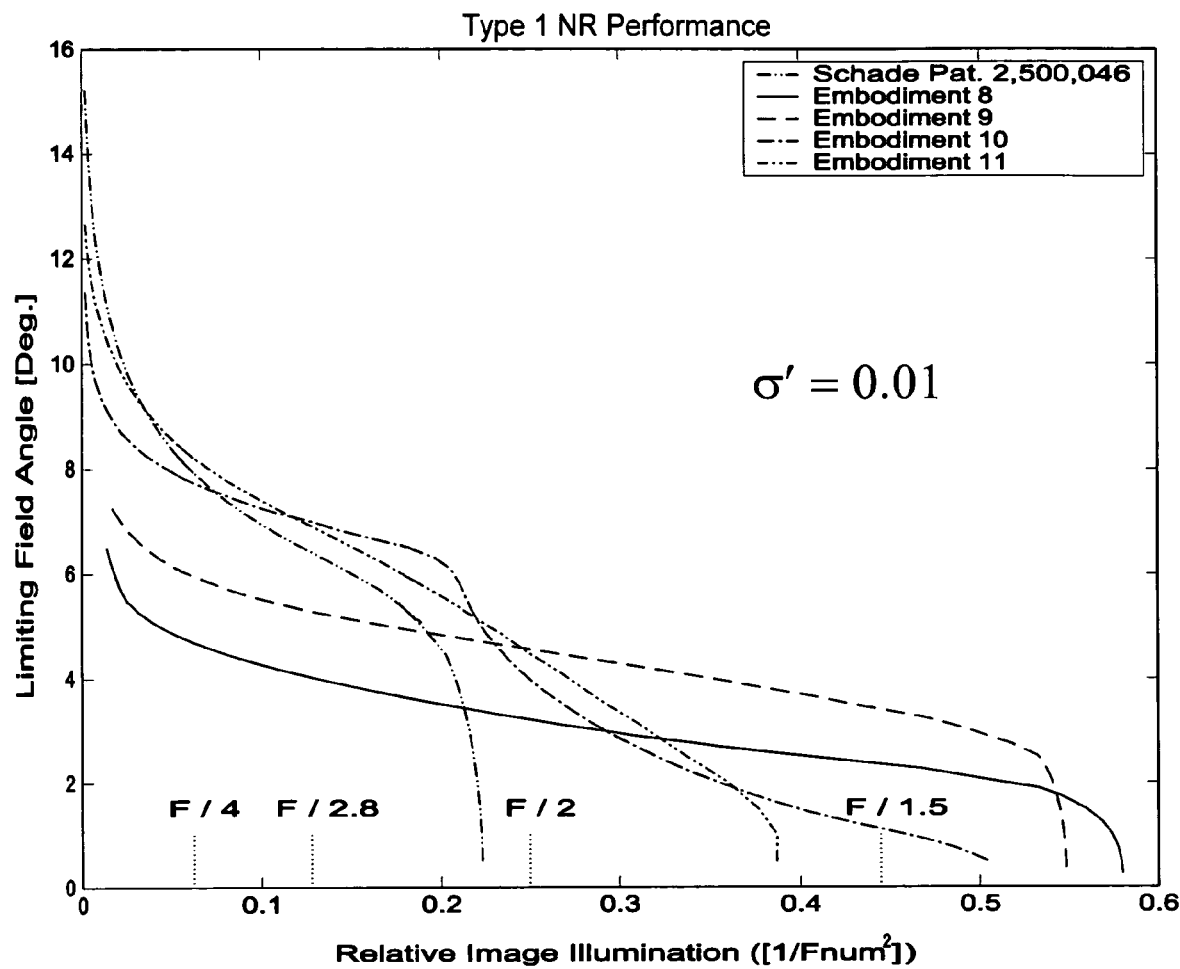

FIG. 25 compares the performance of four additional Type 1NR combination embodiments to Schade's Petzval design.

Figure 26:
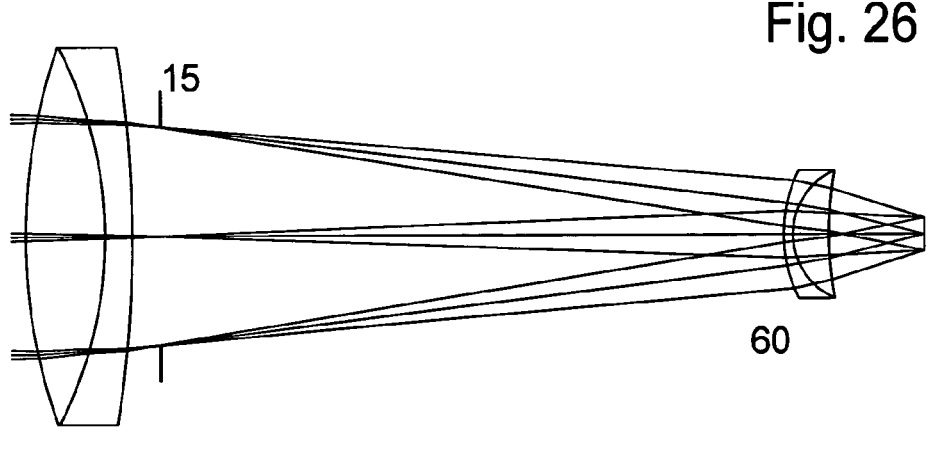

FIG. 26 depicts the eighth combination embodiment.

Figure 27:
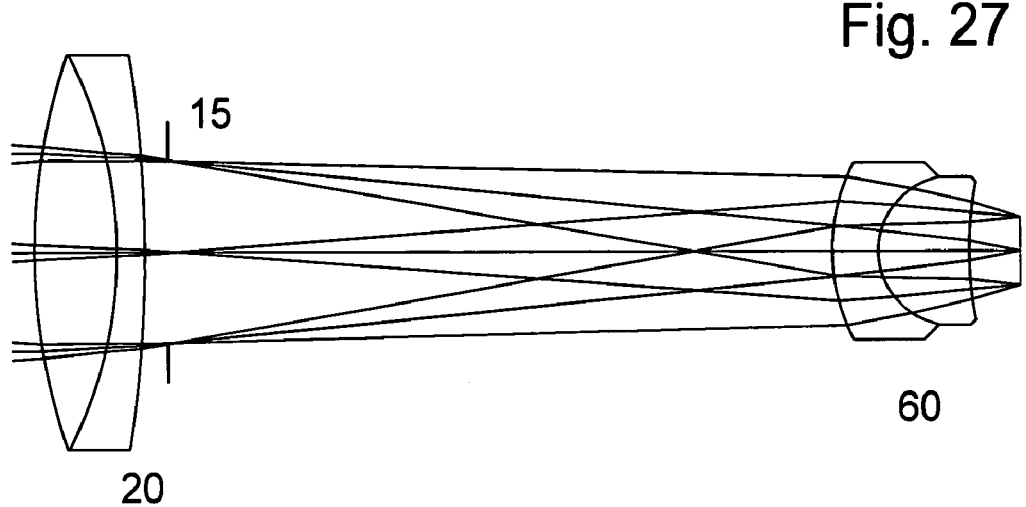

FIG. 27 depicts the ninth combination embodiment.

Figure 28:
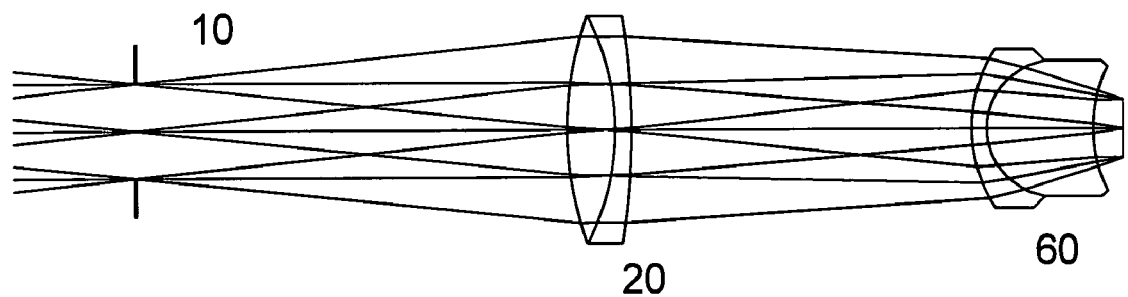

FIG. 28 depicts the tenth combination embodiment.

Figure 29:
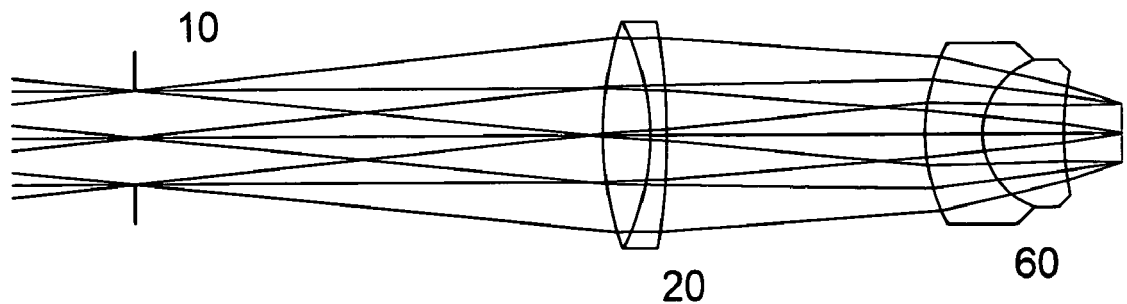

FIG. 29 depicts the 11th combination embodiment.

Figure 30:
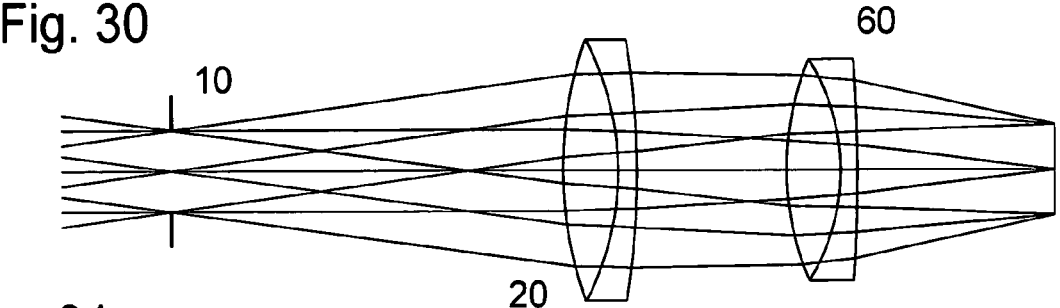

FIG. 30 depicts the first embodiment of a Type 1NN combination; this is the 12th combination embodiment of the invention.

Figure 31:
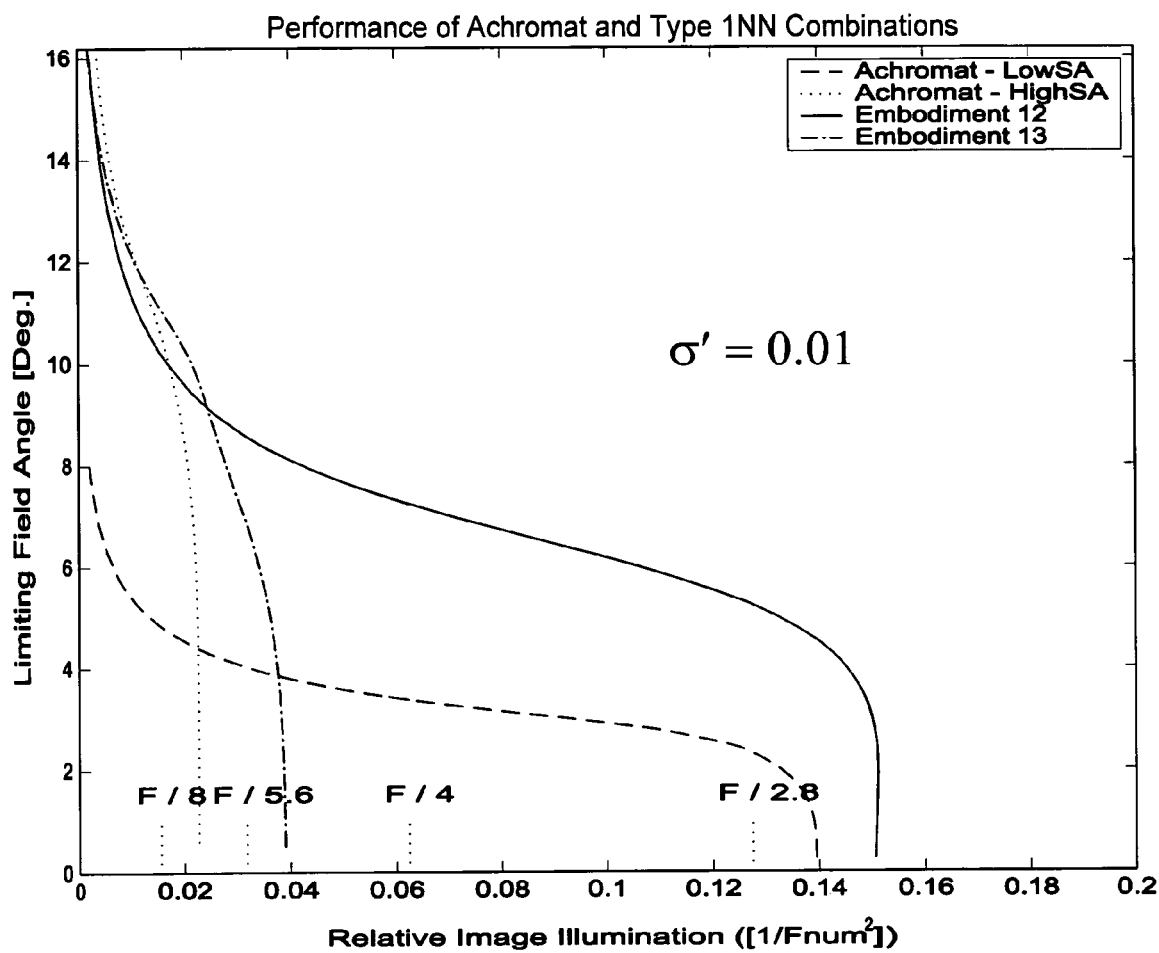

FIG. 31 compares the performances of the 12th and 13th combination embodiments to the performance of the example achromat.

Figure 32:
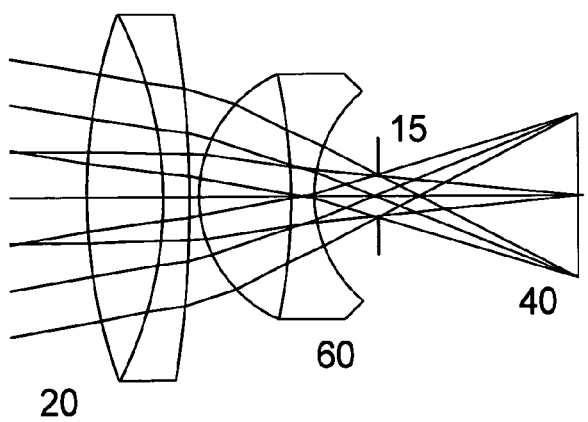

FIG. 32 depicts the 13th combination embodiment.

Figure 33:
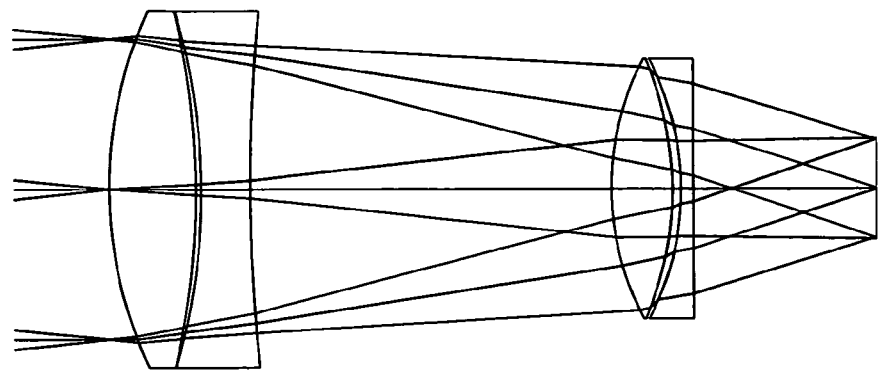

FIG. 33 depicts a Petzval lens designed by Werfeli, as prior art.

Figure 34:
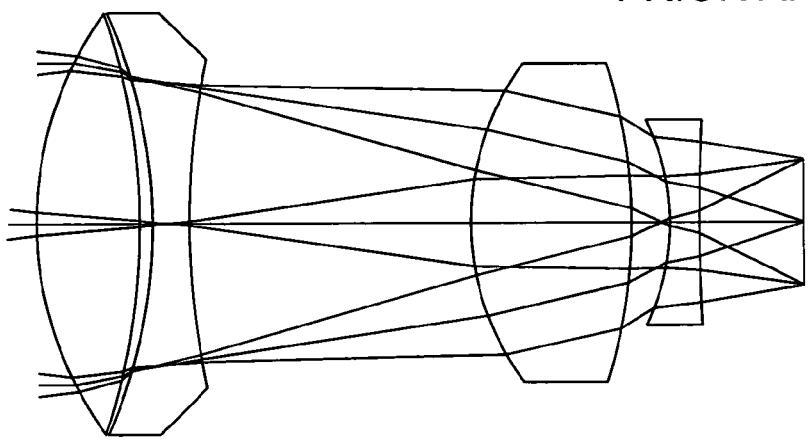

FIG. 34 depicts a Petzval lens designed by Laikin, as prior art.

Figure 35:
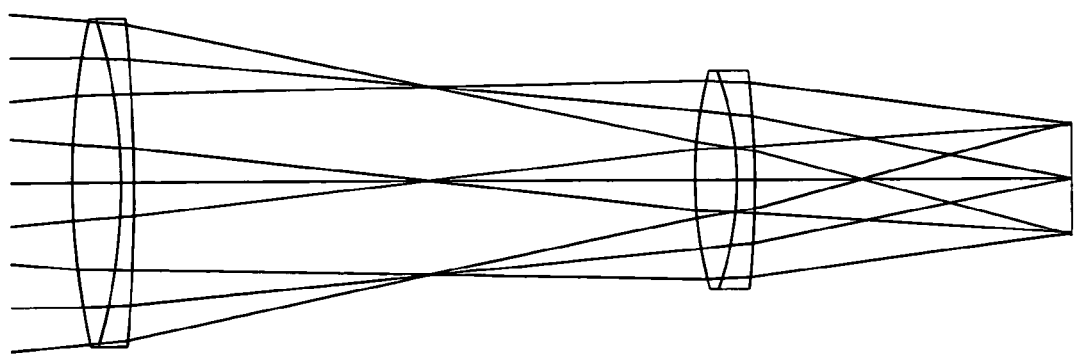

FIG. 35 depicts a simulated Petzval lens designed by Walker, as prior art.

Figure 36:
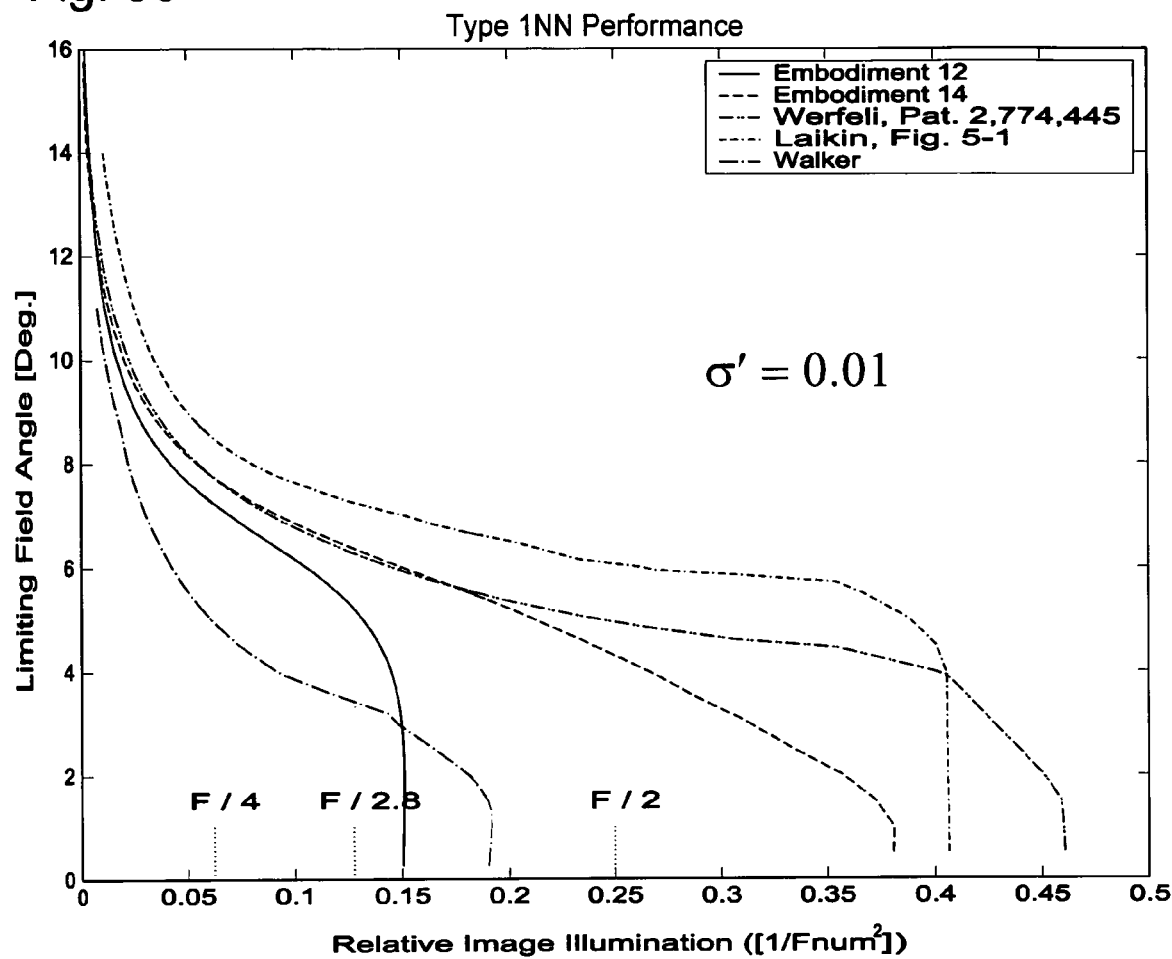

FIG. 36 compares the performances of my combination embodiments 12 and 14 with the lenses of Werfeli, Laikin, and Walker.

Figure 37:
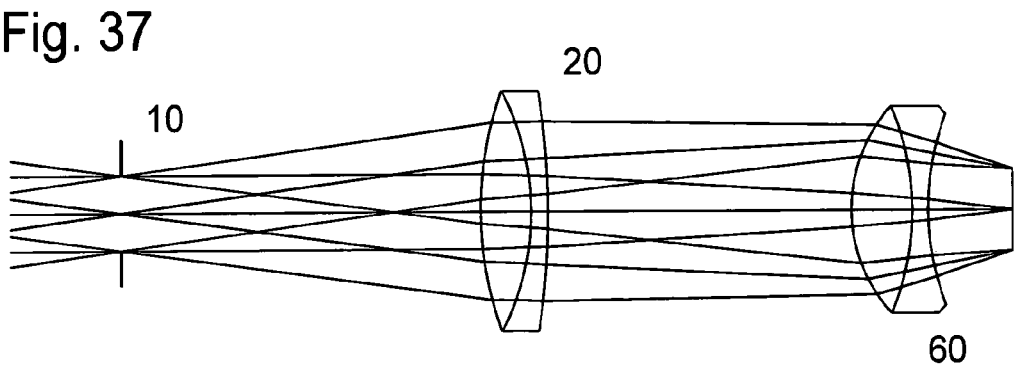

FIG. 37 depicts my 14th combination embodiment.

Figure 38:
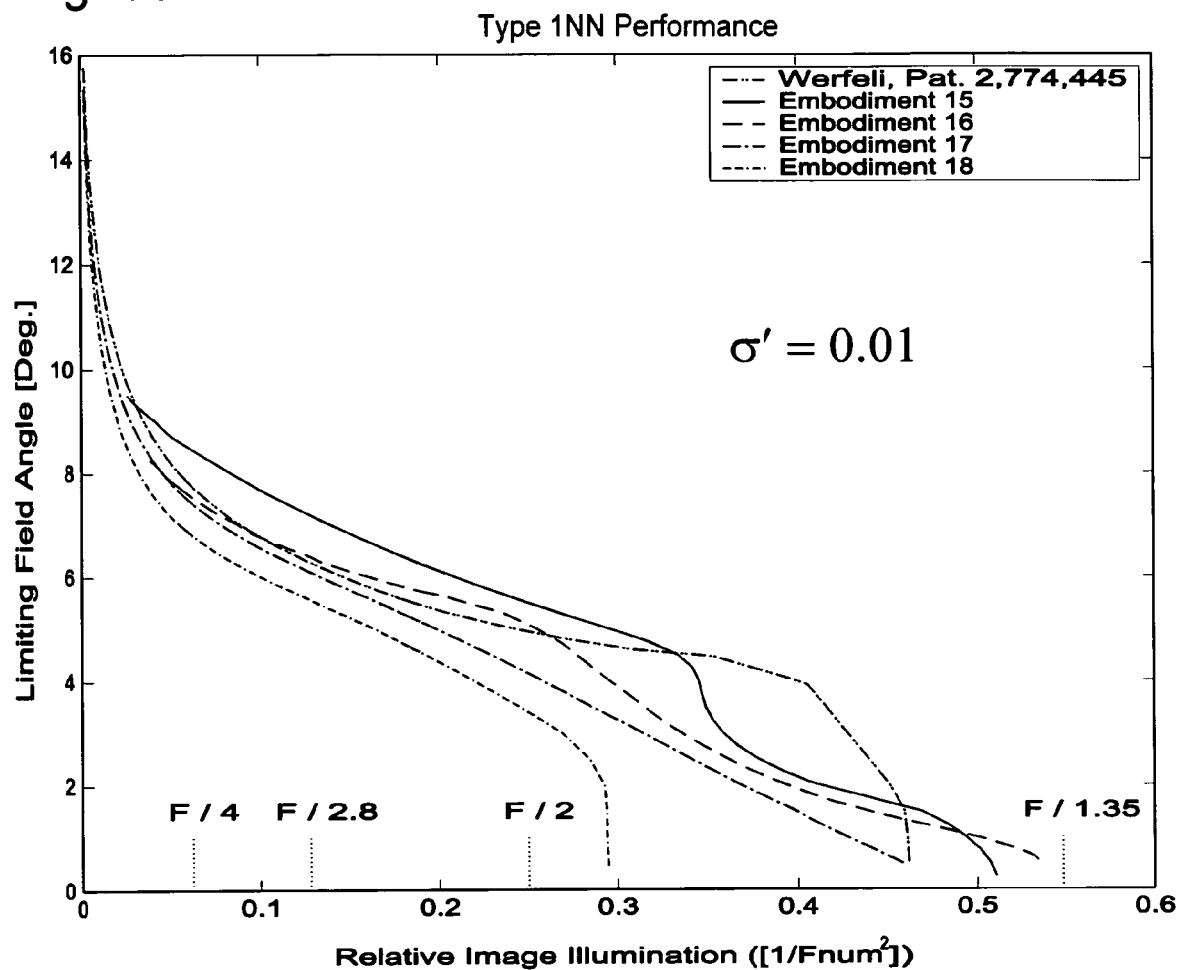

FIG. 38 compares the performance of Werfeli's lens to my 15th, 16th, 17th, and 18th combination embodiments.

Figure 39:
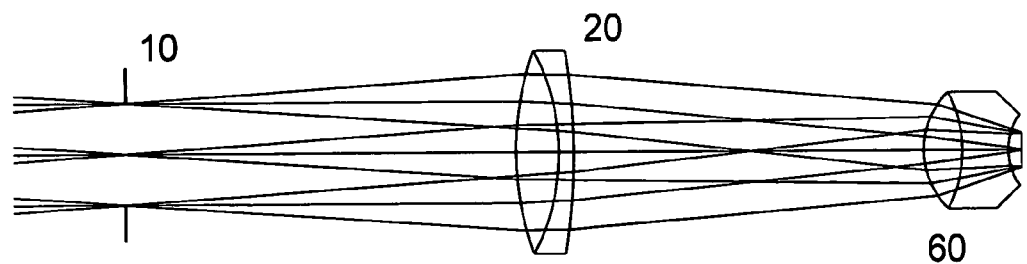

FIG. 39 depicts my 15th combination embodiment.

Figure 40:
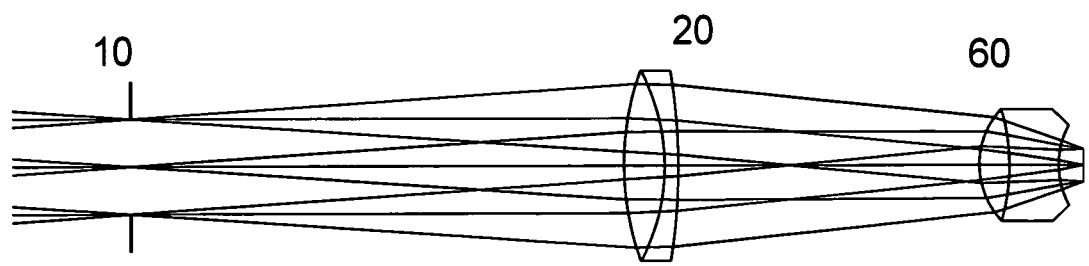

FIG. 40 depicts my 16th combination embodiment.

Figure 41:
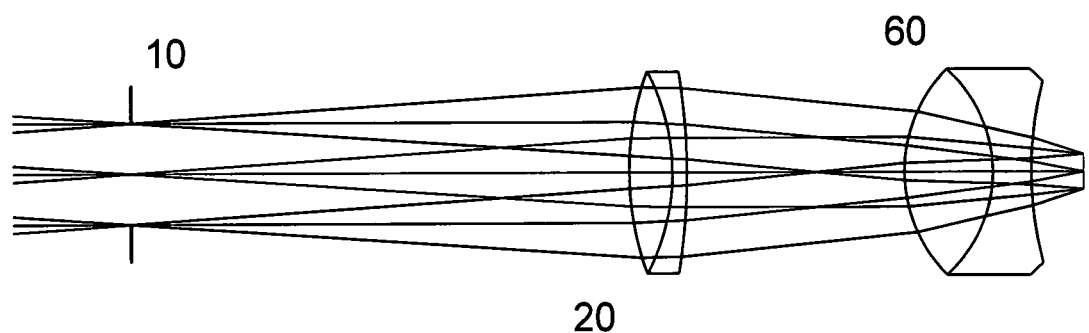

FIG. 41 depicts my 17th combination embodiment.

Figure 42:
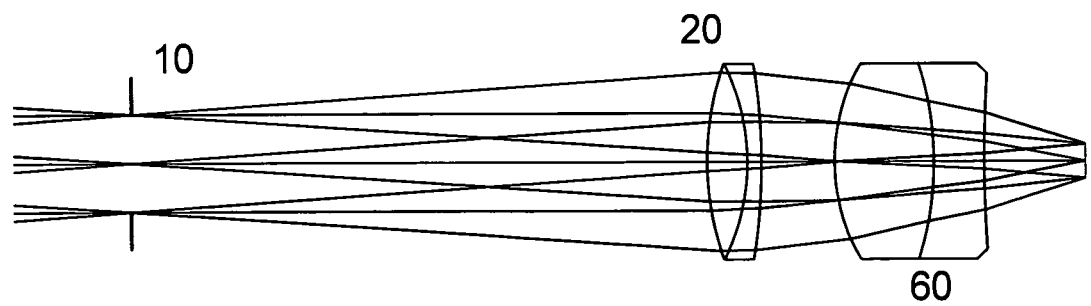

FIG. 42 depicts my 18th combination embodiment.

Figure 43:
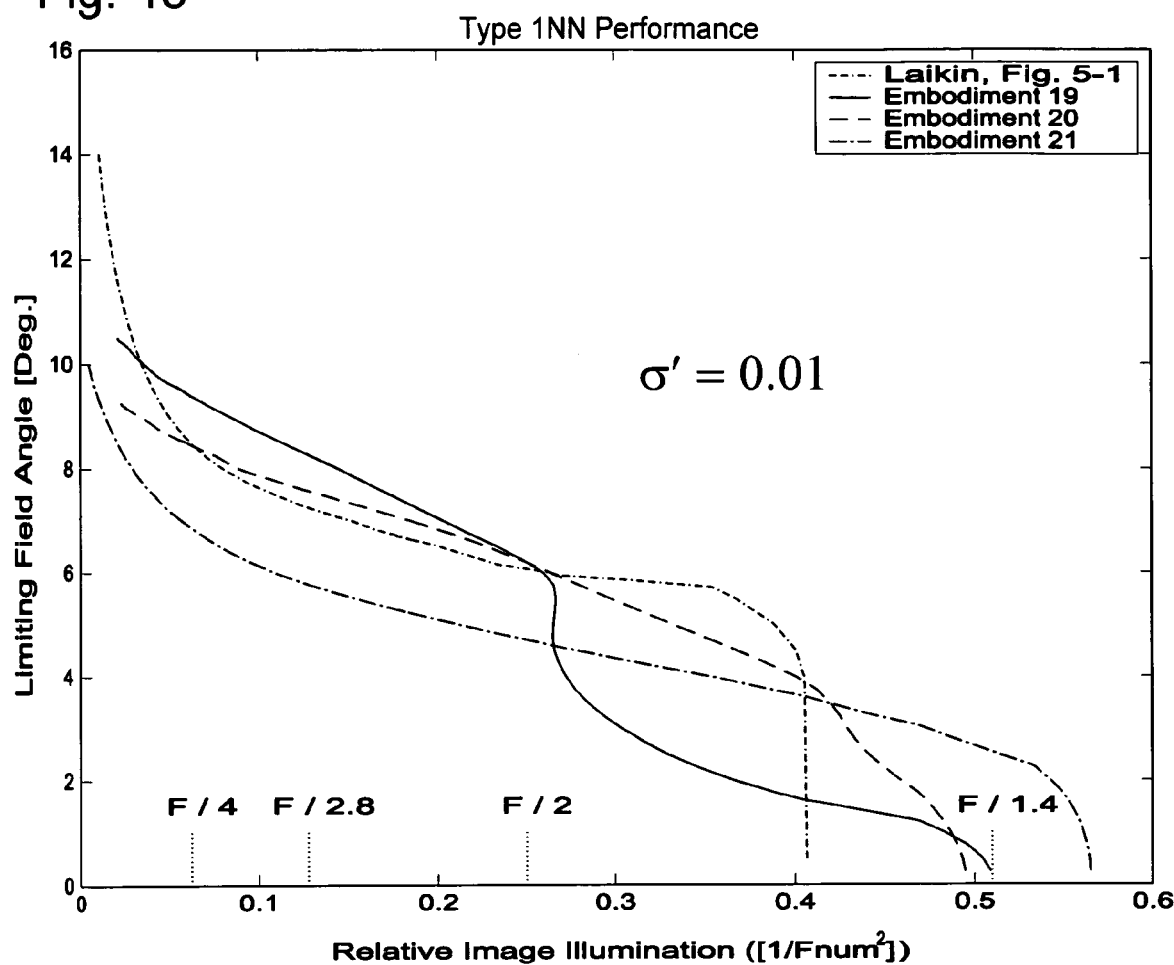

FIG. 43 compares the performance of Laikin's lens to my 19th, 20th, and 21st combination embodiments.

Figure 44:
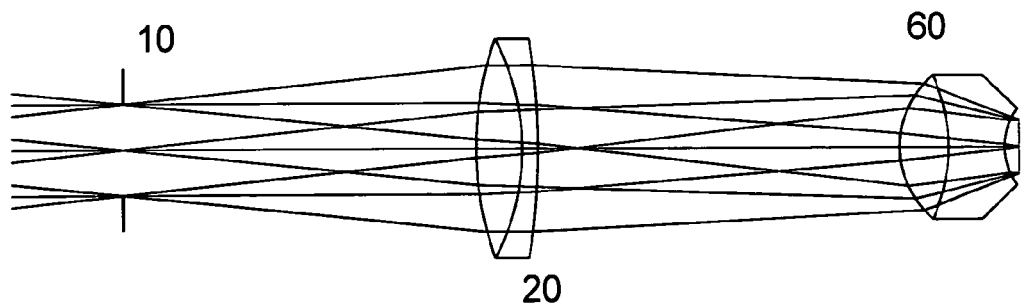

FIG. 44 depicts my 19th combination embodiment.

FIG. 45 depicts my 20th combination embodiment.

FIG. 46 depicts my 21st combination embodiment.

FIG. 47 compares the performances of Walker's simulated Petzval lens, the reversed achromat, and my 12th and 13th combination embodiments.

Figure 48:
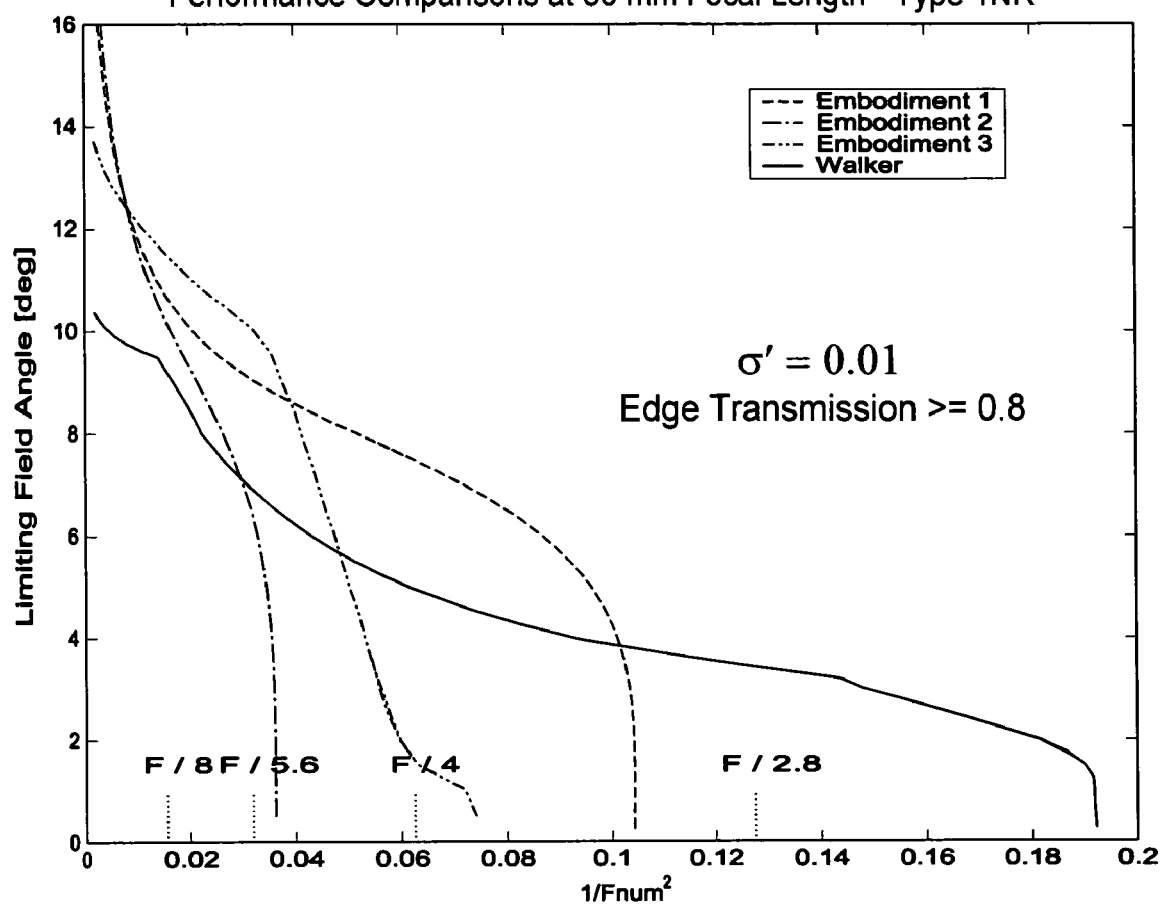

FIG. 48 compares the performance of Walker's simulated Petzval lens to those of my first, second, and third combination embodiments.

Figure 49:
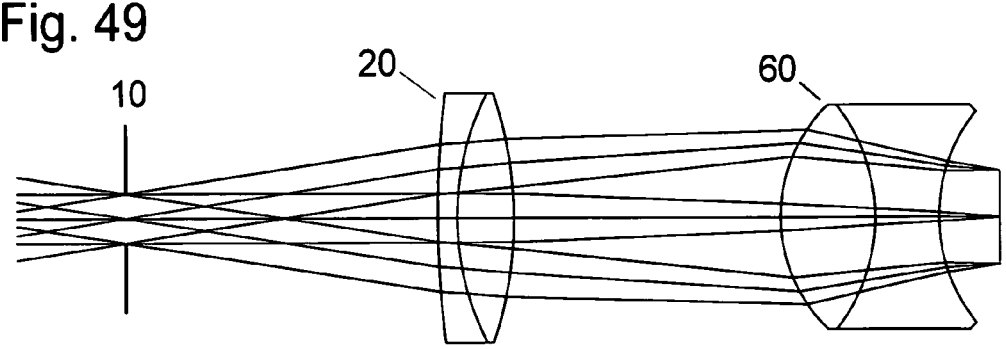

FIG. 49 depicts a first embodiment of a Type 1RN system, and is my 22nd combination embodiment.

Figure 50:
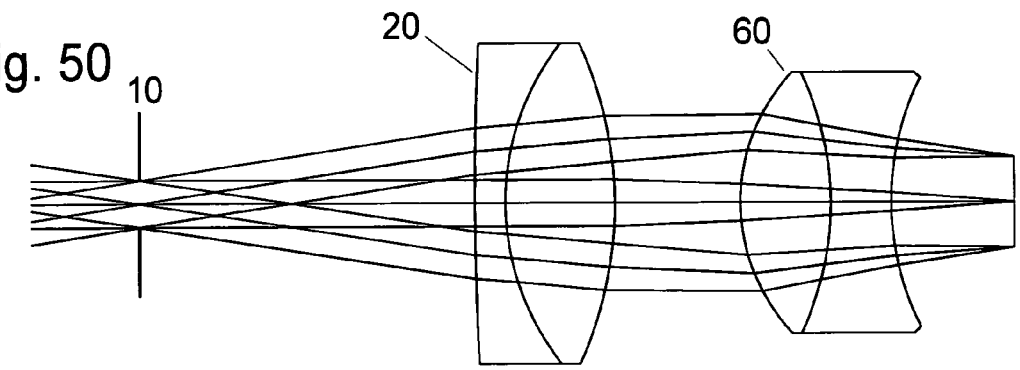

FIG. 50 depicts my 23rd combination embodiment, also of Type 1RN.

Figure 51:
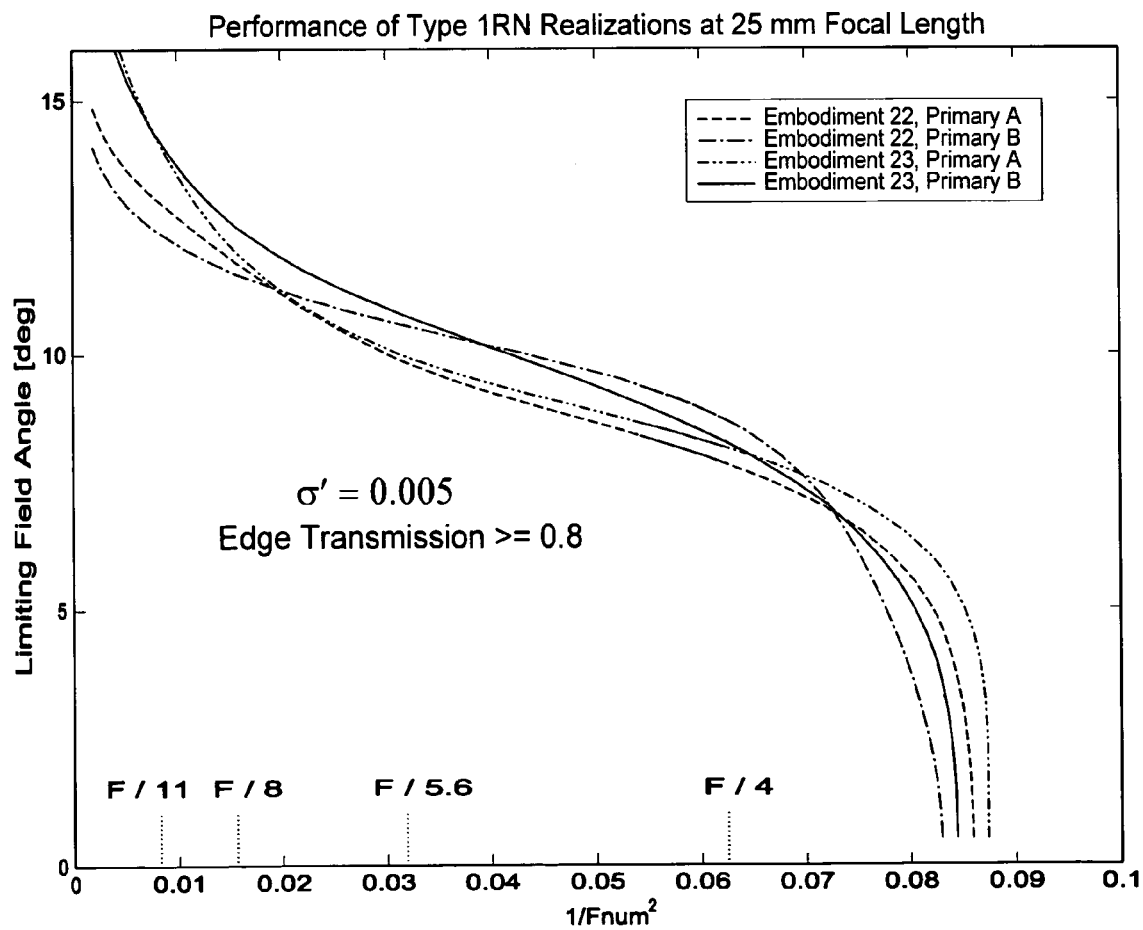

FIG. 51 compares the performances of the 22nd and 23rd combination embodiments to the performances of similar combinations with the primaries interchanged.

Figure 52:
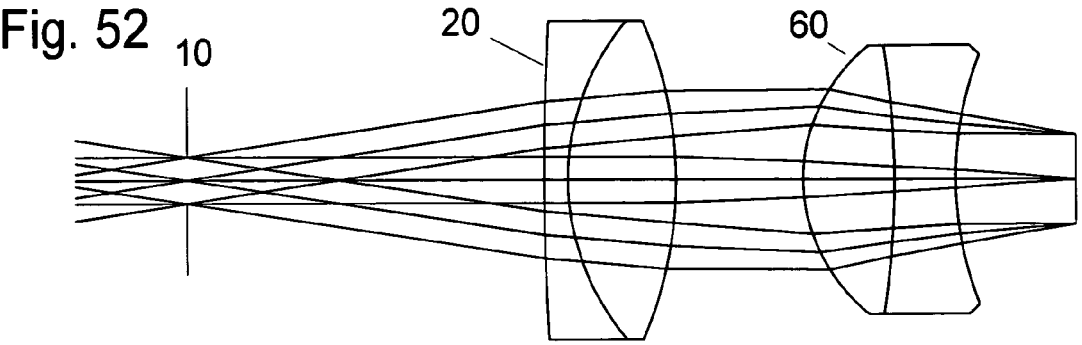

FIG. 52 depicts a third companion combination of Type 1RN that is my 24th combination embodiment.

Figure 53:
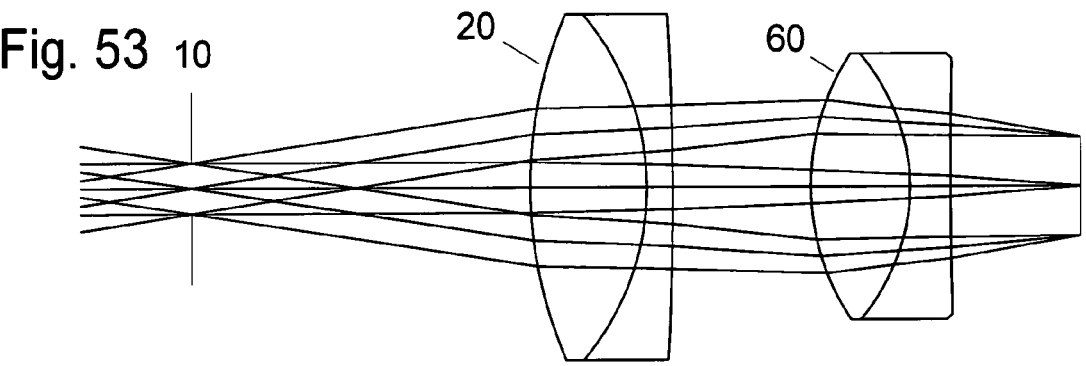

FIG. 53 depicts a tenth embodiment of Type 1NN that is my 25th combination embodiment.

Figure 54:
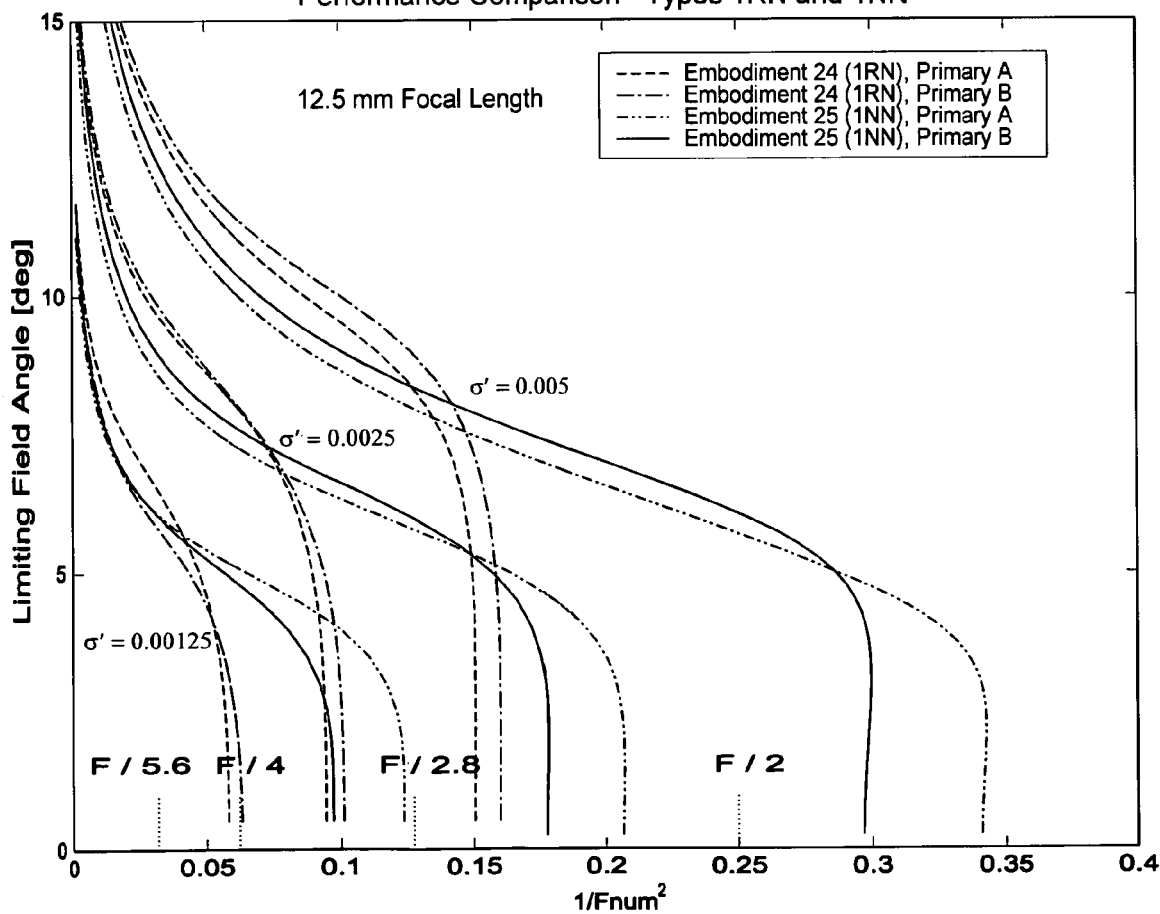

FIG. 54 compares the performances of Type 1RN and Type 1NN companion combinations for three different values of σ'.

Figure 55:
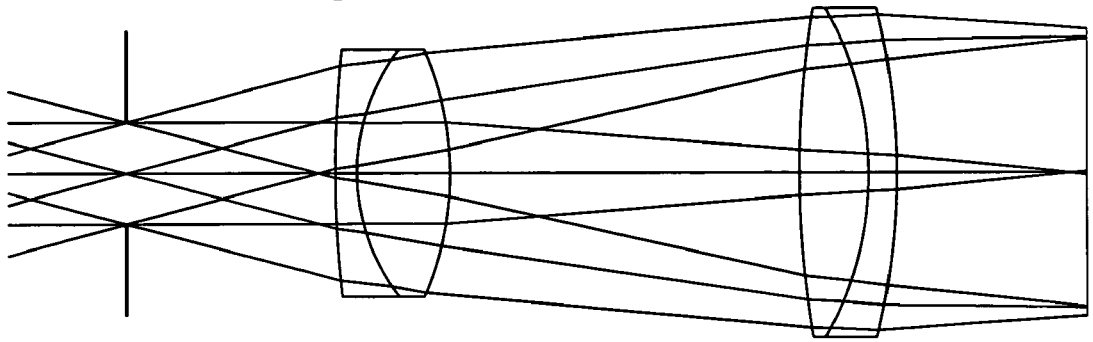

FIG. 55 depicts an eyepiece designed by Kingslake, as prior art.

Figure 56:
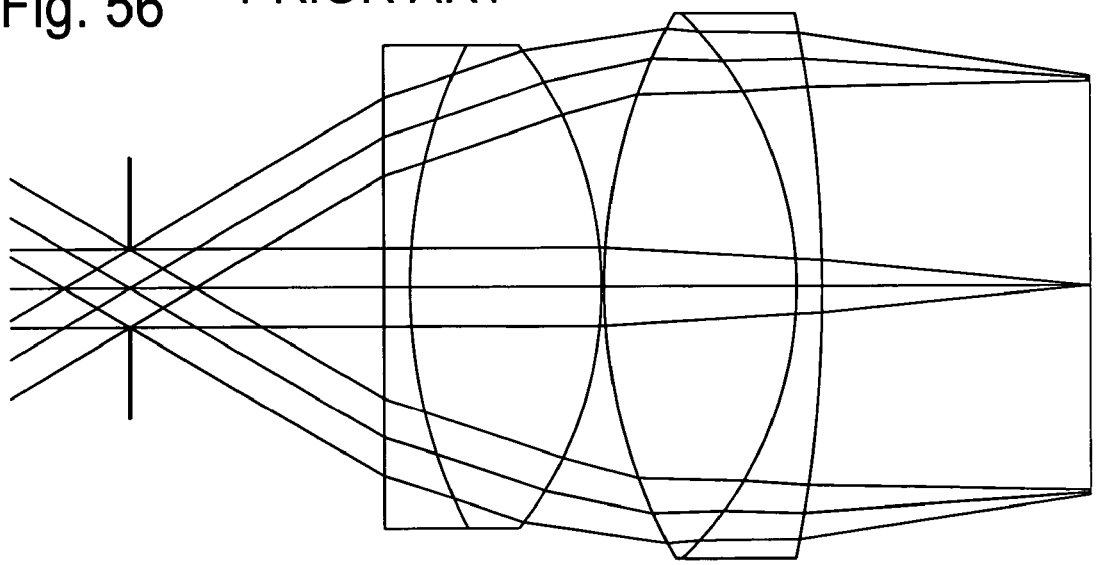

FIG. 56 depicts an eyepiece designed by König, as prior art.

Figure 57:
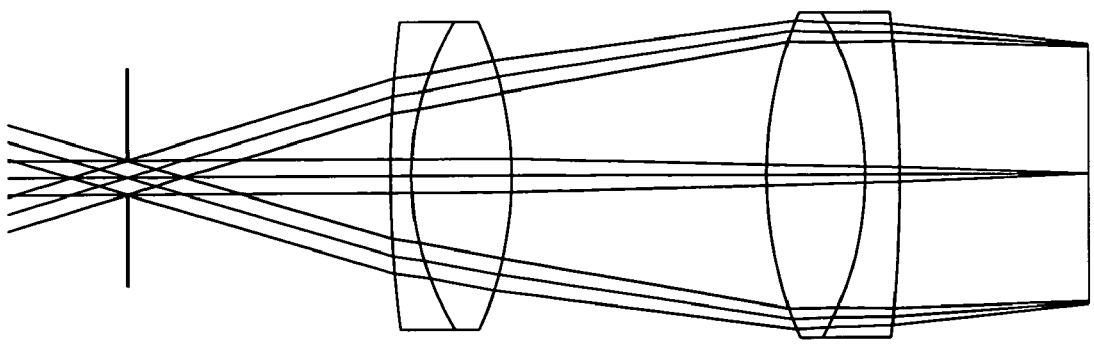

FIG. 57 depicts an eyepiece published by Linos Photonics, as prior art.

Figure 58:
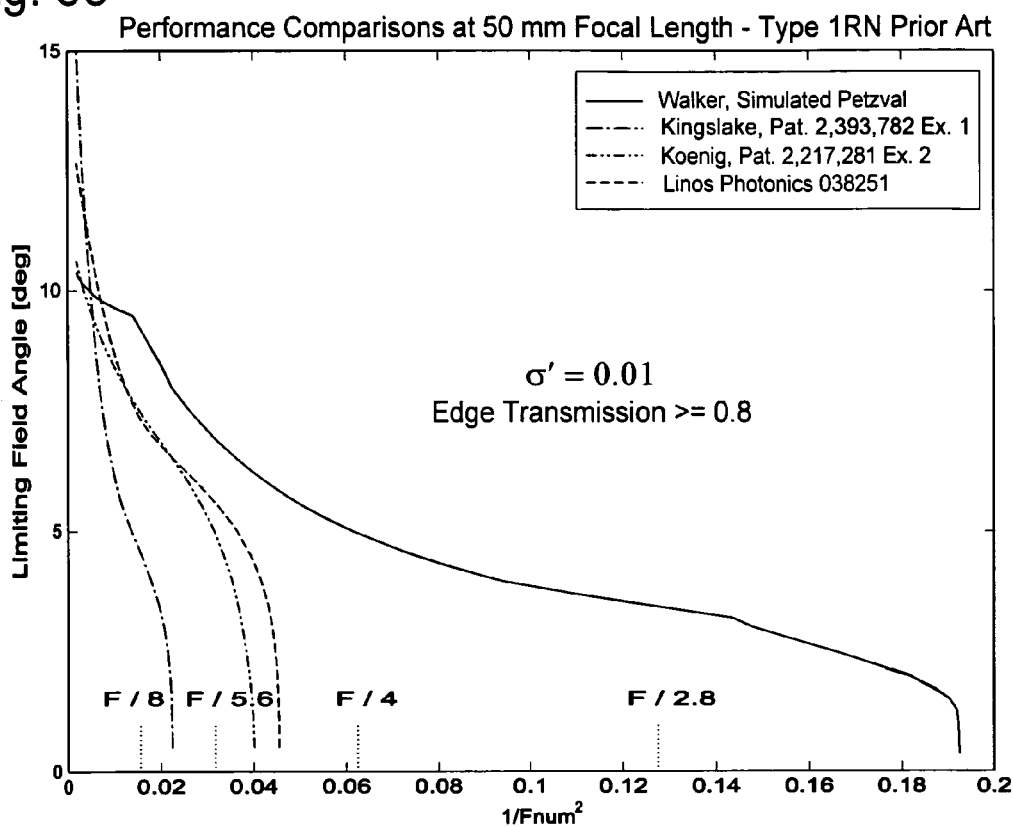

FIG. 58 compares the performances of the three eyepieces of Type RN to the performance of Walker's simulated Petzval lens.

Figure 59:
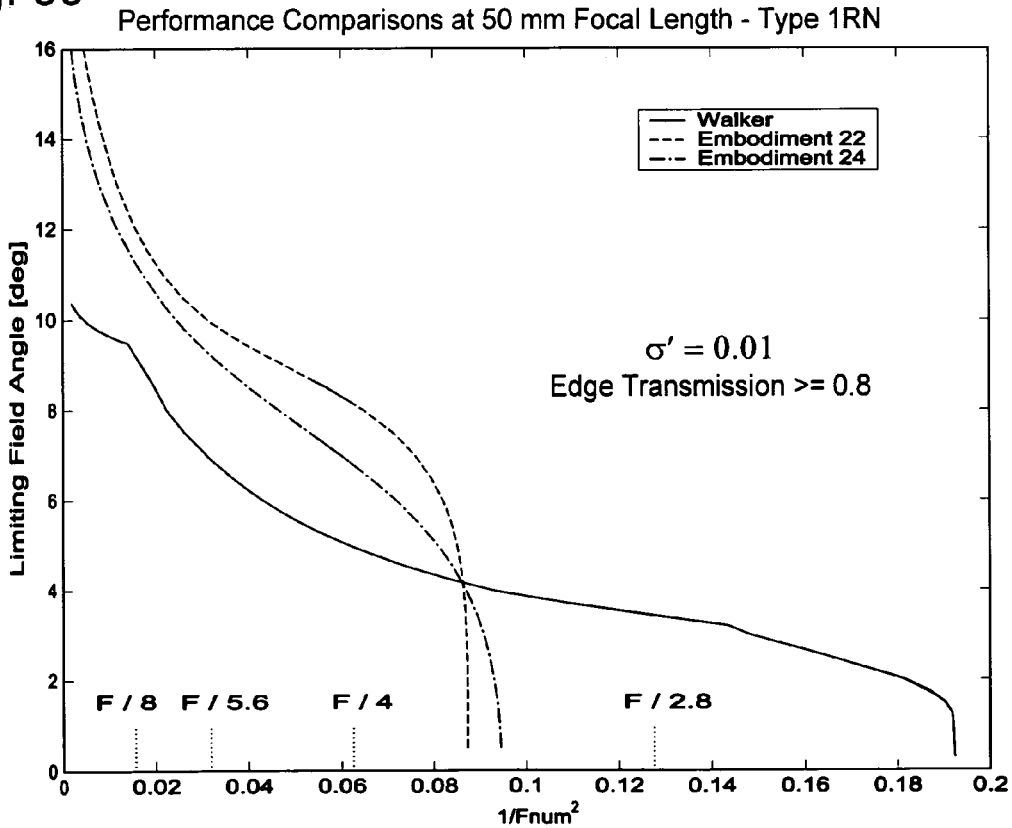

FIG. 59 compares the performance of two of my Type 1RN combination embodiments to the performance of the prior art as represented by Walker's lens.

Figure 60:
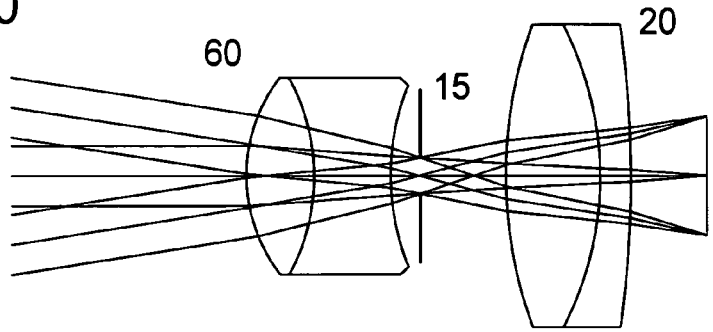

FIG. 60 depicts an embodiment of a Type 2NN companion combination; this is the 26th combination embodiment of my system.

Figure 61:
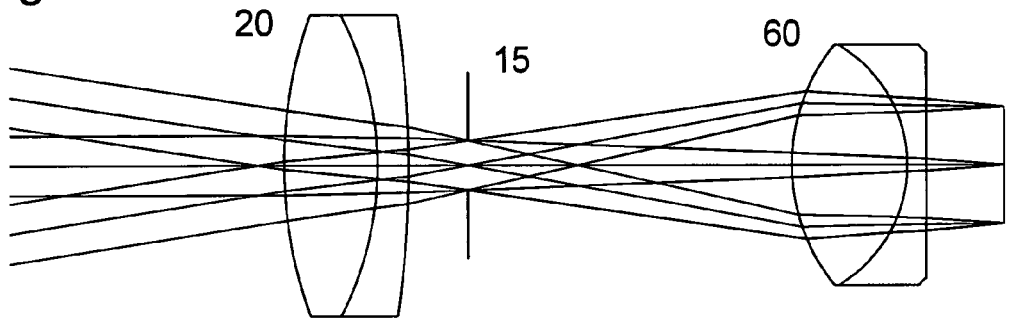

FIG. 61 depicts a twelfth embodiment of a Type 1NN system; this is the 27th combination embodiment of my system.

Figure 62:
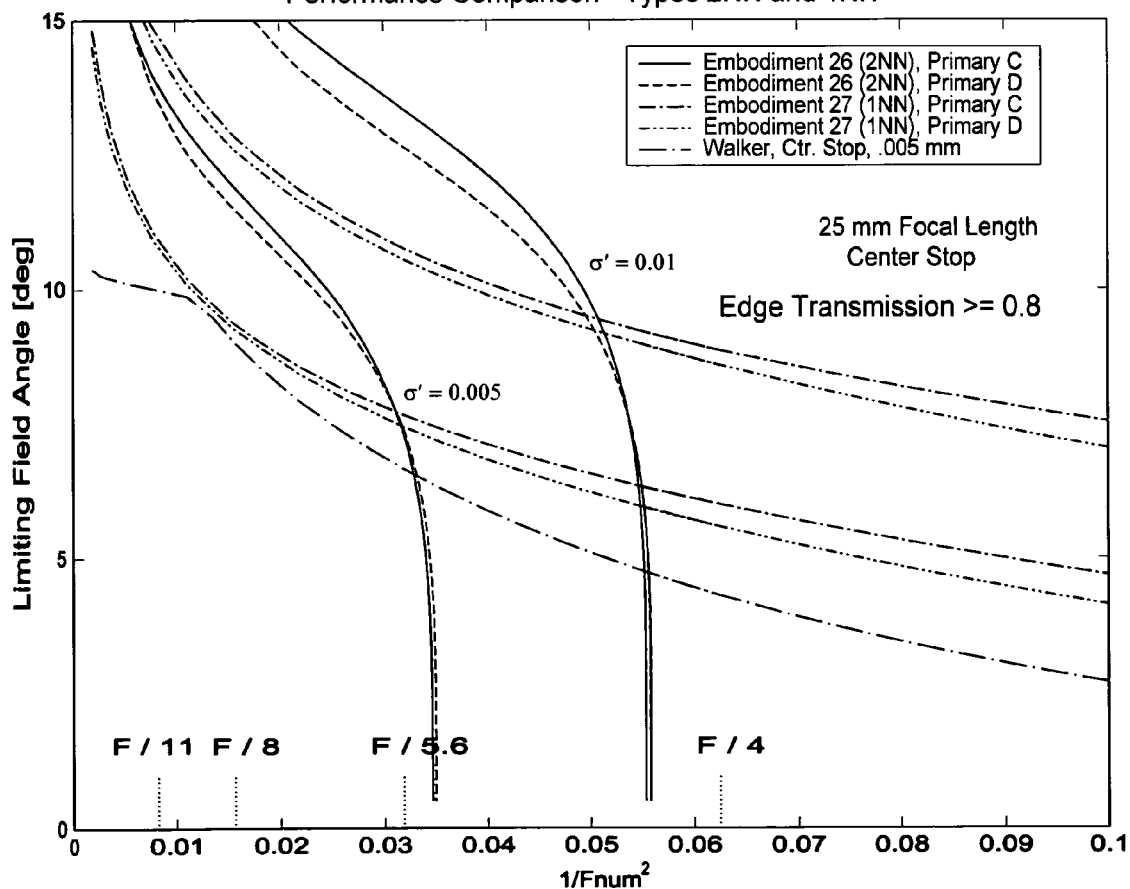

FIG. 62 compares the performances of Type 2NN combination embodiments to Type 1NN embodiments using the same primaries, optimized under the same conditions and constrained to have a stop located between the primary and the companion.

Figure 63:
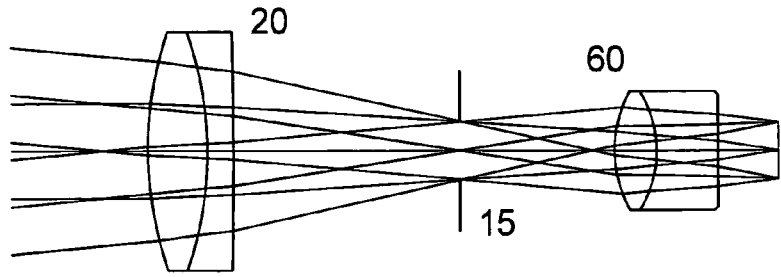

FIG. 63 shows the 28th combination embodiment.

Figure 64:
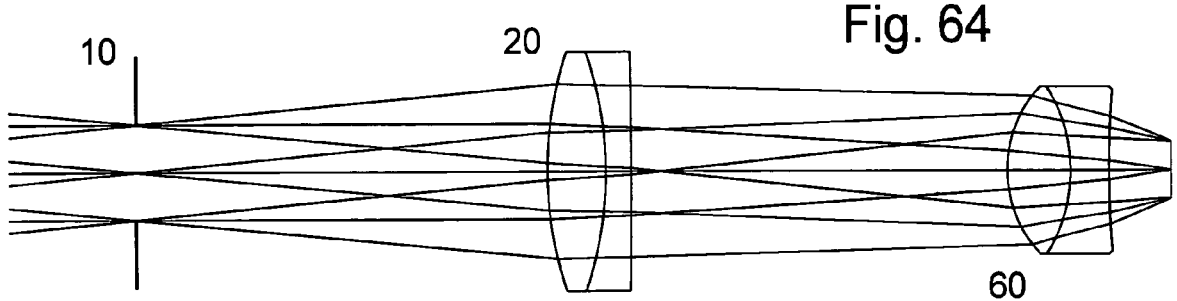

FIG. 64 shows the 29th combination embodiment.

Figure 65:
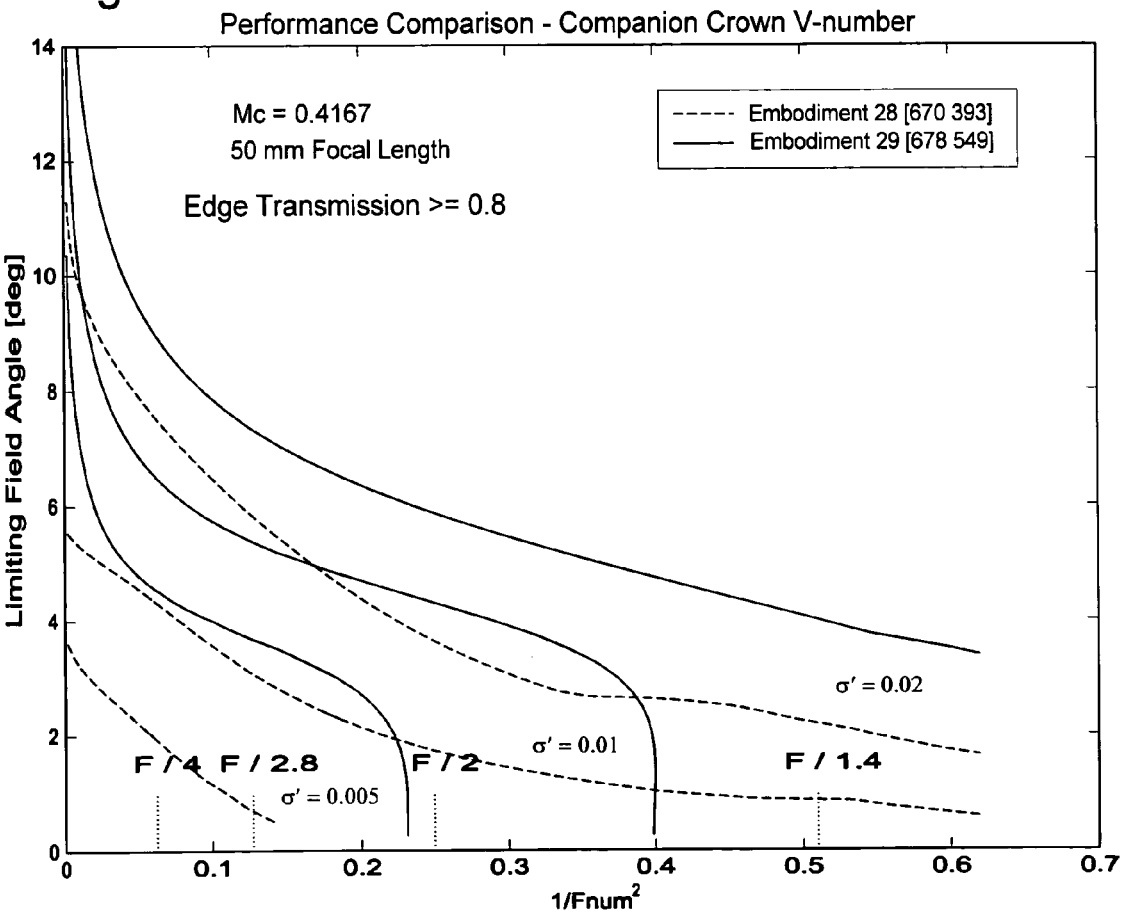

FIG. 65 compares the performances of the 28th and 29th embodiments at three image quality criteria.

Figure 66:
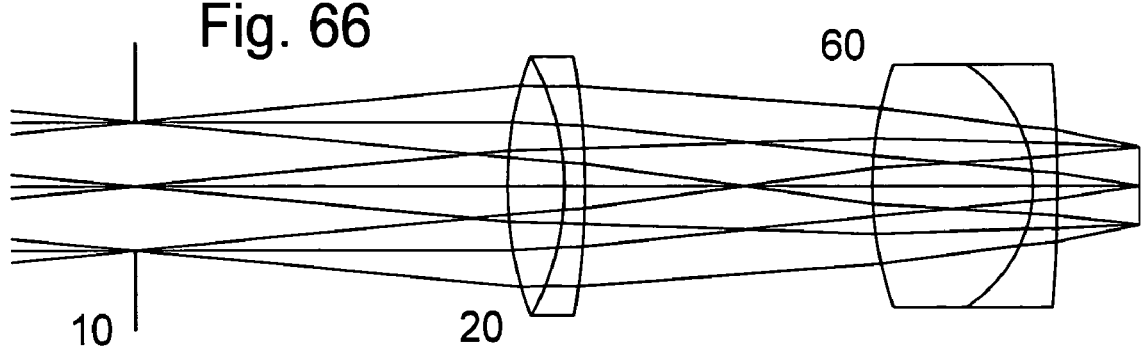

FIG. 66 shows the 30th combination embodiment.

Figure 67:
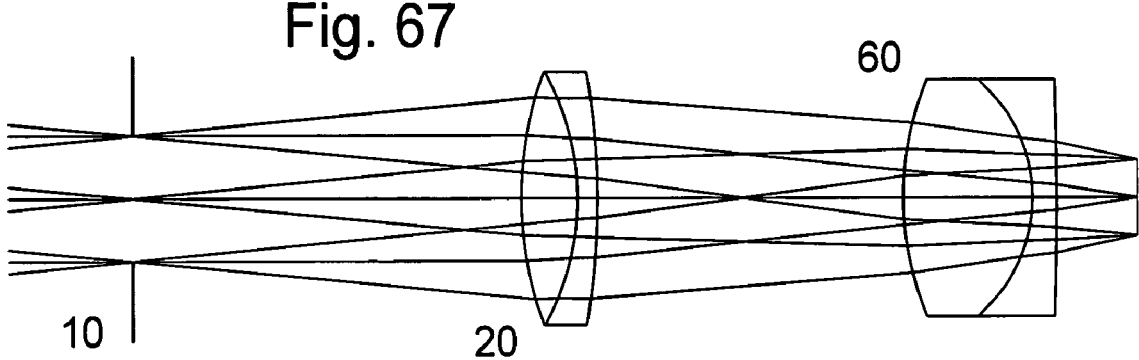

FIG. 67 shows the 31st combination embodiment.

Figure 68:
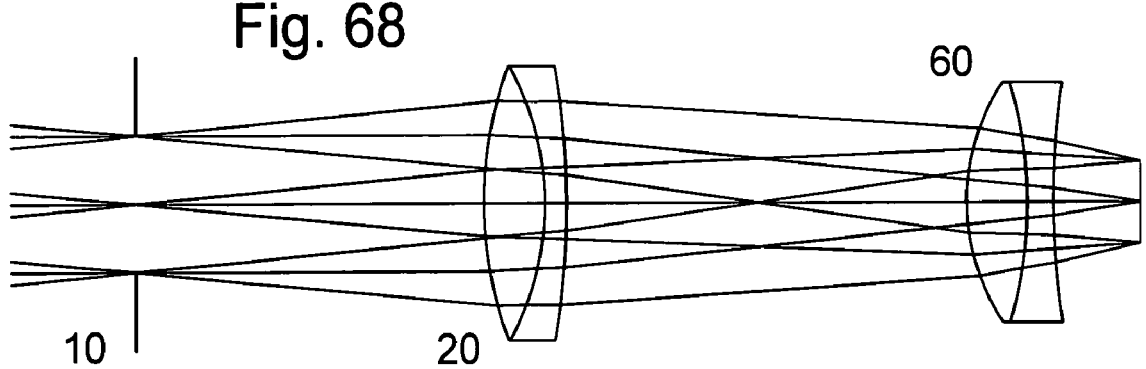

FIG. 68 shows the 32nd combination embodiment.

Figure 69:
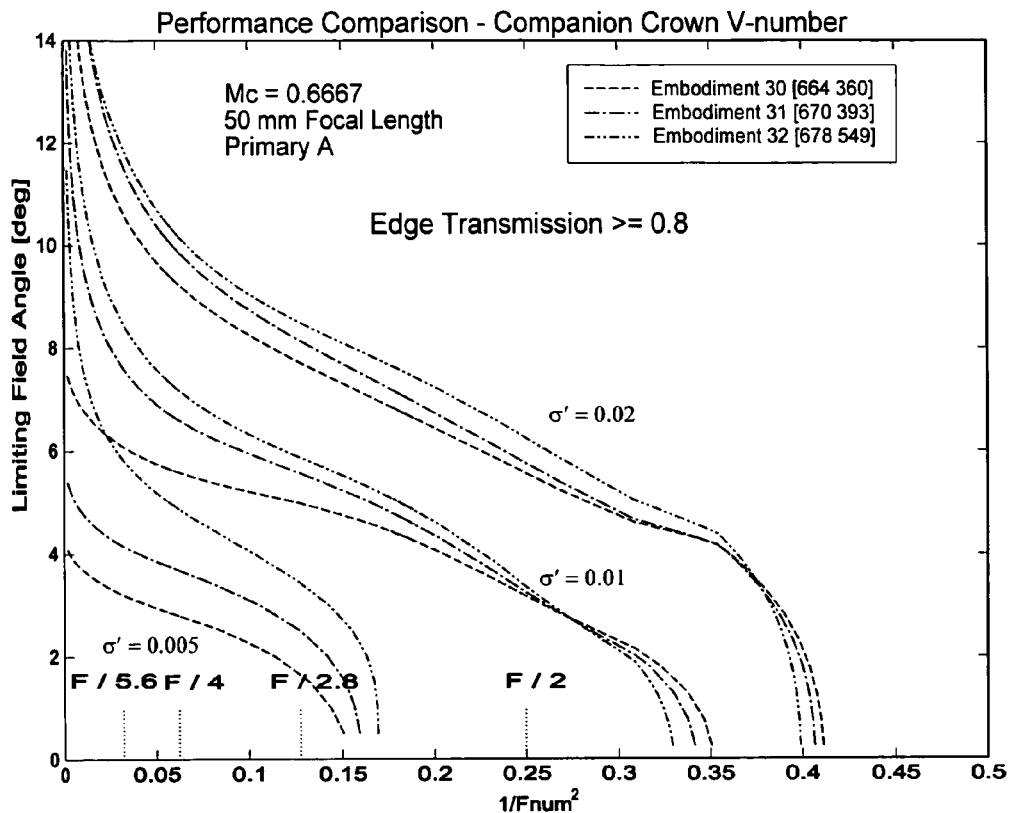

FIG. 69 compares the performances of combination embodiments 30, 31, and 32.

Figure 70:
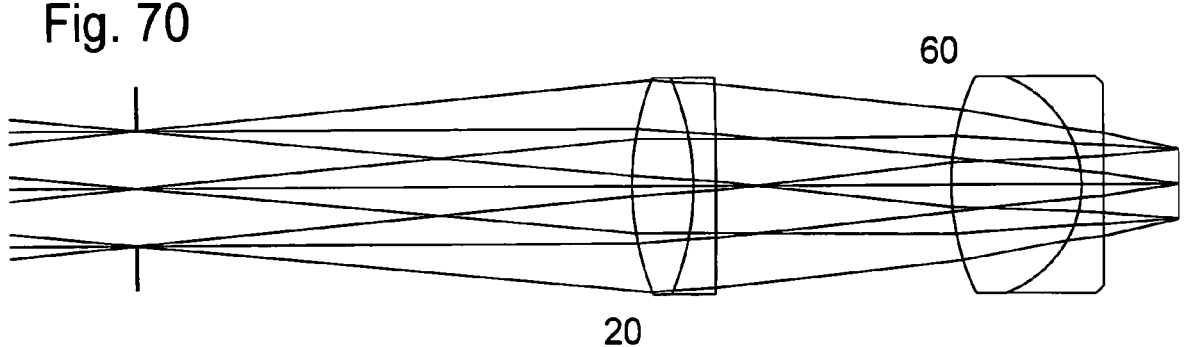

FIG. 70 shows the 33rd combination embodiment.

Figure 71:
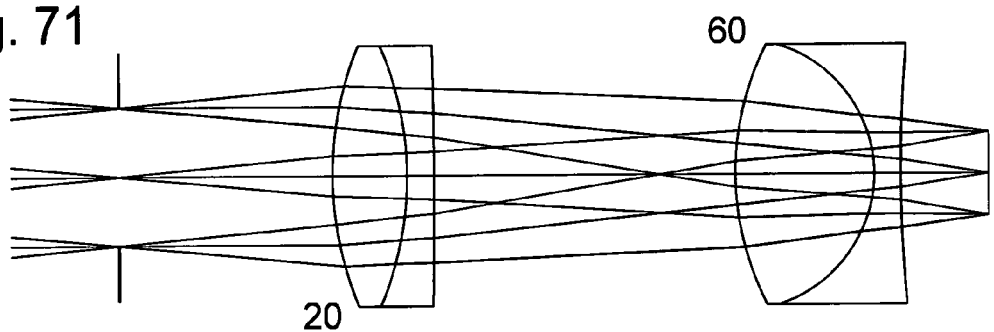

FIG. 71 shows the 34th combination embodiment.

Figure 72:
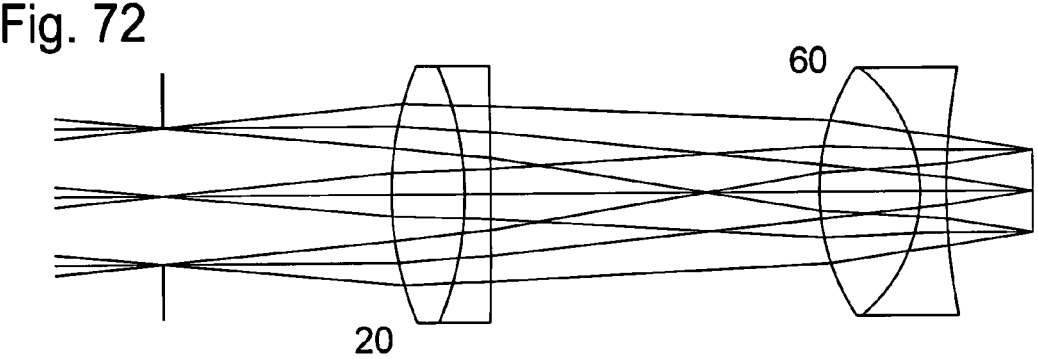

FIG. 72 shows the 35th combination embodiment.

Figure 73:
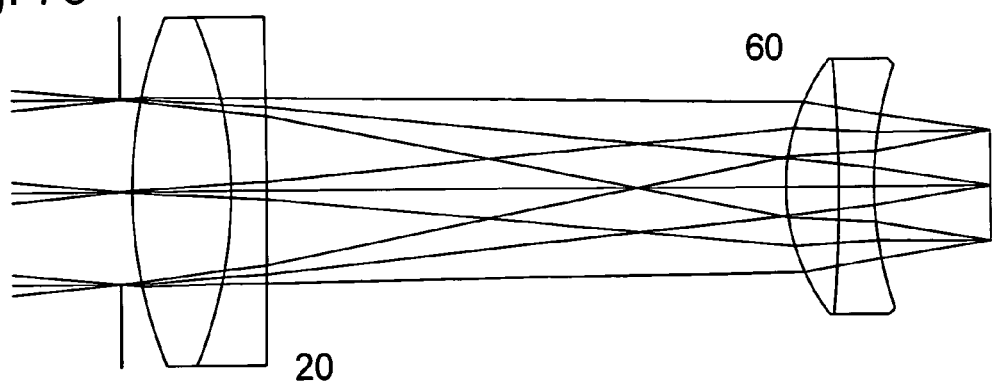

FIG. 73 shows the 36th combination embodiment.

Figure 74:
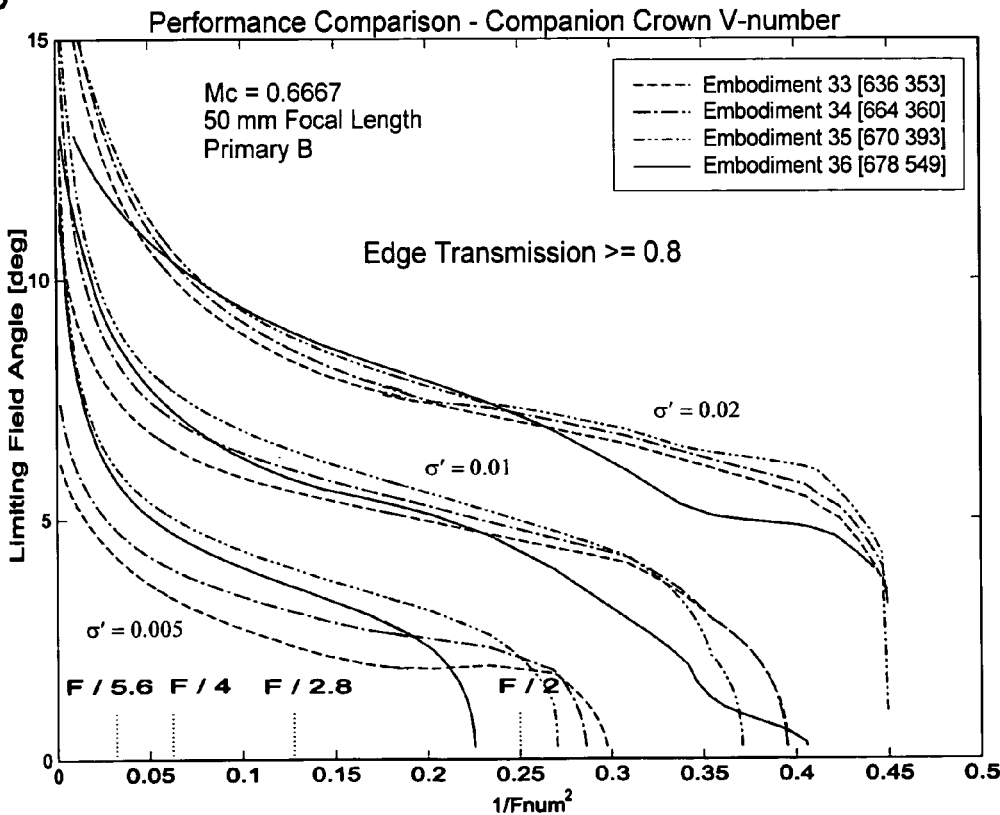

FIG. 74 compares the performances of combination embodiments 33, 34, 35, and 36.

Figure 75:
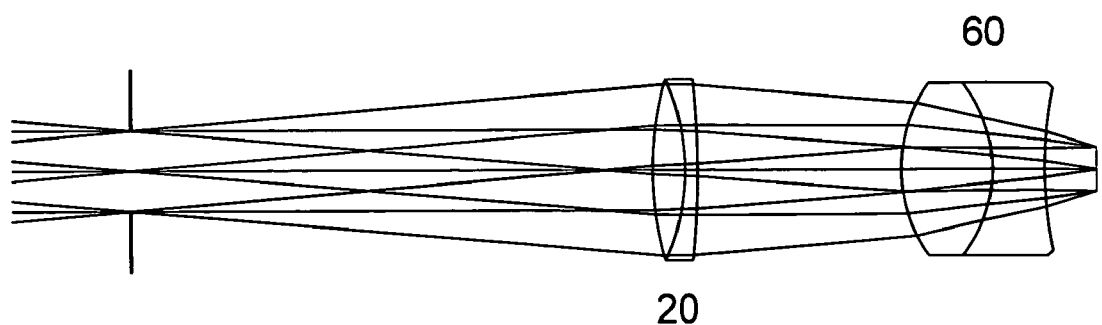

FIG. 75 shows the 37th combination embodiment.

Figure 76:
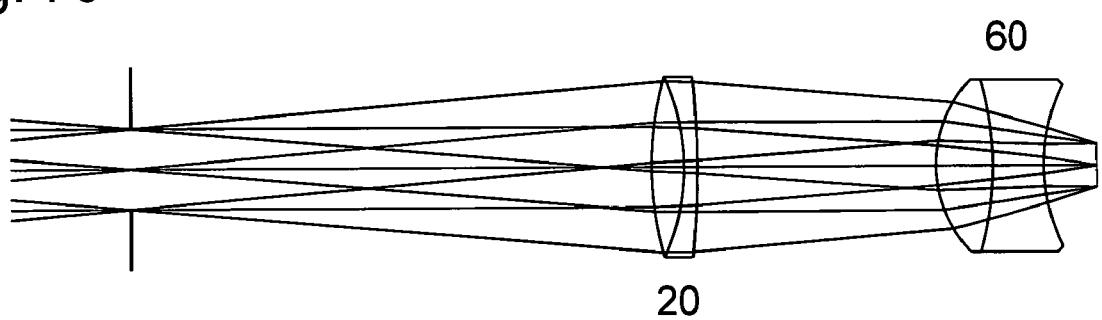

FIG. 76 shows the 38th combination embodiment.

Figure 77:
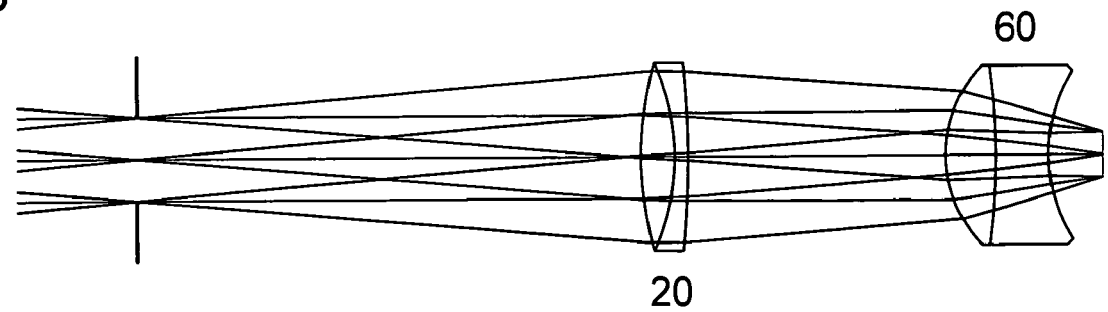

FIG. 77 shows the 39th combination embodiment.

Figure 78:
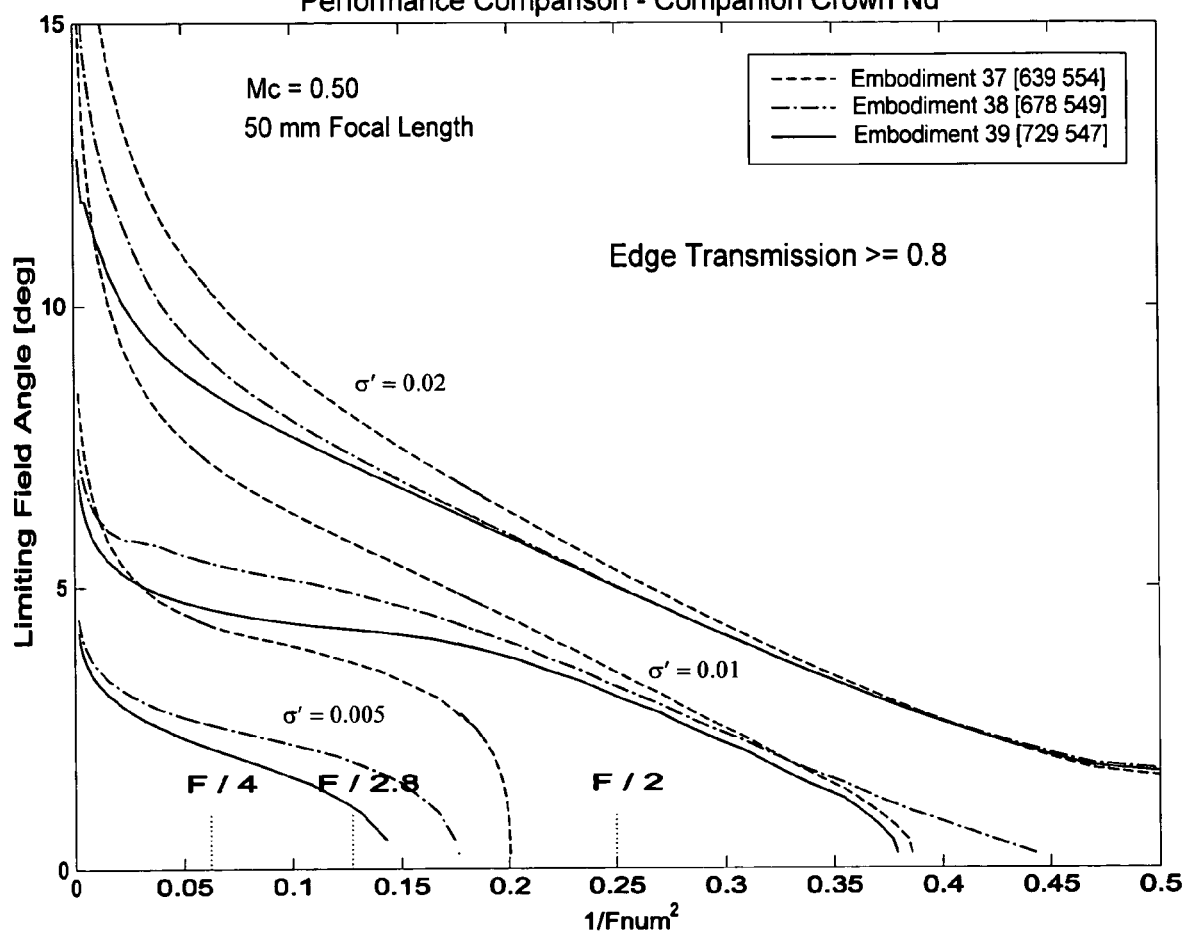

FIG. 78 compares the performances of combination embodiments 37, 38, and 39.

Figure 79:
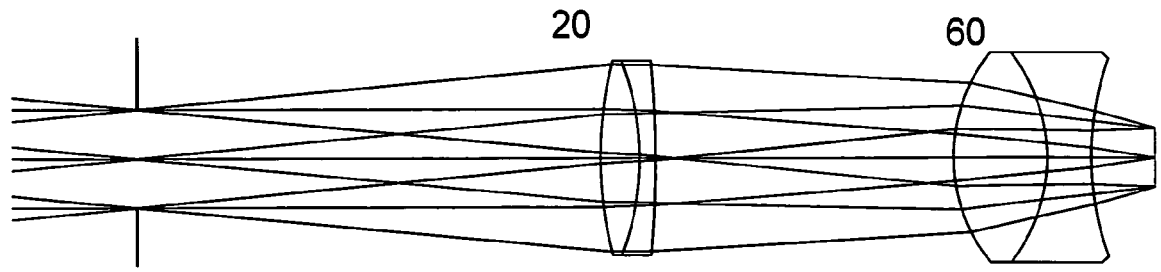

FIG. 79 depicts combination embodiment 40.

Figure 80:
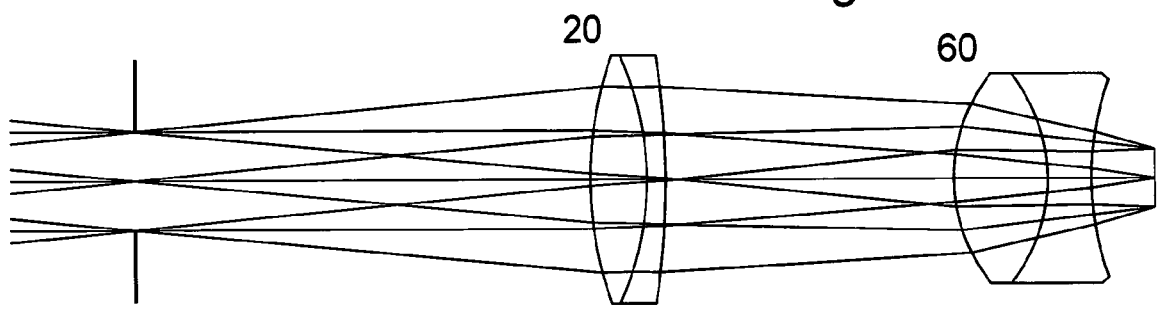

FIG. 80 depicts combination embodiment 40A.

Figure 81:
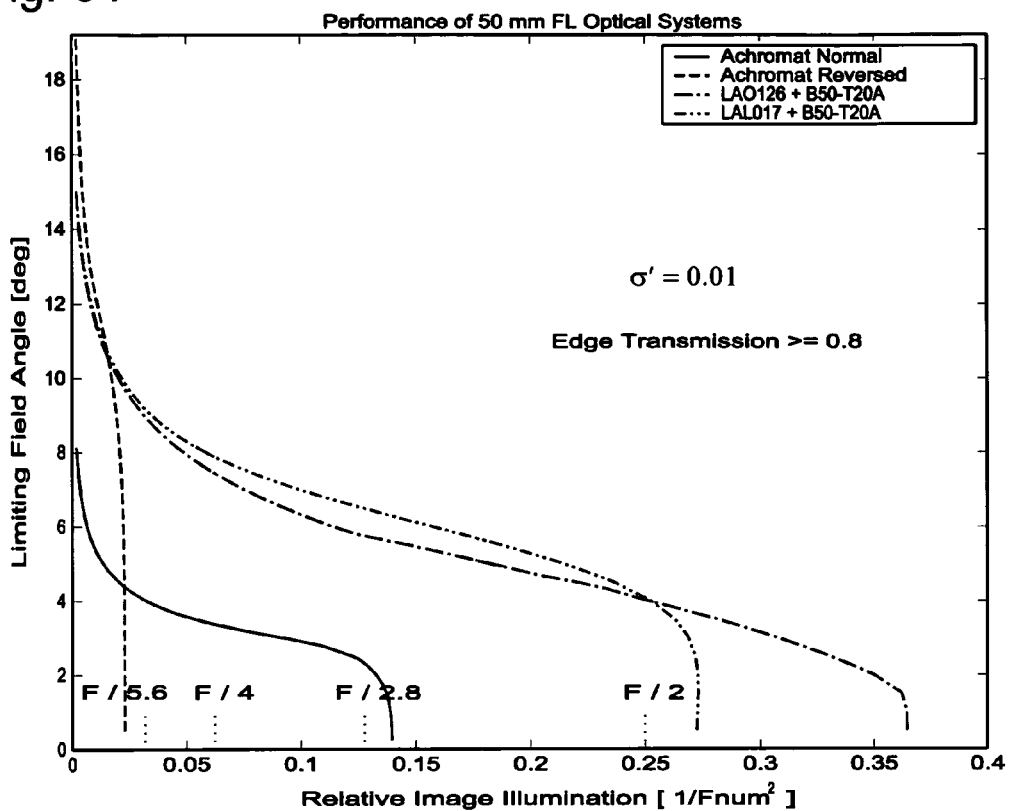

FIG. 81 depicts compares the performances of combination embodiments 40 and 40A to the performance of an achromat.

Figure 82:
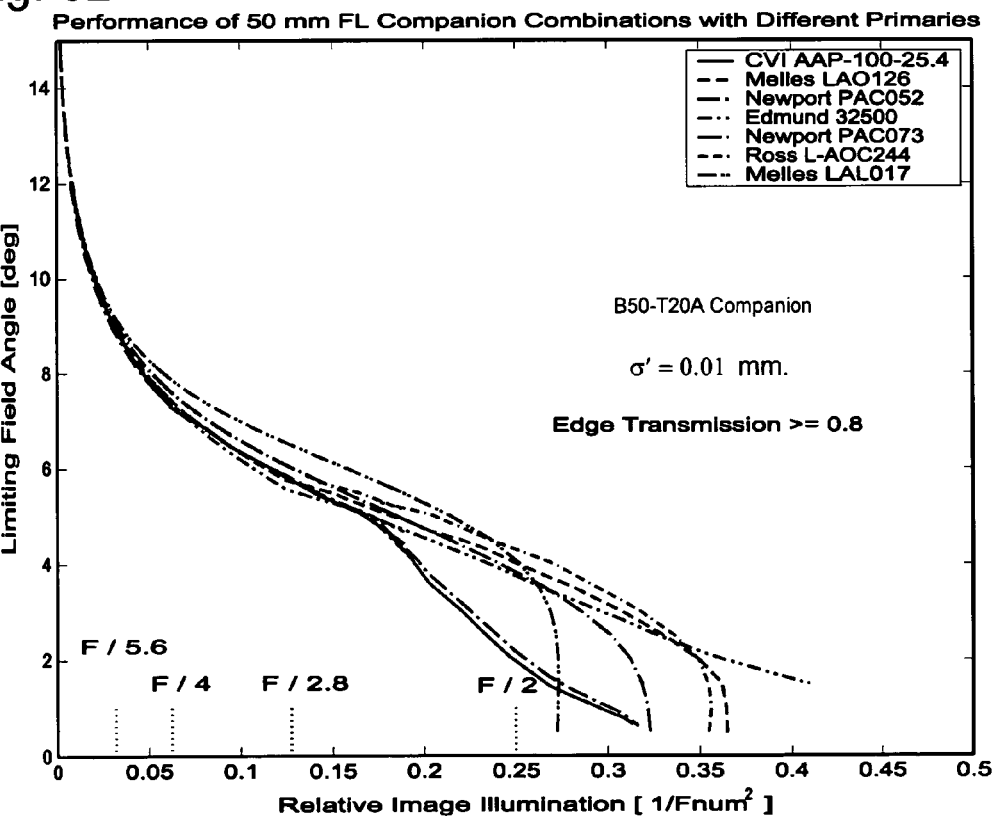

FIG. 82 compares the performances achieved by my B50-T20A companion when it is combined with a variety of primary achromats.

Figure 83:
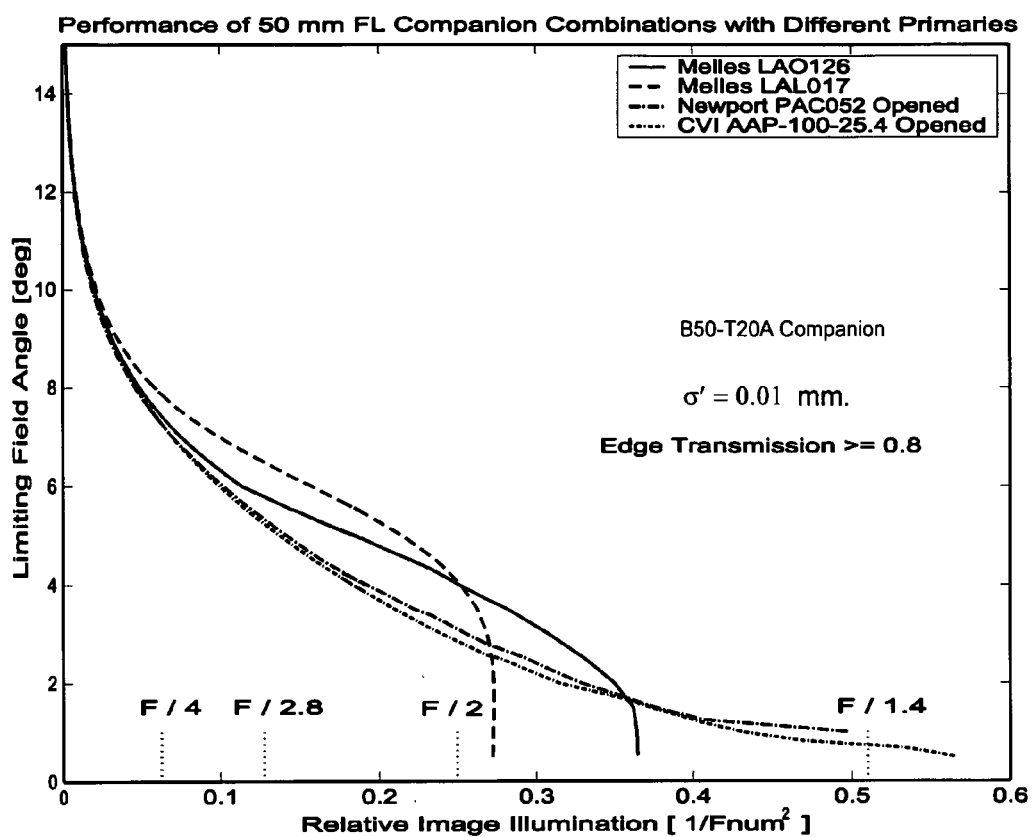

FIG. 83 depicts an interesting property of certain primaries when they are used with my B50-T20A companion.

Figure 84:
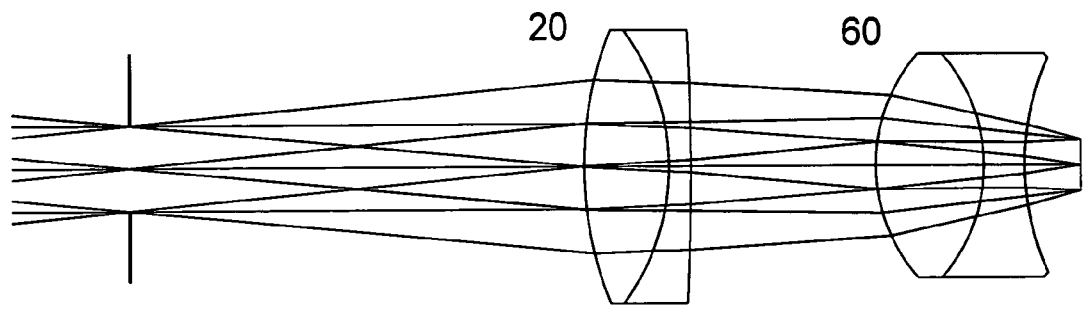

FIG. 84 depicts a 41st combination embodiment, of 25 mm focal length.

Figure 85:
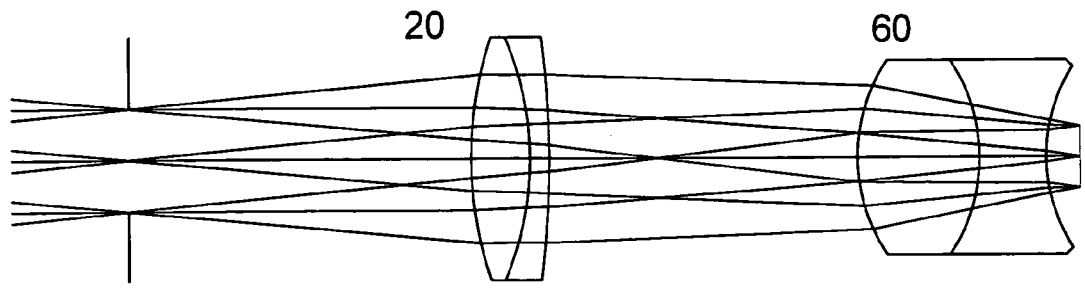

FIG. 85 depicts a 42nd combination embodiment, of 100 mm focal length.

Figure 86:
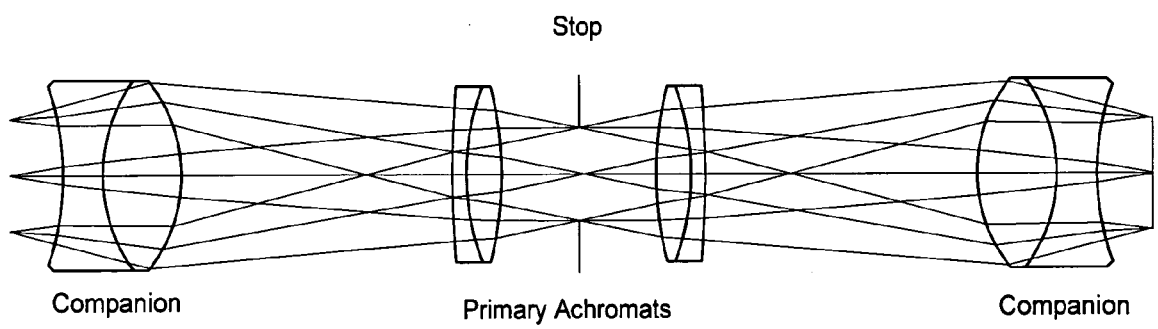

FIG. 86 depicts a 1:1 relay system comprised of 50 mm focal length companion combinations placed on either side of a stop.

Figure 87:
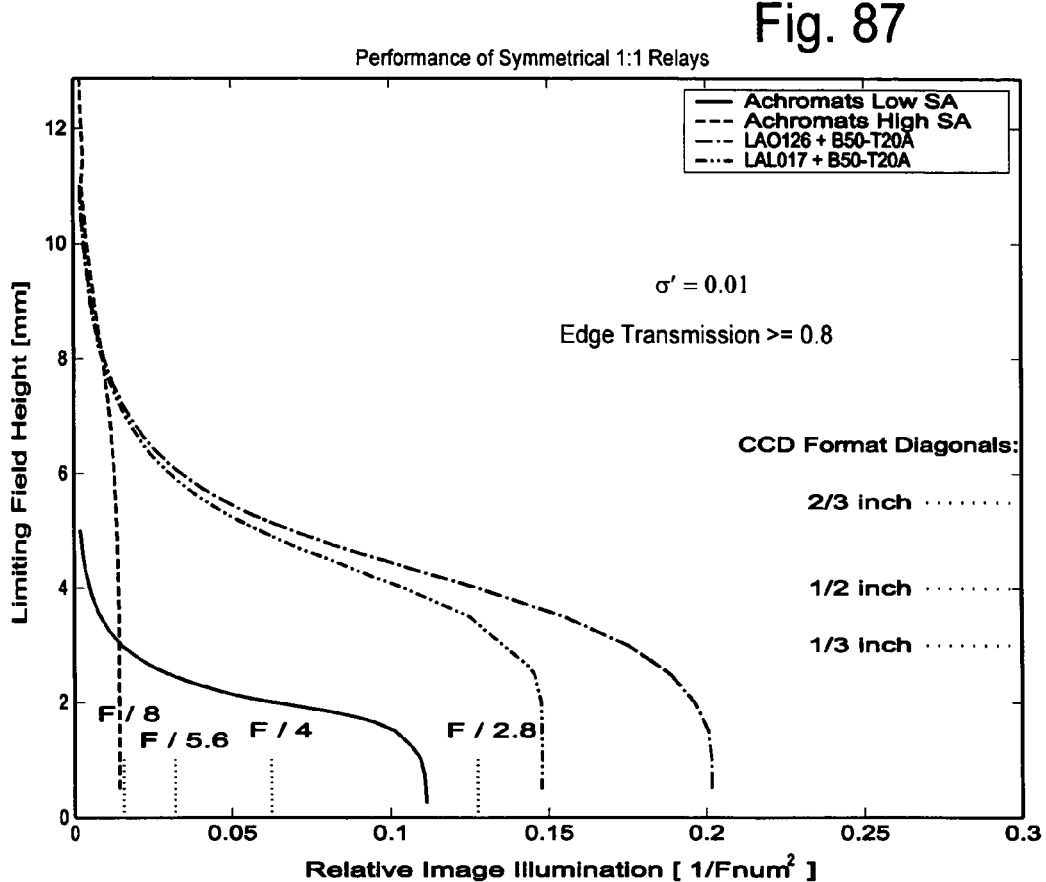

FIG. 87 compares the performance of a 1:1 relay comprised of achromats to two different 1:1 relays comprised of companion combinations.

Figure 88:
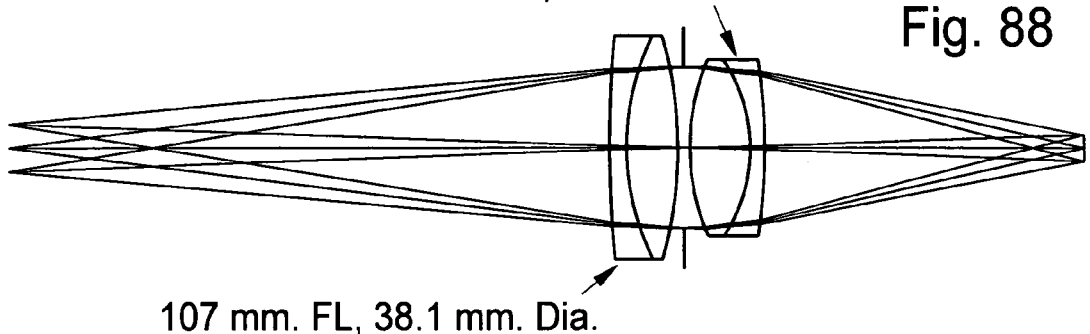

FIG. 88 shows an unsymmetrical relay comprised of a pair of achromats.

Figure 89:
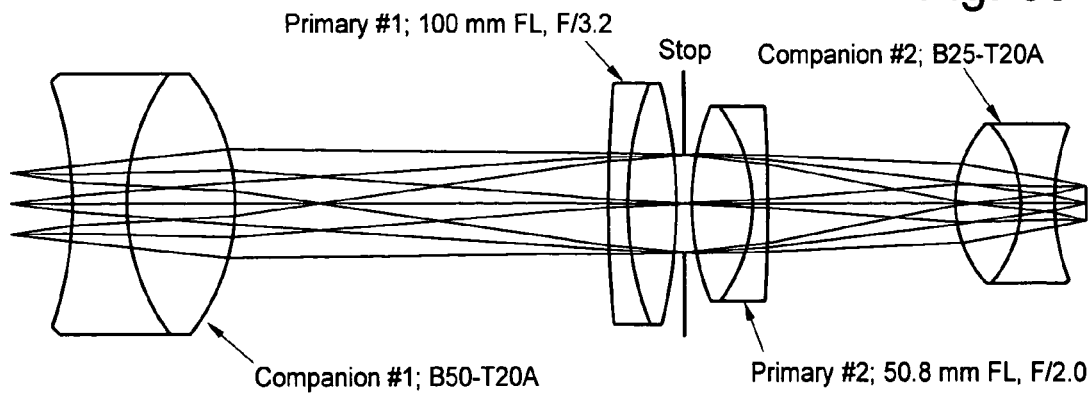

FIG. 89 shows an unsymmetrical relay comprised of a pair of companion combinations.

Figure 90:
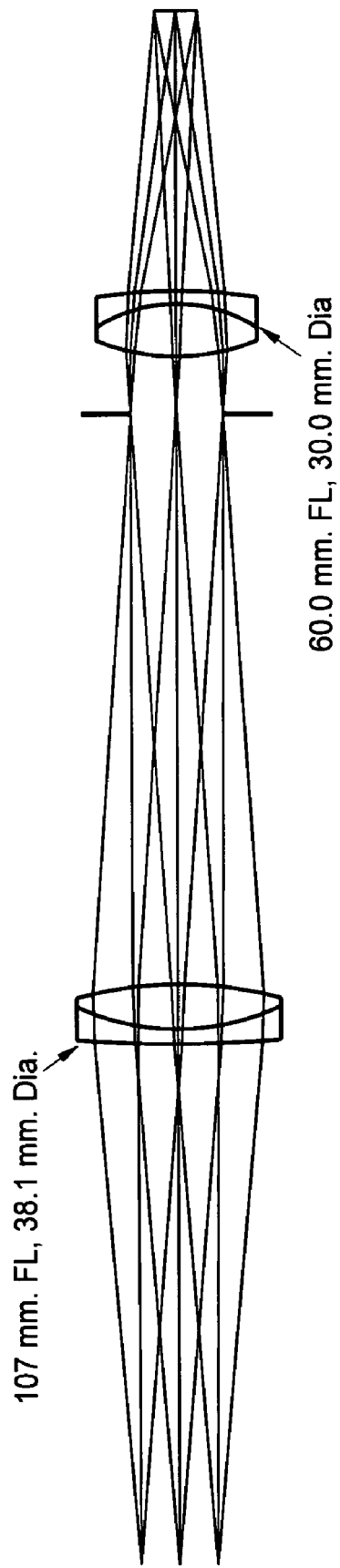

FIG. 90 depicts a second unsymmetrical relay made with a pair of achromats.

Figure 91:
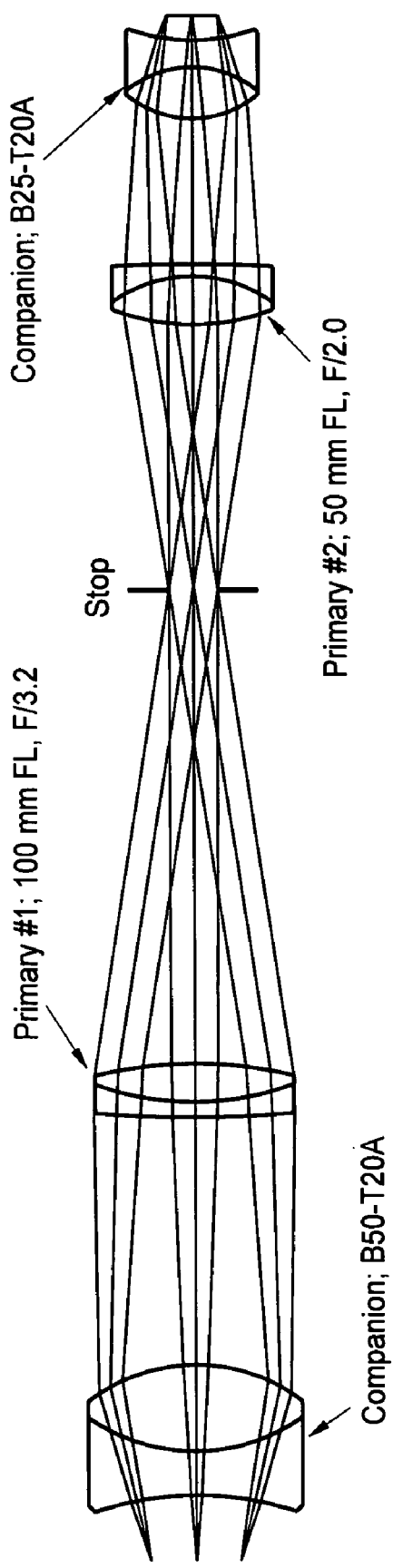

FIG. 91 depicts a second unsymmetrical relay made with companion combinations.

Figure 92:
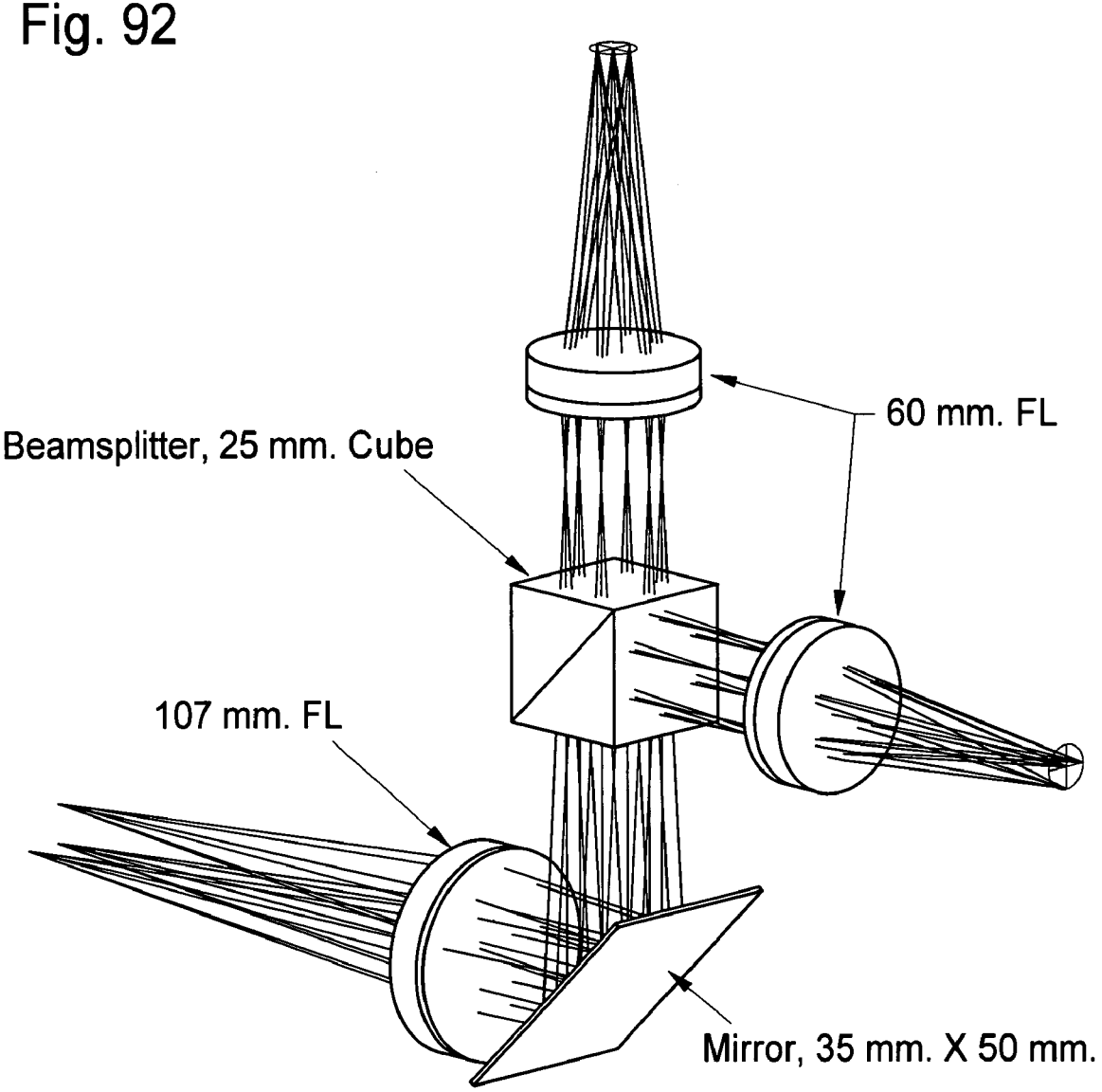

FIG. 92 is a perspective view of the optical system of FIG. 90 in its near final form.

Figure 93:
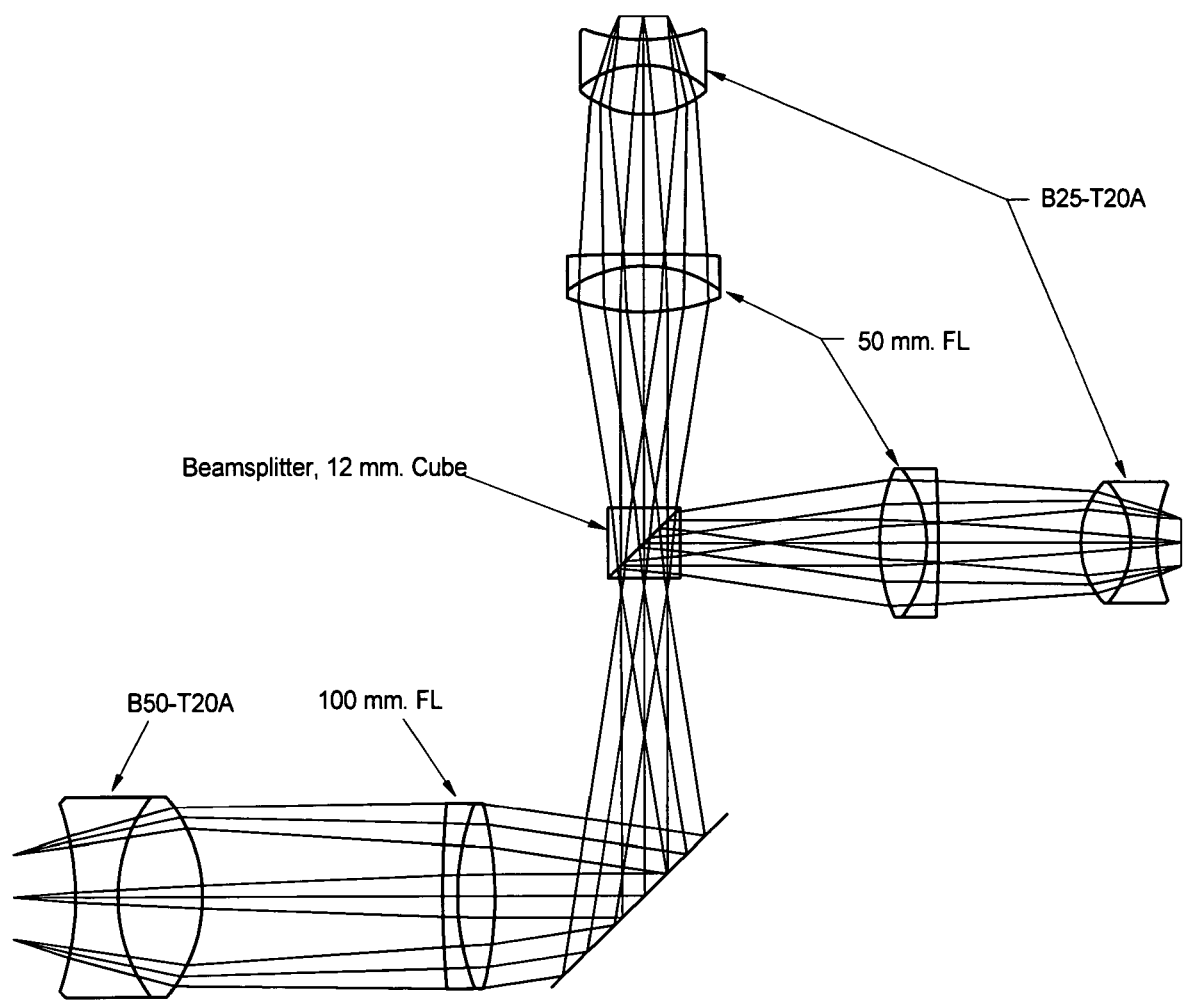

FIG. 93 is a plan view of the version of the optical system made with companion combinations.

Figure 94:
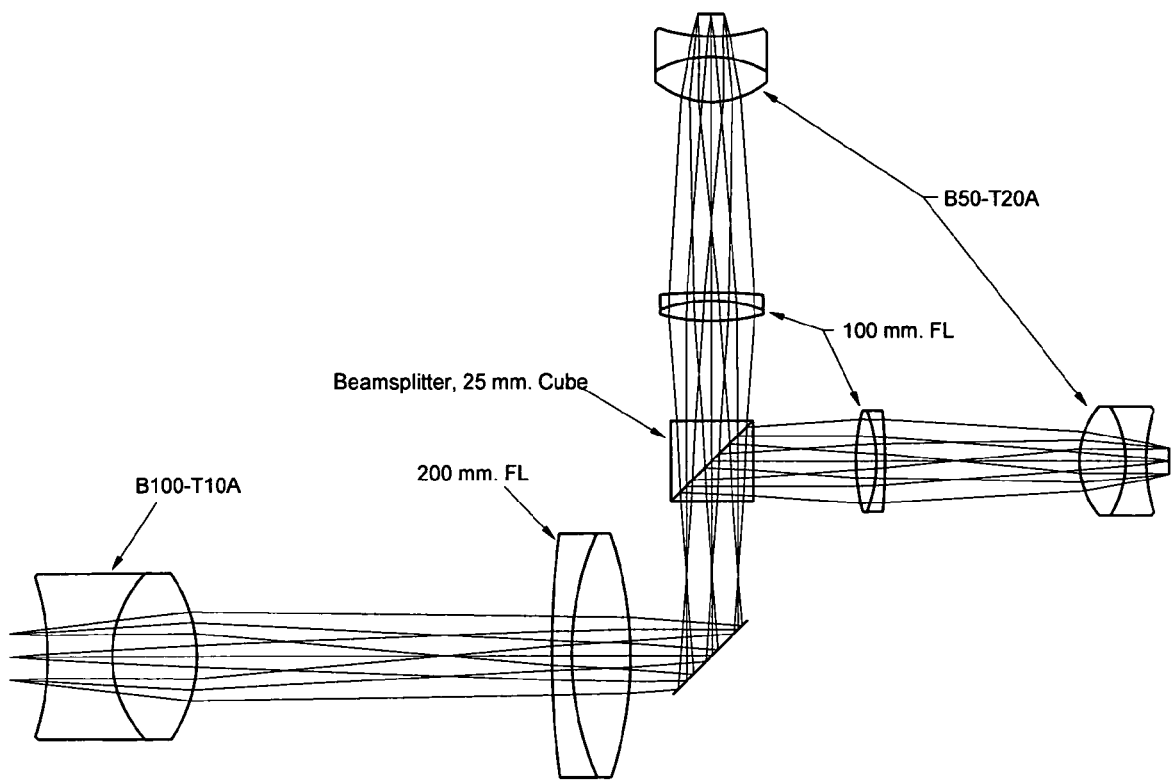

FIG. 94 is a plan view of a second version of the optical system comprised of companion combinations.

Figure 95:
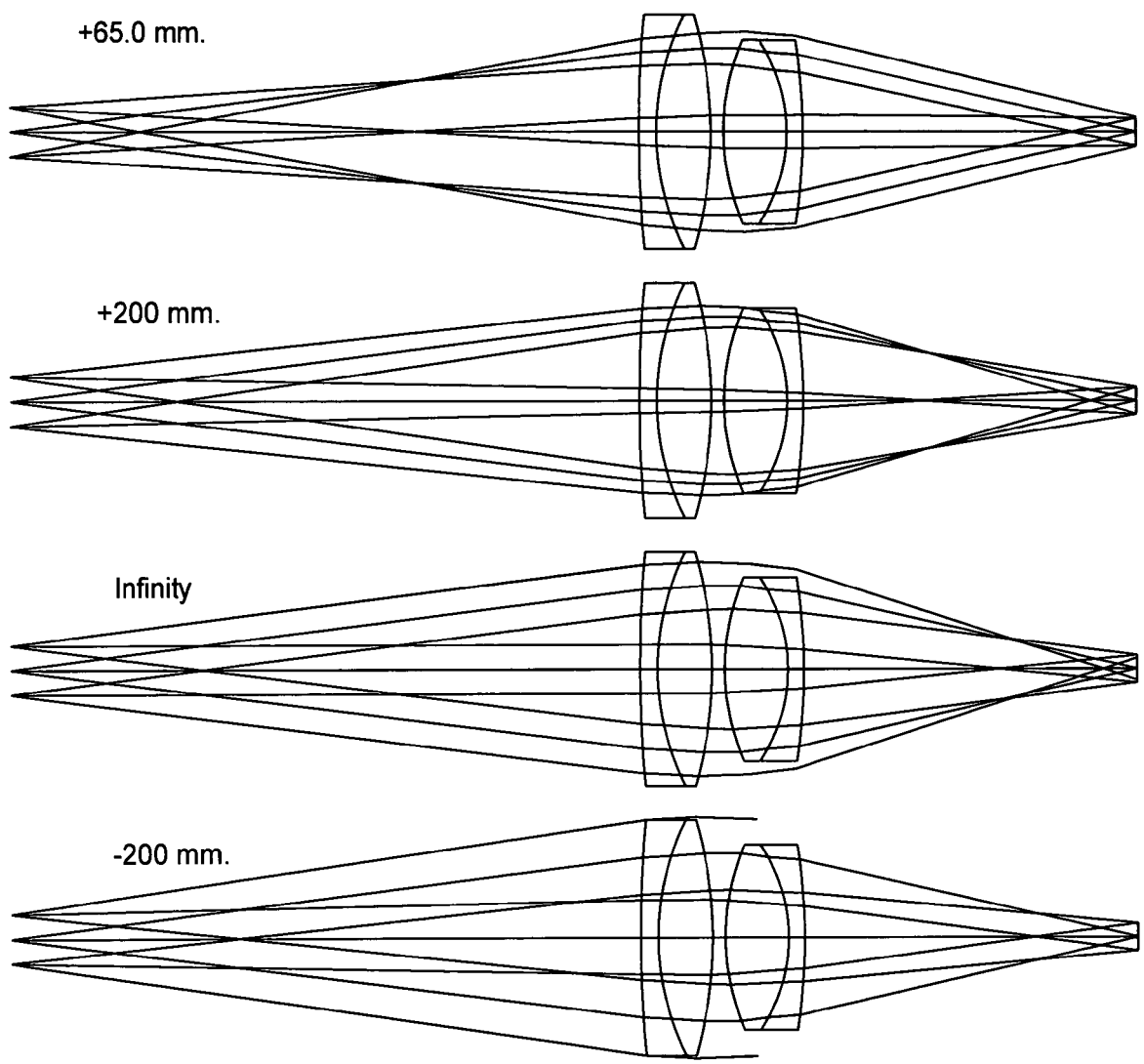

FIG. 95 depicts the changes which occur when an unsymmetrical achromat relay is used to relay an image at different entrance pupil positions.

Figure 96:
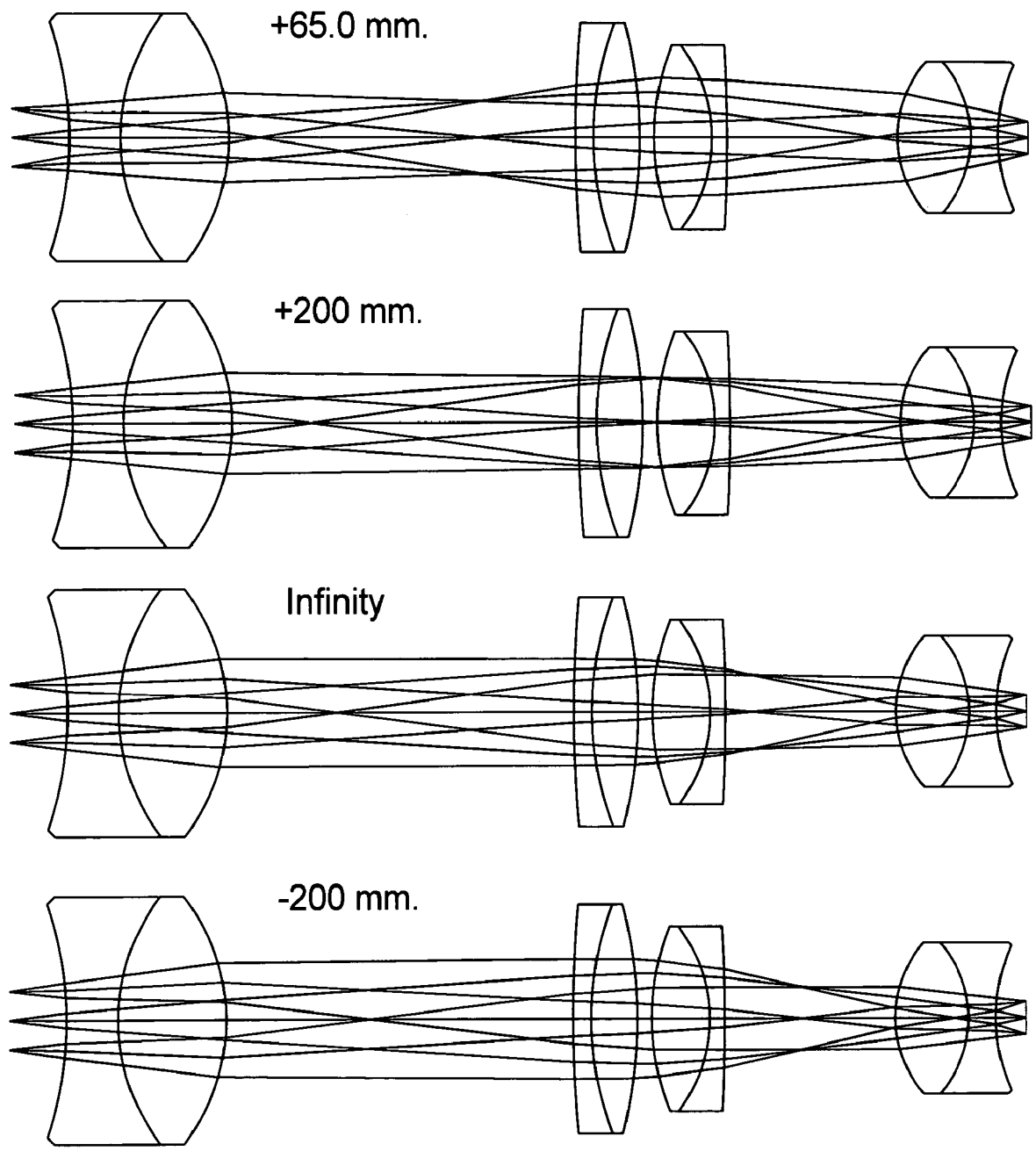

FIG. 96 depicts the changes which occur when an unsymmetrical companion combination relay is used to relay an image at different entrance pupil positions.

Figure 97:
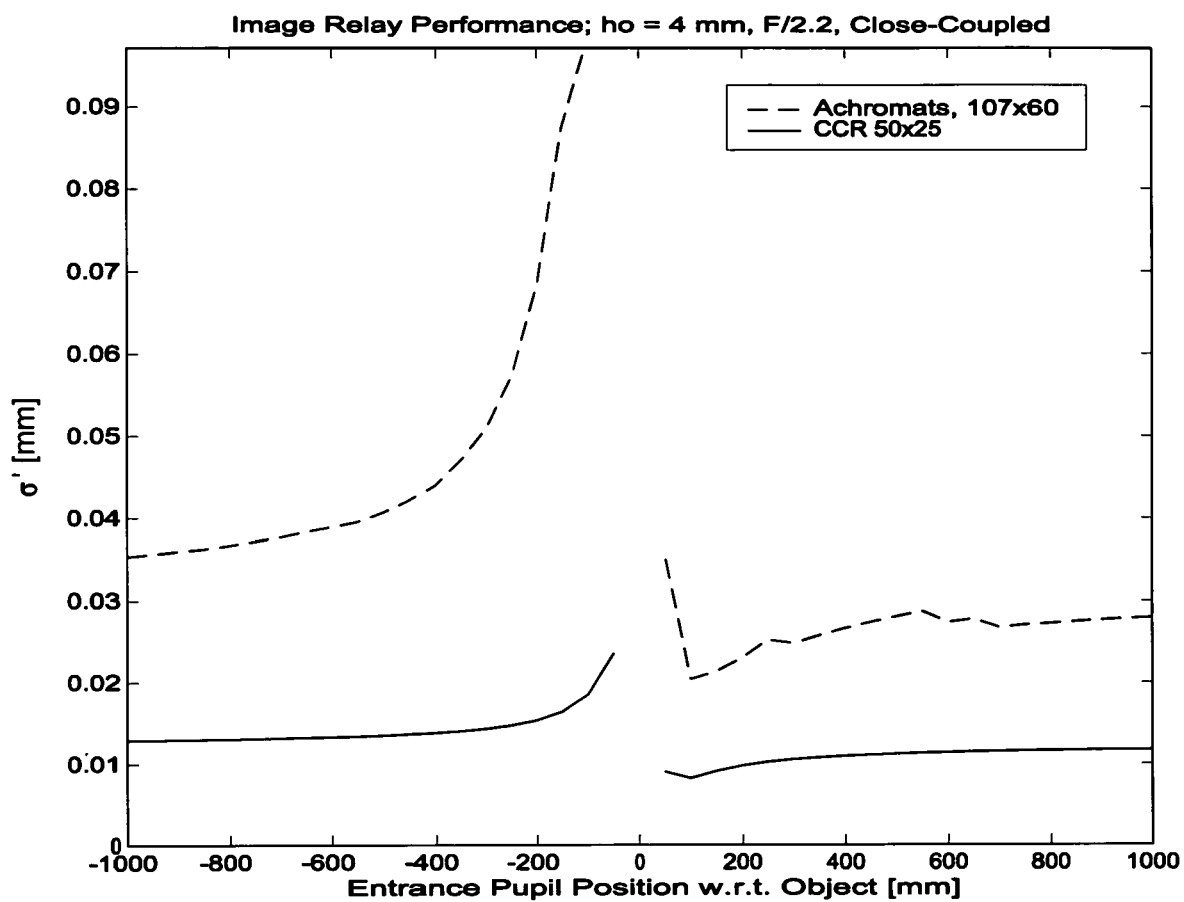

FIG. 97 compares the performances of the systems of FIGS. 95 and 96 as the position of the entrance pupil is varied.

Figure 98:
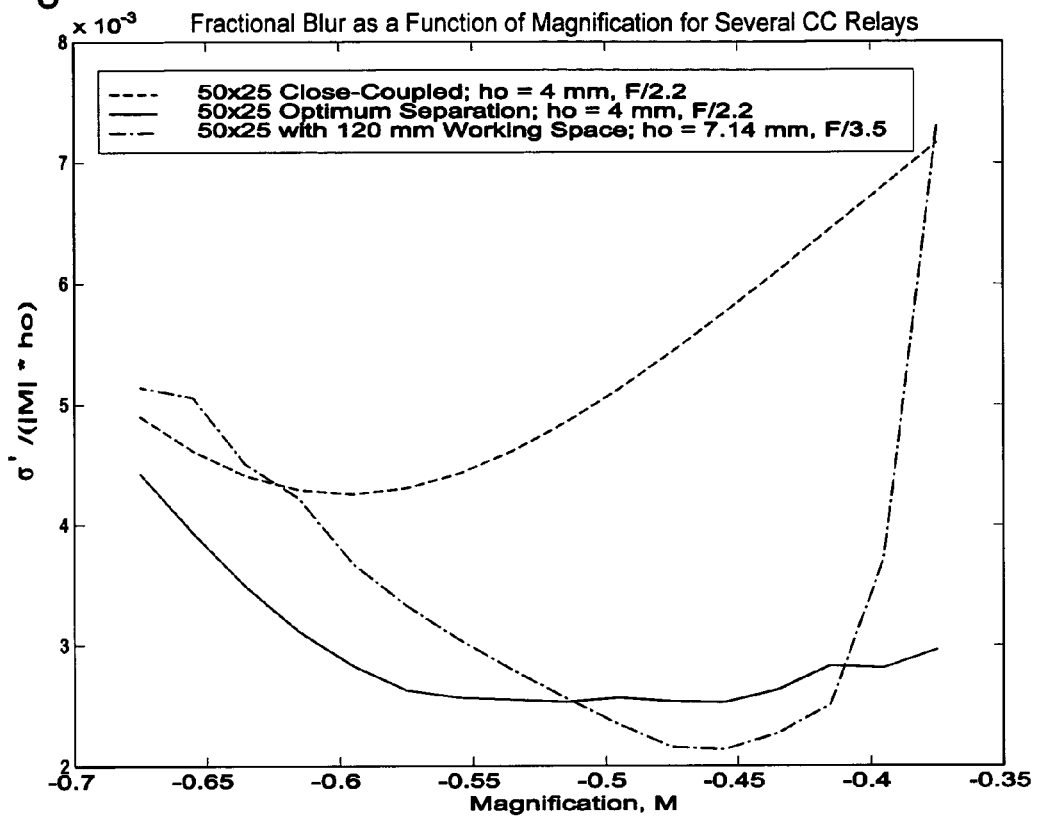

FIG. 98 depicts the performance of three companion combination relays, using the same optical components in all cases, as a function of the magnification of the relays, for magnifications near −0.5.

Figure 99:
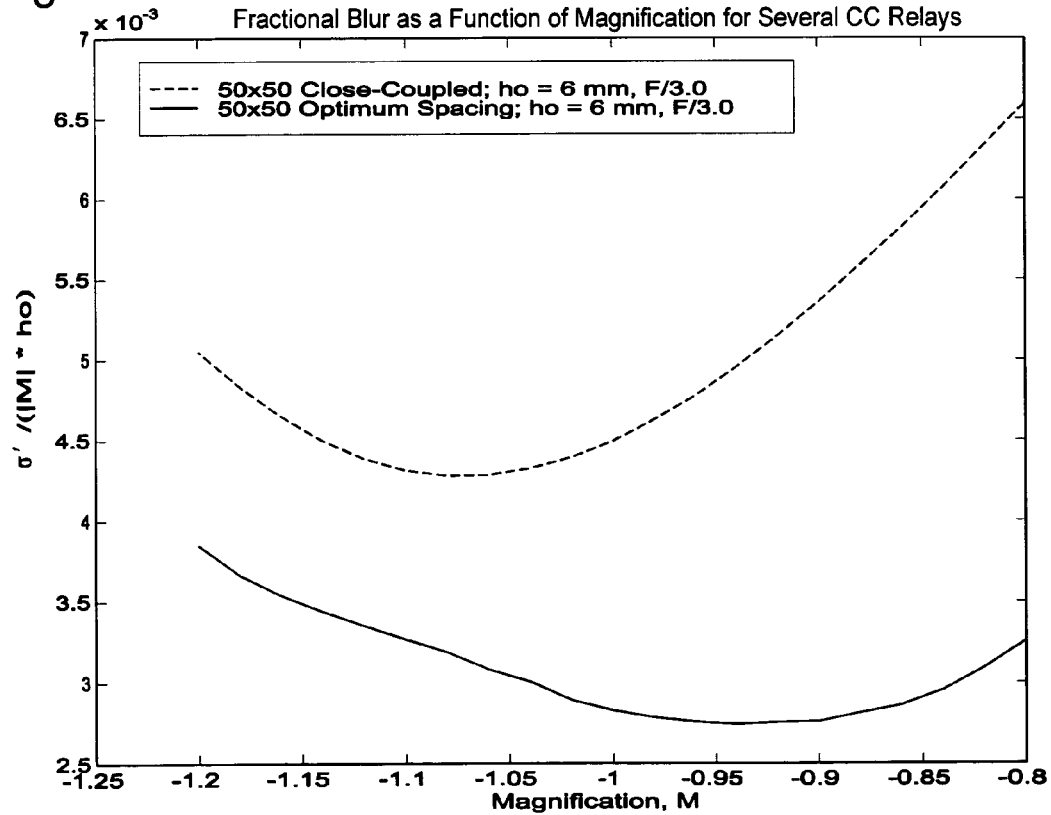

FIG. 99 shows the performance of a two companion combination relays, using the same optical components, as the magnification of the relay is varied, for magnifications near −1.0.

Figure 100:
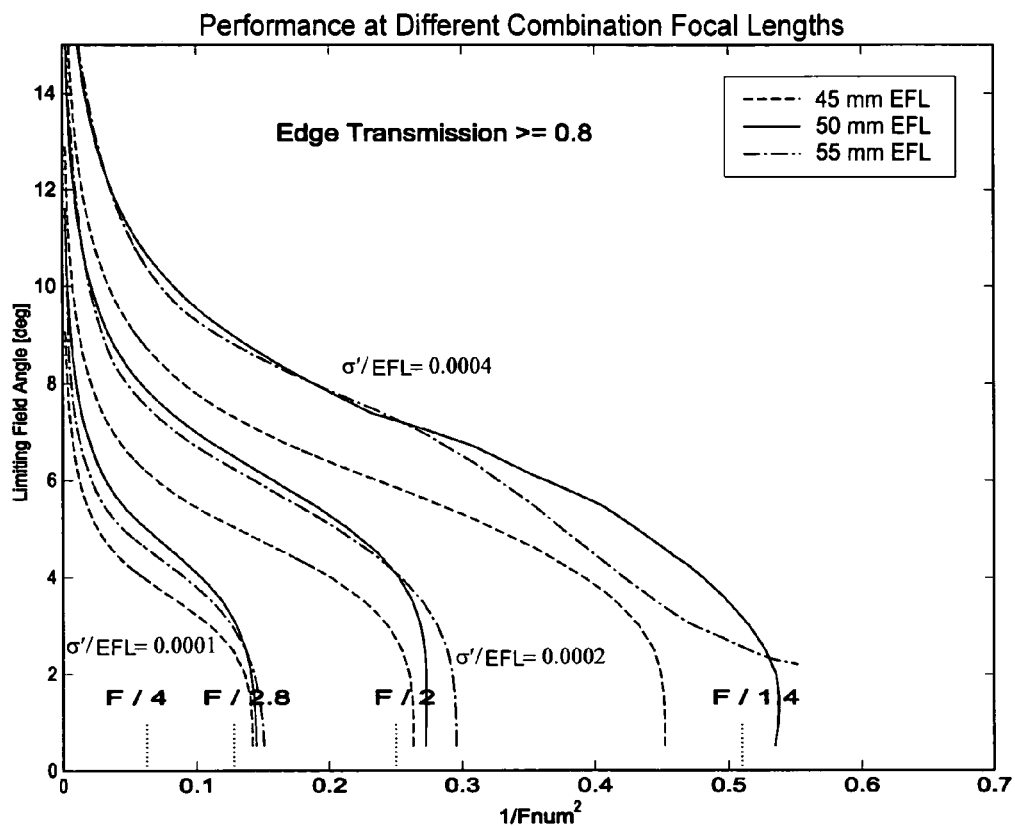

FIG. 100 shows the variation in performance when a particular companion combination is adjusted to three different combination focal lengths, using a primary having its nominal focal length.

Figure 101:
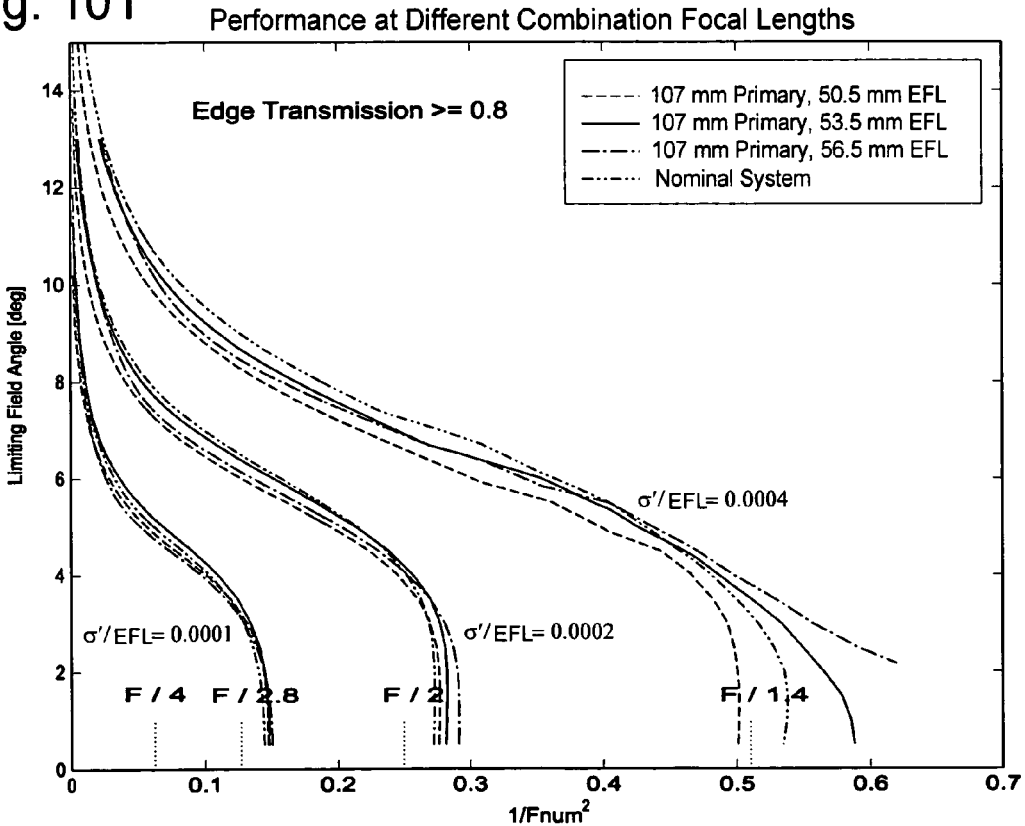

FIG. 101 shows the variation in performance when a particular companion combination is adjusted to different focal lengths, using a primary that has a longer than nominal focal length.

Figure 102:
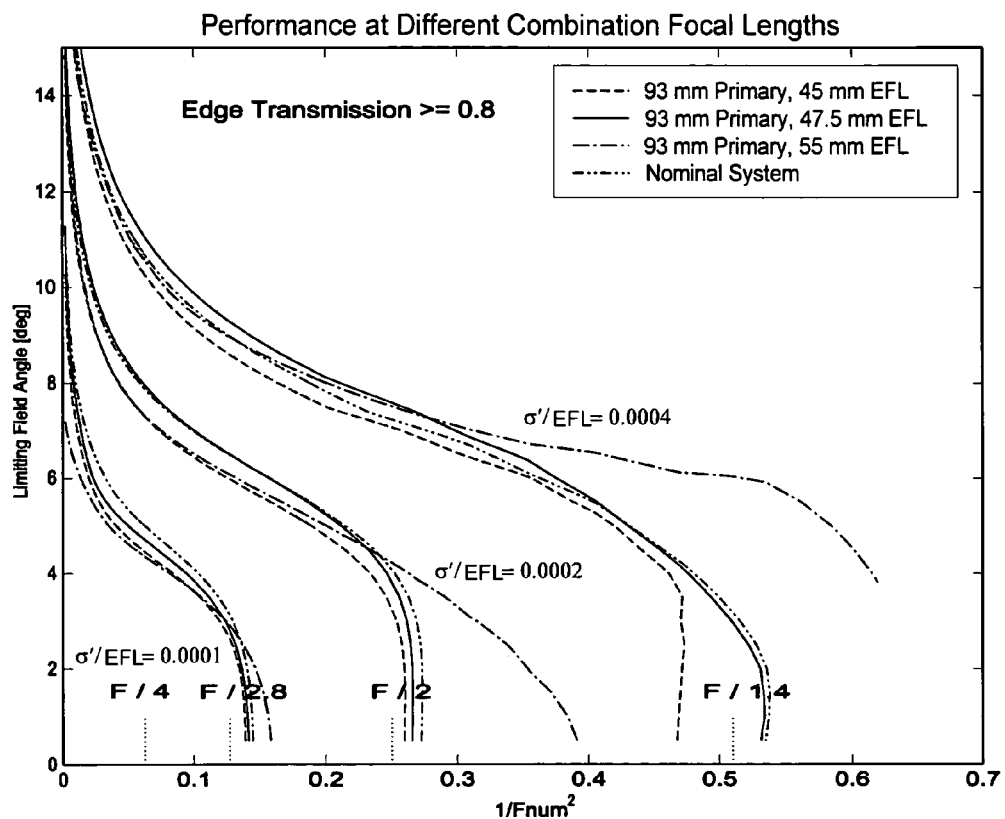

FIG. 102 shows the variation in performance when a particular companion combination is adjusted to different focal lengths, using a primary that has a shorter than nominal focal length.

Figure 103:
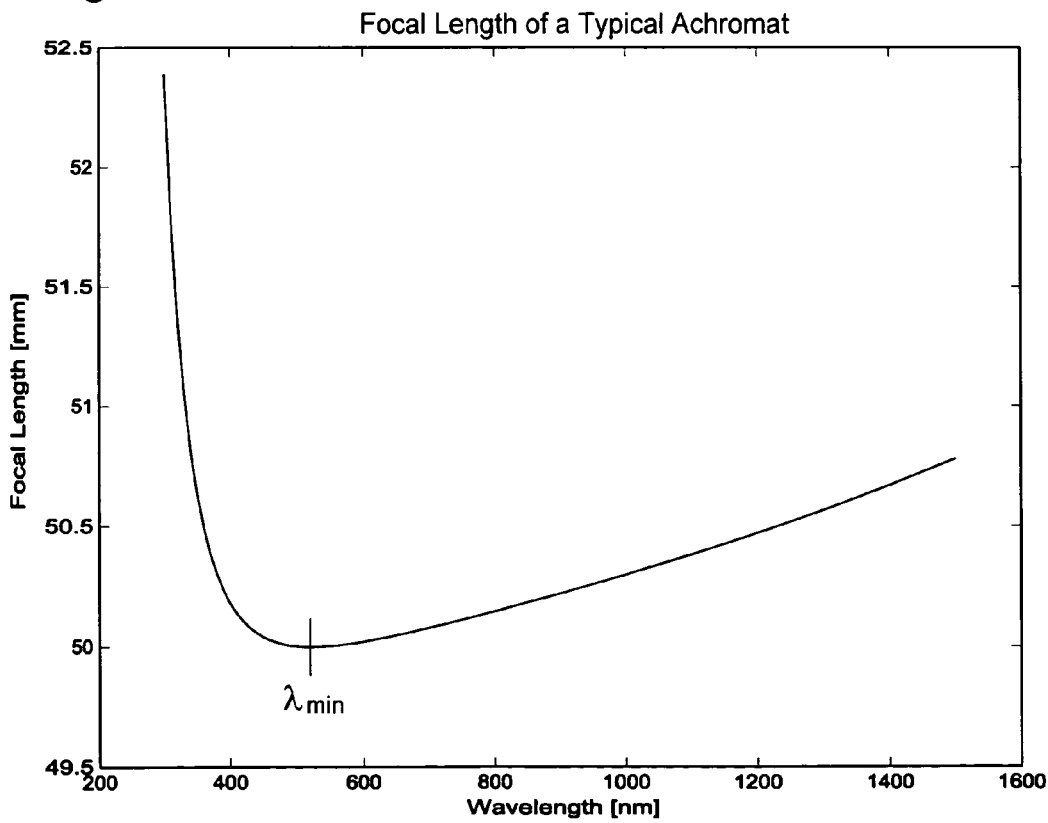

FIG. 103 depicts the focal length of an achromat as a function of wavelength.

Figure 104:
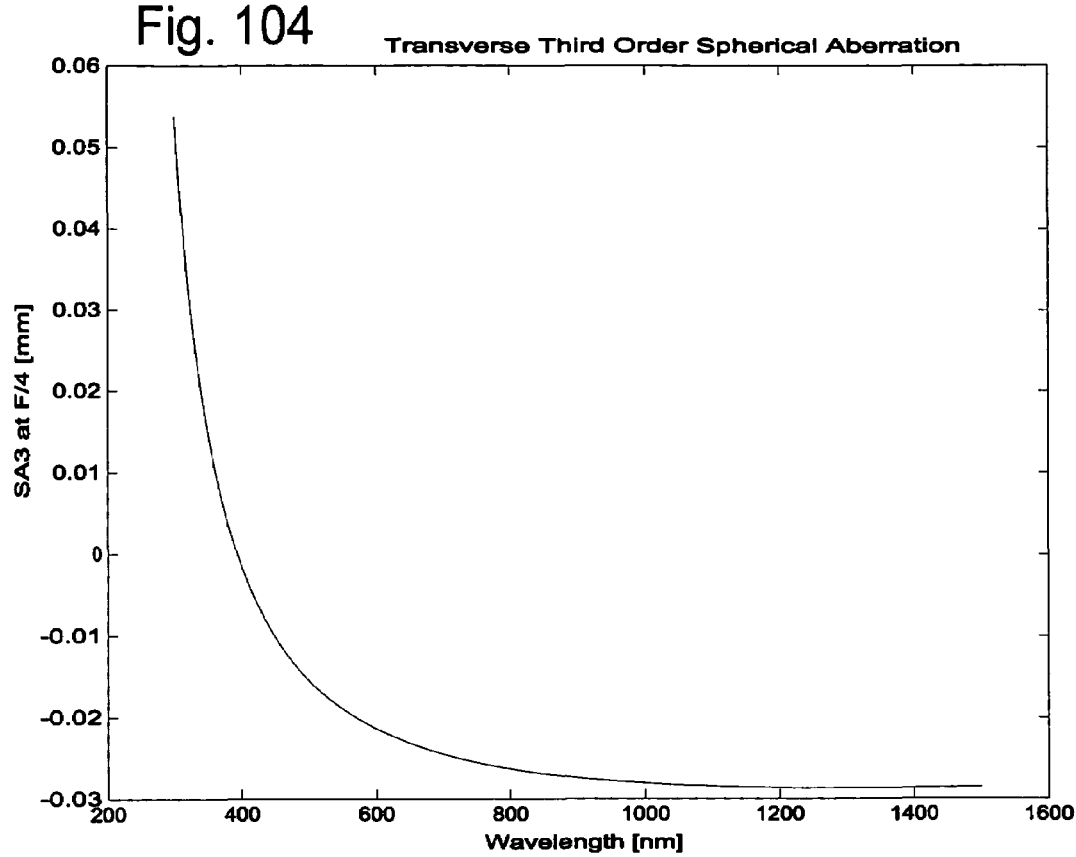

FIG. 104 depicts the third order spherical aberration of an achromat as a function of wavelength.

Figure 105:
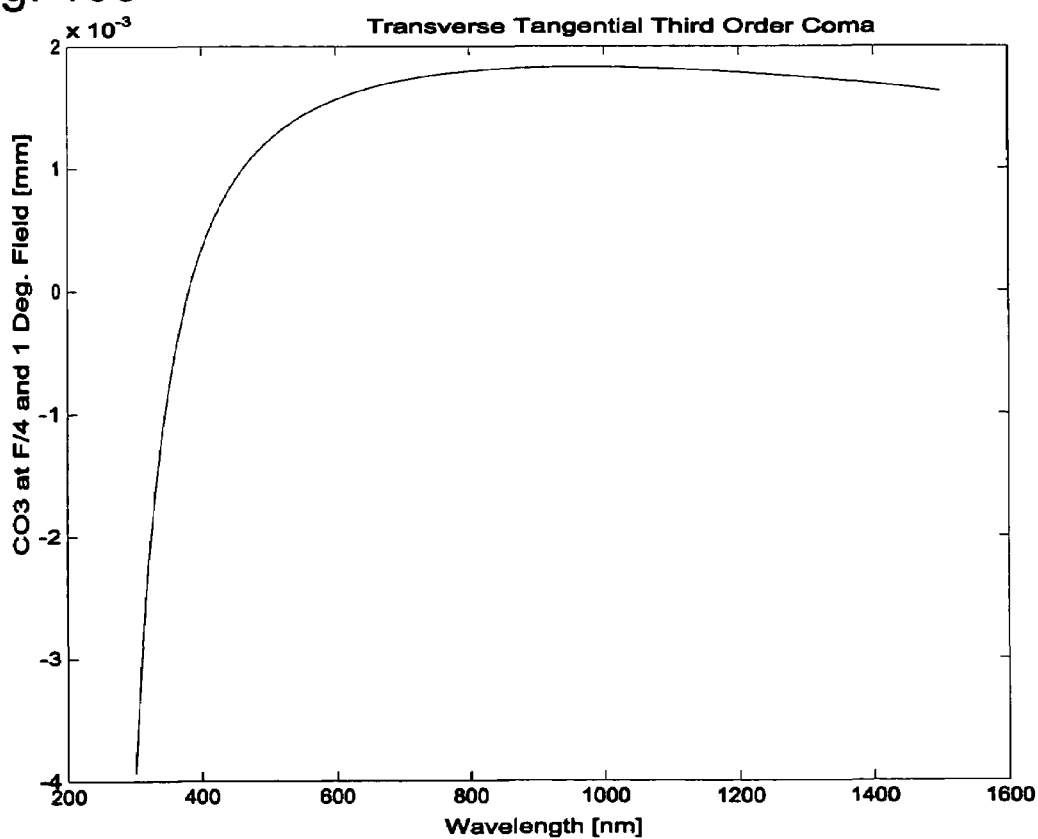

FIG. 105 shows the third order coma of an achromat as a function of wavelength.

Figure 106:
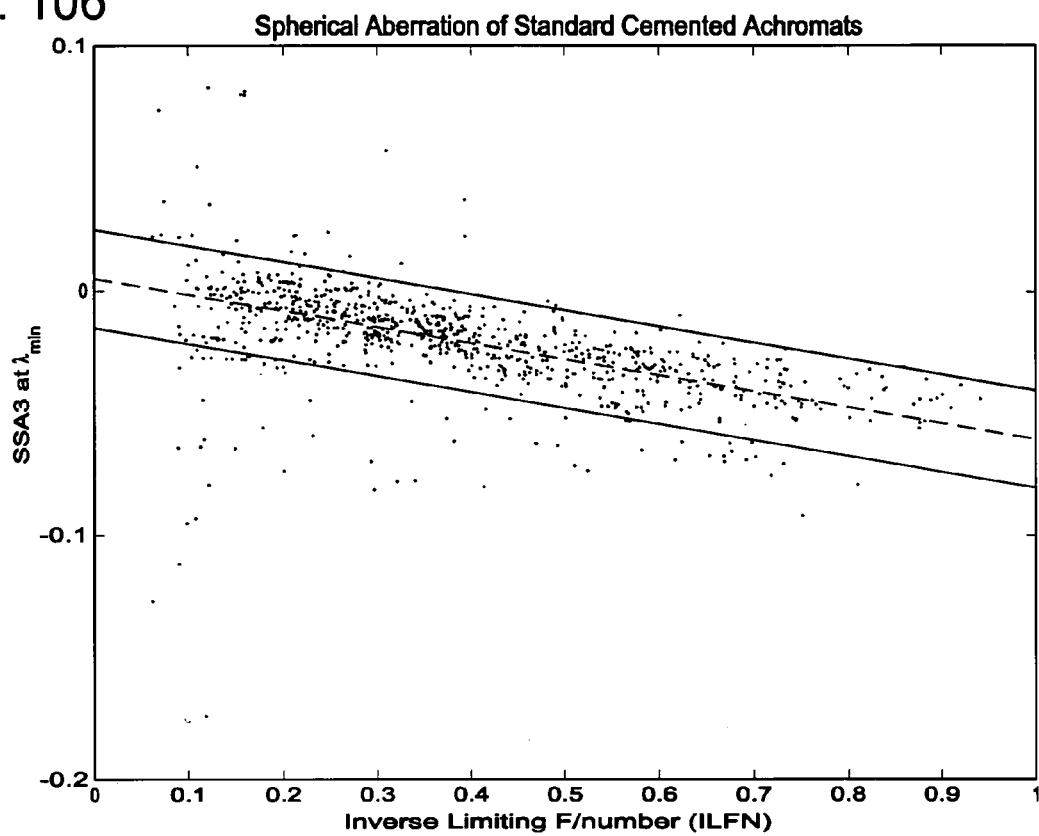

FIG. 106 shows the relationship between the fundamental limiting aperture of standard achromats and their scaled spherical aberration.

Figure 107:
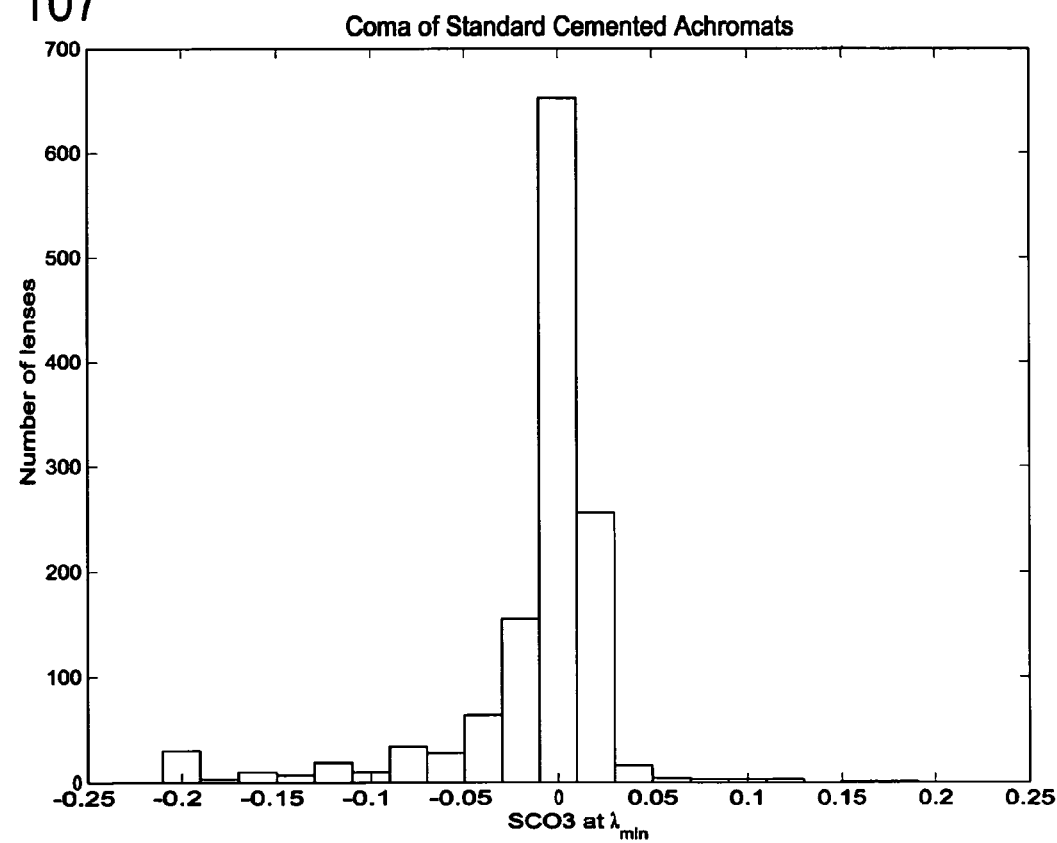

FIG. 107 depicts a histogram of the number of standard achromats versus their scaled coma.

Figure 108:
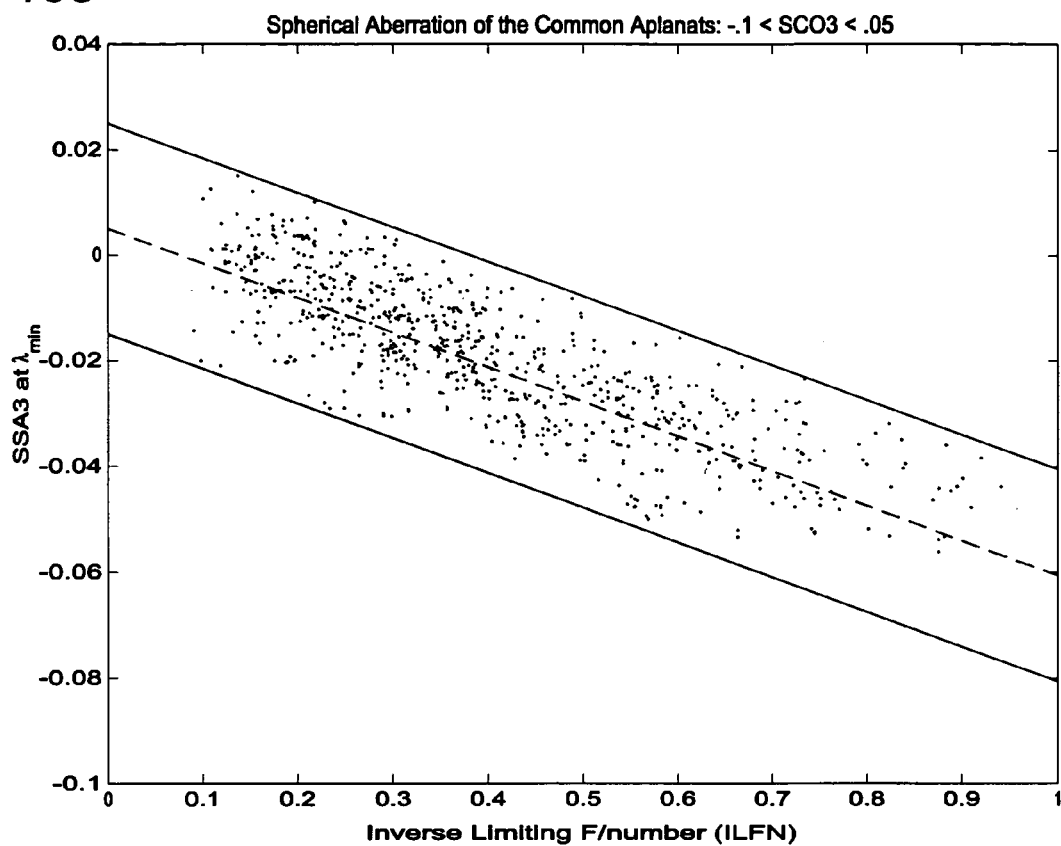

FIG. 108 shows the spherical aberration of the effectively aplanatic standard achromats—the common aplanats—as a function of their fundamental apertures, the inverse limiting F/No.

Figure 109:
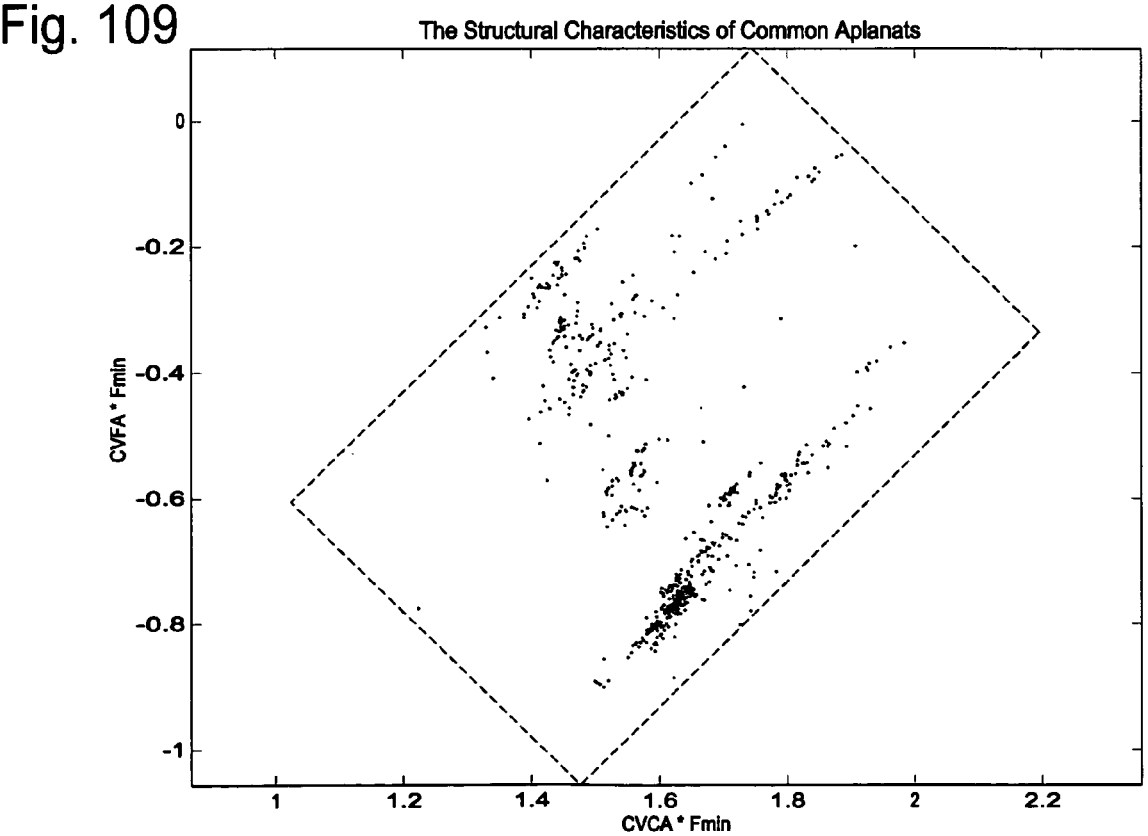

FIG. 109 depicts a structural characteristic of the common achromats, in terms of the scaled flint-air curvature plotted vs. their scaled crown-air curvatures.

Figure 110:
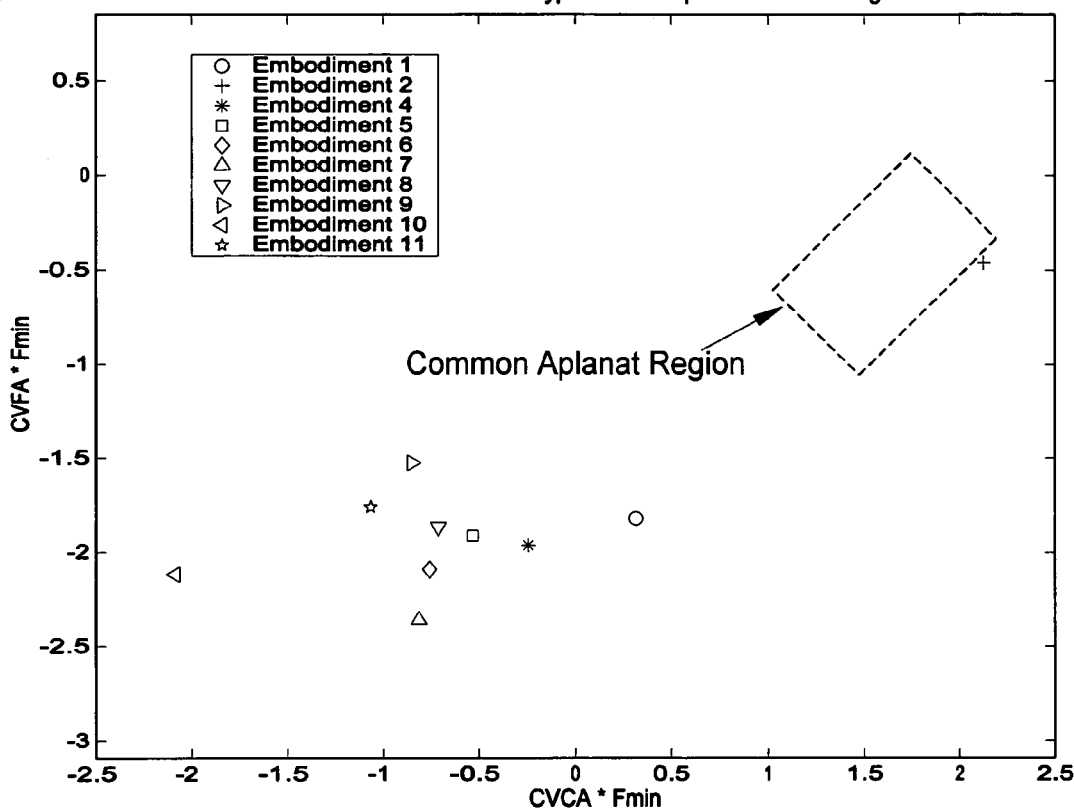

FIG. 110 shows the structural characteristics of the Type 1NR embodiments that lie near the common aplanat region.

Figure 111:
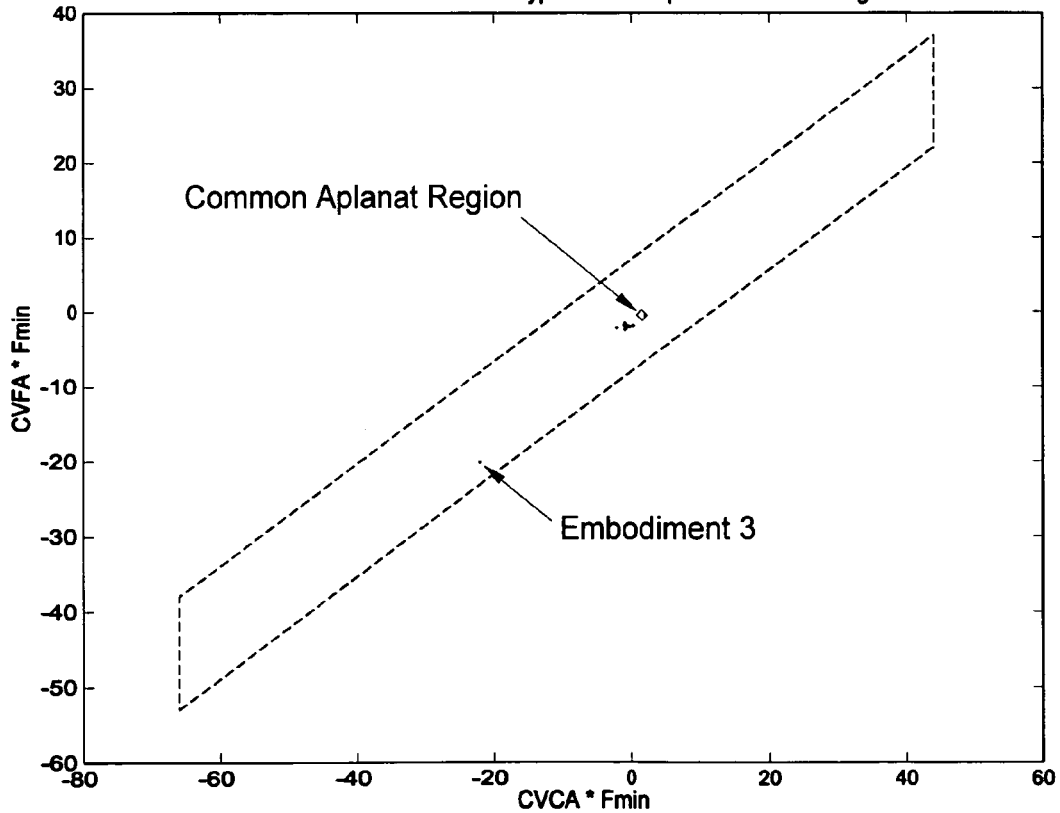

FIG. 111 shows the quality region, in terms of the structural characteristic, for all good Type 1NR embodiments.

Figure 112:
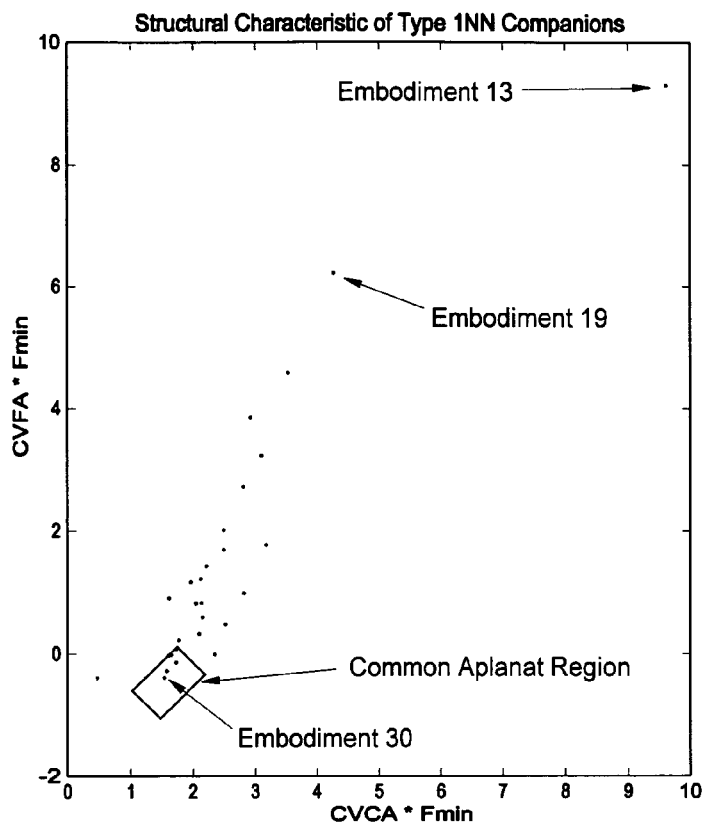

FIG. 112 shows the structural characteristics of all of the Type 1NN embodiments, in the region near the common aplanat region.

Figure 113:
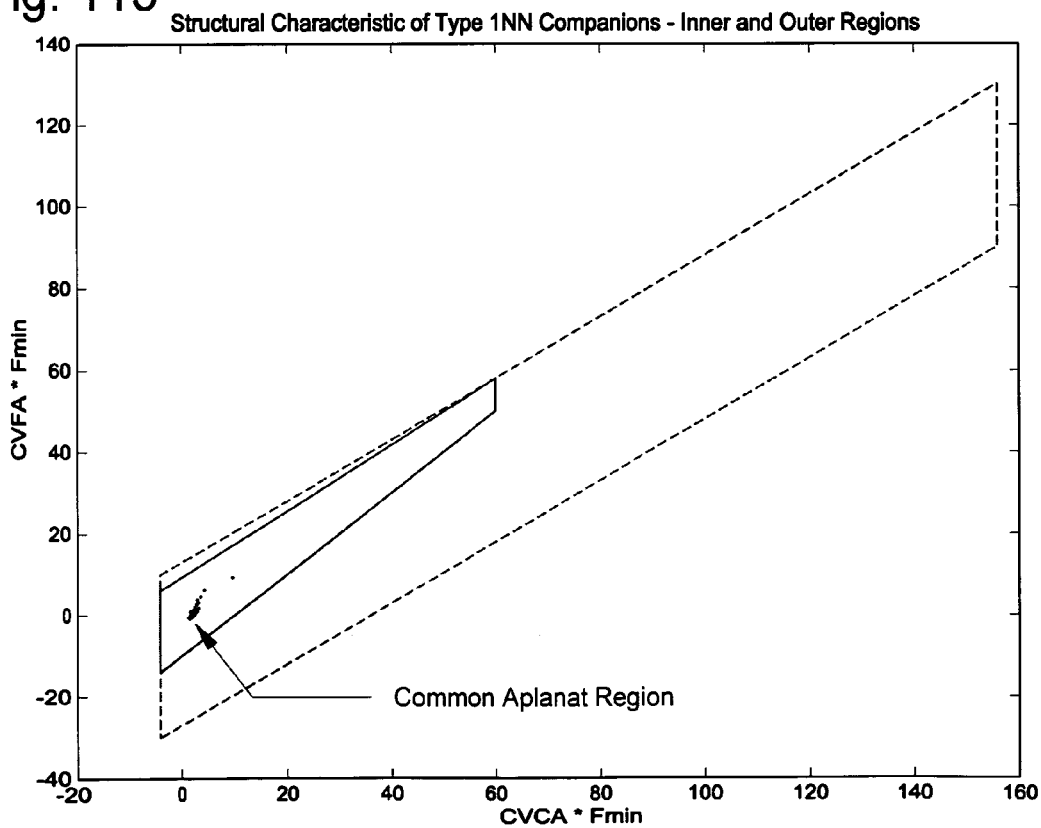

FIG. 113 shows the inner and outer quality regions, in terms of the structural characteristic, for all good Type 1NN embodiments.

DETAILED DESCRIPTION OF THE INVENTION

1. Discussion of the Problem Being Solved

Figure 1:
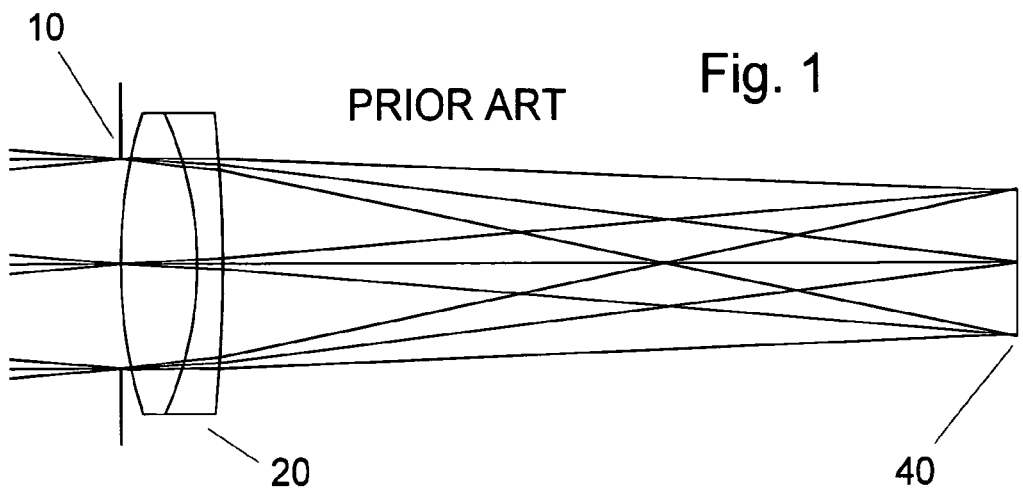
FIG. 1 depicts a standard 50 mm focal length standard achromat imaging an object located at infinity over a field of view with a radius of 5 degrees, as prior art.

As an example of the prior art, FIG. 1 depicts a standard achromat, 20, being used to image an object located at infinity over a field of view with a radius of 5 degrees. An aperture stop, 10, has been placed coincident with the front vertex of the lens (normally referred to as being "in contact" with the lens) so that the image is formed at a focal ratio of F/4. The image produced by the lens is examined or characterized on an image viewing plane 40. Lens 20 is shown here in its conventional, forward or normal orientation, in which condition it is substantially corrected for spherical aberration. If the lens happens to be substantially corrected for coma as well, with the stop at the position shown, the lens is referred to as being an aplanat.

Figure 2:
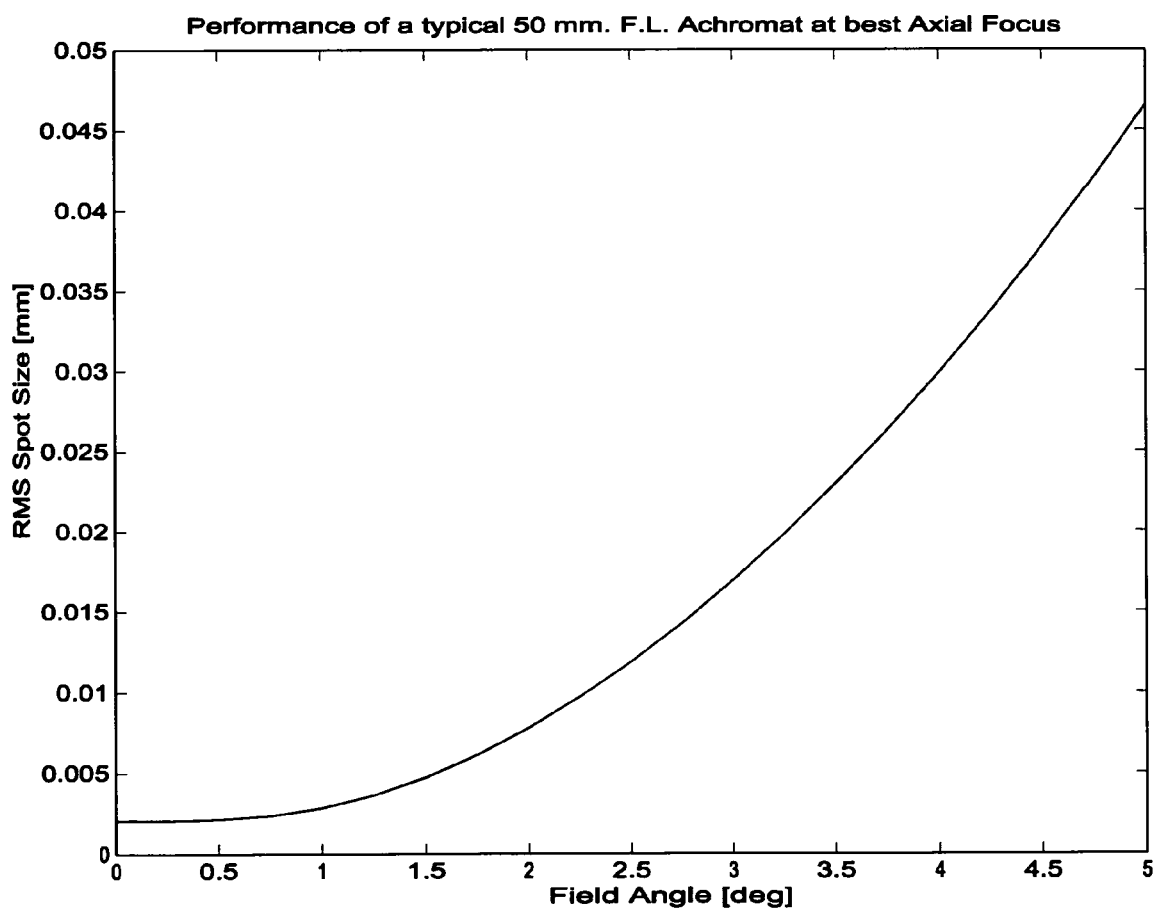
FIG. 2 depicts the imaging performance of the lens of FIG. 1, as RMS spot size of the image, when the imaging viewing plane is at the position of best on-axis focus.

To make the example more specific, I have chosen lens 20 to be a particular achromat of 50 mm focal length, part number LAO-059, supplied by Melles Griot company of Carlsbad, Calif. When image viewing plane 40 is located at the best focus for the on-axis point, the performance of this lens over the entire (half) field of view is shown in FIG. 2. The metric for image quality used here is the RMS spot size, as determined from a multi-wavelength geometrical ray trace analysis. As is common in the industry, I have used three wavelengths to represent the visible wavelength band; these are the so-called "C", "d", and "F" wavelengths which are 656.3 nm, 587.6 nm, and 486.1 nm, respectively.

As shown in FIG. 2, at the center of the field of view the indicated RMS spot size is slightly over 2 microns. The radius of the Airy disk due to diffraction is given by the expression: 1.22 λ F/No., which in this case equals 2.81 microns if we use the average of the three wavelengths as being representative. Thus, on axis this lens is close to diffraction limited at F/4. However, as the field angle increases past 1 degree, the aberrations and image size grow rapidly.

Figure 3:
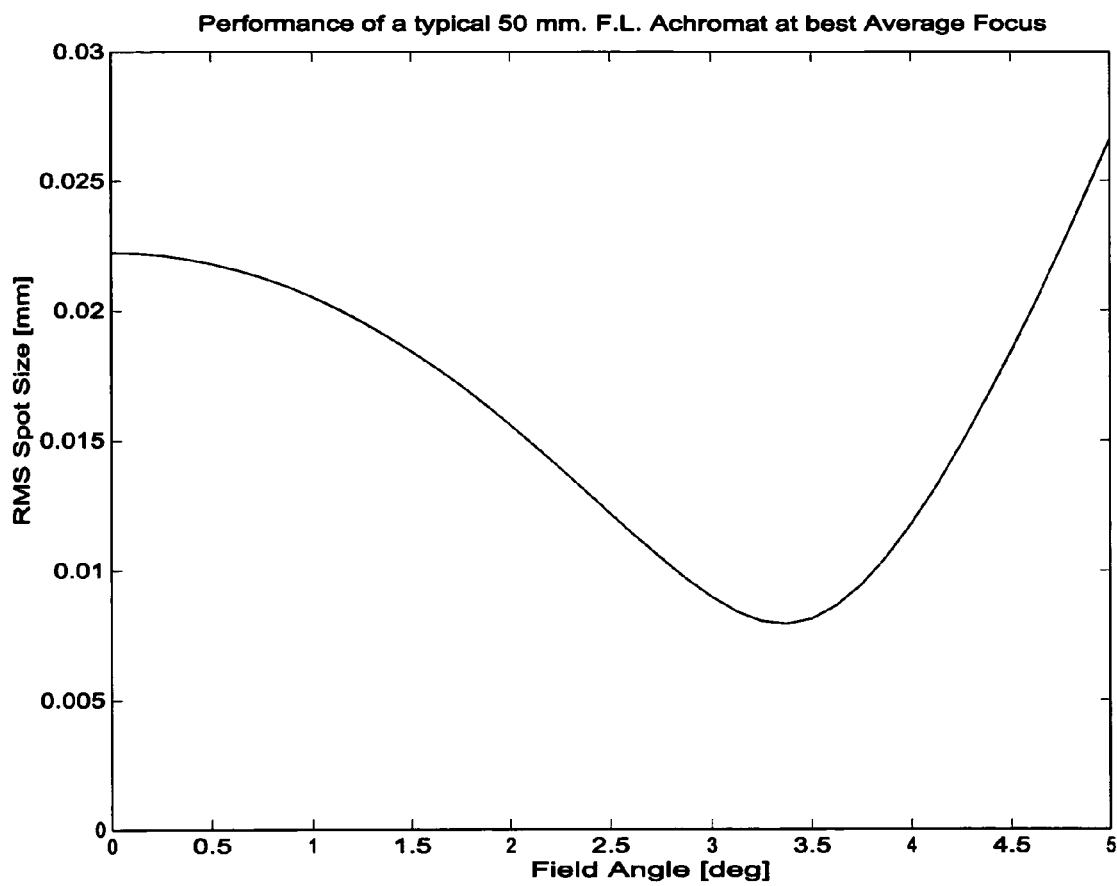
FIG. 3 depicts the imaging performance of the lens of FIG. 1 when the imaging viewing plane is at the position of best average focus.

If one were actually viewing the image produced by this lens over this field of view, and if the whole field of view were important, one would not choose the image viewing plane position used for FIG. 2. One would instead adjust the focus to accept a decrease in the image quality at the center of the field of view in exchange for better quality at the edge of the field of view. The result of such a choice is depicted in FIG. 3, where the focus has been adjusted to minimize the average of the RMS image sizes at three field angles: 0 degrees, 3.5 degrees and 5 degrees. With this choice of viewing plane the vast majority of the field has an image size smaller than 25 microns RMS.

Hereinafter I will refer to the average of the RMS image sizes at 0, 0.7, and 1.0 times the half field of view of an optical system as the "average RMS spot", and I will denote this quantity by the symbol (σ). For the case of FIG. 3, (σ)=19.0 microns, and it is this number that is representative of the capability of this standard achromat to form images at a focal ratio of F/4 over a field of view with a radius of 5 degrees.

Figure 4:
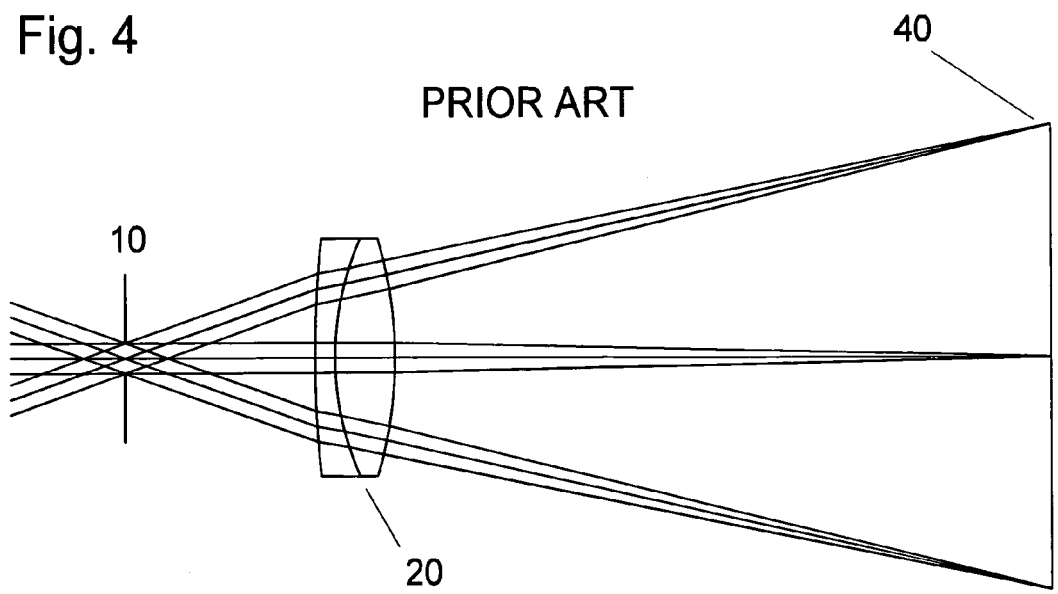
FIG. 4 shows a standard achromat imaging an object located at infinity over a wide field of view, when the lens is reversed and the stop is remote, as prior art.

As was mentioned previously in the Section entitled "Background of the Invention", standard achromats are capable of performing well over large fields of view (at high focal ratios) if the lens is reversed from its normnal orientation and if the stop is located away from the lens. An example is shown in FIG. 4, which depicts the same lens as in FIG. 1 being used to image a field of 20.125 degrees radius at a focal ratio of F/22, and in which the same item numbers are used as were used in FIG. 1. It turns out that in this situation, this lens can image this wide field of view with (σ)=10 microns if the stop position and image viewing plane are both optimized.

Hereinafter I use an average RMS spot of 10 microns as one of several standard image quality criteria. An optical system that provides an image of this quality is, roughly speaking, about 4 to 5 times diffraction limited at F/4, and its geometrical blur is about equal to the diffraction blur at F/22.

An important reason that a fixed level of image blur is an appropriate image quality criterion is that today most images are captured and characterized using solid state image sensors. Such sensors are made up of a rectangular array of discrete picture elements or "pixels". The spacing or pitch of the individual pixels along the two dimensions of the array are fixed, and are limited by current technology to be in the range of approximately 5 to 15 microns. As is known to those skilled in the art, the resulting sampling of an image puts a limit on the smallest features in an image which can be correctly represented by such an array of pixels. If an image with too much high spatial frequency detail is presented to an array of sensor pixels, the resulting image data will not correctly represent the image—it will be corrupted by a phenomenon called "aliasing" which can easily cause completely spurious features to appear in the sampled image. Thus, it is important when using solid state imagers that the image presented to the imager contain only spatial frequencies that the array can correctly represent. An image providing a 10 micron RMS blur is, roughly speaking, about as good as can be correctly represented by the majority of solid state image sensors in use today.

Figure 5:
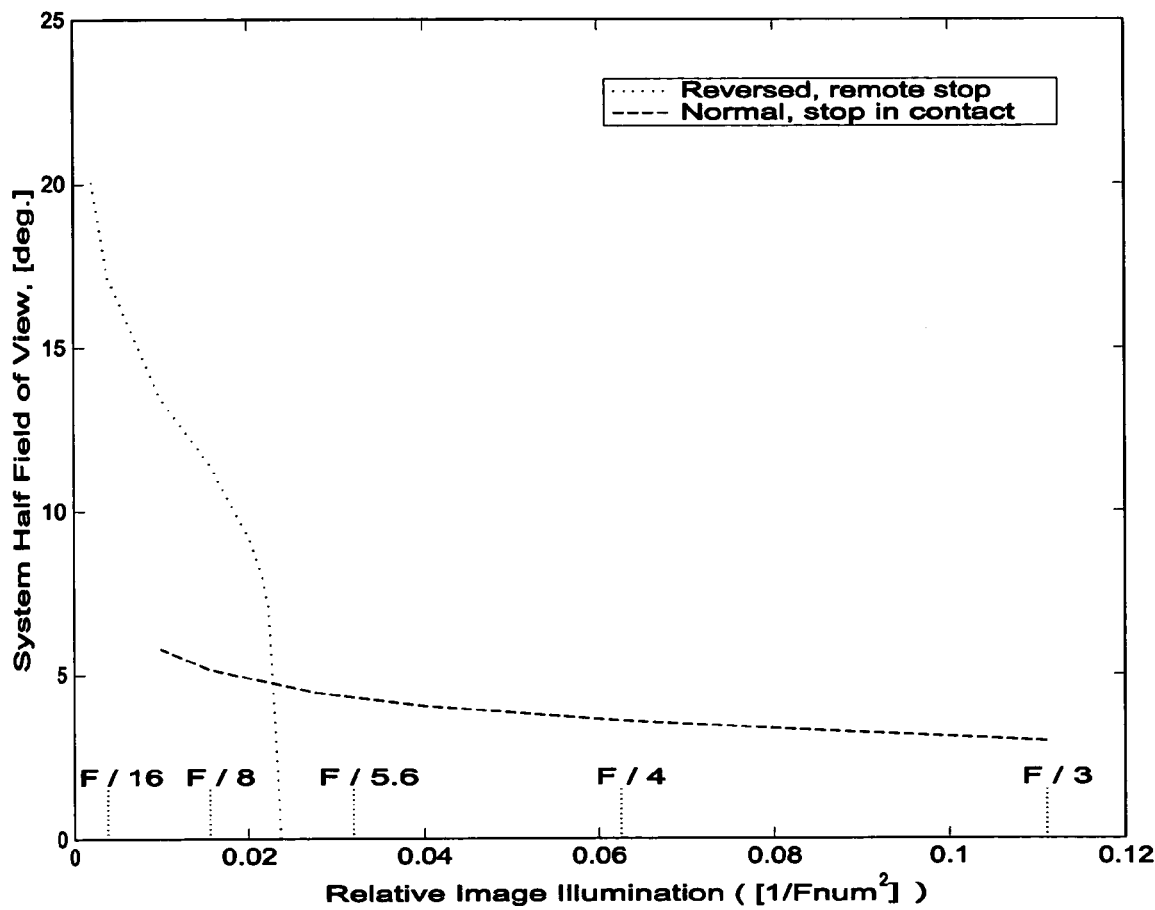
FIG. 5 depicts the performances of a range of possible optimized optical systems consisting of the lens of FIGS. 1 and 4 and a stop, as a function of the F/No. of the system, for a specified image quality criterion, and where the performance is given by the limiting system field angle.

Given an image quality criterion, such as (σ)=10 microns, one can depict the performance of all the possible infinite conjugate imaging systems that one can create using a particular standard achromat on a single plot. An example, calculated for the lens of FIGS. 1 and 4, is shown in FIG. 5. Here, the dashed line represents the performance when the lens is employed in its "normal" configuration as shown in FIG. 1, while the dotted line represents the performance of systems laid out as shown in FIG. 4, with the lens in a "reversed" configuration.

In FIG. 5 the abscissa of the chart is linear in image illumination, which is proportional to the inverse of the square of the focal ratio. The ordinate of the chart is the maximum field angle which can be covered by the individual system in question, while meeting the specified image quality criterion. Each point on the curves represents the performance of a particular optical system consisting of a stop and the lens.

In the case of reversed lens orientation (FIG. 4), the distance of the remote stop, as well as the image viewing plane position, is optimized for each individual system represented by a point on the dotted curve. The system depicted in FIG. 4, at F/22, happens to be the one that works best with the stop closest to the lens. The optimum stop distance increases to about 50% further from the lens as the focal ratio decreases past F/8. With the lens in this orientation, there is a very rapid falloff in field of view capability as the focal ratio gets smaller than F/8 because the on axis spot becomes 10 microns RMS at F/6.5 due to spherical aberration.

For the normal lens orientation only the image viewing plane position is optimized at each focal ratio. In this case the stop is always in contact with the first surface of the lens, as depicted in FIG. 1, because that stop position gives essentially the same (within 1%) results as does an optimum stop position, which is always located at most a few millimeters in front of the lens. With this orientation the lens can produce images smaller than 10 microns RMS on axis at low focal ratios, but the field of view over which that performance can be maintained is small.

One would obtain similar results using any other standard achromat of same focal length because they are all designed to correct for the same aberrations in approximately the same way. There are some manufacturers that have chosen not to correct for coma with the stop at the first surface of the lens, so the results with those lenses will be slightly different than shown on FIG. 5, but the overall picture of the lens performance will remain about the same.

Clearly, if a large focal ratio, say greater than about F/7, is acceptable for the application, then the reversed orientation of the lens with the remote stop is preferred for wide field of view applications. However, most applications require smaller focal ratios to produce adequate signal to noise ratio in the sensed image, and for these applications, the conventional orientation of the lens is required.

Consider the large quantity of information that is contained in FIG. 5. Every point on each of the curves represents a separate optical system. Thus, the display of FIG. 5 represents a comprehensive view of the imaging performance capability of the lens being analyzed for an object at a particular distance (in this case, an infinite distance). I am, to my knowledge, the first to consider lens imaging performance from this general viewpoint. This viewpoint is important, because my goal is to develop lens systems which offer improved performance over a wide range of user applications. This is in distinction to the more usual case where a lens is designed specifically for a particular application and is used only in that application.

What I mean be improved performance is that curves representing the performance of new systems of interest should lie higher than the curves shown on FIG. 5 at each focal ratio of interest. Since the applications of most interest require more illumination than can be provided by a focal ratio of F/7, another way of stating my goal for a new optical system is that its performance curve should be located further toward the upper right hand corner of the chart than are the curves in FIG. 5.

Figure 6:
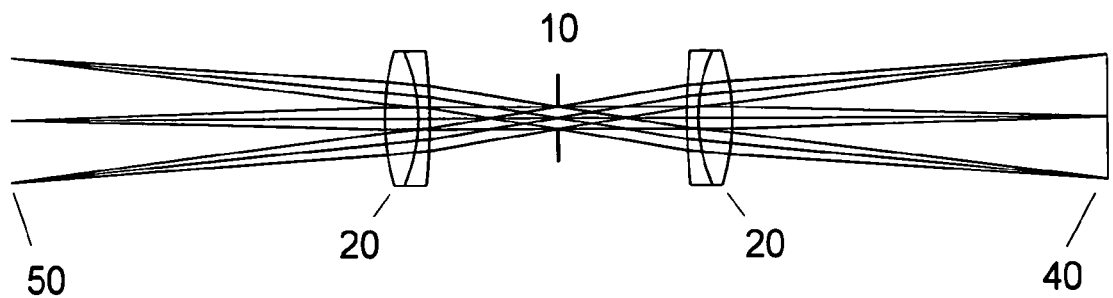
FIG. 6 shows one way to construct a 1:1 symmetrical relay using standard achromats, as prior art.
Figure 7:
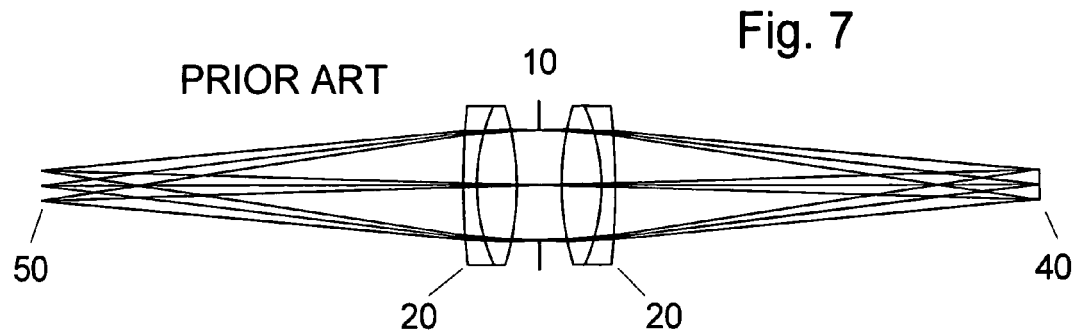
FIG. 7 shows an alternate method of constructing a 1:1 symmetrical relay with standard achromats, as prior art.

While it may not be obvious from FIG. 5, this level of performance is severely constraining to the practical use of standard achromats. Consider FIGS. 6 and 7, which show two ways that one might use a pair of these achromats to form an image of a nearby object 50 at a magnification of—1 on an image viewing plane 40. In FIG. 6 the achromats 20 are oriented back to back to take advantage of the high performance available at large focal ratios in this configuration. In FIG. 7 the achromats 20 are oriented front to front, so that spherical aberration is minimized. In both cases the stop 10 is located in the center of the symmetrical system, which automatically eliminates any coma, distortion, or lateral chromatic aberration from the image. Hereinafter, I will sometimes refer to the back to back arrangement of FIG. 6 as the "High SA" (for high spherical aberration) configuration, and I will likewise sometimes refer to the front to front arrangement in FIG. 7 as the "Low SA" configuration.

Figure 8:
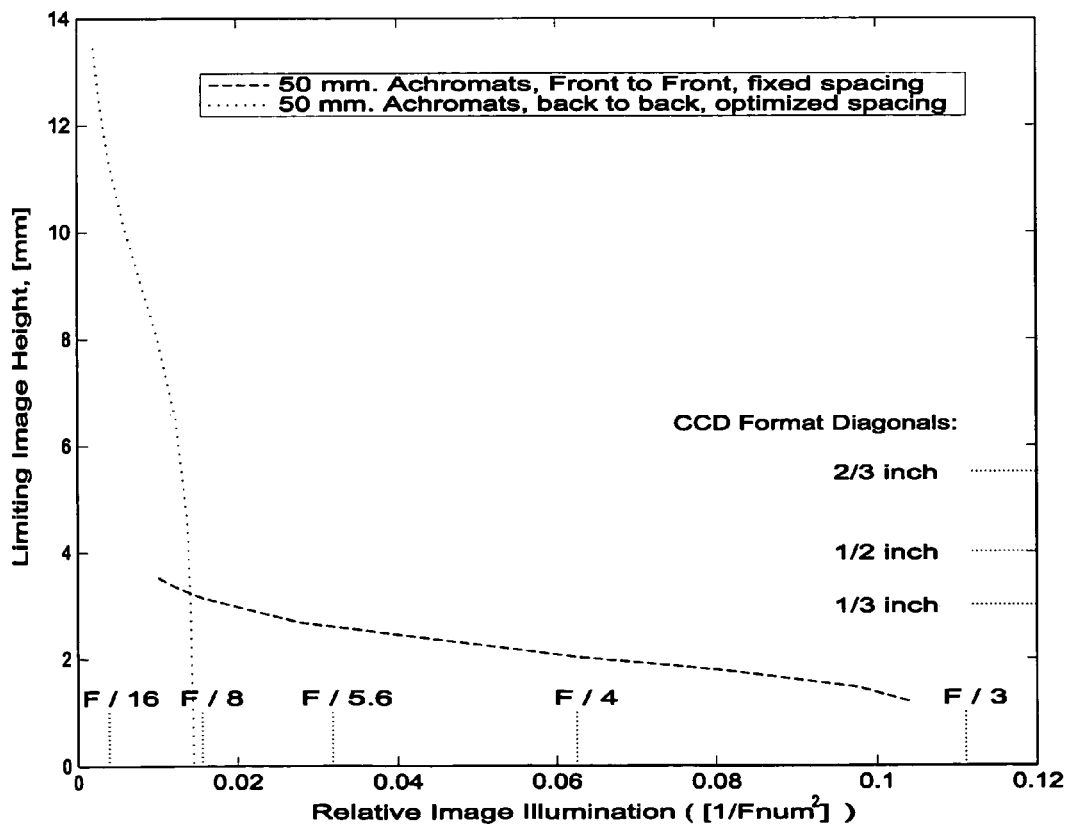
FIG. 8 depicts the performances of a range of possible optimized optical systems consisting of the relays of FIG. 6 or 7, as a function of the F/No. of the system, for a specified image quality criterion, and where the performance is given by the limiting image height.

I refer to such systems as symmetrical 1:1 relay systems. FIG. 8 shows the performance of these relay systems, when they are optimized for stop and image viewing plane positions at each field position and focal ratio, once again using the (σ)≦10 micron RMS image quality criterion. Note that in both orientations, the performance falls off faster at low focal ratios than it did in FIG. 5 since spherical aberration is doubled in the two lens system.

On the right hand side of FIG. 8 are denoted several practical image sizes of interest as determined by the diagonal dimensions of various standard CCD imagers. The names of these formats come from historical reference to the diameters of the vidicon image tubes used in early video cameras, and have no obvious relationship to the actual size of the image sensing surface. For instance, the so-called "½ inch" CCD has a diagonal of 8 mm, i.e., it corresponds to an image height of 4 mm. From FIG. 8, it is clear that none of these common imager formats can be covered by a relay consisting of two 50 mm focal length standard achromats at a focal ratio faster than about F/8.

The diagonal of the "½ inch" CCD corresponds to a field angle of about 4.6 degrees at 50 mm focal length. The applications of most interest to me require semi-fields that range from approximately 2.2 times as large as this to 2.2 times smaller than this, that is, between about 2 and 10 degrees. Hereinafter, I will refer to fields of view in this range as "intermediate" fields of view. I will sometimes also refer to an "extended intermediate" field of view, by which I mean a semi-field up to 15 degrees.

The reality is that if one wants a short optical system, as one often does, that coverage of standard CCD image formats entails required field angles that exceed the capability of standard achromats to perform at all but high focal ratios. Use of longer focal length lenses is not usually a solution even when the necessary space is available, because the residual spherical aberration of standard achromats increases approximately linearly with the focal length.

2. The Size of an Achromat; Definition of $A_{max}$

I need to take a short detour here to define a useful quantity related to an achromat, more specifically, to the aperture of the achromat. Any achromat is manufactured with a particular physical aperture, that is, at a particular physical size. As is well-known to those skilled in the art, achromats with identical optical designs are often sold at a number of different physical apertures, to accommodate applications with differing combinations of mechanical and optical requirements. Thus, the physical aperture size of an achromat is not fundamental to its properties; it can have the same optical properties while being supplied at a number of different apertures. This situation is illustrated in FIG. 9, where an achromat that has manufactured with a physical aperture radius of $A_{mfg}$ is shown to have what I call a limiting aperture radius of $A_{max}$.

For cemented achromats, I define the limiting aperture radius as that radius where the edge thickness of the crown element becomes zero. For air-spaced achromats the limit is determined by the edge thickness of the crown element, or the edge thickness of the air space, whichever leads to a smaller limiting aperture. Unlike the physical aperture radius $A_{mfg}$, the limiting aperture radius $A_{max}$ is fundamentally related to the optical properties of the achromat—it is determined by some of the curvatures and thicknesses of the design.

Figure 9:
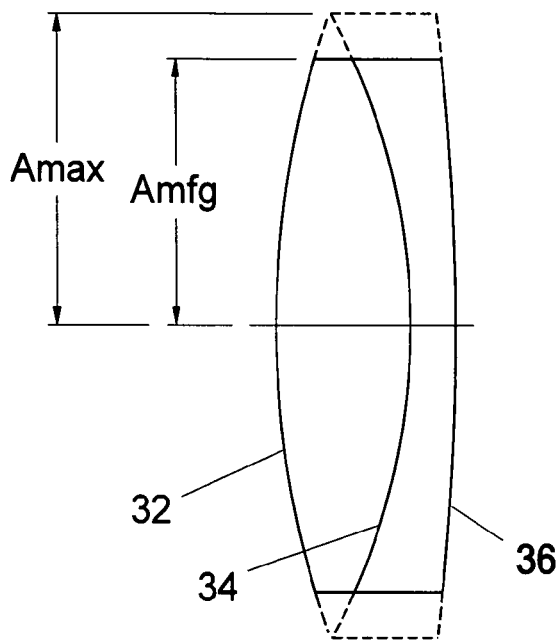
FIG. 9 depicts the difference between the nominal (physical, as manufactured) aperture radius of an achromat and the maximum feasible aperture.

For future reference FIG. 9 also defines the three optical surfaces of a cemented achromat. These are the crown-air surface 32, the crown-flint surface 34, and the flint-air surface 36.

3. The Companion Doublet; Type 1NR

Figure 10:
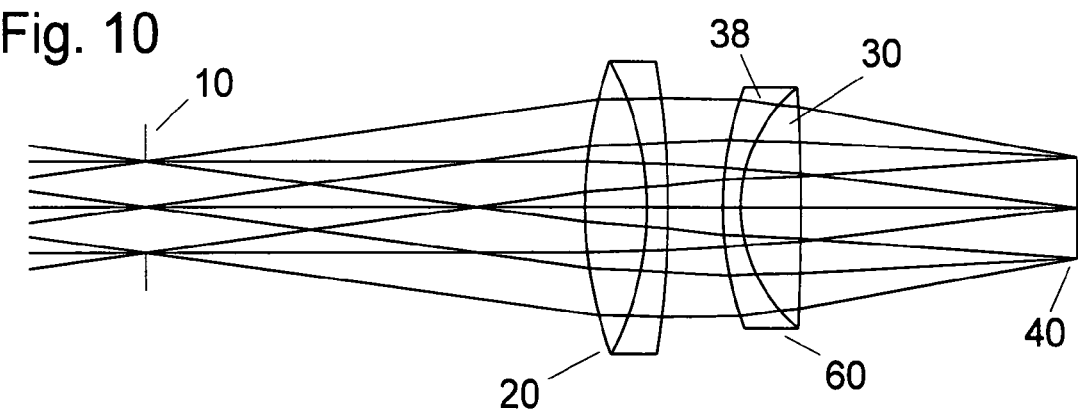
FIG. 10 depicts the use of a companion doublet combined with a primary achromat, as the first combination embodiment of the invention.

A first embodiment of my new system is depicted in FIG. 10 and its construction details are presented in Table 1. The arrangement in FIG. 10 comprises a remote stop 10, an achromatic doublet 20 that I call the primary, and a second doublet 60, specially designed for this application, that I call the companion. As before, the image is viewed on an image viewing plane 40. Companion 60 is composed of an element having a positive focal length, 30, and an element having a negative focal length, 38.

In the case shown, the primary has a focal length of 100 mm, and is based on catalog Part Number 32500 as provided by the Edmund Optics company of Barrington, N.J. By "based on" what I mean is that the surface curvatures, thicknesses, and glass types of primary doublet 20 are those specified by the manufacturer, but that the aperture of the lens has been increased to its maximum feasible value, $A_{max}$, so as to minimize vignetting in various of the embodiments I discuss below. I refer to this specific primary achromatic doublet, as defined in Table 1, as the "reference primary", and I will later discuss the use of other primaries.

TABLE 1

Construction of combination embodiment 1 at 50 mm focal length (FIG. 10).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 59.08480 | AIR | | |
| PRIMARY: | | | | | |
| 2 | 61.36000 | 8.25000 | BK7 | 1.51680 | 64.17 SCHOTT |
| 3 | −44.30000 | 2.80000 | SF5 | 1.67270 | 32.21 SCHOTT |
| 4 | −128.89999 | 7.26391 | AIR | | |
| COMPANION: | | | | | |
| 5 | 47.63407 | 2.50000 | SF5 | 1.67270 | 32.21 SCHOTT |
| 6 | 21.88088 | 8.00000 | S-BAL3 | 1.57135 | 52.95 OHARA |
| 7 | −273.22408 | 37.04678 | AIR | | |
| IMAGE | INFINITE | | | | |

I refer to the system depicted in FIG. 10 as a "companion combination". Since my new system includes both the companion 60 taken by itself, and the combination of the companion with a primary achromat, I will refer to two types of embodiments. The embodiments of companions themselves will be referred to as "companion embodiment", and these will be designated by embodiment numbers. Embodiments of companion combinations will be referred to as "combination embodiments" and these will take the number of the associated companion and may have an associated letter suffix if necessary to distinguish combination embodiments that use the same companion. Thus, Table 1 gives the complete design structure of both companion embodiment 1 and combination embodiment 1.

The data display of Table 1 will be quite familiar to those skilled in the art. It defines a pair of cemented doublets, the first being oriented so that its positive focal length element is facing the object and the second being oriented the opposite way. The aperture stop is defined to be at Surface 1 in Table 1 and has been denoted as "ENTP", an abbreviation for entrance pupil.

The entrance pupil and the stop are synonymous when the stop lies between the object and the optical system as shown in FIG. 10. However, if the stop lies inside of or on the image side of the optical system, then the entrance pupil is the image of the stop formed by all the optical elements lying between the stop and the object. The entrance pupil is therefore a more general concept than the stop, and it is more convenient to work with when the stop position is to be allowed to vary.

The glass denoted "SF5" is a common medium index flint supplied by the Schott optical glass company, while the glass denoted "BK7" is a common crown also supplied by the same company. The glass denoted "S-BAL3" is a light flint glass supplied by the Ohara optical glass company. The column "INDEX" gives the refractive index of the glass at the "d" wavelength, and the column entitled "V-NUMBER" gives the reciprocal relative dispersion over the "C", "d", and "F" wavelengths. Note that hereinafter I will refer to the lower dispersion (i.e., higher V-NUMBER) glass, the one that the positive focal length element of a positive focal length achromatic doublet is made of, as the "crown", no matter what its manufacturer's designation or ordinary use may be. Likewise, the higher dispersion glass will be referred to as the "flint".

The index of refraction of a glass varies with wavelength, and the reciprocal relative dispersion depends on three wavelengths. I will use the symbol $N_d$ to refer to the refractive index at the "d" wavelength, and I will use the symbol $V_d$ to refer to the V-number as determined over the three wavelengths "C", "d", and "F". I will use the unsubscripted symbols N and V, and the terms "index" and "V-number" to refer to these quantities when the wavelength(s) are unspecified. Also, I use the term "glass" to refer to any substantially optically transmissive material; this then includes, without limitation, plastic and crystalline materials.

As a practical convenience, the companion depicted in FIG. 10 has been designed to make the overall focal length of the combination 50 mm, i.e., just one half of the focal length of the primary. The companion has been designed to work cooperatively with the primary so that the performance of the combination over intermediate fields of view is greatly increased over that of a standard achromat of equivalent focal length. This improved performance can be seen in FIG. 11, in which the performance of the two configurations of the 50 mm focal length standard achromat is compared to the performance of combination embodiment 1. The performance of the combination is superior to the performance of the 50 mm achromat over focal ratios from about F/6.7 to F/3.1 and over most of this range, the limiting field angle is increased by at least a factor of 2.

Figure 11:
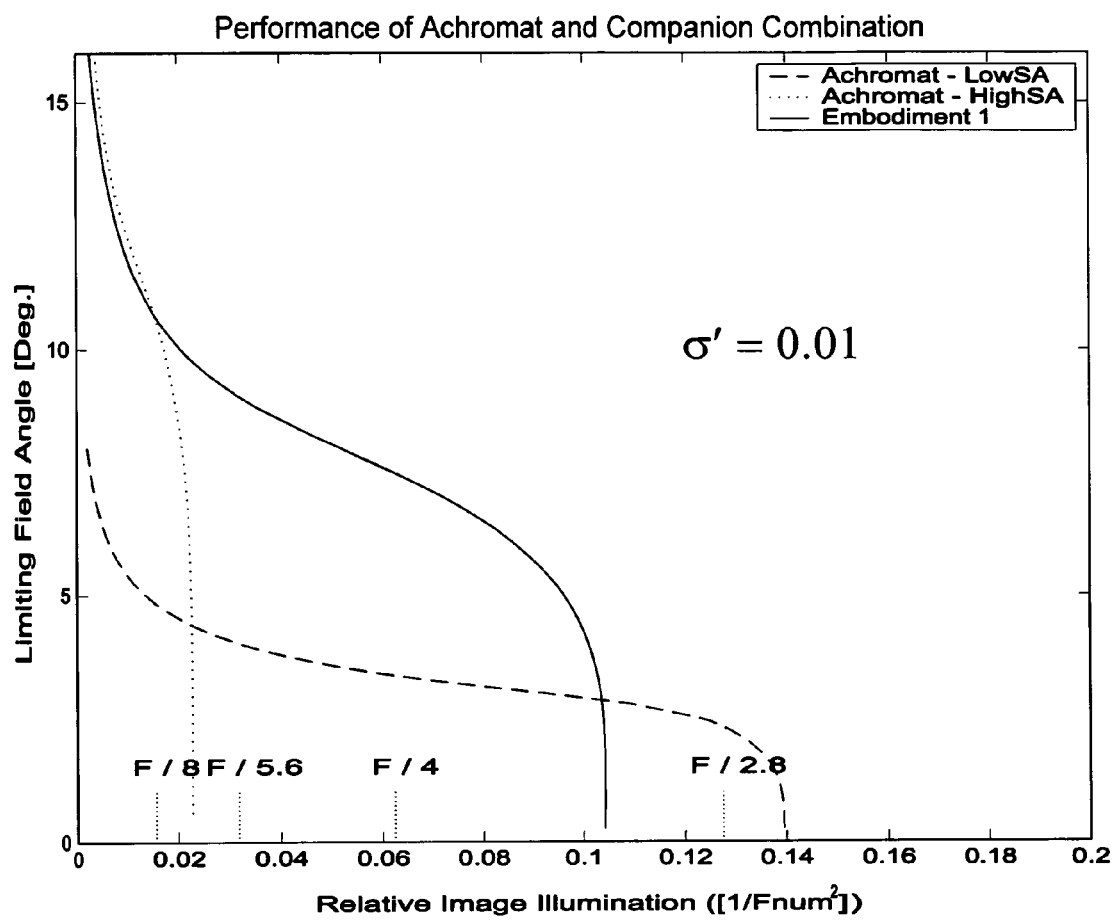
FIG. 11 shows the improved performance provided by the companion when combined with a primary, as compared to a single standard achromat.

The image quality criterion for the curves in FIG. 11 is slightly different than what I have already discussed. Here I am using a quantity that I call "sigma prime", represented as σ'. Above I defined the average of the RMS image sizes at 0, 0.7, and 1.0 times the half field of view of an optical system as the "average RMS spot", and I denoted this quantity by the symbol (σ). That is:

$$\langle \sigma \rangle = \frac{\sigma_0 + \sigma_{0.7} + \sigma_{1.0}}{3} \quad (1)$$

Here I am using a closely related quantity that could be called the square root of the average image variance, but which I choose to call "sigma prime". I have defined this second quantity because it is much easier to use than (σ) during optimization with certain optical design software, and because the difference between these two quantities provides important insight into the quality of the image. The definition of sigma prime is:

$$\sigma' = \sqrt{\frac{\sigma_0^2 + \sigma_{0.7}^2 + \sigma_{1.0}^2}{3}} \quad (2)$$

Note that σ' is equal to (σ) if all of the three component RMS image sizes happen to be the same; otherwise σ'>(σ). These two quantities are not far from being equal for most images, however the difference between σ' and (σ) is a direct indication of how much the image size varies across the field of view. I will quote them both later in this application when I closely examine how an optical system is performing under specific sets of operating conditions.

As will be understood by those skilled in the art, while the numerical data in Table 1 specifies a lens system of 50 mm focal length, the surface radii and thicknesses could all be scaled by a factor as necessary to define a lens system of any other desired focal length. It will also be appreciated that the apparent numerical precision of the radius and thickness values used in the Table are simply the unmodified result of numerical calculations and have no relationship to the tolerances that must be placed on these quantities to ensure the production of an optical system having the desired imaging properties.

I refer to this particular arrangement of two doublets, with their positive focal length elements facing away from each other, as "Type NR" in analogy with the normal and reversed orientations of the standard achromatic doublet discussed earlier, where the doublet on the image side of the combination shown in FIG. 10 is considered to be in a "reversed" configuration with respect to the object at infinity. More specifically, I refer to the combination of FIG. 10 as "Type 1NR", where the "Type 1" refers to the fact that the primary is the component closest to the object. I have also found that there are useful "Type 2" combinations, that is, where the companion lies between the object and the primary, and these will be discussed later.

The large entrance pupil distance disclosed here is rather unusual and will be immediately noticed by those skilled in the art. This entrance pupil distance happens to be optimum for the focal ratio and field of view for which FIG. 10 was drawn, however I have found that the performance is not very sensitive to this distance in Type 1NR. Both the fact that the performance is best with the stop far in front of the system, and that the performance is not very sensitive to the position of the stop, are important advantages of my companion combinations. These points will be discussed in detail later in conjunction with the application of companion combinations to specific optical systems.

To those skilled in the art, combination embodiment I will be reminiscent of known prior art combinations of two non-identical doublets, specifically the Petzval portrait lens.

Figure 12:
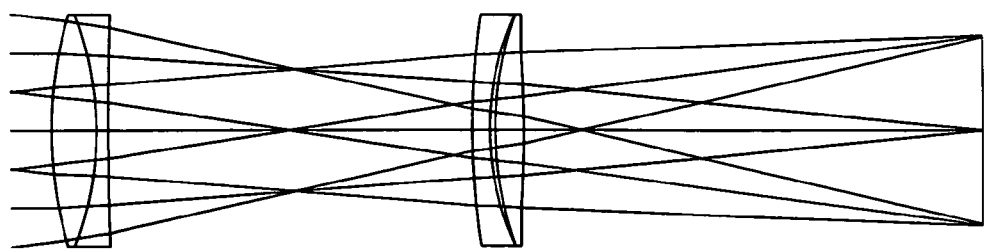
FIG. 12 depicts the original Petzval lens, as prior art.
Figure 13:
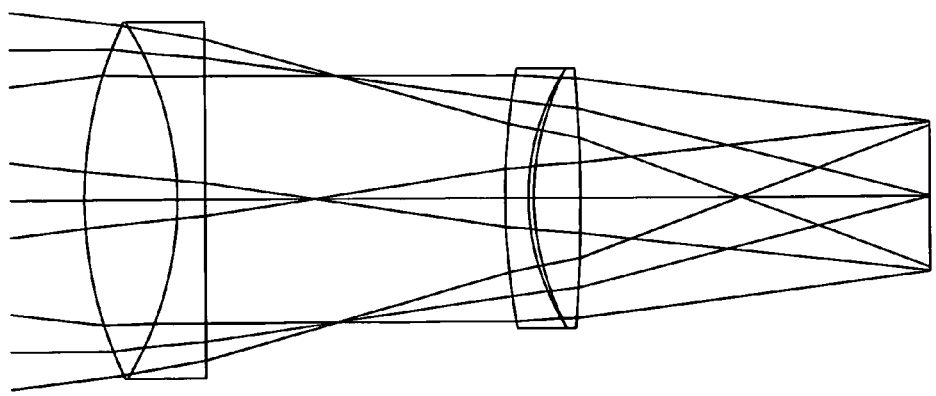
FIG. 13 depicts a Petzval lens designed by Schade, as prior art.

In fact, the original Petzval portrait lens, designed by J. Petzval in 1839, is of Type NR. FIGS. 12 and 13 depict two examples of Type NR Petzval lenses, and Table 2 lists all of the Type NR Petzvals that I am aware of. The non-patent sources for the table are the following books: [1] A. E. Conrady, *Applied Optics and Optical Design,* Part Two, © 1960, Dover; [2] R. Kingslake, *Lens Design Fundamentals,* © 1978, Academic Press; and [3] W. J. Smith, *Modern Lens Design,* © 1992, McGraw-Hill.

TABLE 2

Prior Art Petzvals in Type NR

| Inventor or Authority | Date | Source | Location |
|---|---|---|---|
| Petzval | 1839 | [1] | p. 810 |
| Repp | 1920 | U.S. Pat. No. 1,415,002 | |
| Frederick | 1923 | U.S. Pat. No. 1,620,337 | |
| Schade | 1948 | U.S. Pat. No. 2,500,046 | |
| Conrady | ? | [1] | pp. 809–810 |
| Kingslake | 1978 | [2] | pp. 251–257 |
| Smith | 1992 | [3] | FIG. 13-1 |

I note two things in conjunction with Table 2. First, Smith refers to the design documented in his FIG. 13-1 as the original Petzval portrait lens, but it is considerably different, and its performance is better. Secondly, M. Laikin, in his book *Lens Design,* © 1991, Marcel Dekker, offers a Petzval as his FIG. 5-2 that would be in Type NR if it were really a Petzval. However, that lens is actually a telephoto, since the focal length of the combination is larger than the focal length of the first component.

FIG. 12 depicts the original Petzval portrait lens, as documented in Reference 1 (and as also documented in A. Warmisham, U.S. Pat. No. 1,484,853). FIG. 13 depicts the design of Schade, U.S. Pat. No. 2,500,046. I chose to use these two lenses as examples because their performances essentially bracket the performances of all the other lenses in Table 2. These performances, as well as the performances of my combination embodiments 1, 2 and 3, and of the 50 mm achromat in its two configurations are all compared in FIG. 14. For FIG. 14 and most of the following similar Figures, I have scaled the prior art lenses as necessary to produce lenses with a focal length of 50 mm so that their performance curves are directly comparable to the performances of my embodiments.

From FIG. 14 one can see that the performance of my embodiment 2 is superior to that of the achromat only over the range between about F/6.5 and F/5.4. Note that it is also superior to the performance of the original Petzval over a small range, but also that the performance of the latter is superior to the achromat almost to F/4.0. The reasons that my embodiment 2 is included here have more to do with its structure than its performance, as will be explained.

Likewise, my embodiment 3 is included here primarily for structural reasons, but notice that its performance is superior to all the other lenses shown in FIG. 14 over the region from about F/7.5 to F/5. Note also that the performance of Schade's Petzval is superior to all other lenses in the Figure from about F/5 down to where it cuts off at about F/2.1. I will use the performance of Schade's lens as a reference for discussing the performance of my other Type 1NR embodiments.

I emphasize here that the performance curves of FIG. 14 and all the following performance figures have been generated for each lens being considered by allowing the position of the entrance pupil to vary to produce the best average RMS spot for each combination of focal ratio and field of view being analyzed. The construction tables and lens drawings necessarily represent each lens at a single specific combination of focal ratio and field of view. For my embodiments, the entrance pupil position shown is optimum for the corresponding focal ratio and field of view; for the drawings of the prior art, I used the entrance pupil or stop position contained in the reference, if one was defined.

I also controlled the vignetting at the edge of the field of view in determining the performance. This was done by adding terms to control the vignetting to the image quality merit function. The result is that these performance curves apply to the situation where only a small amount of vignetting (almost always less than 10%) is allowed at the edge of the field of view. Sometimes, different (and higher) curves can be generated when larger amounts of vignetting are allowed. In all cases I allowed the apertures of lens elements to obtain their maximum feasible values as necessary rather than constraining them to the values that may have been specified in the original references. In some cases these maximum feasible apertures were too small to generate unvignetted performance curves over the full range of focal ratios; in these cases the curves were truncated.

Combination embodiment 2 is depicted in FIG. 15 and its construction is documented in Table 3, while combination embodiment 3 is depicted in FIG. 16 and its construction is documented in Table 4. In both cases, the same item numbers are used that were used in previous figures to denote the primary, the companion, etc. These same item numbers will be used again without being specifically referred to in the following Figures.

In embodiment 3, the entrance pupil lies to the right of the first surface of the primary. An equivalent stop 15, corresponding to the specified entrance pupil, can be seen to be located just inside the rear surface of the second element of companion 60. While it would be possible, by making that second element out of sub-elements, to place a physical stop there, the more likely case is that this system will be used behind another optical system that provides a suitable external exit pupil. In that case, the exit pupil would be placed at the position specified in Table 4. Note that the design of embodiment 3 would need to be changed only a little to employ a physical stop located just behind the companion. Systems with stops located in this region may be useful for special-purpose applications.

TABLE 3

Construction of combination embodiment 2 at 50 mm focal length (FIG. 15).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 18.42718 | AIR | | |

TABLE 3-continued

Construction of combination embodiment 2 at 50 mm focal length (FIG. 15).

| SURF | RADIUS | THICKNESS | MEDIUM | INDEX | V-NUMBER |
|---|---|---|---|---|---|
| PRIMARY: | | | | | |
| 2 | 61.36000 | 8.25000 | BK7 | 1.51680 | 64.17 SCHOTT |
| 3 | −44.30000 | 2.80000 | SF5 | 1.67270 | 32.21 SCHOTT |
| 4 | −128.89999 | 1.00000 | AIR | | |
| COMPANION: | | | | | |
| 5 | 184.19651 | 2.50000 | KZFSN4 | 1.61340 | 44.29 SCHOTT |
| 6 | 21.19318 | 10.00000 | N-BK7 | 1.51680 | 64.17 SCHOTT |
| 7 | −40.03110 | 42.11145 | AIR | | |
| IMAGE | INFINITE | | | | |

TABLE 4

Construction of combination embodiment 3 at 50 mm focal length (FIG. 16).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | −47.21683 | AIR | | |
| PRIMARY: | | | | | |
| 2 | 61.36000 | 8.25000 | BK7 | 1.51680 | 64.17 SCHOTT |
| 3 | −44.30000 | 2.80000 | SF5 | 1.67270 | 32.21 SCHOTT |
| 4 | −128.89999 | 12.09404 | AIR | | |
| COMPANION: | | | | | |
| 5 | 8.91173 | 2.50000 | BASF6 | 1.66755 | 41.93 SCHOTT |
| 6 | 5.72796 | 10.00000 | N-FK56 | 1.43425 | 94.95 SCHOTT |
| 7 | 8.08694 | 20.63765 | AIR | | |
| IMAGE | INFINITE | | | | |

Note also that, in comparison to embodiment 1 (FIG. 10), in embodiment 2 the stop is much closer to the primary, and that the back focus distance (thickness of surface 7) is larger.

FIG. 17 compares the performances of four more combination embodiments of my Type 1NR system to the performance of Schade's lens. The performances of all of these embodiments exceed that of Schade's lens at low focal ratios, and are close to it at high focal ratios. Note that some of these embodiments are able to produce an average RMS spot of 10 microns or better over a field angle exceeding 2 degrees at focal ratios smaller than 2.0! I believe that obtaining such performance in a two lens group optical system using a lens group that has been designed for another purpose entirely will be a surprise to anyone skilled in the art.

Combination embodiments 4, 5, 6 and 7 are depicted in FIGS. 18, 19, 20, and 21 respectively. Their construction details are provided in Tables 5, 6, 7, and 8.

TABLE 5

Construction of combination embodiment 4 at 50 mm focal length (FIG. 18).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 70.81519 | AIR | | |
| PRIMARY: | | | | | |
| 2 | 61.36000 | 8.25000 | BK7 | 1.51680 | 64.17 SCHOTT |
| 3 | −44.30000 | 2.80000 | SF5 | 1.67270 | 32.21 SCHOTT |
| 4 | −128.89999 | 59.56045 | AIR | | |
| COMPANION: | | | | | |
| 5 | 19.19089 | 3.41042 | SF5 | 1.67270 | 32.21 SCHOTT |
| 6 | 11.78530 | 20.00000 | N-PSK57 | 1.59240 | 68.40 SCHOTT |
| 7 | 154.01157 | 2.50000 | AIR | | |
| IMAGE | INFINITE | | | | |

TABLE 6

Construction of combination embodiment 5 at 50 mm focal length (FIG. 19).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 85.87351 | AIR | | |
| PRIMARY: | | | | | |
| 2 | 61.36000 | 8.25000 | BK7 | 1.51680 | 64.17 SCHOTT |
| 3 | −44.30000 | 2.80000 | SF5 | 1.67270 | 32.21 SCHOTT |
| 4 | −128.89999 | 48.20079 | AIR | | |
| COMPANION: | | | | | |
| 5 | 27.66409 | 8.81635 | SF5 | 1.67270 | 32.21 SCHOTT |
| 6 | 12.11623 | 20.00000 | N-LAK7 | 1.65160 | 58.52 SCHOTT |
| 7 | 99.51772 | 5.00000 | AIR | | |
| IMAGE | INFINITE | | | | |

TABLE 7

Construction of combination embodiment 6 at 50 mm focal length (FIG. 20).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 103.76441 | AIR | | |
| PRIMARY: | | | | | |
| 2 | 61.36000 | 8.25000 | BK7 | 1.51680 | 64.17 SCHOTT |
| 3 | −44.30000 | 2.80000 | SF5 | 1.67270 | 32.21 SCHOTT |
| 4 | −128.89999 | 35.91350 | AIR | | |
| COMPANION: | | | | | |
| 5 | 32.52872 | 9.42710 | SF5 | 1.67270 | 32.21 SCHOTT |
| 6 | 14.68728 | 20.00000 | N-LAK7 | 1.65160 | 58.52 SCHOTT |
| 7 | 89.67710 | 10.00000 | AIR | | |
| IMAGE | INFINITE | | | | |

TABLE 8

Construction of combination embodiment 7 at 50 mm focal length (FIG. 21).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 119.20097 | AIR | | |
| PRIMARY: | | | | | |
| 2 | 61.36000 | 8.25000 | BK7 | 1.51680 | 64.17 SCHOTT |
| 3 | −44.30000 | 2.80000 | SF5 | 1.67270 | 32.21 SCHOTT |
| 4 | −128.89999 | 13.54012 | AIR | | |
| COMPANION: | | | | | |
| 5 | 38.77423 | 9.25393 | SF5 | 1.67270 | 32.21 SCHOTT |
| 6 | 20.07320 | 20.00000 | S-PHM52 | 1.61800 | 63.33 OHARA |
| 7 | 112.45349 | 20.00000 | AIR | | |
| IMAGE | INFINITE | | | | |

The most significant differences between combination embodiments 4 through 7 are in their back focal distances (the thickness of Surface 7). During optimization these were constrained to the values shown, corresponding to 5%, 10%, 20%, and 40% of the focal length of the combination. The thicknesses of the elements of the companion were also allowed to vary during the optimization, and as one can see, in all cases the optimization moved the crown thickness to its maximum allowable value, 20 mm. I have found that it is the back focal distance which primarily drives the performance of the Type 1NR combination, and that this dependence becomes apparent when the thicknesses of the elements of the companion are allowed to vary. The typical effect of the back focal distance on the performance of the combinations can be seen in FIG. 17, especially in the region of focal ratios of F/2 and smaller.

While the number of applications which can make use of a back focal distance as small as 2.5 mm, offered by embodiment 4, is small, those skilled in the art would certainly have to agree that the performance offered by that system is impressive. Note also that these four embodiments provide their high performances without resorting to the use of high refractive index glasses.

FIG. 22 depicts combination embodiment 6A in which the reference primary has been replaced by an air-spaced achromat of about the same focal length. This alternate primary is based on Part Number 026-4450 sold by the OptoSigma Corporation of Santa Ana, Calif. The resulting combination, set up for 50 mm focal length, is documented in Table 9. Once again, for performance analysis purposes I have increased the diameter of the primary to its maximum feasible value to minimize vignetting.

TABLE 9

Combination embodiment 6A, using an air-spaced primary (FIG. 22).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 119.98379 | AIR | | |
| PRIMARY: | | | | | |
| 2 | 55.19982 | 6.80000 | BK7 | 1.51680 | 64.17 SCHOTT |
| 3 | −42.38366 | 0.97000 | AIR | | |
| 4 | −40.87973 | 2.89151 | SF2 | 1.64769 | 33.85 SCHOTT |
| 5 | −156.39907 | 34.13272 | AIR | | |
| COMPANION: | | | | | |
| 6 | 32.52872 | 9.42710 | SF5 | 1.67270 | 32.21 SCHOTT |
| 7 | 14.68728 | 20.00000 | N-LAK7 | 1.65160 | 58.52 SCHOTT |
| 8 | 89.67710 | 9.92640 | AIR | | |
| IMAGE | INFINITE | | | | |

Note that in Table 9 the back focal distance has changed slightly from its original value in Table 7. When the air-spaced primary was inserted, the air space between the primary and the companion was adjusted to make the focal length of the combination exactly 50 mm and the back focal distance and the location of the stop were adjusted to optimize the resulting image quality.

The performances of the original version of combination embodiment 6, the version containing the air-spaced primary, and a third version containing an alternate cemented primary are all compared in FIGS. 23 and 24. In FIG. 23 one can see that at σ'=10 microns image quality criterion, the two alternate primary versions have almost identical performances and that these performances are only a little inferior to the version with the reference primary. In FIG. 24 one sees that when the versions are compared at σ'=5 microns, the performances are all even closer to identical. Thus the companion doublet of embodiment 6 meets its goal of being useable with a wide variety of standard achromats having the same focal length.

The alternate cemented primary referred to in FIGS. 23 and 24 is based on Part Number AAP-100-25.4 supplied by the CVI Laser Corporation of Albuquerque, N. Mex. The construction of combination embodiment 6B which uses it is documented in Table 10.

TABLE 10

Combination embodiment 6B, using an alternate cemented primary.

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 100.05392 | AIR | | |
| PRIMARY: | | | | | |
| 2 | 62.00397 | 6.00000 | BK7 | 1.51680 | 64.17 SCHOTT |
| 3 | −42.37827 | 3.00000 | SF2 | 1.64769 | 33.85 SCHOTT |
| 4 | −133.28357 | 37.07226 | AIR | | |
| COMPANION: | | | | | |
| 5 | 32.52872 | 9.42710 | SF5 | 1.67270 | 32.21 SCHOTT |
| 6 | 14.68728 | 20.00000 | N-LAK7 | 1.65160 | 58.52 SCHOTT |
| 7 | 89.67710 | 10.01026 | AIR | | |
| IMAGE | INFINITE | | | | |

The performances of four additional combination embodiments of my Type 1NR system are compared to Schade's lens in FIG. 25. Combination embodiments 8, 9, 10 and 11 are depicted in FIGS. 26, 27, 28, and 29, respectively. In FIGS. 26 and 27 a physical stop has been shown at the equivalent stop position 15.

The constructions of companion embodiments 8, 9, 10, and 11 are detailed in Tables 11, 12, 13, and 14. In these tables the construction details for the reference primary and the entrance pupil have been dropped because it will now be clear to those skilled in the art how to combine the companion with a primary to obtain a combination having the correct focal length, and it would always have been clear how to position the entrance pupil to obtain the best image for a specific focal ratio and field of view. For the convenience of the reader the nominal back focal lengths are included in these tables, although that information is not necessary to completely specify the design of the companion.

Companion embodiment 8 is an example of what can be done with lower thicknesses and medium index materials, while in the other embodiments high index materials have been employed to attempt to obtain the highest possible levels of performance.

about F/2.3. While that fact is impressive, it will also be apparent to those skilled in the art that these companions will be relatively expensive to manufacture, due both to the expensive materials and to the steep curvatures used. However, it will also be apparent by now to one skilled in the art that there are any number of companions which could be designed that will have performances that lie somewhere between the performances exhibited by embodiment 2 on

TABLE 11

Construction of companion embodiment 8 for 50 mm combination focal length when used with a 100 mm focal length primary (FIG. 26).

| SURF | RADIUS | THICKNESS | MEDIUM | INDEX | V-NUMBER | |
|---|---|---|---|---|---|---|
| COMPANION: | | | | | | |
| 5 | 15.04937 | 1.00000 | SF62 | 1.68134 | 31.94 | SCHOTT |
| 6 | 7.43249 | 3.79616 | S-LAL18 | 1.72916 | 54.68 | OHARA |
| 7 | 39.41557 | 10.00000 | AIR | | | |
| IMAGE | INFINITE | | | | | |

TABLE 12

Construction of companion embodiment 9 for 50 mm combination focal length when used with a 100 mm focal length primary (FIG. 27).

| SURF | RADIUS | THICKNESS | MEDIUM | INDEX | V-NUMBER | |
|---|---|---|---|---|---|---|
| COMPANION: | | | | | | |
| 5 | 20.12950 | 4.55438 | SF6 | 1.80518 | 25.43 | SCHOTT |
| 6 | 7.68485 | 9.00597 | N-LASF31 | 1.88067 | 41.01 | SCHOTT |
| 7 | 36.08293 | 5.00000 | AIR | | | |
| IMAGE | INFINITE | | | | | |

TABLE 13

Construction of companion embodiment 10 for 50 mm combination focal length when used with a 100 mm focal length primary (FIG. 28).

| SURF | RADIUS | THICKNESS | MEDIUM | INDEX | V-NUMBER | |
|---|---|---|---|---|---|---|
| COMPANION: | | | | | | |
| 5 | 26.14237 | 2.62990 | SF11 | 1.78472 | 25.76 | SCHOTT |
| 6 | 12.22176 | 18.21167 | S-LAH58 | 1.88300 | 40.76 | OHARA |
| 7 | 26.56861 | 5.00000 | AIR | | | |
| IMAGE | INFINITE | | | | | |

TABLE 14

Construction of companion embodiment 11 for 50 mm combination focal length when used with a 100 mm focal length primary (FIG. 29).

| SURF | RADIUS | THICKNESS | MEDIUM | INDEX | V-NUMBER | |
|---|---|---|---|---|---|---|
| COMPANION: | | | | | | |
| 5 | 34.45822 | 10.00000 | SF57 | 1.84666 | 23.83 | SCHOTT |
| 6 | 13.88734 | 14.07149 | S-LAH58 | 1.88300 | 40.76 | OHARA |
| 7 | 56.84773 | 10.00000 | AIR | | | |
| IMAGE | INFINITE | | | | | |

Note that the performances of combination embodiments 10 and 11 exceed the performance of Schade's lens for all focal ratios lower than about F/4 and the performances of embodiments 8 and 9 exceed it for focal ratios smaller than the one hand and embodiments 10 and 11 on the other, and that in the middle of the range, as exemplified by embodiment 1, Type 1NR companions will be no more expensive to manufacture than are ordinary achromats.

4. The Companion Doublet in Type 1NN

There is another Type of companion combination that I have found to give excellent performance in the application range of interest. This is Type 1NN, which has both the primary achromat and the companion doublet oriented with their crown elements facing the object. A first combination embodiment of this Type, which is embodiment 12 of my system, is depicted in FIG. 30 and its construction details are presented in Table 15.

TABLE 15

Construction of combination embodiment 12 at 50 mm focal length (FIG. 30).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 58.75778 | AIR | | |
| PRIMARY: | | | | | |
| 2 | 61.36000 | 8.25000 | BK7 | 1.51680 | 64.17 SCHOTT |
| 3 | −44.30000 | 2.80000 | SF5 | 1.67270 | 32.21 SCHOTT |
| 4 | −128.89999 | 22.35955 | AIR | | |
| COMPANION: | | | | | |
| 5 | 45.40002 | 8.00000 | SK2 | 1.60738 | 56.65 SCHOTT |
| 6 | −33.26339 | 2.50000 | SF5 | 1.67270 | 32.21 SCHOTT |
| 7 | −256.47875 | 29.62274 | AIR | | |
| IMAGE | INFINITE | | | | |

The performance of combination embodiment 12 is compared to the performance of the single achromat in FIG. 31. In comparison with the performance of embodiment 1 (Type 1NR) which was shown in FIG. 11, it is clear that embodiment 12 has even better performance at the lower F/Nos.; in fact, it is superior to the achromat in its normal configuration at any F/No.

Also shown in FIG. 31 is the performance of embodiment 13. Combination embodiment 13 is depicted in FIG. 32, and its construction details are presented in Table 16. As was the case with embodiments 2 and 3 of Type 1NR, embodiment 13 is presented here more for structural reasons than performance reasons, however its rear stop configuration can be useful in special applications.

than the former. Table 17 lists all of the Type NN prior art that I am aware of; the first lens is a microscope objective referred to by designer as a Lister objective, the rest of these are Petzvals. A more precise characterization of this list is that these are lenses comprised of two lens groups, each of which group is a doublet comprising a positive focal length element and a negative focal length element, that the focal length of the combination is smaller than the focal length of the first doublet, each of the doublets being oriented as described above, and that the lens as a whole is intended to operate over a wide wavelength range. There are prior art Petzvals intended for use with monochromatic radiation that I have not included here.

The non-patent sources for the Table, not previously listed, are books: [4] M. Laikin, *Lens Design*, © 1991, Marcel Dekker; [5] M. J. Kidger, *Fundamental Optical Design*, © 2002, SPIE; a technical paper: [6] K. Doyle & J. Hoffman, *Proceedings of the SPIE*, vol. 4444, pp. 130–140, November 2001; and a web page based on a book [7]. Reference [7] is an improved lens design based on one contained in B. H. Walker, *Optical Engineering Fundamentals*, © 1997, SPIE, and is described at:

TABLE 16

Construction of combination embodiment 13 at 50 mm focal length (FIG. 32).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | −49.58367 | AIR | | |
| PRIMARY: | | | | | |
| 2 | 61.36000 | 8.25000 | BK7 | 1.51680 | 64.17 SCHOTT |
| 3 | −44.30000 | 2.80000 | SF5 | 1.67270 | 32.21 SCHOTT |
| 4 | −128.89999 | 1.00000 | AIR | | |
| COMPANION: | | | | | |
| 5 | 14.76499 | 10.00000 | N-PSK58 | 1.56907 | 71.20 SCHOTT |
| 6 | −66.99223 | 2.50000 | BASF6 | 1.66755 | 41.93 SCHOTT |
| 7 | 15.26682 | 28.19927 | AIR | | |
| IMAGE | INFINITE | | | | |

Just as with Type NR, there is much prior art in Petzval lenses in Type NN; in fact I have found more of the latter http://www.lambdares.com/walker/fundamentals.phtml and the detailed construction can be obtained at:

http://www.lambdares.com/walker/bin/fundamentals/Petzval%20EdSci.len
(last accessed on Mar. 28, 2006). This lens is called by the author a "simulated Petzval", because it is comprised of two standard achromats, rather than having the two doublets being designed to cooperate with each other.

TABLE 17

Prior Art in Type NN

| Inventor or Authority | Date | Source | Location |
|---|---|---|---|
| Kingslake | 1978 | [2] | p. 182 |
| Repp | 1922 | U.S. Pat. No. 1,479,251 | |
| Warmisham | 1922 | U.S. Pat. No. 1,484,853 | |
| Graf | 1925 | U.S. Pat. No. 1,610,514 | |
| Richter | 1931 | U.S. Pat. No. 1,843,519 | |
| Gehrke | 1938 | U.S. Pat. No. 2,187,780 | |
| Werfeli | 1954 | U.S. Pat. No. 2,774,445 | |
| Nagler | 1981 | U.S. Pat. No. 4,400,065 | |
| Smith | 1992 | [3] | FIG. 13-2 |
| Smith | 1992 | [3] | FIG. 13-3 |
| Laikin | 1991 | [4] | FIG. 5-1 |
| Kidger | 2001 | [5] | FIG. 9-2 |
| Doyle & Hoffman | 2001 | [6] | |
| Walker | 1997 | [7] | |

FIG. 33 depicts the lens of Werfeli, U.S. Pat. No. 2,774,445, FIG. 34 depicts the lens of Laikin, (his FIG. 5-1) and FIG. 35 depicts the lens of Walker. These lenses were selected as examples because their performances bracket the performances of the high performance prior art. Note that Laikin's lens, FIG. 34, has an entrance pupil that corresponds to an equivalent stop located inside one of the lens elements; thus this lens is intended for use with an auxiliary optical system.

I have found that Grafs lens, U.S. Pat. No. 1,610,514, has a performance similar to the achromat in its high spherical aberration orientation; I consider this to be low performance and this level of performance is not of interest here.

The performances of my combination embodiments 12 and 14 are compared to the performances of the lenses of Werfeli, Laikin, and Walker in FIG. 36. A comparison of this Figure to FIG. 14 will show one that the performances of Werfeli's and Laikin's lenses are vastly superior to any of the Type NR prior art at low focal ratios. I will address the comparison between the performances of my embodiments 12 and 13 and the performance of Walker's lens in more detail later.

My combination embodiment 14 is depicted in FIG. 37 and its construction is detailed in Table 18.

TABLE 18

Construction of combination embodiment 14 at 50 mm focal length (FIG. 37).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 58.97463 | AIR | | |
| PRIMARY: | | | | | |
| 2 | 61.36000 | 8.25000 | BK7 | 1.51680 | 64.17 SCHOTT |
| 3 | −44.30000 | 2.80000 | SF5 | 1.67270 | 32.21 SCHOTT |
| 4 | −128.89999 | 49.76228 | AIR | | |
| COMPANION: | | | | | |
| 5 | 26.03810 | 10.00000 | N-LASF31 | 1.88067 | 41.01 SCHOTT |
| 6 | −44.86578 | 2.50000 | SF57 | 1.84666 | 23.83 SCHOTT |
| 7 | 43.94534 | 13.87772 | AIR | | |
| IMAGE | INFINITE | | | | |

FIG. 38 compares the performances of my combination embodiments 15, 16, 17, and 18 to that of Werfeli's lens. These embodiments are depicted in FIGS. 39, 40, 41, and 42, respectively, and the construction of the corresponding companions, along with their back focal lengths, are presented in Tables 19, 20, 21, and 22.

TABLE 19

Construction of companion embodiment 15 for 50 mm combination focal length when used with a 100 mm focal length primary (FIG. 39).

| SURF | RADIUS | THICKNESS | MEDIUM | INDEX | V-NUMBER |
|---|---|---|---|---|---|
| COMPANION: | | | | | |
| 5 | 15.92528 | 7.67537 | S-LAL18 | 1.72916 | 54.68 OHARA |
| 6 | −25.39519 | 8.85898 | SF5 | 1.67270 | 32.21 SCHOTT |
| 7 | 12.28146 | 2.50000 | AIR | | |
| IMAGE | INFINITE | | | | |

TABLE 20

Construction of companion embodiment 16 for 50 mm combination focal length when used with a 100 mm focal length primary (FIG. 40).

| SURF | RADIUS | THICKNESS | MEDIUM | INDEX | V-NUMBER |
|---|---|---|---|---|---|
| COMPANION: | | | | | |
| 5 | 17.75129 | 6.14937 | S-LAL18 | 1.72916 | 54.68 OHARA |
| 6 | −42.64251 | 10.00000 | SF5 | 1.67270 | 32.21 SCHOTT |
| 7 | 18.28838 | 5.00000 | AIR | | |
| IMAGE | INFINITE | | | | |

TABLE 21

Construction of companion embodiment 17 for 50 mm combination focal length when used with a 100 mm focal length primary (FIG. 41).

| SURF | RADIUS | THICKNESS | MEDIUM | INDEX | V-NUMBER |
|---|---|---|---|---|---|
| COMPANION: | | | | | |
| 5 | 29.52285 | 17.16948 | S-LAL52 | 1.67000 | 57.33 OHARA |
| 6 | −27.80734 | 7.38137 | SF5 | 1.67270 | 32.21 SCHOTT |
| 7 | 73.68678 | 10.00000 | AIR | | |
| IMAGE | INFINITE | | | | |

TABLE 22

Construction of companion embodiment 18 for 50 mm combination focal length when used with a 100 mm focal length primary (FIG. 42).

| SURF | RADIUS | THICKNESS | MEDIUM | INDEX | V-NUMBER |
|---|---|---|---|---|---|
| COMPANION: | | | | | |
| 5 | 40.63352 | 20.00000 | N-PSK57 | 1.59240 | 68.40 SCHOTT |
| 6 | −66.89512 | 10.00000 | SF5 | 1.67270 | 32.21 SCHOTT |
| 7 | 261.34887 | 20.00000 | AIR | | |
| IMAGE | INFINITE | | | | |

This series of embodiments demonstrates the effects of the back focal distance on the performance of the companion combination, and just as with Type 1NR, generally speaking one finds that smaller back focal distances lead to increased levels of performance.

FIG. 43 compares the performances of Laikin's lens and my combination embodiments 19, 20 and 21. These embodiments are depicted in FIGS. 44, 45, and 46 respectively, while the constructions of the corresponding companions are documented in Tables 23, 24, and 25. Once again there are embodiments of my system whose performances exceed the performance of any known prior art system, at least over certain F/No. ranges, even though the two lense groups in the prior art systems have been designed specifically to cooperate with each other to provide the best image.

TABLE 23

Construction of companion embodiment 19 for 50 mm combination focal length when used with a 100 mm focal length primary (FIG. 44).

| SURF | RADIUS | THICKNESS | MEDIUM | INDEX | V-NUMBER |
|---|---|---|---|---|---|
| COMPANION: | | | | | |
| 5 | 17.63398 | 8.82143 | S-LAL18 | 1.72916 | 54.68 OHARA |
| 6 | −31.21757 | 10.00000 | SF5 | 1.67270 | 32.21 SCHOTT |
| 7 | 12.12639 | 2.50000 | AIR | | |
| IMAGE | INFINITE | | | | |

TABLE 24

Construction of companion embodiment 20 for 50 mm combination focal length when used with a 100 mm focal length primary (FIG. 45).

| SURF | RADIUS | THICKNESS | MEDIUM | INDEX | V-NUMBER |
|---|---|---|---|---|---|
| COMPANION: | | | | | |
| 5 | 17.01408 | 6.77583 | N-LASF31 | 1.88067 | 41.01 SCHOTT |
| 6 | −23.95733 | 8.73379 | SF6 | 1.80518 | 25.43 SCHOTT |
| 7 | 12.91823 | 2.50000 | AIR | | |
| IMAGE | INFINITE | | | | |

TABLE 25

Construction of companion embodiment 21 for 50 mm combination focal length when used with a 100 mm focal length primary (FIG. 46).

| SURF | RADIUS | THICKNESS | MEDIUM | INDEX | V-NUMBER |
|---|---|---|---|---|---|
| COMPANION: | | | | | |
| 5 | 20.81202 | 13.29787 | S-LAH58 | 1.88300 | 40.76 OHARA |
| 6 | −12.30504 | 2.06714 | SF57 | 1.84666 | 23.83 SCHOTT |
| 7 | 37.11102 | 5.00000 | AIR | | |
| IMAGE | INFINITE | | | | |

To be fair, the performances of my companion combinations seem to exceed that of the prior art only when the back focal distance of the system is small. I suspect that if new two lens group systems were designed using the performance criteria that I use and allowing the back focal distance to be small, that these new systems could have considerably better performance, by my criteria, than any of the prior art, and would also exceed the performance of my companion combinations. However, even if that turns out to be true, it does not detract from the value of my companion combinations, as their main point is to provide a new usefulness to commonly available standard achromats.

5. Comparison of Companion Combination Performance to that of Walker's Simulated Petzval Lens So far I have introduced two Types of the companion and companion combinations and I have compared the performances of representative companion combinations to the performance of a single achromat and also to a variety of prior art lenses. One of those prior art lenses is the simulated Petzval of Walker. I consider this lens important because it represents an example of what one can achieve by combining two ordinary achromats, when they are chosen essentially at random. Of interest here is this quote from the comment lines in Walker's actual lens file [7]:

"This lens file contains a 143 mm f/2 Petzval lens made from two cemented achromats from the EDmund catalog. The air space between doublets has been adjusted to yield the desired focal length. This model works well to describe features such as EFL, BFL, F-Number and vignetting. Image quality has not been dealt with."

In other words, Walker made no attempt to choose achromats that cooperate in some way to form a better image. However, it is clear from a comparison of FIGS. 31 and 36 that there is some improvement in performance over that of a single achromat for intermediate fields of view. Thus, Walker is arguably a better reference for the performance offered by the prior art than is a single achromat. That is, to be of most value my companion combinations should have better performance than Walker's lens.

FIG. 47 compares the performances of my 12th and 13th combination embodiments (Type 1NN) to that of Walker's lens and to that of the reversed achromat, when all are scaled to 50 mm focal length. I emphasize once again that all these performance curves, including that of Walker, are generated by optimizing the stop position for each focal ratio and field angle. Here I have slightly changed the method of generating the performance curves as compared to those shown in earlier Figures. Previously, as described above, I attempted to limit the vignetting to an unspecified, but small, value during the optimization process that determines the position of the stop and the focal plane at each focal ratio and field angle. However, I found that in some cases the vignetting did not remain small everywhere on the performance curve. Therefore, I decided here to let the optimization proceed without necessarily limiting the vignetting and then to apply the vignetting criterion later. Now, and in all subsequent performance charts, the performance curves are explicitly limited, where applicable, to the field angles that could be achieved with a vignetting no greater than that specified on the chart. Thus, for FIG. 47, the vignetting at the edge of the field was limited to 20% maximum, that is, the transmission at the edge of the field must be at least 80%.

Note the "dip" at the left hand side of Walker's performance curve. This is the effect of the specified vignetting criterion on the performance of Walker's lens. None of the other lenses in FIG. 47 were affected by this vignetting criterion. Part of the reason is that Walker's lens has been analyzed with the achromats at their nominal, as manufactured, diameters, while the embodiments are analyzed using the reference primary at its maximum feasible diameter.

The other prior art lens in FIG. 47 is the reversed achromat. As previously discussed, this works well at large focal ratios, and one can see from the Figure that the performance of the achromat (at the σ'=0.01 mm criterion) exceeds that of Walker's lens for all focal ratios larger than $(0.02)^{-0.5} = 7.07$. Thus a criterion for minimum desirable performance in a companion combination is given by the combined envelope of the performance of the reversed achromat and of Walker's lens. It is clear from FIG. 47 that the performance of embodiment 13 just barely exceeds this criterion, while the performance of embodiment 12 comfortably exceeds it. I will have more to say about using the performance of Walker's lens as a criterion for optical system performance in Section 10, Definitions.

FIG. 48 compares the performances of the less capable embodiments in Type 1NR to that of Walker's lens. Note that Embodiment 2 just barely exceeds the minimum desirable performance criterion, while embodiment 1 exceeds it comfortably. Recall that the presence of embodiments 2, 3, and 13 here were originally stated to be due more to their structures than to their performances.

6. The Companion Doublet in Type 1RN

I have found that there is a third type of companion combination that is of particular interest when both the back focal length of the combination and the operating field of view are large. This is Type 1RN, where the primary is used in the reversed orientation. A first embodiment of this Type, which is embodiment 22 of my system, is depicted in FIG. 49 and its construction details are presented in Table 26. This is a 25 mm focal length combination, and the particular primary depicted is Part Number L-AOC025 of Ross Optical Industries of El Paso, Tex. which has a focal length of 50 mm. In this case the nominal back focal length for the combination is 20% of the combination focal length, or 5 mm, but when this companion was optimized over a set of six primary achromats the back focal distance was allowed to vary to obtain the best results with each individual primary. Thus this companion when used with this particular primary gives a back focal distance of 4.7 mm at 25.00 mm combination focal length as shown in Table 26.

TABLE 26

Construction of combination embodiment 22 at 25 mm focal length (FIG. 49).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 24.67595 | AIR | | |
| PRIMARY: | | | | | |
| 2 | 86.36324 | 1.50000 | SF5 | 1.67270 | 32.21 SCHOTT |
| 3 | 22.46989 | 4.46000 | SK11 | 1.56384 | 60.80 SCHOTT |
| 4 | −32.15951 | 21.00557 | AIR | | |
| COMPANION: | | | | | |
| 5 | 12.76417 | 7.50000 | N-LAK22 | 1.65113 | 55.89 SCHOTT |
| 6 | −14.75295 | 5.00000 | SF2 | 1.64769 | 33.85 SCHOTT |
| 7 | 13.87051 | 4.70919 | AIR | | |
| IMAGE | INFINITE | | | | |

A second embodiment of Type 1RN, which is embodiment 23 of my system, is depicted in FIG. 50, and its construction details are given in Table 27. This is also a 25 mm focal length combination, but in this case the back focal distance is set to 40% of the combination focal length, so the nominal back focal length is 10 mm. This companion was optimized over the same set of six primaries as was embodiment 22, and in Table 27 and FIG. 50 I depict its use with a second of these primaries: part number AC254-050-A1 from ThorLabs, Inc. of Newton, N.J.

TABLE 27

Construction of combination embodiment 23 at 25 mm focal length (FIG. 50).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 27.65553 | AIR | | |
| PRIMARY: | | | | | |
| 2 | 291.06997 | 2.50000 | SF10 | 1.72825 | 28.41 SCHOTT |
| 3 | 22.28015 | 9.00000 | BAFN10 | 1.67003 | 47.11 SCHOTT |
| 4 | −33.34000 | 10.30324 | AIR | | |
| COMPANION: | | | | | |
| 5 | 16.22466 | 7.50000 | N-LAK22 | 1.65113 | 55.89 SCHOTT |
| 6 | −26.09630 | 5.00000 | SF5 | 1.67270 | 32.21 SCHOTT |
| 7 | 24.15088 | 10.00964 | AIR | | |
| IMAGE | INFINITE | | | | |

Two of the important properties of Type 1RN companions are illustrated in FIG. 51. Here the performances of four companion combinations are shown. These combinations are just those listed in Tables 26 and 27 plus the two combinations obtained when their primaries are interchanged. In FIG. 51, I denote the primary listed in Table 26 as "Primary A" and that listed in Table 27 as "Primary B".

First note that, as expected, the performances of the combinations depend in only a minor way on which primary is used. Secondly, note that in Type 1RN we do not see the fall off in performance with increasing back focal length that we saw in Types 1NR and 1NN. Third, note that the performance is high for focal ratios greater than 4.0 but falls off rapidly for lower focal ratios. Thus, Type 1RN finds its application at high focal ratios.

The curves of FIG. 51 refer to the performance attainable with the primary achromats at their actual, as marketed, diameters. In previous embodiments I used a reference primary whose physical aperture radius had been assumed to take its maximum feasible value, as was discussed above.

I have found that companions of Type 1RN offer the best available performance of any Type at the higher focal ratios in the larger back focal lengths. Since larger back focal lengths are of more importance at shorter combination focal lengths, Type 1RN is of particular interest at short combination focal lengths.

As an example of the superiority of Type 1RN, consider embodiments 24 and 25. Embodiment 24 is a third embodiment of Type 1RN that is depicted in FIG. 52 and whose construction details are given in Table 28. Embodiment 25 is a tenth embodiment of Type 1NN that is depicted in FIG. 53 and whose construction details are given in Table 29. Both of these embodiments have a combination focal length of 12.5 mm using a 25 mm focal length primary, and have nominal back focal lengths of 5 mm, 40% of the combination focal length.

TABLE 28

Construction of combination embodiment 24 (Type 1RN) at 12.5 mm focal length (FIG. 52).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 14.78346 | AIR | | |
| PRIMARY: | | | | | |
| 2 | 116.80333 | 1.00000 | SF10 | 1.72825 | 28.41 SCHOTT |
| 3 | 10.54096 | 4.50000 | BAFN10 | 1.67003 | 47.11 SCHOTT |
| 4 | −17.25209 | 5.24509 | AIR | | |
| COMPANION: | | | | | |
| 5 | 7.39089 | 3.75000 | N-SK2 | 1.60738 | 56.65 SCHOTT |
| 6 | −37.51376 | 2.50000 | SF11 | 1.78472 | 25.76 SCHOTT |
| 7 | 14.68195 | 5.00000 | AIR | | |
| IMAGE | INFINITE | | | | |

TABLE 29

Construction of combination embodiment 25 (Type 1NN) at 12.5 mm focal length (FIG. 53).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 12.95979 | AIR | | |
| PRIMARY: | | | | | |
| 2 | 17.25209 | 4.50000 | BAFN10 | 1.67003 | 47.11 SCHOTT |
| 3 | −10.54096 | 1.00000 | SF10 | 1.72825 | 28.41 SCHOTT |
| 4 | −116.80333 | 5.26649 | AIR | | |
| COMPANION: | | | | | |
| 5 | 9.71258 | 3.75000 | N-LAK22 | 1.65113 | 55.89 SCHOTT |
| 6 | −8.18745 | 1.54347 | N-SF15 | 1.69892 | 30.20 SCHOTT |
| 7 | 204.07503 | 5.00000 | AIR | | |
| IMAGE | INFINITE | | | | |

Embodiments 24 and 25 both are shown in the Figures and the Tables as being combined with the same primary, part number PAC522 from the Newport Corporation of Irvine, Calif. The performances of these combinations (Primary A) are compared in FIG. 54 for three different values of σ'. FIG. 54 also shows the performance of these companions when they are combined with a second primary, part number 45174 of the Edmund Optics Co. of Barrington, N.J. (Primary B).

Both of the companions of embodiments 24 and 25 were subjected to a similar amount of optimization effort and I believe that the curves in FIG. 54 fairly represent the relative performance capability of these two Types at this focal length and back focal length when optimized for focal ratios of about 6. Note the increase in performance of the Type 1RN companion at high focal ratios as compared to the Type 1NN companion. Also note the similar performances obtained with the different primaries in both Types.

Type RN combinations have been used in the prior art as eyepieces. FIGS. 55, 56, and 57 respectively depict the eyepieces of R. Kingslake, U.S. Pat. No. 2,393,782, Example 1; A. König, U.S. Pat. No. 2,217,281, Example 2; and an eyepiece design published by a supplier of lenses. The supplier is Linos Photonics, a German corporation which has a U.S. office in Milford, Mass. Their part number for this design is 038251 and its design is published as part of a lens library that can be downloaded at www.winlens.de/en/lenslib_install.html (last accessed on Apr. 10, 2006).

Note that for normal use as an eyepiece, in these diagrams the light would travel from right to left. So, we are considering using these eyepieces backwards, to image an object at infinity. Used this way, the performances of these eyepieces, which bracket the range of performance of all similar eyepieces I have found, are compared to the performance of Walker's simulated Petzval in FIG. 58. The performance of Walker's lens is superior to every eyepiece in the range of interest, and by not a small amount.

The performances of my Type 1RN companion combinations are superior to the prior art as represented by Walker. This fact is depicted in FIG. 59, where the performance of combination embodiments 22 and 24 are compared with the performance of Walker's simulated Petzval. In this case both combination embodiments 22 and 24 were scaled to 50 mm focal length before the performance was calculated, in order to enable the comparison. Note the superiority of the Type 1RN combinations for any focal ratio larger than about 3.4.

Type 1RN differs from Types 1NR and 1NN in another important aspect. I have found that in the latter types, the performance is not very sensitive to the position of the stop. In Type 1RN, on the other hand, I have found that the stop position is very important to achieving the best performance of the combination.

7. The Companion Doublet in Type 2NN

It is also possible to place the companion in front of the primary. I call such combinations "Type 2", and I have found that Type 2NN, that is, where both the companion and the primary are oriented with their crown elements toward the distant object, has advantages over all other Types under certain conditions.

FIG. 60 depicts a combination embodiment using a Type 2NN companion, with its construction details given in Table 30. This represents embodiment 26 of my system, and it has a combination focal length of 25 mm and has a back focal length of 20% of the combination focal length. Here the companion 60 lies in front of the primary 20. The particular primary shown (Primary C) is part number L-AOC138 from Ross Optical Industries of El Paso, Tex. Note also that an equivalent stop 15 lies between the companion and the primary. I have found that Type 2NN companions can be preferred when the stop must be placed between the primary and the companion.

TABLE 30

Construction of combination embodiment 26 (Type 2NN) at 25 mm focal length (FIG. 60).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | −13.34836 | AIR | | |
| COMPANION: | | | | | |
| 2 | 10.83057 | 4.40179 | N-BAF10 | 1.67003 | 47.11 SCHOTT |
| 3 | −13.76185 | 5.00000 | N-SF8 | 1.68894 | 31.31 SCHOTT |
| 4 | 16.08044 | 7.52582 | AIR | | |
| PRIMARY: | | | | | |
| 5 | 30.15318 | 6.10000 | BK7 | 1.51680 | 64.17 SCHOTT |
| 6 | −22.12977 | 2.00000 | SF2 | 1.64769 | 33.85 SCHOTT |
| 7 | −71.44388 | 5.00000 | AIR | | |
| IMAGE | INFINITE | | | | |

FIG. 61 depicts a Type 1NN system that has been optimized under the same conditions as was the Type 2NN system of embodiment 26 and in which the companion has been combined with the same primary. This represents the eleventh embodiment of my Type 1NN system and is combination embodiment 27. The construction details are given in Table 31. In this case, during optimization the stop was constrained to lie between the primary 20 and the companion 60, and that fact leads to differences between this Type 1NN embodiment and all of the others previously disclosed. Essentially the same level of optimization effort went into embodiments 26 and 27.

TABLE 31

Construction of combination embodiment 27 (Type 1NN) at 25 mm focal length (FIG. 61).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | −10.82146 | AIR | | |
| PRIMARY: | | | | | |
| 2 | 30.15318 | 6.10000 | BK7 | 1.51680 | 64.17 SCHOTT |
| 3 | −22.12977 | 2.00000 | SF2 | 1.64769 | 33.85 SCHOTT |
| 4 | −71.44388 | 24.92486 | AIR | | |
| COMPANION: | | | | | |
| 5 | 12.93635 | 7.49960 | N-LAK22 | 1.65113 | 55.89 SCHOTT |
| 6 | −9.46931 | 1.25885 | SF15 | 1.69895 | 30.07 SCHOTT |
| 7 | −1393.80623 | 5.00000 | AIR | | |
| IMAGE | INFINITE | | | | |

The performances of the combinations of embodiments 26 and 27 are compared in FIG. 62 for two values of σ'. Curves are shown using both the example primary specified above, and a second representative primary of 50 mm focal length which is again different than any of those used previously. Since these combinations have focal lengths of 25 mm, they are also compared in FIG. 62 with the prior art system of Walker with the latter scaled to 25 mm focal length. In this case, the performance of Walker's system is shown when Walker's system is also constrained to have the stop located in the center of the system.

Walker's system had the stop in the center as it was originally disclosed. However, I have found that when determining its performance in the manner as has been described previously, that the its performance improves when the stop is allowed to move to the front of the system. Thus all prior performance curves of Walker's system had, for the most part, the stop in front of the system.

The Walker curve in FIG. 62 corresponds to σ'=0.005, that is, the lower of the two sets of curves for the embodiments. Walker's performance has a similar relationship to the embodiment curves at σ'=0.01 (and also at σ'=0.0025) but I have avoided showing more curves to avoid clutter in the Figure. Note the superiority of the Type 2NN embodiment under these conditions to the 1NN embodiment and also to Walker.

8. Additional Type 1NN Companions; Glass Requirements

Above I have presented a wide variety of companions of different Types, optimized using different merit functions, and using a variety of glass combinations. By studying the exemplary performance curves, one can choose a starting companion design to be further investigated and optimized for any individual purpose of interest. However, recall that the whole concept of the companion is that it is meant to be a general purpose optical component, useful for the implementation of a wide range of individual optical systems of differing fields of view and focal ratios. This is different than any previously contemplated lens design that I am aware of. For my purposes, I feel that maximizing the field of view capability of the companion combination in the focal ratio region between approximately F/4 and F/2 is the key to producing a companion of the most general utility.

Over that range of system focal ratios, it is clear that Types 1NR and 1NN are the best. If one studies the performance curves presented earlier, one will find that the performances of these two Types in this range are very similar. However, examining companion designs further will show that the curvature of the crown-flint interface surface is steeper in Type 1NR than it is in Type 1NN companions of roughly equivalent performance. Therefore, I chose Type 1NN for further investigation.

Companions, when designed for a given optimization criterion (such as widest field of view over a given range of focal ratios at a given image quality criterion) at a given combination focal length can still differ in glass combination and back focal length. They can also differ in magnification, $M_c$, that is, in the ratio of the combination focal length to the primary focal length, and in the properties of the particular primary achromats with which they are designed to cooperate, all of those primaries having approximately the same focal lengths. All of these issues have at least been mentioned to this point, but here we further investigate further the effects of companion magnification, the combination of glasses comprising the companion, and the range of matching primaries.

I have found that companion combinations of good performance can be found when the focal length of the combination is taken to be anywhere between 25% and 90% of the focal length of the primary (i.e., $0.25<M_c<0.90$), with the preferred value of the ratio being between 40% and 70% (i.e., $0.40<M_c<0.70$).

In general I have found that the index of the flint element of the companion has only a relatively small effect on the performance of the companion, assuming that the glass of the crown element of the companion is selected to cooperate with that of the flint element. There is a small preference for higher refractive indexes. While I discuss below in detail the rules that apply to glass combinations for Type 1NN embodiments, I have found that there are also general rules that apply to all Types, and these are also noted.

A. Dependence of Performance on V-Number of the Crown Glass.

FIG. 63 shows my 28th combination embodiment and FIG. 64 shows my 29th combination embodiment, both of Type 1NN, and their corresponding design structures are given in Tables 32 and 33. These two embodiments both have 50 mm combination focal length, but here the magnification of the companions used is 5/12 (0.4167) rather than 1/2 as was used in all previous embodiments. Thus, the focal length of the primary is now 120 mm, and the particular primary shown in FIGS. 63 and 64 is part number 32921 of the Edmund Optics Company of Barrington, N.J.

TABLE 32

Construction of combination embodiment 28 at 50 mm focal length (FIG. 63).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | −75.13798 | AIR | | |
| PRIMARY: | | | | | |
| 2 | 65.22000 | 9.60000 | SSKN8 | 1.61772 | 49.77 SCHOTT |
| 3 | −62.03000 | 4.20000 | SF10 | 1.72825 | 28.41 SCHOTT |
| 4 | −1240.67000 | 62.74300 | AIR | | |
| COMPANION: | | | | | |
| 5 | 20.79900 | 6.87700 | BAH32 | 1.66998 | 39.28 OHARA |
| 6 | −19.43100 | 10.00000 | SF4 | 1.75520 | 27.58 SCHOTT |
| 7 | −1589.56900 | 9.95289 | AIR | | |
| IMAGE | INFINITE | | | | |

TABLE 33

Construction of combination embodiment 29 at 50 mm focal length (FIG. 64).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 67.37758 | AIR | | |
| PRIMARY: | | | | | |
| 2 | 65.22000 | 9.60000 | SSKN8 | 1.61772 | 49.77 SCHOTT |
| 3 | −62.03000 | 4.20000 | SF10 | 1.72825 | 28.41 SCHOTT |
| 4 | −1240.67000 | 61.67500 | AIR | | |
| COMPANION: | | | | | |
| 5 | 20.79900 | 10.37600 | LAKL12 | 1.67790 | 54.92 SCHOTT |
| 6 | −26.57100 | 6.25000 | SF4 | 1.75520 | 27.58 SCHOTT |
| 7 | 165.52200 | 10.10507 | AIR | | |
| IMAGE | INFINITE | | | | |

Both embodiments 28 and 29 were designed using the same merit function; with that merit function I attempted to maximize the performance of the combination between F/4 and F/2. The difference between embodiments 28 and 29 is in the crown glass used in the companion. The same flint (SF4) is used in both companions, and both crowns (BAH32) and (LAKL12) have essentially the same refractive index at the "d" wavelength, $N_d$. Thus, the difference between these two companions is driven by the fact that their crown glasses have different V-numbers.

That these performances of these two embodiments differ substantially is shown in FIG. 65. Note that the standard six digit glass codes for the crown elements of the companions have been provided in the legend of the Figure. Here we see that the performance of companion embodiment 29 is vastly superior to that of embodiment 28 over the target focal ratio range for three values of σ':5 microns, 10 microns and 20 microns. In fact, the performance of embodiment 29 exceeds the performance of embodiment 28 for almost any focal ratio at these three values of image quality. Thus case a higher V-number in the crown element of the companion leads to better companion combination performance.

I have found that the refractive index of the crown used here (~1.67–1.68) is about the optimum value for the flint used in these particular companions. These two companions have been optimized for use with this particular primary achromat, but I have found that the result that a higher V-number in the crown provides a higher performance is typical for a wide range of companions. However, "typical" does not mean universal, as I will now show.

Three more combination embodiments of Type 1NN are depicted in FIGS. 66, 67, and 68; these are the 30th, 31st, and 32nd embodiments, respectively, and their construction details are presented in Tables 34, 35, and 36, respectively. In these embodiments, the companion operates at a magnification of ⅔, so that the primary has a focal length of 75 mm. The particular primary being used here is part number 32325 of the Edmund Optics Co. of Barrington, N.J. In this case I took the liberty of increasing the aperture of the primary to its maximum feasible value, $A_{max}$, just as I did with the reference primary discussed earlier in relation to the first embodiments of my system. I did this to avoid limiting the performance curves by vignetting at the small aperture of the primary as supplied by the manufacturer; this small aperture is not fundamental and it tends to obscure the point I am trying to make.

TABLE 34

Construction of combination embodiment 30 at 50 mm focal length (FIG. 66).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 45.36984 | AIR | | |
| PRIMARY: | | | | | |
| 2 | 46.44000 | 7.00000 | BK7 | 1.51680 | 64.17 SCHOTT |
| 3 | −33.77000 | 2.50000 | FD5 | 1.67270 | 32.17 HOYA |
| 4 | −95.94000 | 34.78500 | AIR | | |
| COMPANION: | | | | | |
| 5 | 45.01100 | 19.57600 | N-BASF2 | 1.66446 | 36.00 SCHOTT |
| 6 | −17.83000 | 3.00000 | SF4 | 1.75520 | 27.58 SCHOTT |
| 7 | −178.40500 | 10.01149 | AIR | | |
| IMAGE | INFINITE | | | | |

TABLE 35

Construction of combination embodiment 31 at 50 mm focal length (FIG. 67).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 48.34617 | AIR | | |
| PRIMARY: | | | | | |
| 2 | 46.44000 | 7.00000 | BK7 | 1.51680 | 64.17 SCHOTT |
| 3 | −33.77000 | 2.50000 | FD5 | 1.67270 | 32.17 HOYA |
| 4 | −95.94000 | 37.69000 | AIR | | |
| COMPANION: | | | | | |
| 5 | 39.65100 | 16.10700 | BAH32 | 1.66998 | 39.28 OHARA |
| 6 | −19.92100 | 3.00000 | SF4 | 1.75520 | 27.58 SCHOTT |
| 7 | −490.77200 | 10.00923 | AIR | | |
| IMAGE | INFINITE | | | | |

TABLE 36

Construction of combination embodiment 32 at 50 mm focal length (FIG. 68).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 39.89337 | AIR | | |
| PRIMARY: | | | | | |
| 2 | 46.44000 | 7.00000 | BK7 | 1.51680 | 64.17 SCHOTT |
| 3 | −33.77000 | 2.50000 | FD5 | 1.67270 | 32.17 HOYA |
| 4 | −95.94000 | 45.59100 | AIR | | |
| COMPANION: | | | | | |
| 5 | 25.81900 | 6.95500 | LAKL12 | 1.67790 | 54.92 SCHOTT |
| 6 | −50.32000 | 3.00000 | SF4 | 1.75520 | 27.58 SCHOTT |
| 7 | 92.80500 | 10.00328 | AIR | | |
| IMAGE | INFINITE | | | | |

The performances of these embodiments are compared in FIG. 69. Companion embodiments 31 and 32 use the same glass combinations as did embodiments 28 and 29, while embodiment 30 uses a crown element having an even lower V-number. Note that it is still the case here that the performance of the combinations increases with increasing V-number of the crown element of the companion, but that this increase is nowhere near as pronounced as it was for embodiments 28 and 29. Note that in the case of N-BASF2, the difference between V-number of the crown element and the V-number of the flint element of the companion is only 8.4.

An example where the V-number of the companion's crown element has even less effect on the performance of companion combination is provided with the next four embodiments. Combination embodiments 33, 34, 35, and 36 are depicted in FIGS. 70, 71, 72, and 73, and their constructions are given in Tables 37, 38, 39, and 40 respectively. In this case the primary is part number 32498 of the Edmund Optics Company. This primary has a focal length of 75 mm, just as with the previous three embodiments. In addition, the same glass combinations are used in embodiments 34–36 as were used in the previous embodiments, with embodiment 33 using a crown that has a V-number that is only 7.8 higher than the V-number of the flint.

TABLE 37

Construction of combination embodiment 33 at 50 mm focal length (FIG. 70).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 67.37758 | AIR | | |
| PRIMARY: | | | | | |
| 2 | 40.51000 | 8.40000 | SSKN8 | 1.61772 | 49.77 SCHOTT |
| 3 | −38.68000 | 3.00000 | SF10 | 1.72825 | 28.41 SCHOTT |
| 4 | −922.04000 | 31.97200 | AIR | | |
| COMPANION: | | | | | |
| 5 | 35.75300 | 17.81600 | F6 | 1.63636 | 35.34 SCHOTT |
| 6 | −15.98200 | 3.00000 | SF4 | 1.75520 | 27.58 SCHOTT |
| 7 | −11970.00000 | 10.09654 | AIR | | |
| IMAGE | INFINITE | | | | |

TABLE 38

Construction of combination embodiment 34 at 50 mm focal length (FIG. 71).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 24.02119 | AIR | | |
| PRIMARY: | | | | | |
| 2 | 40.51000 | 8.40000 | SSKN8 | 1.61772 | 49.77 SCHOTT |
| 3 | −38.68000 | 3.00000 | SF10 | 1.72825 | 28.41 SCHOTT |
| 4 | −922.04000 | 33.92300 | AIR | | |
| COMPANION: | | | | | |
| 5 | 33.32000 | 15.66600 | N-BASF2 | 1.66446 | 36.00 SCHOTT |
| 6 | −15.87200 | 3.00000 | SF4 | 1.75520 | 27.58 SCHOTT |
| 7 | 173.51700 | 9.98526 | AIR | | |
| IMAGE | INFINITE | | | | |

TABLE 39

Construction of combination embodiment 35 at 50 mm focal length (FIG. 72).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 26.06786 | AIR | | |
| PRIMARY: | | | | | |
| 2 | 40.51000 | 8.40000 | SSKN8 | 1.61772 | 49.77 SCHOTT |
| 3 | −38.68000 | 3.00000 | SF10 | 1.72825 | 28.41 SCHOTT |
| 4 | −922.04000 | 37.56800 | AIR | | |
| COMPANION: | | | | | |
| 5 | 27.47800 | 11.51700 | BAH32 | 1.66998 | 39.28 OHARA |
| 6 | −18.76600 | 3.00000 | SF4 | 1.75520 | 27.58 SCHOTT |
| 7 | 78.16000 | 9.98579 | AIR | | |
| IMAGE | INFINITE | | | | |

TABLE 40

Construction of combination embodiment 36 at 50 mm focal length (FIG. 73).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 1.00000 | AIR | | |
| PRIMARY: | | | | | |
| 2 | 40.51000 | 8.40000 | SSKN8 | 1.61772 | 49.77 SCHOTT |

TABLE 40-continued

Construction of combination embodiment 36 at 50 mm focal length (FIG. 73).

| SURF | RADIUS | THICKNESS | MEDIUM | INDEX | V-NUMBER |
|---|---|---|---|---|---|
| 3 | −38.68000 | 3.00000 | SF10 | 1.72825 | 28.41 SCHOTT |
| 4 | −922.04000 | 44.17200 | AIR | | |
| COMPANION: | | | | | |
| 5 | 18.35000 | 4.46700 | LAKL12 | 1.67790 | 54.92 SCHOTT |
| 6 | −134.15600 | 3.00000 | SF4 | 1.75520 | 27.58 SCHOTT |
| 7 | 32.84800 | 9.97150 | AIR | | |
| IMG | INFINITE | | | | |

The performances of these embodiments are compared in FIG. 74. Note that the performances here are generally a bit better than they were in FIG. 69, and that the companion with the crown element having the highest V-number no longer has the best performance in the target focal ratio range. The only difference between the set of embodiments 30 to 32 on the one hand, and embodiments 34 to 36 on the other is that they were optimized using the two different primaries. Here is an example of the major effect that the optimization of a companion in combination with a particular primary achromat can have on the performance of the combination. It is also an example of a situation where the V-number of the crown element of the companion matters little to the performance of a companion combination. I emphasize here that this latter situation is not typical, but clearly it can happen.

I have found that it is primarily the difference between the V-number of the crown element, $V_c$, and the V-number of the flint element $V_f$, of the companion which drives the performance of the companion combination. In general, I have found that $\Delta V = V_c - V_f$ must be at least 5 in all cases in order to give good performance.

Of course, such a statement assumes that the spectral band over which the companion combination is to be used is wide. Clearly, in monochromatic or narrow spectral band situations, the V-number of the glasses used in the companion won't matter as much, and the smaller the band, the less they'll matter. It is over a wavelength range of at least 150 nm that $\Delta V$ must be at least 5. I have also found that $\Delta V$ of at least 10 is preferred, in general. Note that if a different wavelength band is used than the CdF wavelength band I have been using, the actual values of the reciprocal relative dispersion of the glasses used will be different than the standard values I have presented. However, what I mean by a statement such as $\Delta V \geq 5$ is that the relationships between the glasses, as defined over the C, d, and F wavelengths, are the relationships which must be maintained in the companion no matter what the operational wavelength band is. Clearly this will be true and meaningful when the operational wavelength band is near the visible, but it will tend to lose its validity if the wavelength band is far from the visible, such as between 1.0 and 1.5 microns.

I have found that these same $\Delta V$ requirements apply to companions of all four Types that I discuss in this application.

As I've said, it is more typical that much higher V-number in the crown element of the companion leads to significantly higher performance in the companion combination, as was depicted in FIG. 65. In these cases one finds that one obtains the highest performance when the crown element is made of a glass that lies on the "crown line", that is, that is located at as high a V-number as it is possible to obtain for the selected index of the crown element. Since glasses along the crown line tend to be expensive and hard to work, the selection of the crown glass then becomes a question of the tradeoff between performance and cost.

Note also from FIGS. 65, 69 and 74 that it is at small σ' that $\Delta V$ matters most to the performance of the companion combination. This is because the correction for lateral chromatic aberration becomes relatively more important as the image quality requirement gets better.

B. Dependence of Performance on the Index of the Crown Glass

Three more embodiments of Type 1NN are depicted in FIGS. 75, 76, and 77; these are the 37th, 38th, and 39th combination embodiments of my system, and their construction details are given in Tables 41, 42, and 43, respectively. These companions have a magnification of 0.5, so that the primary here has a focal length of 100 mm. In this case the primary is part number LAO126 of the Melles Griot Company of Carlsbad, Calif. Once again, in the Figures and for performance comparisons, I have taken the liberty of opening up the aperture of the primary to its maximum feasible value to minimize vignetting.

TABLE 41

Construction of combination embodiment 37 at 50 mm focal length (FIG. 75).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 100.00000 | AIR | | |
| PRIMARY: | | | | | |
| 2 | 64.28000 | 6.23000 | SK11 | 1.56384 | 60.80 SCHOTT |
| 3 | −44.98000 | 2.50000 | SF5 | 1.67270 | 32.21 SCHOTT |
| 4 | −180.42999 | 38.98900 | AIR | | |

TABLE 41-continued

Construction of combination embodiment 37 at 50 mm focal length (FIG. 75).

| SURF | RADIUS | THICKNESS | MEDIUM | INDEX | V-NUMBER |
|---|---|---|---|---|---|
| COMPANION: | | | | | |
| 5 | 30.70000 | 17.45400 | N-SK18 | 1.63854 | 55.42 SCHOTT |
| 6 | −28.25400 | 10.00000 | SF2 | 1.64769 | 33.85 SCHOTT |
| 7 | 79.22500 | 10.03103 | AIR | | |
| IMAGE | INFINITE | | | | |

TABLE 42

Construction of combination embodiment 38 at 50 mm focal length (FIG. 76).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 100.00000 | AIR | | |
| PRIMARY: | | | | | |
| 2 | 64.28000 | 6.23000 | SK11 | 1.56384 | 60.80 SCHOTT |
| 3 | −44.98000 | 2.50000 | SF5 | 1.67270 | 32.21 SCHOTT |
| 4 | −180.42999 | 45.87900 | AIR | | |
| COMPANION: | | | | | |
| 5 | 25.18800 | 10.89000 | LAKL12 | 1.67790 | 54.92 SCHOTT |
| 6 | −64.33700 | 10.00000 | SF2 | 1.64769 | 33.85 SCHOTT |
| 7 | 37.12200 | 10.00883 | AIR | | |
| IMAGE | INFINITE | | | | |

TABLE 43

Construction of combination embodiment 39 at 50 mm focal length (FIG. 77).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 93.41115 | AIR | | |
| PRIMARY: | | | | | |
| 2 | 64.28000 | 6.23000 | SK11 | 1.56384 | 60.80 SCHOTT |
| 3 | −44.98000 | 2.50000 | SF5 | 1.67270 | 32.21 SCHOTT |
| 4 | −180.42999 | 47.73900 | AIR | | |
| COMPANION: | | | | | |
| 5 | 24.80800 | 9.23200 | S-LAL18 | 1.72916 | 54.68 OHARA |
| 6 | −134.69700 | 10.00000 | SF2 | 1.64769 | 33.85 SCHOTT |
| 7 | 30.75900 | 10.01054 | AIR | | |
| IMAGE | INFINITE | | | | |

The differences between embodiments 37, 38, and 39 come about because of the different refractive indices of the crown glasses used in these companions; the V-numbers of the crown glasses used here are virtually identical. The performances of these embodiments are compared in FIG. 78. The same optimization criteria were used as in the previous examples, that is, I attempted to optimize the limiting field angle over the F/4 to F/2 range.

Here we see that the performance drops as the refractive index of the crown increases. I have found this to universally be the case; that is, that there is an optimum crown refractive index and when the index is higher than this optimum, the performance of the companion decreases. I have found that the refractive index of the crown must be no higher than 0.1 larger than the optimum refractive index in order for the companion to give good performance.

When the refractive index of the crown lies below the optimum refractive index, I have found that it is often the case that the performance can remain relatively stable as the index decreases, just as long as the V-number of the crown also increases in proportion so that the position of the crown glass in the glass map remains at about the same distance from the crown line. If the index of the crown is decreased without changing the V-number of the crown, then the performance usually decreases as one moves away from the optimum analogously to what is shown in FIG. 78.

Here the optimum index for the crown element of the companion is approximately equal to the index of the flint of the companion. I have found this to be the case over a wide range of conditions, but not for all companions. For instance it is not true for embodiments 28 and 29 at $M_c$=0.417, nor is it true for embodiments 34 through 36 at $M_c$=0.667, where in both cases the optimum index for the crown element was found to be below that of the flint element. However, I have found that in most cases for companions designed for back focal lengths from 10% to 30% of the combination focal length and with magnifications in the range of $0.45 \leq M_c \leq 0.70$, that the optimum crown refractive index is about equal to the flint refractive index. Outside those ranges I generally have found the optimum crown index to be lower than the flint index.

I have also found that the optimum refractive index for the crown element of the companion is never more than 0.05 higher than the refractive index of the flint element, thus for good performance, the crown index is always no greater than the flint index +0.15. I have found this rule to be true for companions of all four Types that I consider in this application. In Type 1NN, I find that the crown index tends toward high values in companions designed for short back focal lengths.

Making the refractive indices of the crown and flint elements of the companion the same is an unusual situation. The interface between the crown and flint is then a so-called "buried surface". In the prior art, the purpose of a buried surface was to allow correction of chromatic aberration without affecting monochromatic aberrations; that is, the chromatic correction could be left to be handled until after the other aberrations were corrected. This was useful in the days when lens design was a laborious manual process. I know of no other previous use for a buried surface; in particular it was unknown to use a buried surface to improve the performance of an optical system. However, for the purposes of a general purpose companion I find that it does just that. Generally, I consider that a surface is buried when the index of the two glasses matches within ±0.02.

C. General Purpose Companion Designs

I am working toward producing a practical product line of companions. As with most things, one must make compromises among a number of competing goals in order to define such a product line. The key is to make a set of compromises that will reasonably well address the largest number of customer applications. Each individual companion should give the best performance improvement possible consistent with reasonable cost. However, the individual companions should also be as flexible as possible so that the total number of different companions to be designed, manufactured, and cataloged can be held to a minimum.

There can never be a definitive answer to the question of whether a given line of companions represents the best possible compromise. That being said, I have discovered a specific class of companion designs that I believe to be particularly well suited for a practical product line.

The first example of a companion combination using the first embodiment of a general purpose class of companions is depicted in FIG. 79 and its construction details are presented in Table 44. This is the 40th combination embodiment of my system. It has a combination focal length of 50 mm and is of Type 1NN. The magnification of the companion, $M_C$, is 0.5, so the primary has a focal length of 100 mm. The primary used is part number LAO126 of the Melles Griot company of Carlsbad, Calif.

TABLE 44

Construction of combination embodiment 40 at 50 mm focal length (FIG. 79).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 73.13508 | AIR | | |
| MELLES: LAO126 | | | | | |
| 2 | 64.28000 | 6.23000 | SK11 | 1.56384 | 60.80 SCHOTT |
| 3 | −44.98000 | 2.50000 | SF5 | 1.67270 | 32.21 SCHOTT |
| 4 | −180.42999 | 47.07192 | AIR | | |
| COMPANION: | | | | | |
| 5 | 28.05666 | 14.70410 | S-LAM54 | 1.75700 | 47.82 OHARA |
| 6 | −28.05666 | 6.87485 | SF4 | 1.75520 | 27.58 SCHOTT |
| 7 | 49.05478 | 9.99279 | AIR | | |
| IMAGE | INFINITE | | | | |

The indexes of the glasses used in this companion are rather high, which also helps the performance a bit, as I mentioned above. Ohara's glass S-LAM54, used for the crown element of the companion, is inexpensive and relatively ways to work, according to their catalog. As discussed above, the performance can be increased a little by using glasses with higher V-numbers, such as S-YGH51, but these are much less desirable glasses from cost and workability standpoints. The SF4 flint is a commonly used and relatively inexpensive glass.

In addition to the use of the buried surface in the companion, embodiment 40 also introduces another important feature. The same surface radius of curvature is used on both surfaces of the crown element of the companion; thus the companion needs only two different radii, rather than three. This is an important cost reducing measure and I have found that using the glass combination specified, I can still achieve high performance.

As discussed above, one of its goals is that the companion be useable with a wide range of primaries. Therefore FIG. 80 depicts the same companion being used with a primary of considerably different design. The details of this second example, combination embodiment 40A, are presented in Table 45. In this case the primary is part number LAL017, also sold by the Melles-Griot company. I have now also denoted this particular companion in Table 45 by the developmental part number B50-T20A, and I will refer to it by that number henceforth.

TABLE 45

Construction of combination embodiment 40A at 50 mm focal length (FIG. 80).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 71.90371 | AIR | | |
| MELLES: LAL017 | | | | | |
| 2 | 60.46000 | 9.00000 | BALKN3 | 1.51849 | 60.26 SCHOTT |
| 3 | −49.20000 | 3.00000 | SF15 | 1.69895 | 30.07 SCHOTT |
| 4 | −133.80000 | 45.56444 | AIR | | |
| COMPANION B50-T20A: | | | | | |
| 5 | 28.05666 | 14.70410 | S-LAM54 | 1.75700 | 47.82 OHARA |
| 6 | −28.05666 | 6.87485 | SF4 | 1.75520 | 27.58 SCHOTT |
| 7 | 49.05478 | 9.93965 | AIR | | |
| IMAGE | INFINITE | | | | |

The companion B50-T20A has been drawn at 34 mm diameter in FIGS. 79 and 80, which seems adequate for general purpose use. I have chosen to design this companion with a back focal distance of 20% of the combination focal length. This seems to be a reasonable compromise between the competing goals of improved performance, which a shorter back focal length would provide, and enabling the widest variety of applications.

FIG. 81 compares the performances of the companion combinations of FIGS. 79 and 80 to the performance of a standard 50 mm focal length standard achromat, in the manner taught above. Here both of the primaries are used at their nominal, as supplied, physical aperture sizes. Clearly, both companion combinations have performances that far exceed that of the achromat. While they differ in detail, the performances of the two companion combinations are quite similar over most of the focal ratio range, showing that this companion meets the goal of being useable with a variety of primaries.

FIG. 82 compares the performances obtained when the B50-T20A companion is combined with the primary achromats of Examples 1 and 2 as well as a variety of additional primary achromats, all of 100 mm focal length. The performance curves are virtually identical at high focal ratios, they vary a little in the F/4.0 to F/2.0 region, and they vary significantly at low focal ratios. However, in every case, the performance of a companion combination using any of these primary achromats is much superior to the performance of an achromat (FIG. 81), at least for focal ratios lower than F/8.0 or so.

The performance curves for the CVI AAP-100-25.4 and Newport PAC052 primaries break down at a relative image illumination of 0.17 (F/2.43). This drop off is due to vignetting; the requirement that the transmission at the edge of the field be at least 80% limits the field of view of systems using these primaries. These lenses are the slowest ones in the list; they have aperture diameters of 25.4 mm, and are thus about F/4.0.

FIG. 83 illustrates an interesting property I have discovered about these two primaries, as well as other similar achromats. In FIG. 83, performance curves are plotted for companion combinations using these two primaries when their physical apertures have been opened up to their maximum feasible values, $A_{max}$. In this case, while these lenses provide relatively low performance at focal ratios larger than F/2.0, the resulting combinations can provide usable fields of view, at the 10 micron image quality criterion, to focal ratios lower than F/1.4! I have seen this same characteristic with other primaries and companions; it does appear to be due to a property of certain high focal ratio achromats.

FIG. 82 shows that the B50-T20A companion can be combined with a wide variety of achromats to achieve the benefits of better images, brighter images, or both. If the resulting optical system is to work at F/2.0 or larger, then the selection of the primary achromat will not, in general, have a major effect on the performance of the system. The primary does, however, need to be significantly faster than F/4.0 in order to avoid vignetting. In general terms, I consider the preferred range for the speed of the primary achromat for such uses to be between F/3.2 and F/2.5.

On the other hand, FIG. 82 also shows that if the resulting optical system is to have a focal ratio lower than F/2.0, then the selection of the primary achromat matters a great deal to the performance of the system. In fact, if the requirement is for a very high speed optical system, say exceeding a relative image illumination of 0.4 (i.e., F/1.58 or faster), then FIG. 83 shows that what one would ideally choose is a special primary, based on a design such as the CVI AAP-100-25.4 or the Newport PAC052, but with a physical aperture diameter that has been increased as compared to the diameter at which it is currently sold.

Companion combinations using companion embodiments 41 and 42, both of the general purpose companion class, are shown in FIGS. 84 and 85, and their construction details are shown in Tables 46 and 47. These are also buried surface companions using the same pair of glasses as embodiment 40. Note that I have given them developmental part numbers similar to that I used for embodiment 40.

TABLE 46

Construction of combination embodiment 41 at 25 mm focal length (FIG. 84).

| SURF | RADIUS | THICKNESS | MEDIUM | INDEX V-NUMBER |
|---|---|---|---|---|
| 0 | INFINITE | INFINITE | AIR | |
| ENTP | INFINITE | 41.52288 | AIR | |

TABLE 46-continued

Construction of combination embodiment 41 at 25 mm focal length (FIG. 84).

| SURF | RADIUS | THICKNESS | MEDIUM | INDEX | V-NUMBER |
|---|---|---|---|---|---|
| NEWPORT: PAC040 | | | | | |
| 2 | 34.61000 | 7.80000 | BAFN10 | 1.67003 | 47.11 SCHOTT |
| 3 | −21.46000 | 2.00000 | SF10 | 1.72825 | 28.41 SCHOTT |
| 4 | −232.9600 | 16.85200 | AIR | | |
| COMPANION B25-T20A: | | | | | |
| 5 | 15.97800 | 9.85800 | S-LAM54 | 1.75700 | 47.82 OHARA |
| 6 | −15.97800 | 3.67600 | SF4 | 1.75520 | 27.58 SCHOTT |
| 7 | 24.84700 | 5.03016 | AIR | | |
| IMAGE | INFINITE | | | | |

TABLE 47

Construction of combination embodiment 42 at 100 mm focal length (FIG. 85).

| SURF | RADIUS | THICKNESS | MEDIUM | INDEX | V-NUMBER |
|---|---|---|---|---|---|
| 0 | INFINITE | INFINITE | AIR | | |
| ENTP | INFINITE | 102.97154 | AIR | | |
| EDMUND: 45417 | | | | | |
| 2 | 118.81000 | 17.94000 | BK7 | 1.51680 | 64.17 SCHOTT |
| 3 | −96.37000 | 6.00000 | SF5 | 1.67270 | 32.21 SCHOTT |
| 4 | −288.97000 | 93.37600 | AIR | | |
| COMPANION B100-T10A: | | | | | |
| 5 | 55.42700 | 36.68800 | S-LAM54 | 1.75700 | 47.82 OHARA |
| 6 | −55.42700 | 20.00000 | SF4 | 1.75520 | 27.58 SCHOTT |
| 7 | 53.31600 | 10.02052 | AIR | | |
| IMAGE | INFINITE | | | | |

Embodiment 41 is combined with a 50 mm focal length primary to produce a 25 mm focal length system and is designed for back focal length of 20% of the system equivalent focal length. The primary specified in Table 46 is part number PAC040 from the Newport Corporation of Irvine, Calif. Embodiment 42 uses a 200 mm focal length primary to produce a 100 mm combination focal length, and the design back focal length is 10% of that combination focal length. The primary specified in Table 47 is part number 45417 from the Edmund Optics Co. of Barrington, N.J.

9. System Use of Companions

Achromats are rarely used in demanding infinite conjugate imaging applications because there are available from stock many multi-element lenses much better suited to this task. However, the situation is different for finite conjugate and image relay applications, especially those that are encountered in optical instrument design. The problems encountered by the optical system designer in these applications were summarized in the Description of Related Art above. It is here that the companion doublet comes into its own as an important tool for the optical system designer. As I will show, the companion doublet enables one to accomplish things that simply could not be done previously without resorting to custom lenses.

A. Symmetrical 1:1 Relays

Recall that FIGS. 6 and 7 depict the two ways that one might use a pair of identical achromats to form an image of a nearby object at a magnification of −1. In both cases the stop is located in the center of the symmetrical system, which automatically eliminates any coma, distortion, or lateral chromatic aberration from the image.

FIG. 86 depicts a similar symmetrical 1:1 relay system made up of 50 mm. focal length companion combinations placed on either side of a stop. Here I have used two of the systems that were shown in FIG. 79.

FIG. 87 compares the performances of the achromat relay systems depicted in FIGS. 6 and 7 using 50 mm. focal length lenses, to the performance of two different companion combination systems of the type depicted in FIG. 86. The two combination systems differ in which primary achromat has been used; these are the same two primaries that were considered earlier in conjunction with FIGS. 79 and 80.

All of the performance curves in FIG. 87 have been generated by allowing both the positions of the stop and the image viewing plane to be varied during optimization at each field and focal ratio; thus these curves refer to systems that may have varying overall lengths. The systems always remained symmetrical, however. Note that the ordinate of the chart is now field height rather than field angle.

As stated in FIG. 87, these performance curves once again apply to the case where σ' is 10 μm and where the transmission at the edge of the field of view is no less than 80%. Note that all the curves in FIG. 87 fall off faster at low focal ratios than they did in FIG. 81 since the spherical and longitudinal chromatic aberrations are doubled in these relay systems.

From FIG. 87, it is clear that in order to cover the "½ inch" CCD format with a relay consisting of two 50 mm. focal length standard achromats at a 10 micron image quality criterion, it would be necessary to use the High SA configuration of the achromats and to use a focal ratio no smaller than F/8. However, using the LAO126 primary achromat combined with the B50-T20A companion, one can cover the same format with the same quality image at a focal ratio of F/2.8; that is, one can obtain a factor of 8 times more light in the image.

The reader may have noticed that in FIG. 81 the performance curve for the LAO126 primary when used with the B50-T20A companion lies below the curve for the combination using the LAL017 primary at most focal ratios, and that the opposite is true is true in FIG. 87. The reason is simply that the coma of the LAO126 primary combination is higher than that of the LAL017 primary combination, reducing its relative performance in the infinite conjugate application. Since the coma is inherently canceled in the symmetrical 1:1 relay system, the smaller spherical aberration of the LAO126 primary combination then increases its performance relative to that of the LAL017 primary combination in that configuration.

While there do exist a few catalog multi-element 1:1 relay lenses that can be obtained from stock, these generally have the disadvantages of a limited range of available focal ratios and overall lengths. The good thing about archromats is their wide range of available focal lengths and diameters, as these can be easily combined to form relays of almost any required magnification, and over a wide range of focal ratios. As I will show, the companion also retains this flexibility, as well as providing better images and brighter images.

B. Non-Symmetrical Relays; Example A

Consider now a realistic optical design problem. Say that one is required to form an image of an object that is 4 mm high at a magnification of M=−0.56, that is, that the image is to have a height of 2.24 mm. Let's also say that the image must be formed at a focal ratio of F/2.2, and that the overall length (OAL) of the optical system must be between 150 and 200 mm.

It turns out that a good solution using achromats combines a 107 mm. focal length, 38.1 mm diameter achromat with a 60 mm. focal length, 30 mm diameter achromat as shown in FIG. 88. Its construction details are given in Table 48. I have placed the two achromats as close as I judge is convenient for mechanical purposes; here I allow a standard separation between the lens vertices of 2 mm. on the optical axis, and I place the stop at the center of this space.

TABLE 48

Construction of a close-coupled achromat relay,
M = −0.56, 4 mm. object height, F/2.2.

| SURF | RADIUS | THICKNESS | MEDIUM | INDEX | V-NUMBER |
|---|---|---|---|---|---|
| 0 | INFINITE | 100.56954 | AIR | | |
| 1 | INFINITE | 0.00000 | AIR | | |
| ROSS: AOC117 | | | | | |
| 2 | 213.86715 | 2.84500 | SF12 | 1.64831 | 33.84 SCHOTT |
| 3 | 43.53694 | 8.61100 | BAK1 | 1.57250 | 57.55 SCHOTT |
| 4 | −70.38288 | 1.00000 | AIR | | |
| STOP | INFINITE | 1.00000 | AIR | | |
| MELLES: LAO079 | | | | | |
| 6 | 39.49000 | 9.99000 | SK11 | 1.56384 | 60.80 SCHOTT |
| 7 | −27.80000 | 2.47000 | SF5 | 1.67270 | 32.21 SCHOTT |
| 8 | −100.93000 | 53.22467 | AIR | | |
| IMAGE | INFINITE | | | | |

The overall length of this system is 179.7 mm. When we examine the image we find that $(\sigma)$=20.3 microns and $\sigma'$=20.7 microns; recall that these are the image quality metrics defined in Equations (1) and (2).

As was depicted in FIG. 86 one can combine two companion combinations to form a relay of the needed magnification. Due to the overall length constraint, we choose to combine a 50 mm focal length companion combination with a 25 mm focal length companion combination to obtain approximately the correct magnification. We then adjust the spacing between the primaries and their companions, as well as the positions of the object and the image, to optimize the image quality at the specified magnification, field, and focal ratio.

FIG. 89 depicts the resulting companion combination relay (CCR) system, and Table 49 gives its construction details. Here the spacing at the stop has been chosen to be our minimum of 2 mm, giving a system of minimum overall length. The length of this system is 137.2 mm and its performance is $(\sigma)$=9.1 microns and $\sigma'$=9.8 microns.

TABLE 49

Non-symmetrical relay using 50 and 25 mm. nominal focal length companion combinations
M = −0.56, 4 mm. object height, F/2.2

| SURF | RADIUS | THICKNESS | MEDIUM | INDEX | V-NUMBER |
|---|---|---|---|---|---|
| 0 | INFINITE | 8.00000 | AIR | | |
| 1 | INFINITE | 0.00000 | AIR | | |

TABLE 49-continued

Non-symmetrical relay using 50 and 25 mm. nominal focal length companion combinations
M = −0.56, 4 mm. object height, F/2.2

| SURF | RADIUS | THICKNESS | MEDIUM | INDEX | V-NUMBER |
|---|---|---|---|---|---|
| COMPANION B50-T20A: | | | | | |
| 2 | −49.05478 | 6.87485 | SF4 | 1.75520 | 27.58 SCHOTT |
| 3 | 28.05666 | 14.70410 | S-LAM54 | 1.75700 | 47.82 OHARA |
| 4 | −28.05666 | 46.59749 | AIR | | |
| MELL: LAO126 | | | | | |
| 5 | 180.42999 | 2.50000 | SF5 | 1.67270 | 32.21 SCHOTT |
| 6 | 44.98000 | 6.23000 | SK11 | 1.56384 | 60.80 SCHOTT |
| 7 | −64.28000 | 1.00000 | AIR | | |
| STOP | INFINITE | 1.00000 | AIR | | |
| NEWP: PAC040 | | | | | |
| 9 | 34.61000 | 7.80000 | BAFN10 | 1.67003 | 47.11 SCHOTT |
| 10 | −21.46000 | 2.00000 | SF10 | 1.72825 | 28.41 SCHOTT |
| 11 | −232.96000 | 22.98875 | AIR | | |
| COMPANION B25-T20A: | | | | | |
| 12 | 15.97800 | 9.85800 | S-LAM54 | 1.75700 | 47.82 OHARA |
| 13 | −15.97800 | 3.67600 | SF4 | 1.75520 | 27.58 SCHOTT |
| 14 | 24.84700 | 4.00000 | AIR | | |
| IMAGE | INFINITE | | | | |

In optimizing the system of FIG. 89 and Table 49 I put constraints on the minimum values of the object and image distances, to guarantee that the resulting system would be feasible. Such constraints are additional criteria defining the specific application; other specific applications may have different constraints. It turns out that the system of Table 49 has taken on the minimum allowable values of both the object and image distances, 8 mm. and 4 mm. respectively. If these were allowed to get smaller, it is likely that the performance of the system would improve.

When the system of FIG. 89 is spaced apart in the region of the stop to obtain an overall length in the specified range of 150 to 200 mm., its performance improves. In fact, the performance of both systems improve when the overall length is increased within this range. When the systems were reoptimized using a criterion limiting the overall length to no more than 190 mm., the results shown in Table 50 were obtained. Here the position of the stop was allowed to vary; it was no longer located half way between the adjacent vertices of the achromats. In neither case was there significant vignetting at the edge of the field. The construction details of the two systems are provided in Tables 51 and 52.

TABLE 50

Characteristics of Two Relay Systems
M = −.56, 4 mm. object height, F/2.2

| System | OAL [mm.] | <σ> [μm] | σ' [μm] |
|---|---|---|---|
| 107 × 60 | 188.3 | 20.2 | 20.6 |
| CCR 50 × 25 | 188.4 | 5.8 | 6.1 |

TABLE 51

Spaced achromat relay system.

| SURF | RADIUS | THICKNESS | MEDIUM | INDEX | V-NUMBER |
|---|---|---|---|---|---|
| 0 | INFINITE | 100.63120 | AIR | | |
| 1 | INFINITE | 0.00000 | AIR | | |
| ROSS: AOC117 | | | | | |
| 2 | 213.86715 | 2.84500 | SF12 | 1.64831 | 33.84 SCHOTT |
| 3 | 43.53694 | 8.61100 | BAK1 | 1.57250 | 57.55 SCHOTT |
| 4 | −70.38288 | 1.00000 | AIR | | |
| STOP | INFINITE | 9.49923 | AIR | | |
| MELLES: LAO079 | | | | | |
| 6 | 39.49000 | 9.99000 | SK11 | 1.56384 | 60.80 SCHOTT |
| 7 | −27.80000 | 2.47000 | SF5 | 1.67270 | 32.21 SCHOTT |
| 8 | −100.93000 | 53.20594 | AIR | | |
| IMG | INFINITE | | | | |

TABLE 52

Spaced companion combination relay (CCR) system.

| SURF | RADIUS | THICKNESS | MEDIUM | INDEX | V-NUMBER |
|---|---|---|---|---|---|
| 0 | INFINITE | 9.26027 | AIR | | |
| 1 | INFINITE | 0.00000 | AIR | | |
| COMPANION B50-T20A: | | | | | |
| 2 | −49.05478 | 6.87485 | SF4 | 1.75520 | 27.58 SCHOTT |
| 3 | 28.05666 | 14.70410 | S-LAM54 | 1.75700 | 47.82 OHARA |
| 4 | −28.05666 | 41.50043 | AIR | | |
| MELL: LAO126 | | | | | |
| 5 | 180.42999 | 2.50000 | SF5 | 1.67270 | 32.21 SCHOTT |
| 6 | 44.98000 | 6.23000 | SK11 | 1.56384 | 60.80 SCHOTT |
| 7 | −64.28000 | 34.38896 | AIR | | |
| STOP | INFINITE | 22.44989 | AIR | | |
| NEWP: PAC040 | | | | | |
| 9 | 34.61000 | 7.80000 | BAFN10 | 1.67003 | 47.11 SCHOTT |
| 10 | −21.46000 | 2.00000 | SF10 | 1.72825 | 28.41 SCHOTT |
| 11 | −232.96000 | 23.11047 | AIR | | |
| COMPANION B25-T20A: | | | | | |
| 12 | 15.97800 | 9.85800 | S-LAM54 | 1.75700 | 47.82 OHARA |
| 13 | −15.97800 | 3.67600 | SF4 | 1.75520 | 27.58 SCHOTT |
| 14 | 24.84700 | 4.00000 | AIR | | |
| IMAGE | INFINITE | | | | |

C. Non-Symmetrical Relays; Example B

In this example, one is required to form an image at the same magnification as before, M=−0.56, but in this case the object is 7.14 mm high and the focal ratio is F/3.5. This object height and magnification correspond to an image height of 4 mm; that is, we must cover the diagonal of a ½ inch CCD imager. An additional requirement in this example is that there must be 120 mm. of collimated working space between the two sections of the relay. The reason for this will soon become clear.

Using the same combinations of lenses as were used in Example A, we generate the preliminary designs depicted in FIGS. 90 and 91.

The performance characteristics of these systems are compared in Table 53. The advantage of the 50×25 CCR over the achromat relay is smaller than it was for Example 1, but it is still significant. The construction details of these two systems are provided in Tables 54 and 55. Once again, we see that the image, distance in the CCR has taken its assumed minimum allowable value.

TABLE 53

Characteristics of Two Relay Systems
M = −.56, 7.14 mm. object height, F/3.5

| System | OAL [mm.] | <σ> [μm] | σ' [μm] |
|---|---|---|---|
| 107 × 60 | 296.6 | 26.3 | 28.3 |
| CCR 50 × 25 | 245.3 | 10.7 | 12.4 |

TABLE 54

Construction of achromat relay system having 120 mm. of collimated working space.

| SURF | RADIUS | THICKNESS | MEDIUM | INDEX | V-NUMBER |
|---|---|---|---|---|---|
| 0 | INFINITE | 99.07416 | AIR | | |
| 1 | INFINITE | 0.00000 | AIR | | |
| ROSS: AOC117 | | | | | |
| 2 | 213.86715 | 2.84500 | SF12 | 1.64831 | 33.84 SCHOTT |
| 3 | 43.53694 | 8.61100 | BAK1 | 1.57250 | 57.55 SCHOTT |
| 4 | −70.38288 | 109.00921 | AIR | | |
| STOP | INFINITE | 10.99079 | AIR | | |
| MELLES: LAO079 | | | | | |
| 6 | 39.49000 | 9.99000 | SK11 | 1.56384 | 60.80 SCHOTT |
| 7 | −27.80000 | 2.47000 | SF5 | 1.67270 | 32.21 SCHOTT |
| 8 | −100.93000 | 53.65655 | AIR | | |
| IMG | INFINITE | | | | |

TABLE 55

Construction of CCR system having 120 mm. of collimated working space.

| SURF | RADIUS | THICKNESS | MEDIUM | INDEX | V-NUMBER |
|---|---|---|---|---|---|
| 0 | INFINITE | 10.63865 | AIR | | |
| 1 | INFINITE | 0.00000 | AIR | | |
| COMPANION: B50-T20A: | | | | | |
| 2 | −49.05478 | 6.87485 | SF4 | 1.75520 | 27.58 SCHOTT |
| 3 | 28.05666 | 14.70410 | S-LAM54 | 1.75700 | 47.82 OHARA |
| 4 | −28.05666 | 33.19783 | AIR | | |
| MELL: LAO126 | | | | | |
| 5 | 180.42999 | 2.50000 | SF5 | 1.67270 | 32.21 SCHOTT |
| 6 | 44.98000 | 6.23000 | SK11 | 1.56384 | 60.80 SCHOTT |
| 7 | −64.28000 | 74.79171 | AIR | | |
| STOP | INFINITE | 45.20829 | AIR | | |
| NEWP: PAC040 | | | | | |
| 9 | 34.61000 | 7.80000 | BAFN10 | 1.67003 | 47.11 SCHOTT |
| 10 | −21.46000 | 2.00000 | SF10 | 1.72825 | 28.41 SCHOTT |
| 11 | −232.96000 | 23.80482 | AIR | | |
| COMPANION B25-T20A: | | | | | |
| 12 | 15.97800 | 9.85800 | S-LAM54 | 1.75700 | 47.82 OHARA |
| 13 | −15.97800 | 3.67600 | SF4 | 1.75520 | 27.58 SCHOTT |
| 14 | 24.84700 | 4.00000 | AIR | | |
| IMAGE | INFINITE | | | | |

The reason for the 120 mm. working space requirement becomes clear when one views FIG. 92, which is a perspective view of the 107×60 system in its near final form. To meet mechanical constraints the system has been folded, and a beamsplitter has been used to form two images of the object in different wavelength bands or in different polarizations, or both. The image sizes listed in Table 53 are for white light, i.e., over the CdF band; if the two arms of the system have different spectral responses, then they will in general have different image sizes and the improvement offered by the CCR may either increase or decrease.

Note that there is plenty of space left in the collimated region of the system to place any spectral filters that are necessary. The presence of the beamsplitter does not significantly affect the image quality (assuming that it is well made), but it does add to the overall length of the system in a manner which will be familiar to anyone skilled in the art.

The CCR 50×25 version of the folded system, in cross-sectional view, is shown in FIG. 93. In addition to its better performance, this system has the possible advantage of requiring a smaller beamsplitter. However, the associated higher angle of the chief ray of the off axis point could be a disadvantage in those applications which have strigent spectral filtering requirements. If the application can accept a somewhat longer system overall length, then one could combine a 100 mm. F.L. companion combination with a 50 mm. F.L. companion combination to both improve the imaging performance even further and to reduce the ray angles in the collimated region. An example is depicted in cross-section in FIG. 94, and its construction (before folding) is detailed in Table 56. Its characteristics are: OAL=415.0 mm. (before the beamsplitter is added), (σ)=4.1 µm, σ'=4.4 µm.

TABLE 56

Construction of a longer CCR having 120 mm. of working space.

| SURF | RADIUS | THICKNESS | MEDIUM | INDEX | V-NUMBER |
|---|---|---|---|---|---|
| 0 | INFINITE | 10.76330 | AIR | | |
| 1 | INFINITE | 0.00000 | AIR | | |
| COMPANION B100-T10A: | | | | | |
| 2 | −53.31600 | 20.00000 | SF4 | 1.75520 | 27.58 SCHOTT |
| 3 | 55.42700 | 36.68800 | S-LAM54 | 1.75700 | 47.82 OHARA |
| 4 | −55.42700 | 106.62990 | AIR | | |
| EDMUND: 45417 | | | | | |
| 5 | 288.97000 | 6.00000 | SF5 | 1.67270 | 32.21 SCHOTT |
| 6 | 96.37000 | 17.94000 | BK7 | 1.51680 | 64.17 SCHOTT |
| 7 | −118.81000 | 58.63270 | AIR | | |
| STOP | INFINITE | 61.36730 | AIR | | |
| MELLES: LAO126 | | | | | |
| 9 | 64.28000 | 6.23000 | SK11 | 1.56384 | 60.80 SCHOTT |
| 10 | −44.98000 | 2.50000 | SF5 | 1.67270 | 32.21 SCHOTT |
| 11 | −180.42999 | 62.28956 | AIR | | |

TABLE 56-continued

Construction of a longer CCR having 120 mm. of working space.

| SURF | RADIUS | THICKNESS | MEDIUM | INDEX | V-NUMBER |
|------|--------|-----------|--------|-------|----------|
| COMPANION B50-T20A: | | | | | |
| 12 | 28.05660 | 14.70410 | S-LAM54 | 1.75700 | 47.82 OHARA |
| 13 | −28.05660 | 6.87485 | SF4 | 1.75520 | 27.58 SCHOTT |
| 14 | 49.05478 | 4.40988 | AIR | | |
| IMAGE | INFINITE | | | | |

Clearly the 200 mm. focal length primary has a much larger diameter than needed for this example, and if this were an actual project, one would most likely choose a slower primary and recompute the design.

D. Image Relays

To this point, we have been assuming that the object being imaged is opaque and is either emitting or reflecting light. In such applications, one has control over where the aperture stop of the system is located and one will generally locate it where it gives the best results.

However, a large class of applications involves modifying an image which has already been formed by an existing optical system. Often such applications arise when one needs to change the size and/or location of the image formed by an existing optical system to better match a new image sensor. These applications differ from those we have considered in that the location of the stop is determined by the existing optical system, and we must accommodate that stop position while relaying the image.

In an image relay application, the exit pupil of the existing optical system becomes the entrance pupil of the relay system. Thus, we are interested in the characteristics of a relay system as a function of the position of its entrance pupil. As an example, we will compare the characteristics of the 107×60 close coupled relay of FIG. 88 to those of the close-coupled CCR 50×25 shown in FIG. 89 as the entrance pupil position is varied.

Recall that in those close-coupled systems, the stop was placed in the middle of a 2 mm airspace between the two sections of the relay. For the achromat 107×60 system, this stop position leads to an entrance pupil position nearly at the same pace, since the stop is very close to the 107 mm F.L. lens, and by definition, the entrance pupil is the image of the stop as seen from the object. Thus, with respect to the object we are relaying, the entrance pupil is located +108.9 mm, that is, on the image side of the object at a distance of 108.9 mm. We will use the object as the reference for the entrance pupil position since that is a convenient reference for the exit pupil location of any existing optical system.

FIG. 95 depicts the changes to the 107×60 system which occur as the entrance pupil position is changed to several different values, while maintaining the same object height, magnification, and focal ratio at the final image. In this system, the only things that are allowed to vary to optimize the system at each entrance pupil position are the object and image distances. One can easily see that when the entrance pupil position gets far from its nominal location, the vignetting gets large and the image gets poor.

A similar series of drawings for the CCR 50×25 system is shown in FIG. 96. In this case, at the nominal setup of the relay the entrance pupil is at +168.4 mm, thus the +200 case is almost identical to the nominal setup that was shown in FIG. 89.

The imaging performances of the two alternatives are compared in FIG. 97. Clearly, the stability of the image size with entrance pupil position is another great advantage of companion combination relays over achromat relays. Note also that the image is not vignetted with the CCR at any position of the pupil over the range shown, whereas as one can see from FIG. 95, the achromat relay has significant vignetting over most of the range.

E. Performance VS. Magnification in Non-symmetrical Relays

The previous examples have shown that a companion combination relay works much better than an achromat relay at a specific magnification, M=−0.56, that is not equal to the ratio of the nominal focal lengths of its constituent companion combinations. This fact, by itself, probably would not be a surprise to anyone skilled in the art, but one would also expect that the CCR would work much better if the magnification were equal to that ratio.

FIG. 98 depicts the performance of the 50×25 CCR as a function of the magnification of the relay for the conditions of the previous relay examples, as well as for a third example. In the third example, the relay is adjusted to its optimum separation for each magnification, that is, with no constraint on the overall length of the system. In FIG. 98 the ordinate of the chart is $\sigma'$ divided by the paraxial image height, $|M*h_o|$. This dimensionless ratio is the blur expressed as a fraction of the height of the image, i.e., the angular blur, and by using it we can directly compare the performances of systems with different object heights and different magnifications.

In all cases the curves reach a minimum near the nominal ratio of the companion combination focal lengths, but these minima are broad. There is no great increase in performance as M approaches the ratio of the companion combination focal lengths; instead the CCR is very tolerant of changes in magnification. This is a surprise.

FIG. 99 shows similar results for relays using two of the B50-T20 companions, at magnifications near unity. We see the same sort of characteristic: a broad minimum in the fractional blur as a function of magnification.

This is a surprising, important, and, I believe, unprecedented result. The fact that companion combination relays can provide high performance imaging over broad ranges of system magnification has major implications. Since the primary use of companion combinations will be in relays, it means that many fewer companions are required to address a given range of applications than one would have expected. This is a major advantage to a practical product line.

For instance, one might decide from FIGS. 98 and 99 to expect any given pair of companion combinations to handle magnification variations of up to ±20% from the nominal. This suggests using a geometric series in companion combination focal lengths. For instance, one could limit the product line to companions having combination focal lengths differing by ratios of √2. An example of such a set would be 12.5, 17.7, 25, 35.4, 50, 70.7, 100, 140, 200. With this set, the vast majority of applications requiring combination focal lengths between 10 mm. and 240 mm. could be handled by just 9 companions.

F. Variation of Combination and Primary Focal Lengths

The focal length of the companion combination varies when the spacing between its components varies. It is this variation in focal length that allows one to achieve a given magnification in a relay when the object and image distances are constrained. Thus, in the relay results discussed above, the focal lengths of the companion combinations are changing as the relay magnifications are changing. This change in focal length of the companion combination can equivalently be considered as a change in the magnification at which a given companion is being used.

It turns out that companions can be very tolerant of changes in focal length, both the focal length of the combination and the focal length of the primary. The main application for this characteristic is variable magnification relays, as discussed above, but I have found that important insights can be gained by examining this issue further.

Consider FIG. 100. This depicts the performance of three different setups of a particular companion combination at three different image quality criteria. The companion combination being used is an early version of embodiment 40A that has nearly equal curvatures on both sides of its crown element rather than precisely equal curvatures as does embodiment 40A. In this case, the combination has been adjusted to focal lengths of 45 mm and 55 mm, as well as the nominal 50 mm. (Equivalently, the operating magnification of the companion has been changed to 0.45 and 0.55, from the nominal 0.50.) The performance criteria here are several values of σ' divided by the combination focal length (EFL). Thus, the performance criterion being used here is the angular blur in the image, and this allows one to directly compare the performances of the systems of different focal lengths.

The system having the nominal focal length is the best under the majority of conditions plotted, but notice that the performances of the systems with focal lengths 10% away from nominal are also good. In fact, the performance of the combination having a focal length 10% longer than nominal is only a little worse than the nominal system. The performance when the combination is adjusted to have a focal length 10% shorter than nominal is considerably worse than the other two.

The focal length (EFL) of the combination is increased when the companion is moved away from the primary. Thus the back focal length (BFL) of the long focal length system is smaller than the back focal length of the nominal system. The paraxial values of the back focal length for these systems are: EFL 45 mm-BFL 12.97 mm; EFL 50 mm-BFL 10.03 mm; EFL 55 mm-BFL 7.10 mm. Thus, the EFL of a companion combination can sometimes be changed with little change in performance (as judged by the angular blur) when the BFL is reduced at the same time.

FIG. 101 shows a similar plot of performance at different combination focal lengths when the primary is changed to have a focal length of 107 mm, rather than the nominal 100 mm. As was implicit in some of the previous discussions, I have found that the differences in characteristics of various primary achromats can lead to changes in the performance curve. Therefore, to avoid that effect here, I created a synthetic 107 mm focal length primary by simply scaling the original primary.

In FIG. 101 the combination focal length corresponding to use of the companion at its nominal magnification of 0.5 is 53.5 mm. Note that the performance is best at this focal length. Note also that, once again, the performance falls off faster as the EFL gets shorter than it does as the EFL gets longer. In this case the back focal lengths are: EFL 50.5 mm-BFL 11.70 mm; EFL 53.5 mm-BFL 10.05 mm; EFL 56.5 mm-BFL 8.41 mm. Another thing to notice here is that the performance of the long primary system at its optimum focal length is actually a little superior to the performance of the nominal system at σ'/EFL=0.0001.

Analogous results with a shorter than nominal primary are shown in FIG. 102. Here the best results occur at EFL=47.5 mm, a little longer than half the primary focal length of 93 mm. In fact, I found that the performance is almost identical at 47.5 mm focal length and 50 mm focal length; thus with short focal length primaries I find that the optimum focal length tends to remain close to the original focal length (equivalently, that the operating magnification of the companion wants to increase). Note that we do, however, see the same effect of the performance falling off much more rapidly when the EFL is made shorter than optimum than it does when the EFL is longer than optimum. In this case the back focal lengths are: EFL 45 mm-BFL 11.00 mm; EFL 47.5 mm-BFL 9.42 mm; EFL 55 mm-BFL 4.69 mm. Note also that in this case, the performance of the combination with the short focal length primary is actually superior to that of the nominal combination at σ'/EFL=0.0004.

There are several implications of these data. First, if one is trying to achieve the highest possible performance under conditions where a small image blur is feasible, then one should try using a longer than nominal focal length primary in the companion combination. I was able to verify that this works in practice. For an F/2.5 system with a 3 degree semi-field, I found that using the original 100 mm focal length primary I achieved σ'=5.9 microns, while when I replaced the primary with a Ross Optical L-AOC218 (115 mm focal length) I got σ'=5.0 microns at an EFL of 55 mm. The improvement in angular image blur was therefore 23%. The back focal length of the system increased from 9.92 mm to 11.25 mm at the same time.

Secondly, if a particular system needs just a little more back focal length, one can try using a longer focal length primary. Finally, if one is trying to achieve the highest possible performance under conditions where the image blur is relatively large, then one can try using a shorter than nominal primary focal length. This latter condition will almost certainly require that one accept a considerably shorter than nominal back focal length, however.

G. Coordinated Groups of Companions

Above I described a group of related companions. I was describing a group of companions that are made with similar characteristics but that are intended to cover a continuous range of focal lengths with adequate performance at every focal length in the range. I call this a coordinated group of companions. I envision that coordinated groups could be supplied having different characteristics, such as different fractional back focal lengths, or optimized using different performance criteria.

As I have shown, a coordinated group of companions makes it straightforward to implement high performance relays at any desired magnification. While I consider it a less compelling application, a coordinated group also enables a user to implement combination lenses for infinite or near-infinite conjugates for any desired focal length. By definition a coordinated group of companions will contain a number of companions having different nominal combination focal lengths. The companions in the group may or may not all have the same nominal operating magnification. In any case for every companion the nominal combination focal length divided by the nominal operating magnification gives a nominal correctable focal length. This is the nominal focal length of the primary that is intended to be used with that companion.

As discussed above, an individual companion need not be used with a primary having exactly the nominal correctable focal length; it only need be used with a primary having a focal length within an effective range of the nominal correctable focal length. As I have shown, it is reasonable to expect that a focal length within 20% of the nominal primary focal length will be quite useable.

Generally, a user having a requirement for a particular combination focal length would start by choosing the companion that has a nominal combination focal length closest to that required. The user would then try a primary of either the nominal correctable focal length, or perhaps a primary either a little longer or a little shorter than nominal as discussed in the previous section and would adjust the combination to the required combination focal length. If time were available, a skilled user might do a search over a larger range of primaries to fully optimize the combination system for the user's specific requirements.

Of course, it is possible to provide any two of the three pieces of information, combination focal length, companion magnification, and nominal primary focal length, to the user to achieve the same results as just described. And, as I have stated repeatedly, there is real value to the user in providing the complete design structure of the companions so that the user can investigate fully optimizing the design of his or her system.

The existence of a coordinated group of companions makes possible what amounts to a new method of supplying optical systems to users of stock lenses. This method is implicit in the discussion I have just presented. One key to the method is that the supplier must teach the user how to select and employ companions from the group to meet the user's needs. For the most skilled users, the explanations already provided together with the design structures of the individual companions will be all the teaching required. For less skilled users, one can envision providing a number of examples of pre-designed systems, as well as tutorial material in the areas of optical design, alignment and testing of optical systems, etc. Another thing that I expect users to value will be example combination systems already set up as lens files suitable for use with various currently popular optical design software.

10. Definitions

A. The Companion

A companion can more generally be called a field corrector lens or a field compressor/corrector lens. (I also call it an image improving lens.) The companion acts to reduce the size of (compress) the image formed by the primary and also acts to correct aberrations of that image so that the combination can be used at both higher field angles and lower focal ratios than can the primary alone. To be useful, the performance of the companion combination must be better than the performance of a version of the primary lens which is scaled to the focal length of the companion combination. To provide good transmission at the edges of intermediate fields of view, I have found that the physical aperture diameters ($2 A_{mfg}$, see FIG. 9) of companions should be at least 10% of the primary focal length.

A companion is a doublet, formed from a positive focal length element disposed adjacent to a negative focal length element. By "adjacent" I simply mean that there is no intervening optical element; the companion could be airspaced. The companion itself may have a focal length that is positive or negative, or the companion may even have zero optical power. While the companion always acts to compress the image formed by the primary lens, it is possible for a thick companion to do so without itself having a positive focal length.

The primary range of interest for the focal lengths of companion combinations is between 10 mm and 250 mm, with an extended range of interest being 5 mm to 500 mm. The geometric mean of these ranges is 50 mm, which is why so many of my embodiments have been shown at 50 mm combination focal length. As stated previously, theoretically, any lens can be scaled to any focal length simply by multiplying all curvatures and thicknesses by the same factor; however, the scaled result tends to become impractical if the scaling factor becomes too large or small. The geometric mean focal length is valuable as a representative focal length for the companion because it minimizes the scaling factor needed to reach the ends of the focal length range.

In order for a lens to be useful as a companion, the lens supplier must either specify the nominal focal length of the primary that it is meant to correct (the "nominal correctable focal length") or provide its complete design structure so that the user can determine how to make use of it. (One could also supply the magnification of the companion and the focal length of the combination optical system; this amounts to implicitly defining the focal length of the primary as the ratio of the focal length of the combination to the magnification of the companion.) Generally, with commercial two-element correctors meant for use with telescopes, neither of these data are provided. It is evidently assumed that the corrector will work "well enough" over the range of focal lengths of telescopes that amateur astronomers are likely to be using. With more elaborate commercial correctors, the specific matching primary is generally specified and nothing is said about whether or not the corrector will work with other telescopes having the same focal length. Complete design information is never supplied for commercial correctors.

If the complete design structure for the companion is not supplied to the user, then the supplier must also provide a setup parameter, so that the user can make use of the companion. The setup parameter could be the final image distance (back focal length) as I have listed it in the many tables above. Alternatively, the setup parameter could be either a primary to companion distance (typically the airspace between them) or it could be a companion object distance. The companion (corrector) object distance is the distance between a specified plane on or within the companion and the image formed by the primary itself. When supplying only either of these latter two parameters, of course, the supplier is making it more difficult for the user to use the companion with anything other than the primary suggested by the supplier.

B. Correcting a Field Aberration

As explained in detail above, the purpose of the companion is to improve the usefulness of standard achromatic doublets for constructing optical systems which operate in the focal ratio range from about F/8 to about F/1.5 over intermediate fields of view (2 to 10 degrees semi-field) or extended intermediate fields of view (fields up to 15 degrees half angle). In these ranges, the aberrations of achromatic doublets which dominate their performance are the field aberrations astigmatism, field curvature, coma and lateral chromatic aberration. (I am not concerned with distortion, since it can be easily handled with image processing these days, if necessary.) In my view, the merit of a lens operating at some point within this range of conditions is determined by the total effect of these field aberrations, and it is not necessary to distinguish between them. In fact, the performance of a given companion combination is likely to be dominated by different specific field aberrations, depending on what focal ratio and field of view is actually being used in a particular application.

In the claims, I refer to the companion as a field correcting lens because that is the most general description of what it does. When I say "adapted to correct a field aberration" of a primary lens, what I mean is that the limiting field angle, for image qualities between 5 microns and 40 microns average RMS spot, is increased, at least somewhere over the focal ratio range between F/8 and F/1.5, over the use of the primary lens itself, when that primary lens is scaled to the focal length of the combination of the companion and the primary. When I say "well adapted to correct a field aberration" of a primary lens, what I mean is that the limiting field angle of the combination of primary and companion exceeds the limiting field angle of Walker's simulated Petzval (when it is scaled to the same combination focal length) at least somewhere over the focal ratio range between F/8 and F/1.5, for at least one image quality of the set 5, 10, 20, and 40 microns average RMS spot. When I say "exceedingly well adapted to correct a field aberration" of a primary lens, what I mean is that the limiting field angle of the combination exceeds that of Walker's simulated Petzval for every focal ratio between F/8 and to the limit where Walker's limiting field angle drops below 2 degrees, for at least one image quality of the set 5, 10, 20, and 40 microns average RMS spot. When I say "average RMS spot" here, I mean to include quantities calculated using either of Equations (1) or (2).

11. Properties of Standard Achromats

A. Properties of Achromats; Definition of "Common Aplanat"

As previously stated, an achromat is a lens in which the chromatic aberration has been corrected. An example of exactly what this means is depicted in FIG. 103. In that Figure, the focal length of the example achromat of FIG. 1 is plotted as a function of wavelength. Here we see that the focal length varies only slightly with wavelength over the visible region (400 to 700 nm) but that it varies rather rapidly outside the visible region, especially in the blue. Note that the focal length is not perfectly constant even over the visible region, and that there is a minimum focal length. For this particular lens, wavelength at which the focal length is a minimum is approximately 520 run, and is marked with a tick on the curve of FIG. 103. Note also that for every wavelength (over most of the range shown) other than at the minimum wavelength, there is a second wavelength at which the focal length of the lens has the same value.

I will refer to the wavelength of minimum focal length of an achromat as $\lambda_{min}$, and this is one of the key parameters that I use to characterize the properties of an achromat.

Also as previously stated, the other key aberrations that can be controlled by the design of an achromat are spherical aberration and coma. As is well-known by those skilled in the art, these aberrations are referred to as "third-order" or "Seidel" aberrations, and their values can be calculated from the curvatures, thicknesses and refractive indices of the glass elements making up the achromat. The equations which are used to calculate these aberrations are sometimes referred to as the "surface contribution" equations, and are straightforward but rather lengthy. Various authorities use somewhat different forms of these equations; the ones I use are those presented by Warren J. Smith in *Modern Optical Engineering*, Third Ed., © 2000, McGraw-Hill. In that book, the surface contribution equations are presented in Section 10.8, pages 328 to 332, which information is incorporated herein by reference.

The transverse third order spherical aberration of the example achromat is plotted as a function of wavelength in FIG. 104. 1 refer to this quantity as SA3; it is the same quantity the Smith reference refers to as "ΣTSC". Since the spherical aberration of a lens depends upon the focal ratio, the F/No. has been chosen to be F/4. We see that the spherical aberration is a strong function of wavelength, thus when characterizing the spherical aberration of an achromat it is important to specify the wavelength being used. Note that for this particular lens, the spherical aberration becomes zero at approximately 390 nm, and that it is negative throughout the visible.

The transverse tangential third order coma of the example achromat is plotted as a function of wavelength in FIG. 105. I refer to this quantity as CO3; it is the same quantity the Smith reference refers to as "3ΣCC". Since the coma of a lens depends on both the focal ratio and the field angle, the F/No. has been chosen to be F/4 and the field angle has been chosen to be 1 degree. The coma also depends on the position of the stop and I choose to characterize the coma of lenses with the stop "in contact". Just as before we see that the aberration is a strong function of wavelength and that it is important to specify the wavelength being used when discussing the coma of a lens. For this lens, the coma is zero at a wavelength of about 380 nm, and it is positive throughout the visible.

I have found it useful to express the optical properties of achromats in terms of a parameter I call the "inverse limiting F/No.", or ILFN. The definition of ILFN is simply:

$$ILFN = \frac{2A_{max}}{EFL}$$

where $A_{max}$ was previously defined in Section 2.

As previously stated, commercial achromats are generally designed to exhibit low spherical aberration and low coma with the stop in contact; that is, they are substantially Atlanta. It will be understood by those skilled in the art that when we say that the spherical aberration of a lens is designed to be low, that the designer will have considered the effects of higher order spherical aberrations as well as the effects of third order spherical aberration. The third order spherical aberration plotted in FIG. 104 does not necessarily give a complete picture of the spherical aberration of a given lens. It is a common practice for the lens designer to "balance" the effects of third order spherical against the effects of higher order spherical aberrations to obtain the best overall result. Thus one would not expect a lens designed for low spherical aberration to necessarily show zero third order spherical aberration. In fact, one would expect that the third order spherical aberration of a lens would be a function of its aperture, since the spherical aberration varies rapidly with lens aperture, and since higher order aberrations become more severe rapidly as the aperture of a lens is increased. I will now make these concepts precise and quantitative.

I have characterized the optical properties of a large number of commercially available achromats, using the lens catalog data provided by various vendors to the ZEMAX optical design software program. To perform this characterization, I first determined the wavelength of minimum focal length, $\lambda_{min}$, for each achromat and then determined the third order spherical aberration, SA3, and the third order coma, CO3, for each at its wavelength of minimum focal length. In doing this I used a focal ratio of F/20 and a field angle of 1 degree, and I placed the stop in contact with the first surface of the lens. (I used that high focal ratio to ensure that any achromat in the list would have sufficient aperture to make the calculated values meaningful.)

To make these data comparable from lens to lens, I divided the transverse aberrations by the focal length at minimum wavelength ($f_{min}$) in each case to create the scaled angular aberrations:

$$SSA3 = 10000 \frac{SA3(\lambda_{min})}{f_{min}} \quad (3)$$

$$SCO3 = 10000 \frac{CO3(\lambda_{min})}{f_{min}}$$

I used a scaling factor of 10,000 to make the resulting numbers more convenient to work with.

After removing a few achromats for which the available data seemed doubtful and a few others for which the data showed that the lenses were not truly achromats, at least over the wavelength range between 300 and 1500 nm, I was left with a list of 1299 standard achromatic lenses. All of these are cemented doublets; there are a few commercially available air-spaced doublets that I did not include in the analysis. Not all of these 1299 lenses were unique; in fact, it was a little surprising how many of the catalogs list lenses having the exact same designs. However, I decided not to eliminate the duplicate lenses from the list because it seems to me likely that lenses that are listed in multiple catalogs are more likely used in larger quantities, and my goal was to characterize the properties of these lenses as, in some sense, weighted by their usefulness.

I found that the wavelengths of minimum focal length for the catalog lenses ranged from 350 nm to 1190 nm. I also found that the scaled spherical aberration, SSA3, of the lenses varied from −0.55 to +0.083. More importantly, I found that the vast majority of lenses exhibit SSA3 values that are contained within a much smaller range, and in fact, that there exists a relationship between the inverse limiting F/No. of a standard achromat and its scaled spherical aberration, just as one would have expected from the balancing of third and higher order spherical aberrations.

FIG. 106 shows the relationship between ILFN and SSA3. In FIG. 106 each point represents the properties of an individual catalog cemented achromat, although as previously stated, some of the lenses appear more than once on the list, so that some points represent more than one catalog item. From the Figure it is clear that the vast majority of the lenses follow a trend in which the third order spherical aberration decreases as the limiting aperture (hence, ILFN) of the lens increases. Accordingly, I have defined a trend line and a trend region as shown in FIG. 106. The trend region between the two solid lines contains 90.0% of the lenses on the original list and is defined by:

$$y = -0.065544 ILFN + 0.004956 \quad (4)$$

$$y - 0.02 < SSA3 < y + 0.02$$

The trend line is given by the first equation in (4) and is shown as the dashed line on the Figure. This trend line and trend region define what I mean by effectively "zero" spherical aberration.

In a similar manner, although the scaled coma, SCO3, of the catalog cemented achromats varies from −3.2 to +0.18, I found that the vast majority of the lenses exhibit values of coma covering a much smaller range. In this case, it turns out that the scaled coma is independent of the aperture of the lens. Accordingly, FIG. 107 shows a histogram of SCO3 for the standard achromats. Based on this histogram, I have chosen to define the range of coma defined by:

$$-0.1 < SCO3 < +0.05 \quad (5)$$

as being effectively "zero" coma. It turns out that 93.1% of the lenses in the original list meet this criterion.

Together, these two criteria define what I mean by "effectively Atlanta". A lens is effectively Atlanta if it meets the equation and inequality defined for third order spherical aberration (4) and also meets the inequality defined for third order coma (5). In both cases the lens is characterized at the wavelength where it exhibits its minimum focal length and at a focal ratio of F/20 (at that wavelength). In the case of coma the stop is taken "in contact" with the first surface of the lens and at a field angle of 1 degree.

I further define any standard cemented achromat that is effectively aplanatic as has just been defined to be a "common aplanat". FIG. 108 shows the limits of the scaled third order spherical aberration of common aplanats as a function of their fundamental apertures, along with points representing the characteristics of the catalog lenses which fulfill the requirements to be common aplanats. It happens that 86.7% of the original list of catalog cemented achromats are effectively aplanatic, and thus are common aplanats.

Note that air-spaced achromats can also be effectively aplanatic, just as long as they fulfill the two requirements (4) and (5).

B. The Structural Characteristics of Common Aplanats

I have found that a physical structural characteristic of common aplanats can be conveniently expressed in terms of their crown-air curvature, CVCA, (surface 32 in FIG. 9) as related to their flint-air curvature, CVFA, (surface 36 in FIG. 9). In particular, I use scaled curvatures, defined as the product of the curvature of the surface with the focal length of the lens at $\lambda_{min}$. The structural characteristics of the common aplanats that were shown in FIG. 108 are depicted in FIG. 109, where the scaled flint-air curvature is plotted against the scaled crown-air curvature and where each dot represents the structure of each unique lens. One can easily see that all of the common achromats are contained within a small region of the scaled curvature plane.

Also depicted in FIG. 109 is the boundary of the region that I call the "common aplanat region". This region is defined by the points in Table 57.

TABLE 57

| Boundary points defining the common aplanat region. | |
| --- | --- |
| CVCA * $f_{min}$ | CVFA * $f_{min}$ |
| 2.1964 | −0.3358 |
| 1.4759 | −1.0563 |
| 1.0251 | −0.6055 |
| 1.7456 | 0.1150 |

For air-spaced achromats I define the structural characteristic in the same way, taking the curvature of the external crown-air surface to be CVCA and the curvature of the external flint-air surface to be CVFA. It turns out that the structure of the air-spaced achromat documented in Table 9 lies within the common aplanat region.

12. Analysis of Two-doublet Prior Art Combinations

A. Petzval Lenses

According to a modern authority, Rudolf Kingslake, in *A History of the Photographic Lens*, Academic Press, © 1989, page 35, Petzval's original design contained a (non-aplanatic) telescope objective as the first doublet. However, as Kingslake goes on to describe (on page 41), in 1878 F. R. von Voigtländer suggested eliminating the correction for spherical aberration in the first doublet of the Petzval to get better overall performance. Most subsequent Petzval lens design practice and instruction teaches away from using a spherically corrected achromat as the first component of a Petzval lens.

A second authority, A. E. Conrady, in *Applied Optics and Optical Design-Part One*, Dover, © 1985, page 360, has pointed out some design rules that govern two lens systems such as the Petzval. (This book was originally published in 1929, so these rules are at least contemporary with, if not earlier than, the Petzval lens patents that I have previously listed in Tables 2 and 17.) These rules were derived by Conrady from a detailed consideration of Seidel (third order) aberration theory. The first rule of interest here is:

"In a fully corrected system of two separated thin components, the latter must be individually achromatized."

This rule explains why the Petzval lens is always comprised of two doublets. The second rule of interest is:

"In an aplanatic system of two positive, thin separated components, a flat field is only attainable if neither component is aplanatic."

Here the term "aplanatic" when applied to the system as a whole means that the system as a whole is corrected for both spherical aberration and coma. The same term when applied to a component means that the component is corrected for spherical aberration and coma in its condition of use. Since the limiting problem with the Petzval is precisely field curvature (along with astigmatism), it is clear that the existence of this rule teaches strongly against the use of an aplanatic component in the Petzval. In particular, the first component of the Petzval must not be aplanatic, and since the first component is used in exactly the same condition in the Petzval as when it is used by itself if the stop is placed at or near the first component, this rule says that the first doublet in a Petzval must not be an aplanat if the stop is located there. The stop is often located at or near the first doublet in a Petzval.

B. Microscope Objectives

According to a third authority, Warren J. Smith in *Modern Optical Engineering*, 3rd. Ed., page 448, there is a microscope objective design composed of two achromatic doublets which is separable so that the objective can be used either with a particular one of the achromats or with both of the achromats together. Smith calls this objective a Lister objective, and I have no reason to dispute this nomenclature, but I have not been able to find any published designs for microscope objectives that have this separability property even though there are published designs referred to as "Lister" objectives, one of which I have included in my prior art Tables. In any case, Smith says:

"The divisible or separable (Lister) version is designed so that it can be used as a 16-mm or, by removing the front doublet, as a 32-mm objective. This is accomplished at the sacrifice of astigmatism correction, since both components must be independently free from spherical and coma and thus no correction of astigmatism is possible."

Smith then goes on to discuss in more detail the design of these and similar objectives and points out that the design of a two achromat microscope objective is very similar to the design of a Petzval lens. Finally he says (p. 449):

"Ordinarily three sets of shapes for the two components can be found for which spherical and coma are corrected. One form will be that of the divisible objective, with the spherical and coma zero for each doublet; this is usually the form with the poorest field curvature."

Note that these statements of Smith are consistent with the teachings of Conrady, stated above. Thus, according to the teachings of authorities on lens design, one would not expect to be able to combine a standard achromat with a second achromat to provide an improved image for the former over significant fields of view if the standard achromat is an aplanat. The prior art in two doublet lenses supports this conclusion, as I shall now show.

The first doublets (those closest to the object) of the prior art two doublet lenses have been analyzed as described above for scaled spherical aberration, SSA3, and scaled coma, SCO3. Tables 58 and 59 show the results of this analysis. These lenses in these tables are line by line the same lenses that were previously listed in Tables 2 and 17.

Since my criterion for the level of SSA3 that a lens can exhibit and still be effectively aplanatic is a function of the limiting aperture of the lens, through relationships (4), I have defined a new quantity, dS A3, which removes the trend:

$$dSA3 = SSA3 - y \qquad (6)$$

where y is the function of ILFN defined in (4). Thus, my criterion for the spherical aberration to be low can be expressed simply as:

$$-0.02 < dSA3 < +0.02 \qquad (7)$$

TABLE 58

Characteristics of the First Doublet - Type NR Prior Art

| Inventor or Authority | SCO3 | dS A3 |
|---|---|---|
| Original Petzval | -.2982 | .0182 |
| Repp, Pat. 1,415,002 | -.2024 | -.0234 |
| Frederick, Pat. 1,620,337 | -.3841 | .6015 |
| Schade, Pat. 2,500,046 | -.2343 | .1143 |
| Conrady | -.4631 | -.1828 |
| Kingslake | -.4852 | -.1993 |
| Smith FIG. 13-1 | -.3081 | .0509 |

TABLE 59

Characteristics of the First Doublet - Type NN Prior Art

| Inventor or Authority | SCO3 | dS A3 |
|---|---|---|
| Kingslake ("Lister") | .4483 | -.2025 |
| Repp, Pat. 1,479,251 | -.2186 | -.0105 |
| Warmisham, Pat. 1,484,853 | -.0724 | .0246 |

TABLE 59-continued

Characteristics of the First Doublet - Type NN Prior Art

| Inventor or Authority | SCO3 | dS A3 |
|---|---|---|
| Graf, Pat. 1,610,514 | −.4106 | .1494 |
| Richter, Pat. 1,843,519 | −.2298 | .0010 |
| Gehrke, Pat. 2,187,780 | −.1065 | .1350 |
| Werfeli, Pat. 2,774,445 | −.2096 | .0684 |
| Nagler, Pat. 4,400,065 | −.2116 | .0488 |
| Smith, FIG. 13-2 | −.1883 | −.0077 |
| Smith, FIG. 13-3 | −.7659 | −.2982 |
| Laikin, FIG. 5-1 | −.3582 | −.0216 |
| Kidger, FIG. 9-2 | −.5829 | .2036 |
| Doyle & Hoffman | −.4812 | −.2067 |
| Walker | .0122 | −.0067 |

In Tables 58 and 59, I have placed a bold border around those values which meet my criteria for low SCO3 and low SSA3. As one can see, in only a few of these lenses is the first doublet substantially corrected for spherical aberration with the object at infinity. In none of those cases is the first doublet also corrected for coma with the stop at the first doublet, save for the simulated Petzval of Walker, which is explicitly a combination of two common aplanats. Thus, the first doublet of a custom designed Petzval or non-separable, two-doublet microscope objective is never an aplanat, just as one would expect from the teachings of the authorities on lens design.

Another way to summarize this situation is that in the prior art of Petzval and Lister lenses, where each group is comprised of a positive-negative doublet, the first doublet is never effectively aplanatic unless the second one is also.

C. Eyepieces

As previously mentioned, there are eyepieces known in the prior art which comprise a pair of doublets. Usually the two doublets are identical; these are the so called "Symmetrical" or Plössl eyepieces, but there are examples where the two doublets are not the same and it is these latter eyepieces that are of interest here. In analyzing the properties of a number of these two doublet eyepieces I have found three examples where one of the doublets is an aplanat, that is, where the doublet is corrected for both spherical aberration (when oriented correctly) and for coma with the stop at the doublet. Two of these examples are from patents: A. König, U.S. Pat. No. 2,217,281 Example 2, and A. H. Bennett, U.S. Pat. No. 2,388,031. The third example is the previously mentioned published design by Linos Photonics, which was depicted in FIG. 57.

According to the discussion above, one would expect that the performance of such combinations, where one of the doublets is an aplanat, would be low and I have found shown this to be the case (see FIG. 58).

Thus we find from the teachings of lens design authorities that there can be no expectation that the field aberrations of an achromatic doublet that is useable by itself could be corrected with a second doublet. The prior art in Petzval lenses, microscope objectives, and eyepieces all supports this conclusion. In Petzvals and eyepieces, the individual components of the combination are not intended to be used by themselves, and generally would not be suitable for this purpose. In the separable microscope objective one component of the combination is explicitly intended to be used by itself as well as in combination with the second, but second component then explicitly does not, and according to the teachings of authorities, cannot, correct a field aberration of the first.

13. The Structural Characteristics of Type 1NR and Type 1NN Companions

I have found that there are particular relationships which must be maintained between the surface curvatures of a companion in order to produce good performance in combination with an achromat.

FIG. 110 depicts the structural characteristic of all but one of the Type 1NR embodiments using the same concepts that I have previously used to discuss the characteristics of the standard achromats. In FIG. 110 the scaled flint-air curvature of each of the embodiments is plotted against its scaled crown-air curvature, where the scaling factor is the focal length of the companion. Since the companion in Type 1NR is reversed in its orientation, I have reversed the signs of both curvatures of each companion before plotting them on this plane, thus defining the structural characteristics of the companion as if it were oriented normally. In this way, these characteristics can be directly compared to the characteristics of the common aplanats.

Where possible, I use as the focal length the minimum focal length in the wavelength range of 300 nm to 1500 nm as discussed above. Some companions do not have minimum focal lengths in this region. When this occurs, I use the focal length at either 300 nm or at 1500 nm, whichever focal length is smaller (assuming a companion of positive focal length).

One can see that most of the Type 1NR embodiments are located within a small region near to, but separated from the common aplanat region. Note that embodiment 2, is located very close to the common aplanat region; this was the main reason why I chose to include it as an example. While the structural characteristic of embodiment 2 is very near the common aplanat region, I find that it is far from effectively aplanatic. I am sure that a Type 1NR companion can be designed that has a structural characteristic that falls within the common aplanat region, however for best performance, I also believe that the resulting companion will not be effectively aplanatic.

I have found that good Type 1NR companions are all located within a relatively narrow band that slopes from the lower left towards the upper right on the (CVFA*$f_{min}$) versus (CVCA*$f_{min}$) plane. This situation is depicted in FIG. 111, where a quadrilateral has been drawn to represent the region within which the structural characteristics of good Type 1NR companions must lie. Note the location of embodiment 3 as compared to the other embodiments and the common aplanat region. The quality region for Type 1NR companions is defined numerically in Table 60.

TABLE 60

Boundary points defining the quality region for good Type 1NR companions.

| CVCA * $f_{min}$ | CVFA * $f_{min}$ |
|---|---|
| −66 | −53 |
| 44 | 22 |
| 44 | 37 |
| −66 | −38 |

Similarly, FIG. 112 depicts the structural characteristics of the Type 1NN companions. Since there are 27 Type 1NN embodiments, they are not all individually identified in the Figure, but the embodiments with extreme values of the structural characteristic, 13, 19, and 30, are identified. Note that these structural characteristics generally lie on the other side of the common aplanat region as compared to the Type 1NR companions.

The structural characteristics of embodiment 12, 25, 27, 28, 30, and 31 are contained within the common aplanat region. The only one of these that is effectively aplanatic is embodiment 12. This is typical of what I have found. Most good Type 1NN companions have structural characteristics that lie upwards and to the right of the common aplanat region. A fraction of them have characteristics that lie within the common aplanat region. Of those companions that do have structural characteristics that lie that region, only a small fraction are actually effectively aplanatic.

Just as with Type 1NR, I have found that good Type 1NN companions are also all located within a relatively narrow band that slopes from the lower left towards the upper right on the (CVFA*$f_{min}$) versus (CVCA*$f_{min}$) plane. FIG. 113 depicts the inner and outer regions within which the structural characteristics of Type 1NN companions must lie. The outer region is defined by the broken line, and the inner region is defined by the solid line. These regions are defined numerically in Tables 61 and 62.

The outer quality region captures some extreme companions designed with merit functions that reward high performance at low focal ratios and small fields of view, i.e., near 2 degrees semifield and at focal ratios of F/2.0 or so. For merit functions that give higher weight to larger fields and/or smaller focal ratios, I have found that the quality region is much smaller. I refer to this as the inner quality region.

TABLE 61

Boundary points defining the outer quality region for Type 1NN companions.

| CVCA * $f_{min}$ | CVFA * $f_{min}$ |
|---|---|
| −4 | −30 |
| 156 | 90 |
| 156 | 130 |
| −4 | 10 |

TABLE 62

Boundary points defining the inner quality region for Type 1NN companions.

| CVCA * $f_{min}$ | CVFA * $f_{min}$ |
|---|---|
| −4 | −14 |
| 60 | 50 |
| 60 | 58 |
| −4 | 6 |

14. Supplying Lens Combinations as Components

I have shown in detail how the companion offers the optical system designer much improved performance in intermediate field of view applications, and I have given examples of how it can be applied in practical systems. The advantages of the companion are broad; in fact, the companion addresses all of the technical issues that I identified as problems with the use of stock multi-element lenses in the Description of the Related Art at the beginning of this document.

My preferred method of providing the companion includes publishing its complete design structure. As I have shown by example, providing complete information allows a user to fully optimize his or her system design according to the specific requirements of the user's application. Inherent in this, although not previously made explicit, is that access to complete information enables the user to accurately predict what the performance of the system will be. This is often even more valuable to the user than is attaining a particular level of performance.

Alternatively, if complete design information is not supplied to the user, then at a minimum the detailed first order properties (that is, the focal length and principal plane locations) and the physical aperture of the companion must be supplied along with the previously discussed setup information. Supplying either complete information or this more limited set of information specifically addresses the first two problems I identified with using existing stock multi-element lenses.

The companion is supplied as a discrete component. This simple fact addresses the other two technical problems that I identified. These problems were that the internal stops of existing lenses lead to large vignetting when they are combined into systems, and that the lenses are often too large to fit into the available space. With the companion, on the other hand, the user has the flexibility of packaging the system however is needed, and placing a stop where it is most advantageous without incurring excess vignetting. In fact, although I didn't mention it earlier, the relatively large distance between the primary and the companion often allows for an optical system to be folded between the companion and its primary, should that be desirable. In addition, a companion could easily be reduced in physical aperture on a semi-custom basis to meet a particular user's mechanical constraints just as is currently done with standard achromats.

The companion being supplied as a discrete component is also necessary for the user to be able to make practical use of the complete design information when it is supplied. Thus, there are many important advantages offered the user by the existence of this new optical component.

The existence of these advantages, now that I have pointed them out, makes it obvious to review the properties of prior art lens combinations to determine how one could offer a user these same advantages by providing one or more of these combinations to the user as separate components. No one has, to my knowledge, previously suggested that any prior art lens combination could be usefully supplied as individual components to be recombined in a user's application to best match a user's space constraints, field of view, focal ratio, and stop location requirements. I now do make this suggestion, and I consider this new use to be part of my invention.

For instance, the use of a pair of two-lens optical systems to construct relays that are tolerant to a change in magnification is, to my knowledge, unknown in the prior art. In particular, no-one has attempted to use a pair of Petzval lenses this way, in which the distance between the two components of each Petzval would be changed to best suit the system magnification required. As far as I know, Petzvals have always been considered to be and used as lenses of fixed focal length. If it turns out that they are suitable, one could define a small set of Petzval lenses, in analogy to the small set of companions discussed above, and offer them as components in a product line of small size but large applicability. In this case, of course, one would have to design, manufacture, and supply both lenses of each Petzval, as opposed to the companion, which is correspondingly each a single new lens.

As the key concept is providing the two lens components individually, this also applies to newly designed two component lenses, when provided as individual components to the user. These two components do not necessarily need to both be doublets, over some range of applications one could be a singlet, with the other component designed appropriately to adequately correct the chromatic aberrations of the pair.

It would also be possible, of course, to supply lenses having more than two components to a user as components to be packaged by the user as required, but I believe that then the tradeoff between improved performance on the one hand, and the burden the user bears in aligning the system on the other hand, would not be favorable for a general purpose product line. In addition, it is the two-doublet prior art lenses that tend to have a large separation between the components, giving the user the most advantage in mechanical flexibility.

By the way, although I have not previously mentioned it, I have found that the alignment tolerances between the companion and the primary are in general quite reasonable, and should be easy for users to achieve.

Considering again the prior art in two-doublet combination lenses, in these combinations, one of the doublets could be considered as correcting for the field aberrations of the other. These combinations have been designed and contemplated for single purpose use, that is, at a particular field of view and focal ratio. It is not therefore obvious that one could extract a corrector lens from such a combination and then make that corrector available as a lens of general utility. It would be even less obvious to extract a corrector that would work with a standard achromat. However, it may be possible to do either, and I also consider these new uses as part of my invention.

As has been extensively discussed, there is also prior art (Walker's simulated Petzval) in which two standard achromats are combined. This lens design was intended solely as a teaching tool and not as a serious suggestion for improving the performance of optical systems. Part of the reason why are undoubtedly the teachings of the lens design authorities discouraging this approach, as I have explained. However, as I have shown, Walker's lens does have the potential to improve the performance of optical systems using stock lenses. It would now be obvious to one skilled in the art to search through combinations of standard achromats to find specific combinations that have particularly advantageous properties and that are able to provide at least some of the advantages I have pointed out for companion combinations. It would be obvious for manufacturers or marketers of achromats to do such a search and to publish the results for combinations of their achromats. It would also be obvious for manufacturers or marketers to design new achromats that can be advantageously combined with other achromats. I consider all of these activities as part of my invention: these are new uses for an achromat.

Since it is the optical performance of such a combination of achromats that would be the key to its value, I consider the dividing line between prior art combinations and new combinations that are part of my invention to be defined by the performance of Walker's lens. Here we are, of course, talking about a scaled version of Walker's lens; it being scaled to the focal length of the lens combination in question. Combinations of achromats that exceed the performance of Walker's lens are then what I consider to be part of my invention. I have already given a suitable definition of what I mean by exceeding the performance of Walker's lens; I use the same criteria I gave above in Section 10, Definitions, for a field correcting lens to be considered "well adapted to correct a field aberration".

CONCLUSIONS, RAMIFICATIONS, AND SCOPE

Accordingly, the reader will see that the improved system of this invention has many advantages over the prior art and solves the problems previously identified. It makes available to the user of catalog optical components images of improved quality and/or increased brightness for optical systems having an intermediate fields of view. Because the system relies on discrete optical components, the user obtains improved optical and mechanical flexibility as well. The user can place the system aperture stop where it is most advantageous without incurring an unacceptable amount of vignetting, and the user can easily accommodate the mechanical constraints of the particular application.

These advantages accrue to the user over an extremely wide range of system fields of view and focal ratios. Unlike with prior art optical systems, which have been designed for particular combinations of field of view and focal ratio, my new system is intended from the beginning to address this wide range. My companion doublet has been conceived as a new optical component having general utility. A key feature of the companion is that it cooperates with an optical component that is already widely used and commonly available to provide its advantages; thus it is attractive from cost and availability standpoints.

As I have shown, the combination of a companion and a standard achromat can have better performance than does any known prior art two-doublet combination in such applications and it has other unexpected and useful properties as well. One of the important features of the companion that greatly increases its usefulness is that it is intended to be supplied to the user together with its complete design structure information. This then allows a skilled user to more fully optimize the design of his or her system.

My innovations make possible an entirely new type of optical system: a variable magnification relay made from catalog optical components in which the imaging performance is stable as the magnification is varied. It also makes possible image relays made from catalog optical components in which the optical performance is not only high, but where that performance is stable as the position of the entrance pupil is varied.

The companion as a discrete optical component has not been anticipated. There are known field compressor/corrector lenses for astronomical telescopes, but these have more than two elements when implemented at high optical quality. Doublets have been suggested for use with achromatic telescope objectives, but these suggestions took no account of the issue of image quality. There are commercially available corrector lenses that I believe to be doublets, but these are claimed to be equally applicable to catadioptric telescopes as to refracting telescopes, showing that optical quality is not an issue for them, either. In addition, these correctors do not specify a range of primary focal lengths over which they are effective, nor do they provide any design information. Also, they are intended to be used only at relatively high focal ratios, and only for small fields of view. Most commonly their intended fields of view are smaller than even the lower limit of the intermediate field of view range, but at most they cover only a small portion of the small field of view end of the intermediate field of view range.

Another important reason that the companion has not been anticipated is that the concept is actually taught against in the prior art. This teaching discourages one from trying to correct the field aberrations of a primary lens, if that primary lens is an aplanat. The prior art in two-doublet multi-element lenses is consistent with this teaching. Since, as I have shown, the vast majority of standard achromats are aplanats (they are the common aplanats), the most common application of the companion will be using aplanats as primaries. In fact, all of my examples use common aplanats as primaries. The combination of these facts makes the companion as a discrete optical component unobvious as well as unanticipated.

Prior art lens combinations also do not anticipate the combination of a companion and an achromat, nor do they make it obvious. The reason is simply who is doing the combining, and how the combination is done. In the prior art there are known combinations of two doublets (some where one of the doublets could be considered as correcting for a field aberration of the other), such as Petzvals, Listers, and eyepieces. However, these combinations are known only in fixed assemblies, optimized for particular field of view and focal ratio. New is my combination of a pair of components of general utility, into a combination optimized for the user's particular situation. Once again, when the combination is performed by the user, the user gains the advantages I have shown in flexibility and performance in the user's particular application.

In the prior art Walker has disclosed a lens comprising the combination of two achromats. This prior art combination does not anticipate my companion combination or make it obvious because it specifically disavows the correcting of any aberrations in the combination. This art was intended as a teaching tool and not as a serious suggestion for improving the optical performance of systems, at least partially because of the teachings of authorities on lens design.

Now that I have pointed the way, it will be obvious to search through combinations of standard achromats to find combinations in which one achromat is well adapted to correct a field aberration of the other.

In summary, I have developed a completely new approach to the design and implementation of optical systems that use catalog (stock) lenses. I provide new apparatus and new methods of providing this apparatus to the user of catalog lenses that enables that user to implement optical systems which are completely outside the range contemplated in the prior art.

From my disclosure, a number of implications will be clear to one skilled in the art. For instance, standard achromats are corrected for spherical aberration with an object at a long (generally referred to as infinite) distance. Thus the companion combination, as I have described it, is directed toward working at infinite conjugates. However, the same concept can be used for primaries corrected for other distances also, and then the companion combinations will be corrected for those same object distances.

All of my embodiments have been shown with and have been particularly well suited to use with common aplanats as primaries. The common aplanats are, as I have shown, the most common of the standard achromats. However, one could adapt companions for another subset of standard achromats or even for a particular design type of a more general achromatic doublet. There may be advantages to doing this for special-purpose applications. For instance, there have recently been made available achromatic doublets for the near infrared wavelength region, some characterized for use out to 1.8 microns. These have significantly different properties than standard achromatic doublets and one would anticipate that companions designed to be used with them might have significantly different properties than the companions I have disclosed here. Nevertheless, I consider such companions to be part of my invention.

As mentioned previously, the companion can also be air spaced. This is of less interest because it is more costly—there are two extra lens surfaces to be anti-reflection coated and a lens cell is required. Of course, an air-spaced companion could be supplied to user as components, but then user would have a much greater alignment burden. I do expect that air spaced companions could enable combination optical systems to have even higher performance than I have demonstrated in the low field of view, low focal ratio region.

The type of achromat discussed throughout this document has been the crown-in-front or "Fraunhofer" achromat. The normal orientation of such an achromat is with the crown element oriented toward the long conjugate, that is, toward the distant object, as has been discussed. In fact, I found that every achromat, cemented or air-spaced, listed in the catalogs supplied to the ZEMAX optical design program was a Fraunhofer achromat.

Those skilled in the art will be aware that there is another type of achromat, called the flint-in-front or "Steinheil" that can also be used in the same applications for which Fraunhofer achromats are suitable. The structures of such achromats will, in general, differ from the structures of the common aplanats, so that the common aplanat region I have defined will not apply to them. However, Steinheil achromats can have both low spherical aberration and low coma, and thus be effectively aplanatic, just as long as they satisfy the two conditions (4) and (5).

Steinheil achromats can also be used as primaries in my companion combinations, and companions designed for Fraunhofer achromats will also work with Steinheil achromats of the same focal length. However, the Type designation of the companion combination needs to be changed if a Steinheil achromat is used as a primary, since the normal orientation of the Steinheil is what I refer to as "R". Thus, if a Steinheil primary is used, my Type 1NR becomes Type 1RR and my Type 1NN becomes Type 1RN. Also, I choose to always define the "stop-in-contact" configuration as the stop being located in the same plane as the external vertex of the crown element. With a Steinheil primary in Type 1, this places the stop behind the primary with respect to the object, but that should make little practical difference from the situation where the stop is located in front of the lens with respect to the object.

In all of my system relay examples, I have shown relays comprised of two achromats or of two companion combinations. I have found that it is also possible to make a useful relay by combining a single companion combination with a single achromat, the companion combination forming one side of the relay, and the achromat the other. Such systems are intermediate in cost and performance between achromat relays and companion combination relays, and will be useful in some circumstances.

I claim:

1. An image improving lens for providing an improved intermediate field of view image of an object, wherein:
    (a) said image improving lens comprises a lens element having a positive focal length disposed adjacent to a lens element having a negative focal length;
    (b) said image improving lens has a specified nominal correctable focal length;
    (c) the image improvement becomes effective when said image improving lens is disposed in optical cooperation with an achromatic doublet, the achromatic doublet having a primary focal length, said image improving lens comprising means for correcting a field aberration of the achromatic doublet, and wherein said optical cooperation fulfills the following conditions:

(d) said primary focal length lies within an effective range of said specified nominal correctable focal length;
(e) a first image of said object is formed by the achromatic doublet, said first image being disposed at an image distance from the achromatic doublet;
(f) said first image is magnified by said image improving lens to form an improved second image;
(g) the magnification of said second image with respect to said first image lies between 0.25 and 0.90; and
(h) a distance between said image improving lens and the achromatic doublet is smaller than said image distance.

2. The image improving lens of claim 1 wherein a setup parameter is specified for said image improving lens, said setup parameter being selected from the group consisting of a final image distance and a corrector object distance and a distance between said image improving lens and the achromatic doublet.

3. The image improving lens of claim 1 wherein the complete design structure of the image improving lens is specified, thereby allowing a user to optimize the setup of the image improving lens and the achromatic doublet to best suit the user's particular application.

4. The image improving lens of claim 1 wherein said image improving lens has a physical aperture diameter, said physical aperture diameter being at least 10% of said primary focal length.

5. The image improving lens of claim 1 further comprising the achromatic doublet.

6. A coordinated group of field correcting lenses, comprising a plurality of field correcting lenses, wherein:
(a) each of said plurality of field correcting lenses comprises a lens element having a positive focal length disposed adjacent to a lens element having a negative focal length;
(b) each of said plurality of field correcting lenses has a nominal operating magnification;
(c) each of said plurality of field correcting lenses has a nominal operating focal length, the nominal operating focal length being different for each lens in the group, and there being minimum and maximum operating focal lengths for the group;
(d) the nominal magnification and the nominal operating focal length thereby defining a nominal correctable focal length for each member of the group as the mathematical ratio of said nominal operating focal length to said nominal operating magnification;
(e) each one correcting lens of said group is adapted to correct a field aberration of an achromatic doublet when said each one correcting lens is placed into optical cooperation with the achromatic doublet, the achromatic doublet having a focal length within an effective range of said nominal correctable focal length for said each one correcting lens;
(f) said optical cooperation producing an operating focal length that lies between said group minimum and maximum operating focal lengths; and
(g) the correction of said field aberration remaining effective at least for operating focal lengths that are numerically closer to said nominal operating focal length of said each one correcting lens than they are to the nominal operating focal length of any other lens in the group.

7. The coordinated group of field correcting lenses of claim 6 wherein the nominal operating focal lengths of the group are disposed in a substantially geometric series.

8. A method of making available an optical system having an improved optical performance to a user of achromatic doublet lenses, said optical system having a specified system focal length, said method comprising:

(a) providing a plurality of field correcting lenses, each of said plurality being adapted to correcting a field aberration of an achromatic doublet, each also being adapted for use in an optical system having a specific individual focal length, and each also being adapted for use at a specific individual magnification, said specific individual focal length and said specific individual magnification implying, for each of said plurality of field correcting lenses, a specific individual primary focal length of a matching primary achromat as the mathematical ratio of said specific individual focal length to said specific individual magnification;
(b) providing to the user, for each of said plurality of field correcting lenses, at least two of these data items: the specific individual focal length, the specific individual magnification, and the specific individual primary focal length; and
(c) teaching the user how to combine one of said plurality of field correcting lenses with a suitable primary achromat to produce a composite optical system having said system focal length and having an optical performance that is improved over the performance of an achromatic doublet having said system focal length.

9. The method of claim 8 wherein the step of teaching the user includes the step of teaching the user how to select a suitable primary achromat that will also provide at least a desired level of edge transmission at a desired optical system field of view at a desired optical system focal ratio.

10. The method of claim 8 wherein the step of teaching the user includes the step of providing the user with the complete design structure for at least one of said plurality of field correcting lenses, thereby allowing the user to further optimize the performance of said optical system.

11. A method of providing a lens having improved mechanical flexibility, optical flexibility, usability, and optical performance to a user, comprising:
(a) identifying a lens combination having suitable optical properties, said lens combination comprising two component lenses, at least one of said component lenses being a doublet;
(b) providing at least one of said two component lenses to said user as a discrete optical component; and
(c) teaching the user how said discrete optical component can be combined by the user with a cooperating lens to produce a combination optical system having improved mechanical and optical properties desired by the user.

12. The method of claim 11 wherein the step of providing comprises the step of providing both component lenses to the user, one of the component lenses thereby being the discrete optical component and the other being the cooperating lens, and wherein the step of teaching comprises the step of teaching the user how to combine the two component lenses to produce said combination optical system.

13. The method of claim 11 wherein the step of identifying comprises the step of selecting from combinations of two standard achromats, and wherein one of said two component lenses is well adapted to correct a field aberration of the other.

14. The method of claim 11 wherein the step of identifying comprises designing a new combination of two component lenses.

15. A field correcting lens for correcting a field aberration of a primary lens, said primary lens having a primary focal length, wherein:
(a) said field correcting lens comprises a lens element having a positive focal length disposed adjacent to a lens element having a negative focal length;

(b) said field correcting lens has a specified nominal correctable focal length;

(c) said field correcting lens is adapted to correct said field aberration of an achromatic doublet when said field correcting lens is placed into optical cooperation with the achromatic doublet, the achromatic doublet thereby acting as the primary lens, wherein said optical cooperation fulfills the following conditions:

(d) said primary focal length lies within an effective range of said specified nominal correctable focal length;

(e) a first image of an object is formed by said primary lens, said first image being disposed at an image distance from said primary lens;

(f) said first image is magnified by said field correcting lens to form a second image;

(g) the magnification of said second image with respect to said first image lies between 0.25 and 0.90; and (h) a distance between said field correcting lens and said primary lens is smaller than said image distance.

16. The field correcting lens of claim 15 wherein a combination of said field correcting lens and said primary lens has a combination focal length and wherein said combination focal length lies between 5 and 500 millimeters.

17. The field correcting lens of claim 15 adapted to effecting a correction when it is disposed between said primary lens and said first image.

18. The field correcting lens of claim 17 adapted to effecting a correction when said primary lens is a crown-in-front achromat with its crown element oriented toward said image.

19. The field correcting lens of claim 18 adapted to effecting a correction when said lens element having a positive focal length is disposed between said primary lens and said lens element having a negative focal length.

20. The field correcting lens of claim 19 having a design form as scaled for a composite focal length of 25 length units and a back focal length of 5 units when used with a primary lens having a focal length of 50 units, substantially as follows:

| RADIUS | THICKNESS | MEDIUM | INDEX | V-NUMBER |
|---|---|---|---|---|
| 12.76417 | 7.50000 | N-LAK22 | 1.65113 | 55.89 SCHOTT |
| −14.75295 | 5.00000 | SF2 | 1.64769 | 33.85 SCHOTT. |
| 13.87051 | — | AIR | | |

21. The image improving lens of claim 1 wherein a combination of said image improving lens and said achromatic doublet has a combination focal length and wherein said combination focal length lies between 5 and 500 millimeters.

22. The image improving lens of claim 1 wherein said means for correcting is well adapted to correct a field aberration of the achromatic doublet.

23. The image improving lens of claim 1 wherein said means for correcting is exceedingly well adapted to correct a field aberration of the achromatic doublet.

24. The coordinated group of claim 6 wherein the nominal magnifications of all lenses in the group are in the range 0.25 to 0.90.

25. The coordinated group of claim 7, wherein the ratio between the nominal operating focal lengths of adjacent members of the group is no greater than the square root of 2.

26. The method of claim 8 wherein the step of teaching the user includes the step of teaching the user how to produce a composite optical system having an optical performance that is improved over the performance offered by a scaled version of the simulated Petzval lens of Walker.

27. The method of claim 8 wherein the step of teaching the user includes the step of teaching the user how to combine said composite optical system with a second optical system to provide the user with an improved optical relay system.

28. The method of claim 11 wherein the step of teaching the user comprises the step of providing the user with the complete design structure for each of the two components, thereby allowing the user to determine the optimum arrangement of these components in the user's specific application.

29. The method of claim 11 wherein the step of teaching comprises teaching the user how to combine said discrete optical component with a standard achromat.

30. The method of claim 11 wherein the step of teaching comprises teaching the user how to combine two of said combination optical systems to form an optical relay system.

31. The method of claim 13 wherein the step of selecting comprises the step of selecting from combinations of two common aplanats.

32. The field correcting lens of claim 15 wherein a setup parameter is specified for said field correcting lens, said setup parameter being selected from the group consisting of a final image distance and a corrector object distance and a distance between said field correcting lens and said primary lens.

33. The field correcting lens of claim 15 wherein the complete design structure of the field correcting lens is specified, thereby allowing a user to optimize the setup of the field correcting lens and the primary lens to best suit the user's particular application.

34. The field correcting lens of claim 15 wherein said field correcting lens has a physical aperture diameter, said physical aperture diameter being at least 10% of said primary focal length.

35. The field correcting lens of claim 15 further comprising the achromatic doublet.

36. The field correcting lens of claim 15 adapted to effecting a correction when it is disposed between said object and said primary lens.

37. The field correcting lens of claim 36 adapted to effecting a correction when said element having a positive focal length is disposed between said object and said element having a negative focal length.

38. The field correcting lens of claim 37 having a design form as scaled for a composite focal length of 25 length units and a back focal length of 5 units, when used with a primary lens having a focal length of 50 units, substantially as follows:

| RADIUS | THICKNESS | MEDIUM | INDEX | V-NUMBER |
|---|---|---|---|---|
| 10.83057 | 4.40179 | N-BAF10 | 1.67003 | 47.11 SCHOTT |
| −13.76185 | 5.00000 | N-SF8 | 1.68894 | 31.31 SCHOTT |
| 16.08044 | — | AIR | | |

39. The field correcting lens of claim 17 adapted to effecting a correction when said primary lens is a crown-in-front achromat with its crown element oriented toward said object.

40. The field correcting lens of claim 39 adapted to effect a correction when said lens element having a negative focal length is disposed between said primary lens and said lens element having a positive focal length.

41. The field correcting lens of claim 40 wherein said element having a positive focal length comprises a crown glass having a V-number, and wherein said element having a negative focal length comprises a flint glass having an V-number, and wherein the V-number of said crown glass exceeds the V-number of said flint glass by at least 5.

42. The field correcting lens of claim 41 wherein said crown glass has a refractive index and wherein said flint glass has a refractive index and wherein the refractive index of the crown glass is no greater than 0.15 higher than the refractive index of the flint glass.

43. The field correcting lens of claim 42 wherein:
(a) said element having a negative focal length has a first surface closest to said object, and said first surface has a surface radius of curvature called CVFA;
(b) said element having a positive focal length has a second surface closest to said image, and said second surface has a surface radius of curvature called CVCA;
(c) said field correcting lens has a focal length called $f_{min}$;
(d) said surface radii of curvature CVFA and CVCA being defined with reversed mathematical signs as if said field correcting lens were oriented with said element having a positive focal length disposed nearest to said object; and
(e) the values defined by the quantities SCVCA=CVCA*$f_{min}$ and SCVFA=CVFA*$f_{min}$ fulfill the condition that the point in Cartesian coordinates defined as (SCVCA, SCVFA) lies internal to the quadrilateral region defined by the four points: (−66, −53), (44, 22), (44, 37) and (−66, −38).

44. The field correcting lens of claim 43 having a design form as scaled for a composite focal length of 50 length units and a back focal length of 37 units, when used with a primary lens having a focal length of 100 units, substantially as follows:

| RADIUS | THICKNESS | MEDIUM | INDEX | V-NUMBER |
|---|---|---|---|---|
| 47.63407 | 2.50000 | SF5 | 1.67270 | 32.21 SCHOTT |
| 21.88088 | 8.00000 | S-BAL3 | 1.57135 | 52.95 OHARA |
| −273.22408 | — | AIR | | |

45. The field correcting lens of claim 39 adapted to effect a correction when said lens element having a positive focal length is disposed between said primary lens and said lens element having a negative focal length.

46. The field correcting lens of claim 45 wherein said element having a positive focal length comprises a crown glass having a V-number, and wherein said element having a negative focal length comprises a flint glass having an V-number, and wherein the V-number of said crown glass exceeds the V-number of said flint glass by at least 5.

47. The field correcting lens of claim 46 wherein said crown glass has a refractive index and wherein said flint glass has a refractive index and wherein the refractive index of the crown glass is no greater than 0.15 higher than the refractive index of the flint glass.

48. The field correcting lens of claim 47 wherein:
(a) said element having a positive focal length has a first surface closest to said object, and said first surface has a surface radius of curvature called CVCA;
(b) said element having a negative focal length has a second surface closest to said image, and said second surface has a surface radius of curvature called CVFA;
(c) said field correcting lens has a focal length called $f_{min}$; and
(d) the values defined by the quantities SCVCA=CVCA*$f_{min}$ and SCVFA=CVFA*$f_{min}$ fullfill the condition that the point in Cartesian coordinates defined as (SCVCA, SCVFA) lies internal to the quadrilateral region defined by the four points: (−4, −30), (156, 90), (156, 130) and (−4, 10).

49. The field correcting lens of claim 48 wherein the point (SCVCA, SCVFA) lies internal to the quadrilateral region defined by the four points: (−4, −14), (60, 50), (60, 58) and (−4, 6).

50. The field correcting lens of claim 49 having a design form as scaled for a composite focal length of 50 length units and a back focal length of 10 units, when used with a primary lens having a focal length of 75 units, substantially as follows:

| RADIUS | THICKNESS | MEDIUM | INDEX | V-NUMBER |
|---|---|---|---|---|
| 35.75300 | 17.81600 | F6 | 1.63636 | 35.34 SCHOTT |
| −15.98200 | 3.00000 | SF4 | 1.75520 | 27.58 SCHOTT |
| −11970.00000 | — | AIR | | |

51. The field correcting lens of claim 49 wherein the V-number of said crown glass exceeds the V-number of said flint glass by at least 10.

52. The field correcting lens of claim 51 having a design form as scaled for a composite focal length of 50 length units and a back focal length of 5 units, when used with a primary lens having a focal length of 100 units, substantially as follows:

| RADIUS | THICKNESS | MEDIUM | INDEX | V-NUMBER |
|---|---|---|---|---|
| 17.75129 | 6.14937 | S-LAL18 | 1.72916 | 54.68 OHARA |
| −42.64251 | 10.00000 | SF5 | 1.67270 | 32.21 SCHOTT |
| 18.28838 | — | AIR | | |

53. The field correcting lens of claim 51 wherein the refractive index of the crown glass is substantially equal to the refractive index of the flint glass.

54. The field correcting lens of claim 51 wherein said crown element has curvatures of equal absolute value on its two faces.

55. The field correcting lens of claim 54 having a design form as scaled for a composite focal length of 50 length units and a back focal length of 10 units, when used with a primary lens having a focal length of 100 units, substantially as follows:

| RADIUS | THICKNESS | MEDIUM | INDEX | V-NUMBER |
|---|---|---|---|---|
| 28.05666 | 14.70410 | S-LAM54 | 1.75700 | 47.82 OHARA |
| −28.05666 | 6.87485 | SF4 | 1.75520 | 27.58 SCHOTT |
| 49.05478 | — | AIR | | |

* * * * *

UNITED STATES PATENT AND TRADEMARK OFFICE
CERTIFICATE OF CORRECTION

PATENT NO.         : 7,224,539 B2
APPLICATION NO.    : 11/432944
DATED              : May 29, 2007
INVENTOR(S)        : David F. Schaack It is certified that error appears in the above-identified patent and that said Letters Patent is hereby corrected as shown below:

Column 18, line 65, replace " embodiment I " with -- embodiment 1 --.

Column 34, line 49, replace " lense " with -- lens --.

Column 45, line 63, insert -- in this -- after " Thus ".

Column 56, line 43, replace " ways " with -- easy --.

Column 66, line 30, delete the comma after " image ".

Column 69, line 45, replace " pace " with -- place --.

Column 75, line 51, replace " run " with -- nm --.

Column 76, line 10, replace " 1 " with -- I --.

Column 76, line 47, replace " Atlanta " with -- aplanatic --.

Column 77, Equation (4), replace " $y = 0.02$ " with -- $y - 0.02$ --.

Column 78, line 18, replace " Atlanta " with -- aplanatic -- (2 places).

Column 80, line 30 and Tables 58 and 59, replace "dS A3 " with -- dSA3 --.

UNITED STATES PATENT AND TRADEMARK OFFICE
CERTIFICATE OF CORRECTION

PATENT NO. : 7,224,539 B2
APPLICATION NO. : 11/432944
DATED : May 29, 2007
INVENTOR(S) : David F. Schaack Page 2 of 2

It is certified that error appears in the above-identified patent and that said Letters Patent is hereby corrected as shown below:

Col. 89, line 53; Claim 6, clause (f), replace " said group " with -- the group --.

Col. 89, line 66; Claim 8, delete " specified ".

Col. 90, line 2; Claim 8, clause (a), line 2, replace " correcting " with -- correct --.

Col. 90, lines 43-44; Claim 11, clause (c), replace " how said discrete optical component can be combined by the user " with -- how to combine said discrete optical component --.

Signed and Sealed this

Fourth Day of March, 2008

JON W. DUDAS
*Director of the United States Patent and Trademark Office*